United States Patent
Sitrick et al.

(10) Patent No.: US 10,387,836 B2
(45) Date of Patent: Aug. 20, 2019

(54) SYSTEMS AND METHODS PROVIDING COLLABORATING AMONG A PLURALITY OF USERS

(71) Applicants: David Howard Sitrick, Pacific Palisades, CA (US); Russell Thomas Fling, Powell, OH (US)

(72) Inventors: David Howard Sitrick, Pacific Palisades, CA (US); Russell Thomas Fling, Powell, OH (US)

(*) Notice: Subject to any disclaimer, the term of this patent is extended or adjusted under 35 U.S.C. 154(b) by 0 days.

(21) Appl. No.: 14/951,414

(22) Filed: Nov. 24, 2015

(65) Prior Publication Data
US 2019/0147402 A1 May 16, 2019

(51) Int. Cl.
| | |
|---|---|
| G06Q 10/10 | (2012.01) |
| G06F 3/14 | (2006.01) |
| H04N 21/233 | (2011.01) |
| H04N 21/234 | (2011.01) |
| G06F 9/54 | (2006.01) |
| H04L 12/18 | (2006.01) |
| H04L 29/06 | (2006.01) |
| H04M 3/56 | (2006.01) |
| H04N 7/15 | (2006.01) |

(52) U.S. Cl.
CPC ......... *G06Q 10/103* (2013.01); *G06F 3/1454* (2013.01); *G06F 9/542* (2013.01); *H04L 12/1813* (2013.01); *H04L 65/4015* (2013.01); *H04M 3/567* (2013.01); *H04N 7/15* (2013.01); *H04N 21/233* (2013.01); *H04N 21/234* (2013.01)

(58) Field of Classification Search
CPC .................................................. G06Q 10/103
USPC ......................................................... 715/753
See application file for complete search history.

(56) References Cited

U.S. PATENT DOCUMENTS

| | | | | |
|---|---|---|---|---|
| 7,418,656 B1* | 8/2008 | Petersen | ............... | G06F 17/241 715/230 |
| 7,536,637 B1* | 5/2009 | Nauerz | ................. | G06F 16/958 715/230 |
| 7,975,215 B2* | 7/2011 | Duncan | ................... | G06T 11/60 715/230 |
| 8,131,833 B2* | 3/2012 | Hadas | ................. | H04L 65/4076 709/204 |
| 8,131,866 B2* | 3/2012 | Samra | ................... | G06F 17/241 709/231 |
| 8,132,094 B1* | 3/2012 | Bryar | .................... | G06F 17/241 715/230 |
| 8,296,170 B2* | 10/2012 | O'Brien | ................. | G06Q 10/06 705/7.12 |

(Continued)

*Primary Examiner* — William D Titcomb
(74) *Attorney, Agent, or Firm* — Sitrick & Strick

(57) ABSTRACT

A computing appliances for use by a user, provide for collaboration on a common project having an associated base image display. User data representative of a respective display of annotations responsive to user input is stored. The user data is comprised of event content data for respective events that are generated in a defined order of entry relative to other of the events. Presentation assembly logic, selectively retrieves respective said event content data for said events in the selected set responsive to the mapping logic, and generates presentation data responsive to processing the event content data for said events in the selected set, in a respective defined order of entry relative to other of the events.

36 Claims, 67 Drawing Sheets

(56) References Cited

U.S. PATENT DOCUMENTS

| | | | | |
|---|---|---|---|---|
| 8,347,207 | B2* | 1/2013 | Borgsmidt | G06F 16/283 |
| | | | | 715/231 |
| 8,418,055 | B2* | 4/2013 | King | G06F 17/211 |
| | | | | 715/234 |
| 9,195,965 | B2* | 11/2015 | Sitrick | G06Q 10/101 |
| 9,977,654 | B2* | 5/2018 | Coslovi | G06F 8/20 |
| 2009/0193327 | A1* | 7/2009 | Roychoudhuri | G06F 17/241 |
| | | | | 715/231 |
| 2009/0307762 | A1* | 12/2009 | Cudd, Jr. | G06F 16/954 |
| | | | | 726/5 |
| 2010/0278453 | A1* | 11/2010 | King | G06Q 10/10 |
| | | | | 382/321 |

* cited by examiner

Fig 13

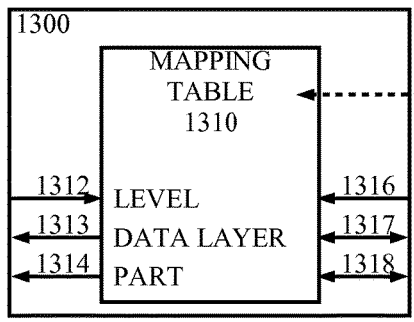

| 1330 Mapping Table Data Example for User C ||||
| LEVEL | DATA LAYER | PART |
|---|---|---|
| 3 | DATA LAYER 2 | PAGE 1 |
| 2 | DATA LAYER 4 | PAGE 1 |
| 1 | DATA LAYER 3 | PAGE 1 |
| 0 | DATA LAYER 1 | PAGE 1 |

| 1331 Mapping Table Data Example for User B ||||
| LEVEL | DATA LAYER | PART |
|---|---|---|
| 1 | DATA LAYER 3 | PAGE 2 |
| 0 | DATA LAYER 1 | PAGE 2 |

| 1332 Mapping Table Data Example for User A ||||
| LEVEL | DATA LAYER | PART |
|---|---|---|
| 1 | DATA LAYER 2 | PAGE 1 |
| 0 | DATA LAYER 1 | PAGE 1 |

Fig 14

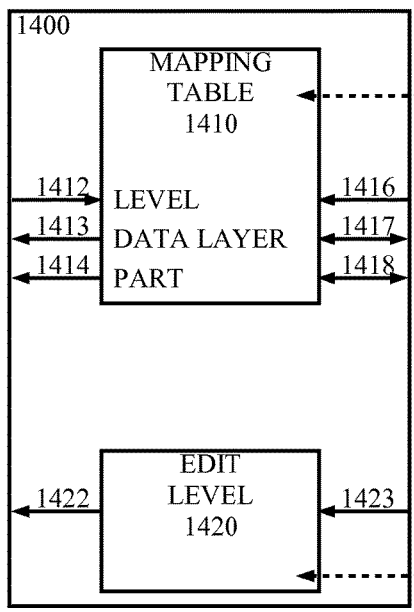

| 1430 Mapping Table Data Example for User C ||||
| LEVEL | DATA LAYER | PART |
|---|---|---|
| 3 | DATA LAYER 2 | PAGE 1 |
| 2 | DATA LAYER 4 | PAGE 1 |
| 1 | DATA LAYER 3 | PAGE 1 |
| 0 | DATA LAYER 1 | PAGE 1 |

| 1431 Mapping Table Data Example for User B ||||
| LEVEL | DATA LAYER | PART |
|---|---|---|
| 1 | DATA LAYER 3 | PAGE 2 |
| 0 | DATA LAYER 1 | PAGE 2 |

| 1432 Mapping Table Data Example for User A ||||
| LEVEL | DATA LAYER | PART |
|---|---|---|
| 1 | DATA LAYER 2 | PAGE 1 |
| 0 | DATA LAYER 1 | PAGE 1 |

1440 Edit Table Data Example for User C

| EDIT LEVEL |
|---|
| 2 |

1441 Edit Table Data Example for User B

| EDIT LEVEL |
|---|
| 1 |

1442 Edit Table Data Example for User A

| EDIT LEVEL |
|---|
| 1 |

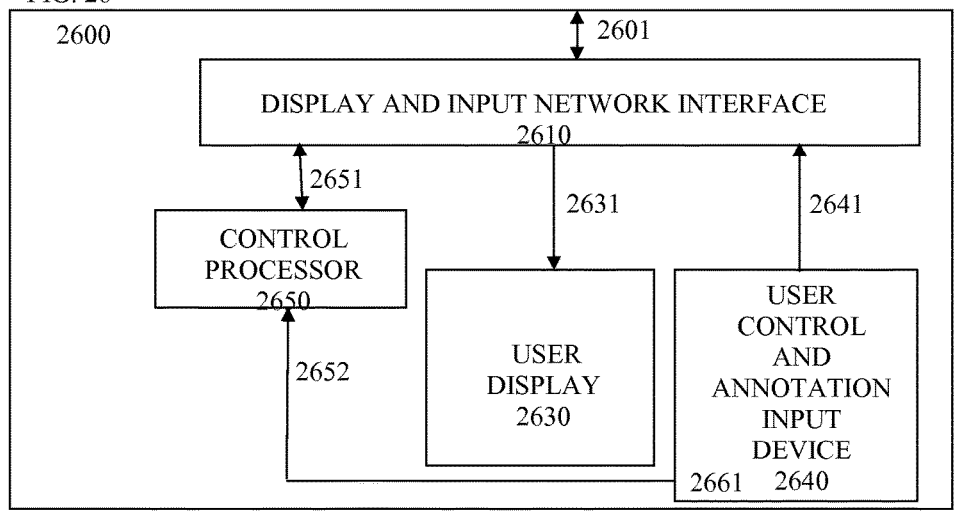
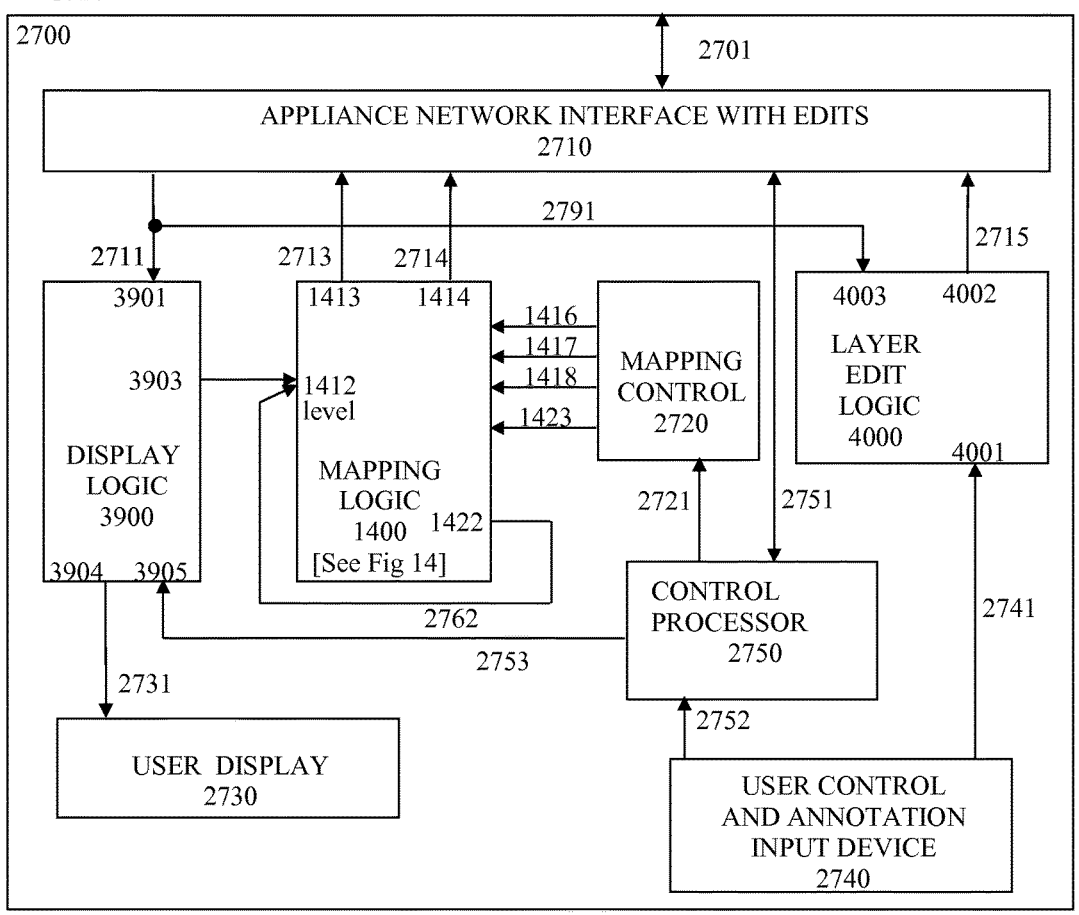

FIG. 29

LEADER 1 MAPPING LOGIC

Mapping Table

| Level | Layer | Part |
|---|---|---|
| 4 | LEADER 1 | PAGE 1 |
| 3 | LEADER 2 | PAGE 1 |
| 2 | OPTIONAL 1 | PAGE 1 |
| 1 | OPTIONAL 2 | PAGE 1 |
| 0 | COMMON | PAGE 1 |

| Edit Level |
|---|
| 4 |

MEMBER 3 MAPPING LOGIC

Mapping Table

| Level | Layer | Part |
|---|---|---|
| 4 | MEMBER 3 | PAGE 3 |
| 3 | LEADER 1 | PAGE 3 |
| 2 | LEADER 2 | PAGE 3 |
| 1 | OPTIONAL 3 | PAGE 3 |
| 0 | COMMON | PAGE 3 |

| Edit Level |
|---|
| 4 |

LEADER 2 MAPPING LOGIC

Mapping Table

| Level | Layer | Part |
|---|---|---|
| 2 | LEADER 2 | PAGE 5 |
| 1 | LEADER 1 | PAGE 5 |
| 0 | COMMON | PAGE 5 |

| Edit Level |
|---|
| 2 |

MEMBER 4 MAPPING LOGIC

Mapping Table

| Level | Layer | Part |
|---|---|---|
| 3 | MEMBER 4 | PAGE 5 |
| 2 | LEADER 1 | PAGE 5 |
| 1 | LEADER 2 | PAGE 5 |
| 0 | COMMON | PAGE 5 |

| Edit Level |
|---|
| 3 |

FIG. 32

TEACHER MAPPING LOGIC IN
TEACHER MODE

| Mapping Table | | |
|---|---|---|
| Level | Layer | Part |
| 1 | TEACHER | LESSON 6 |
| 0 | COMMON | LESSON 6 |

| Edit Level |
|---|
| 1 |

STUDENT Y MAPPING LOGIC

| Mapping Table | | |
|---|---|---|
| Level | Layer | Part |
| 2 | STUDENT Y | LESSON 6 |
| 1 | TEACHER | LESSON 6 |
| 0 | COMMON | LESSON 6 |

| Edit Level |
|---|
| 2 |

TEACHER MAPPING LOGIC IN
MULTI-MODE

| Mapping Table | | |
|---|---|---|
| Level | Layer | Part |
| ... | more students | LESSON 6 |
| 4 | STUDENT 3 | LESSON 6 |
| 3 | STUDENT 2 | LESSON 6 |
| 2 | STUDENT 1 | LESSON 6 |
| 1 | TEACHER | LESSON 6 |
| 0 | COMMON | LESSON 6 |

| Edit Level |
|---|
| none |

TEACHER MAPPING LOGIC
IN STUDENT MODE FOR STUDENT X

| Mapping Table | | |
|---|---|---|
| Level | Layer | Part |
| 2 | STUDENT X | LESSON 6 |
| 1 | TEACHER | LESSON 6 |
| 0 | COMMON | LESSON 6 |

| Edit Level |
|---|
| 2 |

FIG. 37

AD HOC MEMBER 1 MAPPING LOGIC
WITH DISTRIBUTED DATA LAYERS

| Mapping Table | | |
|---|---|---|
| Level | Layer | Part |
| 2 | MEMBER 1 | PAGE 7 |
| 1 | NOTES 1 | PAGE 7 |
| 0 | COMMON | PAGE 7 |

| Edit Level |
|---|
| 2 |

AD HOC MEMBER2 MAPPING LOGIC
WITH DISTRIBUTED DATA LAYERS

| Mapping Table | | |
|---|---|---|
| Level | Layer | Part |
| 2 | MEMBER 2 | PAGE 8 |
| 1 | MEMBER 1 | PAGE 8 |
| 0 | COMMON | PAGE 8 |

| Edit Level |
|---|
| 1 |

AD HOC MEMBER 3 MAPPING LOGIC
WITH DISTRIBUTED DATA LAYERS

| Mapping Table | | |
|---|---|---|
| Level | Layer | Part |
| 1 | MEMBER 1 | PAGE 7 |
| 0 | COMMON | PAGE 7 |

| Edit Level |
|---|
| none |

FIG. 38

THE USER ON THE SENDING APPLIANCE SELECTS A PORTION OF LAYER DATA IN A DATA LAYER (THAT IS MARKED FOR EDIT OR ANY DATA THAT IS SELECTED)

↓

USER ON THE SENDING APPLIANCE SELECTS ONE OR A PLURALITY OF RECEIVING APPLIANCES ON TEAM

↓

SENDING APPLIANCE SENDS THE RESPECTIVE PORTION OF THE LAYER DATA TO RECEIVING APPLIANCES

↓

EACH RECEIVING APPLIANCE MODIFIES THE LAYER DATA IN THE DATA LAYER MARKED FOR EDIT FOR THE RESPECTIVE RECEIVING APPLIANCE WITH THE RECEIVED PORTION OF THE LAYER DATA.

*identification message from a non-Coordinator Appliance* →

*identification message from a Coordinator Appliance* →

5300

3 items are shown in each list,
each list can contain any number including none (0)

| 6101 |
| 6103 | Chat Frankie |
| 6111 | From: John Hey how's it going? |
| 6112 | From: Mary I'm having a bad day. |
| 6113 | From: Jim Check out stock JUNK is going up. |
| 6114 | From: Me Just fine. |
| 6115 | From: Sally Just love your music. |
| 6116 | From: Jane I'm looking forward to next concert |
| 6117 | From: Russ When is the concert? |
| 6118 | From: David Next month at Odium Theater |
| 6119 | From: Jane at 7pm |
| 6120 | From: John Great, dinner with wives tonight? |
| 6121 | From: Fred I'm looking forward to concert too! |
| 6122 | From: Randy Jane want to go with me? |
| 6123 | From: Kim Randy, what can I get a ride? |
| 6124 | From: FrankS Concert will be great, new song |
| 6125 | From: Me Yes how about 8pm at OShay's |
| 6126 | From: Bill Kim, I can pick you up. |
| 6127 | From: Jim Now at 45. |
| 6128 | From: John Need to talk PR at dinner. |

Fig 62

| 6201 |
| 6203 | Chat Frankie    Show: John  6204 |
| 6111 | From: John Hey how's it going? |
| 6114 | From: Me Just fine. |
| 6120 | From: John Great, dinner with wives tonight? |
| 6125 | From: Me Yes how about 8pm at OShay's |
| 6128 | From: John Need to talk PR at dinner. |

Fig 63

Chat — Show: Groupies  [6304]
Frankie  [6303]
From: Mary  I'm having a bad day.  [6112]
From: Jim  Check out stock JUNK is going up.  [6113]
From: Sally  Just love your music.  [6115]
From: Jane  I'm looking forward to next concert  [6116]
From: Russ  When is the concert?  [6117]
From:David  Next month at Odium Theater  [6118]
From: Jane  at 7pm  [6119]
From: Fred  I'm looking forward to concert too!  [6121]
From: Randy  Jane want to go with me?  [6122]
From: Kim  Randy, what can I get a ride?  [6123]
From: FrankS  Concert will be great, new song  [6124]
From: Bill  Kim, I can pick you up.  [6126]
From: Jim  Now at 45.  [6127]

Chat — Show: My threads  [6404]
Frankie  [6403]
From: John  Hey how's it going?  [6111]
From: Me  Just fine.  [6114]
From: John  Great, dinner with wives tonight?  [6120]
From: Me  Yes how about 8pm at OShay's  [6125]
From: John  Need to talk PR at dinner.  [6128]
From: Jane  I'm looking forward to next concert  [6116]
From: Russ  When is the concert?  [6117]
From:David  Next month at Odium Theater  [6118]
From: Jane  at 7pm  [6119]
From: FrankS  Concert will be great, new song  [6124]

| 6501 | Chat |
| 6503 | John |
| 6111 | From: Me  Hey how's it going? |
| 6112 | From: Mary  I'm having a bad day. |
| 6113 | From: Jim  Check out stock JUNK is going up. |
| 6114 | From: Frankie  Just fine. |
| 6115 | From: Sally  Just love your music. |
| 6116 | From: Jane  I'm looking forward to next concert |
| 6117 | From: Russ  When is the concert? |
| 6118 | From: David  Next month at Odium Theater |
| 6119 | From: Jane  at 7pm |
| 6120 | From: Me  Great, dinner with wives tonight? |
| 6121 | From: Fred  I'm looking forward to concert too! |
| 6122 | From: Randy  Jane want to go with me? |
| 6123 | From: Kim  Randy, what can I get a ride? |
| 6124 | From: FrankS  Concert will be great, new song |
| 6125 | From: Frankie  Yes how about 8pm at OShay's |
| 6126 | From: Bill  Kim, I can pick you up. |
| 6127 | From: Jim  Now at 45. |
| 6128 | From: Me  Need to talk PR at dinner. |

Fig 66

| 6601 | Chat | Show: Frankie  6604 |
| 6603 | John | |
| 6111 | From: Me  Hey how's it going? | |
| 6114 | From: Frankie  Just fine. | |
| 6120 | From: Me  Great, dinner with wives tonight? | |
| 6125 | From: Frankie  Yes how about 8pm at OShay's | |
| 6128 | From: Me  Need to talk PR at dinner. | |

Fig 67

| 6701 | Chat | Show: My Threads | 6904 |
| 6703 | John | | |
| 6111 | From: Me Hey how's it going? | | |
| 6114 | From: Frankie Just fine. | | |
| 6120 | From: Me Great, dinner with wives tonight? | | |
| 6125 | From: Frankie Yes how about 8pm at OShay's | | |
| 6128 | From: Me Need to talk PR at dinner. | | |

Fig 68

| 6801 | Chat |
| 6803 | Mary |
| 6112 | From: Me I'm having a bad day. |
| 6113 | From: Jim Check out stock JUNK is going up. |
| 6115 | From: Sally Just love your music. |
| 6116 | From: Jane I'm looking forward to next concert |
| 6117 | From: Russ When is the concert? |
| 6118 | From:David Next month at Odium Theater |
| 6119 | From: Jane at 7pm |
| 6121 | From: Fred I'm looking forward to concert too! |
| 6122 | From: Randy Jane want to go with me? |
| 6123 | From: Kim Randy, what can I get a ride? |
| 6124 | From: FrankS Concert will be great, new song |
| 6126 | From: Bill Kim, I can pick you up. |
| 6127 | From: Jim Now at 45. |

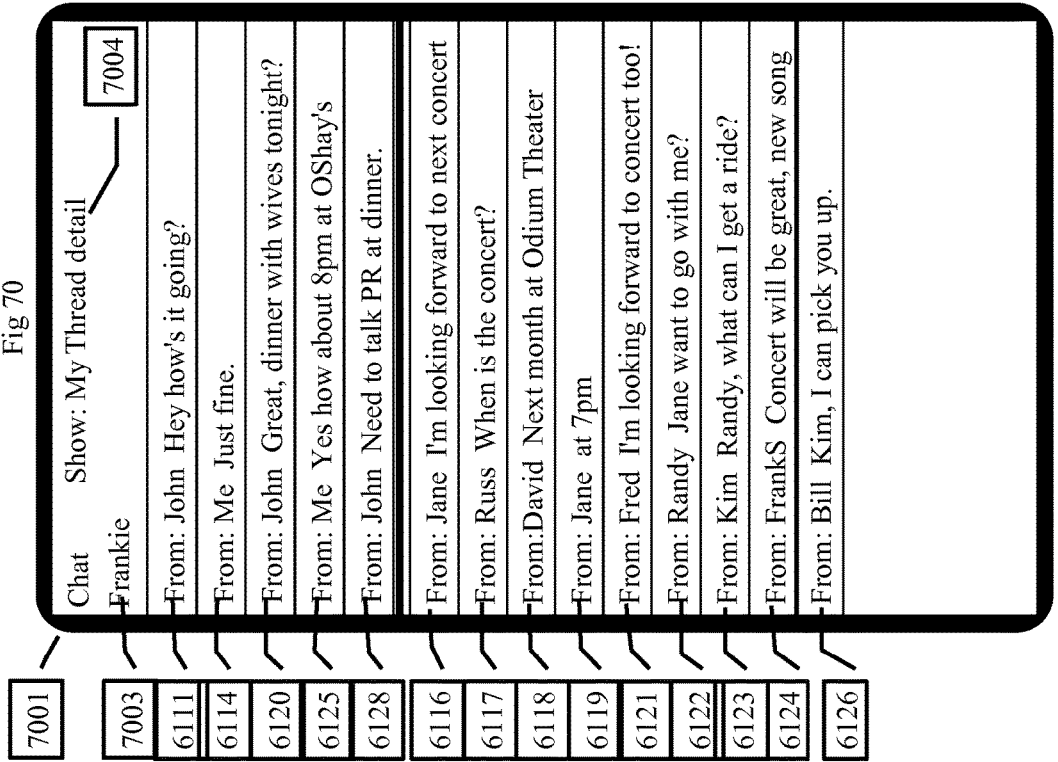
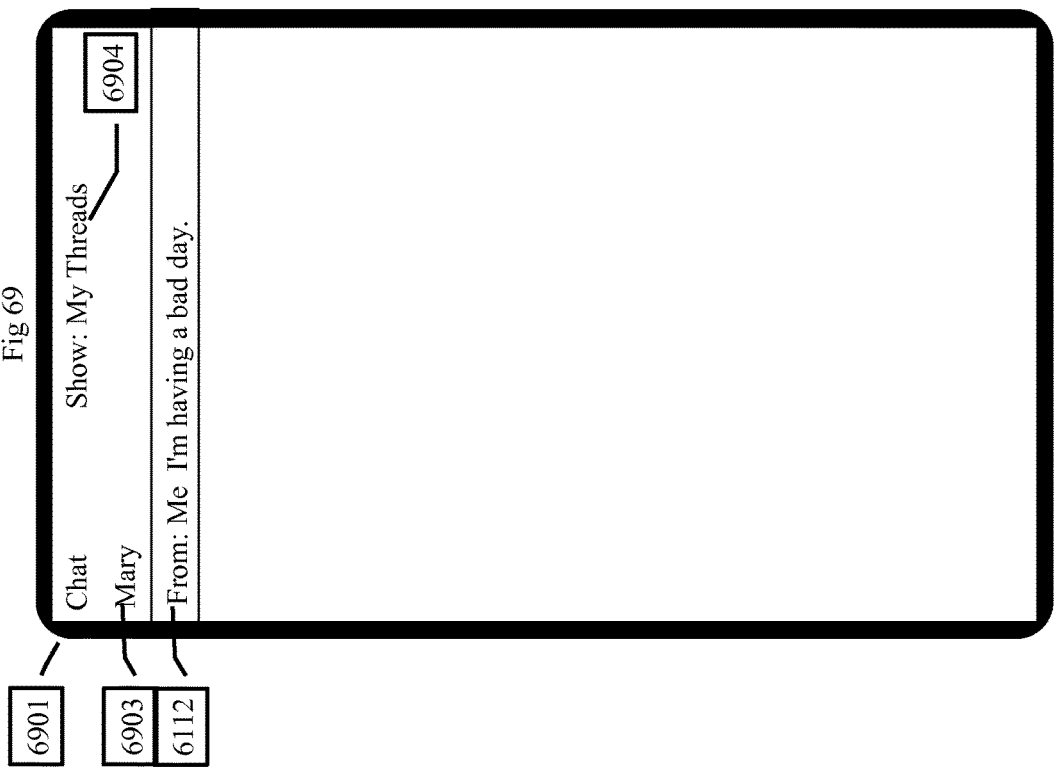

FIG. 75C

| Granularity | Token types created |
|---|---|
| paragraph | • HTML tags (formatting)<br>• line breaks (HTML <br> tags)<br>• text (includes characters, punctuation, special characters and whitespace) |
| word | • HTML tags<br>• line breaks (HTML <br> tags)<br>• whitespace (spaces, tabs, ...)<br>• punctuation (including special characters)<br>• text (characters) |
| char | • HTML tags<br>• line breaks (HTML <br> tags)<br>• whitespace (spaces, tabs, line breaks, ...)<br>• punctuation (including special characters)<br>• characters |

Fig 75D

```
difference_annotations=compare(presentation data, modified presentation data, 'paragraph')

function compare (original, modified, granularity) {
    original_tokens = tokenize(original, granularity)
    modified_tokens = tokenize(modified, granularity)

if granularity == paragraph then new_granularity = 'word'
    else if granularity == word then new_granularity = 'char'
    else                              new_granularity = 'none' set all_differences to empty
    differences = find_difference(original_tokens, modified_tokens)
    foreach difference in differences {
        // difference.type is type of difference: 'change' or 'no change'
        // difference.original are the tokens from the original_tokens in this difference
        // difference.modified are the tokens from the modified_tokens in this difference if difference.type is 'no change' {
            add difference to all_differences
        }
        else if new_granularity == 'none' {
            add difference to all_differences
        }
        else {
            set sub_differences to empty
            diff_original = untokenize(difference.original)
            diff_modified = untokenize(difference.modified)
            sub_differences = compare(diff_original, diff_modified, new_granularity)
            add sub_differences to all_differences
        }
    } return all_differences
}
```

Movie/Audio Event System

FIG. 75G

| Granularity | Token types created |
|---|---|
| slot | • Slot |
| segment | • Slot boundaries<br>• Common segment classes (SourceClip, Sequence, Effect, Filler)<br>• other segment classes (Locator, TaggedValue, KLVData, Transition, Parameter, ControlPoint, ...) |
| components | • Slot boundaries<br>• Segment boundaries (common and other)<br>• components (parameters of segment classes, components in a sequence, ...) |

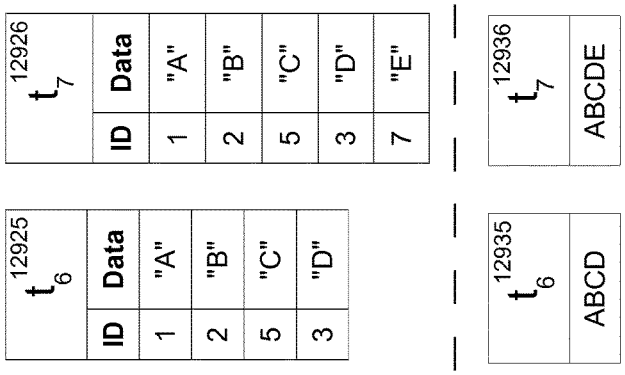

| ID | Edit Reference | Operation | Assembled at time |
|---|---|---|---|
| 1 | beginning | insert "A" after | t1 |
| 2 | 1 | insert "B" after | t2 |
| 3 | 2 | insert "D" after | t3 |
| 4 | 2 | insert "c" after | t4 |
| 5 | 4 | insert "C" after | t6 |
| 6 | 4 | delete | t5 |
| 7 | 3 | insert "E" after | t7 |

12911 Event Storage

FIG. 76B

Assembly of Presentation Data

| 12920 t₁ | | 12921 t₂ | | 12922 t₃ | | 12923 t₄ | | 12924 t₅ | | 12925 t₆ | | 12926 t₇ | |
|---|---|---|---|---|---|---|---|---|---|---|---|---|---|
| ID | Data | ID | Data | ID | Data | ID | Data | ID | Data | ID | Data | ID | Data |
| 1 | "A" | 1 | "A" | 1 | "A" | 1 | "A" | 1 | "A" | 1 | "A" | 1 | "A" |
| | | 2 | "B" | 2 | "B" | 2 | "B" | 2 | "B" | 2 | "B" | 2 | "B" |
| | | | | 3 | "D" | 3 | "D" | 3 | "D" | 5 | "C" | 5 | "C" |
| | | | | | | 4 | "c" | | | 3 | "D" | 3 | "D" |
| | | | | | | | | | | | | 7 | "E" |

FIG. 76C

Formatted Presentation Data

| 12930 t₁ | 12931 t₂ | 12932 t₃ | 12933 t₄ | 12934 t₅ | 12935 t₆ | 12936 t₇ |
|---|---|---|---|---|---|---|
| A | AB | ABD | ABDc | ABD | ABCD | ABCDE |

| ID | Edit Reference | Operation | Assembled at time |
|---|---|---|---|
| 1 | beginning | insert "clip A" after | t1 |
| 2 | 1 | insert "clip B" after | t2 |
| 3 | 2 | insert "clip D" after | t5 |
| 4 | 2 | set in/out | t3 |
| 5 | 2 | insert "C" after | t4 |
| 6 | 3 | delete | t6 |
| 7 | 3 | insert "E" after | t7 |

13001 Event Storage

FIG. 76E Assembly of Presentation Data

13020 — $t_1$: clip A ID 1

13021 — $t_2$: clip A ID 1 | clip B ID 2

13022 — $t_3$: clip A ID 1 | clip B ID 2

13023 — $t_4$: clip A ID 1 | clip B ID 2 | clip C ID 5

13024 — $t_5$: clip A ID 1 | clip B ID 2 | clip D ID 3 | clip C ID 5

13025 — $t_6$: clip A ID 1 | clip B ID 2 | clip C ID 5

13026 — $t_7$: clip A ID 1 | clip B ID 2 | clip E ID 7 | clip C ID 5

FIG. 76F Formatted Presentation Data (Project File)

13030 — clip A | clip B | clip E | clip C

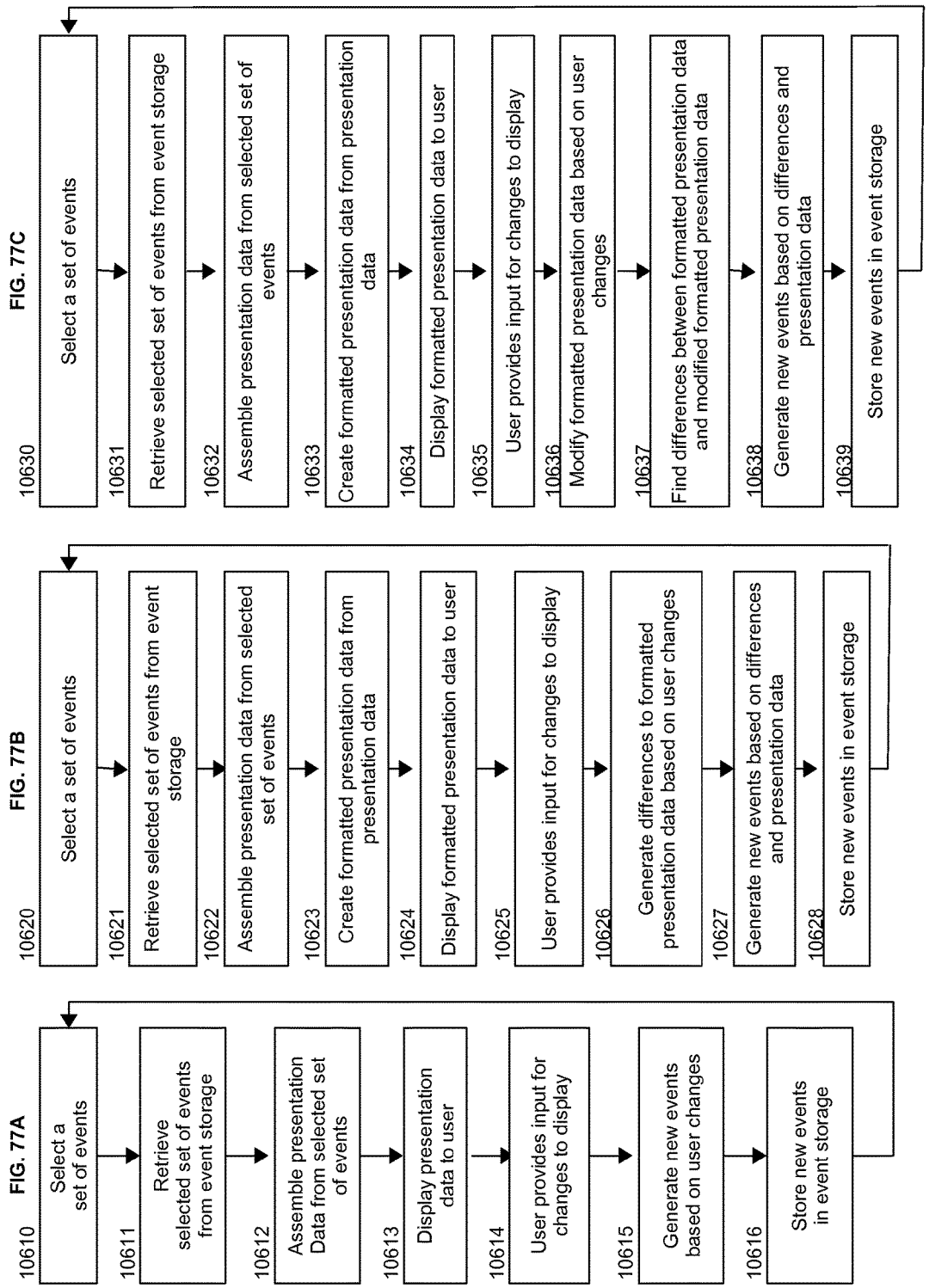

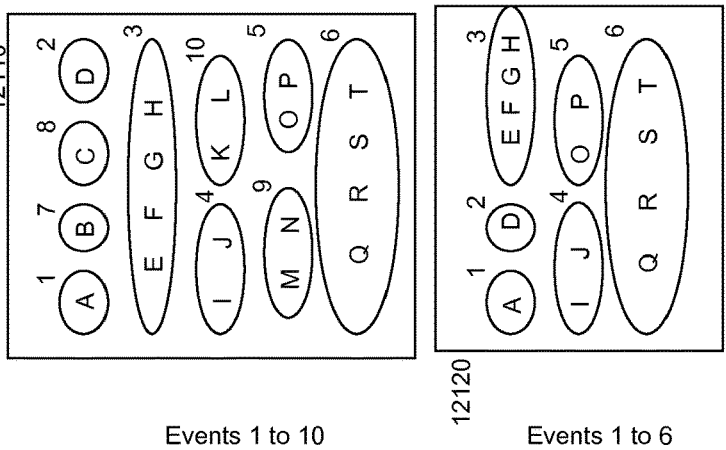

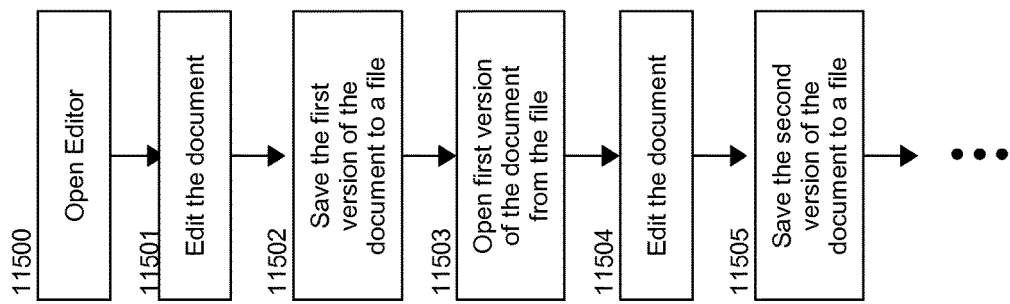

SYSTEMS AND METHODS PROVIDING COLLABORATING AMONG A PLURALITY OF USERS

RELATED APPLICATION (S)

This present application claims priority as a continuation of co-pending patent application Ser. No. 13/616,731, filed on 2012 Sep. 14, which is a continuation-in-part of its parent application Ser. No. 13/102,798 now issued as U.S. Pat. No. 8,875,011.

FEDERALLY SPONSORED RESEARCH OR DEVELOPMENT

Not Applicable.

FIELD OF THE INVENTION

The present invention relates generally to the use of computer systems and applications as a tool in working with documents, and more particularly to a family of systems, methods and apparatus for facilitating and managing a complete and thorough manner to concurrently view and collaborate on a document (or documents), and provide navigation, editing of images and providing user interfaces, and providing data storage and management infrastructures and mechanisms, such that the present invention provides for multiple user real-time collaboration, and to apparatus, systems and methods for multiple individual users each separately and concurrently being able to be modifying as a group a core graphical image, and selectively choosing and displaying chosen ones of the users' modifications along with the core graphical image.

This invention relates to document and media file creation, editing, and presentation, and more particularly, to an event generation processing technology, systems and methodologies providing for processing user inputs, made relative to a presentation, of event content for annotations, to permit creation, modification, change, update and presentation of event content selected by and presented to one or many users, and supporting collaboration of multiple users for creation of, and/or changes to, a presentation.

BACKGROUND OF THE INVENTION

There are computer programs that permit a single user to type text and/or draw via a computer keyboard and/or mouse or other pointing device. An example is a word processor (such as WORD by MICROSOFT Corporation, Redmond, Wash., as well as other programs such as WORDPERFECT, OPENOFFICE, etc.).

These word processor programs often permit the use of tracking of changes made by a user to a document. Thus, a first version of a base document from a first user can be saved as a new and separate document file (a base version of the base document), which file is then shared with a second user (or multiple other users). Then, that second user creates and saves a new and separate document file (a new second version of the base document), wherein that second user can make edits to the base document with tracking turned on so that it creates that new second version of the base document which is a red-lined markup version of the first version of a base. Then, a next user (such as either the first user or a third user) can receive and open that new and separate document file (the second version of the base document) and that next user creates and saves a new and separate document file (a new third version of the base document), wherein that next user can make edits to the second version of the base document with tracking turned on so that it creates that new third version of the base document which is a red-lined markup version of the second version of a base document. And this process can keep repeating over and over, and so on and so on, creating more and more new and separate document files (a new next version of the base document), wherein the next user makes edits to the previous version of the base document with tracking turned on so that it creates that new next version of the base document which is a red-lined markup version of the previous version of the base document. Then, when desired, at some point in this process, a latest one of the red-lined document versions can be "accepted" and saved as a new and separate document file which is a clean version of that latest red-lined version but with no red-ling showing, only the final result of deletions and additions of the totality of red-lining in the accepted version.

During this process, there are multiple new and separate document files created, one new and separate document file taken for each turn by each user for the set of separate edits made by that user during that turn by that user. And, this process inherently causes delays because there is a need to wait for each turn of a user to be completed before a next user can begin his/her turn of making edits and inputs.

Furthermore, there is also the case where the base version of the base document goes to multiple other users. Then, each one of the multiple other users individually and separately creates his/her own new and separate document file (creating multiple ones of a second version of the base document), wherein each one of the multiple other users makes his/her own set of separate edits to the base version of the base document (making the edits with tracking turned on) so that he/she creates a different one of multiple ones of a second version of the base document, each one of which is a red-lined markup version of the first version of the base document. At that point, there are real problems, because now each and every one of the multiple users needs to look at each different one of multiple ones of a second version of the base document for each of the other ones of the multiple users, while also looking at their own separate one of the second version of the base document, in order to understand the inputs made by each of the multiple users. This is a slow, inefficient and frustrating manner to work. And it leads to a loss of momentum and to confusion. This process is again a step at a time, back and forth, seriatim, and not concurrent.

An alternative to this process with Word Processor and tracking, and sending new and separate document file versions of a base document version back and forth, is to work online as a group with a shared file that keeps being updated with changes as they are occurring, but still occurring with only one user in control (making his/her edits/inputs at a time, in a seriatim usage manner. [An example of such a tool with one user in control at a time, and seriatim use, is "GOOGLEDOCS", owned by Google, Inc., of Mountain View, Calif.]

Initially, a first version of a base document from a first user is saved as a new and separate document file (a base version of the base document), which file is then centrally stored on a Google computer server, which file is then shared via that server and an Internet coupling with multiple other users). Any one of the other users can select to take control and make an edit to the shared document. As the edit is made, the shared file on the server is updated to create and save a new and separate document file (anew second version of the base document) that contains those edits to the base document. Then, a next user (such as either the first user or a third user) takes control and he/she can edit that shared server document file (the second version of the base document), and when those edits are made, the shared file on the server is again updated to create and save another new and separate document file (a new third version of the base document) that contains those edits to the base document. And this process can keep repeating over and over, and so on and son on, creating more and more new and separate document files (a new next version of the base document).

During this process, there are multiple new and separate document files created and saved and stored on the server, one new and separate document file for each turn taken by each user. And, this process inherently causes delays because there is a need to wait for each turn of a user to be completed before a next user can begin his/her turn of making edits and inputs. And, it leads to a loss of momentum and to confusion. This process is again a step at a time, back and forth, seriatim, and not concurrent.

There are drawing programs and illustration programs that are single user with a single document on a single computer, which permit multiple layers to be utilized to create an image. However, these are for single user use, and do not work for multiple user collaboration. [An example of such a tool with one user in control at a time, and seriatim use, is "PHOTOSHOP", available from ADOBE (Adobe Systems Incorporated, of San Jose, Calif.] This is a slow, inefficient and frustrating manner to work. This process is again seriatim, and not concurrent.

There are also programs that permit communications via email permitting sending and receiving of communications (text with or without attached files) to be sent back and forth between users. [An example of such a tool with one user in control at a time, and seriatim use, is "THUNDERBIRD".] This is a slow, inefficient and frustrating manner to work. And, it leads to a loss of momentum and to confusion. This process is again a step at a time, back and forth, seriatim, and not concurrent.

There are also programs that permit communications via instant messaging to permit multiple users to text message back and forth. These communicate text messages back and forth, but do not permit collaborative work upon a common base document text or image. This is a slow, inefficient and frustrating manner to work. And, it leads to a loss of momentum and to confusion. This process is again a step at a time, back and forth, seriatim, and not concurrent.

There are also programs that permit conferencing communications via voice (using a microphone and speaker) or via video (using a video or still camera) among multiple users. These permit voice communication or camera-based video communication in a very limited manner, but do not permit concurrent collaborative edits and inputs in real-time to be performed upon a common base document (text or image).

There are also problems that permit communications wherein there is conferencing where one specific user at a time is in control (often referred to as that user having the token), wherein that one specific user can show what is on his/her computer screen to be viewed by other viewing users who can only passively watch based upon that one specific user's display. [An example of such a web-conferencing tool with one user in control at a time, and seriatim use, is "WEBEX", owned by Cisco Systems, Inc., of San Jose, Calif.] At some point, that one specific user can decide to give up control, and can decide to select a document file stored on that one specific user's computer, or that one specific user can choose to save a first version of a base document from that one specific user's computer, and that first version of a base document is then shared with one or multiple other users.

Then, the control (the token) is taken over by another user. That other user can then show what is on his/her computer screen to be viewed by other viewing users who can only passively watch based upon that specific another user's display. That display can be something independent of what the first user was showing, or can be a display of the first version of a base document from that one specific user's computer.

At some point, that specific another user can decide to give up control, and can decide to select a document file stored on that specific another user's computer, or that one specific user an choose to save another version of the base document (which is an edited version of the first version of a base document (which is an edited version of the first version of a base document from that one specific user's computer), and that another version of a base document can then be shared with one or multiple other users. And, this process can keep repeating over and over, and so on and so on, creating more and more new and separate document files (a new another version of the base document), wherein a next another user makes edits to the previous version of the base document, so that it creates that new next another version of the base document.

This alternative is a low, inefficient and frustrating manner to work. And, it leads to a loss of momentum and to confusion. This process is again a step at a time, back and forth, seriatim, and not concurrent.

This invention provides for an efficient, real-time document collaboration system that provides an unique ability to separate the input of users and provide customized and dynamic presentations of the document with edits to each user.

With prior art document editing systems, a first author's inputs must first be saved as a first version of a non-event document, and then the system allows for input by a second author (to make edits relative to the first version of the document). Then, this second author's inputs/changes must be saved as a second version of the document, before allowing (again) for the first author to make edits relative to the second version of the document.

With eStand Performer computer systems and technology from e-Stand, Inc., a user can make a selection of which user/author edits to view, with selection made by author to select to view all the edits made relative to a displayed image, such as sheet music.

There is no way, however, to select less than all the events in an order of entry made by a user, or by multiple users, and to exclude one or more of the edit entries somewhere in the middle of the order of entry.

There is also no way to specifically select presentation views, or the individual underlying edits, via criteria.

It is therefore an object of this present invention to provide systems and methodologies that provide an ability to store events generated for all edits and construct sets of edits selected by any one or more of criteria, and with selection of the edit events not limited by order of entry.

SUMMARY OF THE INVENTION

Document collaboration ("DC") is a powerful paradigm. Document collaboration provides a unique vehicle, to concurrently work with others, (1) in simultaneously viewing a same-base document image, (2) any or all users can annotate at the same time, and (3) all users can see the real-time annotations of all other ones of the users that are in a same group. Its embodiment is a powerful tool to its users. It provides a new user interface paradigm—like FaceBook. Document collaboration is an enabling medium upon which can be built a set of usage practices and protocols to allow the medium to be adapted to the operations of a target use.

In accordance with another aspect of the present invention, the concurrent use of document collaboration is used in conjunction with and concurrently with conferencing (such as audio, video, screen sharing, application sharing, etc.).

In accordance with another aspect of the present invention, "document collaboration" is combined in various permutations with the "conferencing solutions" and results in special synergy.

The document collaboration solution works with a wide-range of many different target markets (each which for separate reasons cares about document collaboration features). With document collaboration, users can focus on working directly on the core base document. Each user can write, draw or type text as user annotations that appear in the display presentation that is made viewable to all users in the working group/team.

The legal market is a good fit, because they are not focused on giving of presentations, but rather the focus is on working with documents and tracking of "who said what"

As used herein, the term, "conferencing solutions", refers primarily to a screen sharing and/or and audio/video conferencing tool.

As used herein, the term "screen sharing" refers to the user that is a presenter has a selected window of the screen display image on their computer desktop as displayed on their desktop screen display is communicated to and displayed upon the displays of all other users.

As used herein, an "audio/video tool" provides all equipment and tools for people to be connected to one another ranging from using web-cams and microphones to audio-only phone calls. Just as there can be split-screen video of different users' subsets of annotations, there is a parallel analogy in the audio and audio/video areas (such as using multiple channels (switched/controlled) for multiple chats at once. Audio can be separately sent to other people on the team through the computing system hosting the document collaboration or via a separate phone conference (e.g., POTS (Plain Old Telephone System) or Internet or cable).

As used herein, "document collaboration" permits users (each at a separate computer display) to all commonly view, collaborate upon and work on (discuss and annotate) documents, and manage a library of documents.

All users commonly view the same image display for an underlying document being worked on. As annotations are made by a first user that appear in that first user's display as markings showing atop the image of the underlying document, the annotations can also be seen simultaneously by other users as appearing in each of the other users' displays also aligned for viewing atop the image of the underlying document.

Conferencing solutions are about people interaction and transitory visuals that are momentarily displayed or audio sounds that are momentarily played. Conferencing solutions do not permit management of documents or groups of documents.

With document collaboration, the users are concerned about the development of a document.

With conference solutions, the users' concern is to discuss something (e.g., a subject or document).

The collaboration technology of the present invention maintains information about the development and evolution of the document (layers of annotation data mapped and stored by User Identification and by Annotation Timing).

With the present invention, each user's annotations are logically mapped and correlated to a document. This is one focus of the collaboration. However, another novel perspective is how the annotations are correlated to the document and presented to the users.

Annotations for each of the users are stored and separated into user layers or user Data Layers. In addition to the annotation data stored in the user layers, there is also stored meta-data as to when (date, time) those annotations were made, and by whom. This provides a time line and ownership of annotation data, a related meta-data defining how the documents were created and evolved.

Another novel area is utilizing the perspective and paradigm of working on the viewable image of a document and using "images of annotations" aligned atop the image of the document. The annotation data is thus representative of the display presentation for annotations of a respective user as aligned to and written atop the underlying document.

With user ID and timing information for the annotation data, it makes it easier to be able to reconstruct "who said what when", and to maintain information about the development and evolution of the document.

This information (about the development and evolution of the document) that is maintained can then be utilized for selective viewing of annotations by user or group or subgroup of users, and/or by time of entry or by other criteria.

By contrast, "The conferencing solutions" are one user at a time. All annotations are in the same single layer in a conferencing solution. There are limited tracking of annotations made by members of the conference and if they are available it isn't easy to separate various users from the final result because they do not maintain each user's markings in a separate Data Layer. The conferencing solutions may not even provide a final markup of a document. It does not even provide any concurrent markup of a document.

Conferencing solutions may permit a user who is presenting at the time to markup or annotate his/her screen. Others may be given the opportunity to further markup the document but it doesn't get maintained in the document. The screen that was annotated can be saved outside the document on a "per page" basis. These saved screens with annotations must be manually correlated later by the user who maintains the work product.

Conferencing solutions do allow all annotations to be placed on one layer over an underlying document. Individual annotations can be removed but since all users contribute to the same single layer, the individual contributions by user is lost and the order of the development of the document with annotations is lost.

The collaboration technology of the present invention is a better tool than standard conference tools in those instances where the document itself is the center of attention (that needs to be changed) [rather than the focus being a presentation and personal interaction].

There are other document collaboration tools available other than the collaboration technology of the present invention but many do not provide real-time editing. None allow for multiple Data Layers for separating the user's additions or for creating a new Base Data Layer from previous edits. They provide a single Data Layer for providing the annotations, markings and edits to the existing document.

Also, the collaboration technology of the present invention is a peer-to-peer solution whereas the conference solutions and other document collaboration solutions are a client/server model. (The collaboration technology of the present invention can also be implemented in a client/server model as well.) The collaboration technology of the present invention can operate on a local area network where every appliance can communicate with any of the other appliances. This provides the flexibility to operate, even when Internet access or is not available.

One of the difficulties with a peer-to-peer solution is that communications over the Internet is conducted in a server-to-server or client-to-server manner. Client-to-client communications are generally not possible directly on the Internet for a variety of practical and technical reasons. The collaboration technology of the present invention avoids this by using an Internet server that the peer-to-peer clients connect to. Then the server allows messages from one client to be passed to other clients that are connected to the same server. The peer-to-peer messages are maintained but the client-to-client connection is simulated by the client/server connections. The server does not have significant computational requirements so it can handle more clients. The server is also not storing large amounts of information for all the users. This is maintained on the user's systems. Security issues with centralized storage of information is minimized. Still the redundancy of the data is maintained at each user's local appliance. This allows each user to access the documents, albeit maybe not in direct collaboration with others, any time, anywhere.

Our document collaboration system provides control of the operation in each system with data also flowing between systems. Client/server systems generally require that you be able to access the server to access the documents unless local storage for all documents are provided on the user's appliance. This either makes it impractical to access the documents reduces the benefits of a centralized storage of document information. The server in addition controls most of the aspect of the system. This does allow for better centralized control of the use of the system but it also puts a "middle-man" between the user and getting their job done. If control of the users is minimized in a centralized server then the benefits of this control is minimized for a central server and a peer-to-peer solution is more appropriate.

When our systems are used in a local network the bandwidth is not limited by Internet connectivity or server bandwidth, only by the user appliances. On the other hand our system and all peer-to-peer systems have more synchronization issues of data since the data is generally replicated across several systems. If a system is not connected to the team and activities take place, the system must be brought up-to-date to the rest of the team and the team must be brought up-to-date to changes made by the user.

Even where the collaboration technology of the present invention is a better solution for a customer than conferencing above, there are also many situations where some or all of the features in the conferencing (e.g., audio and/or video) solution are beneficially added to the document collaboration. This combines the best of conferencing and document collaboration to allow real-time discussions to occur as the documents are edited. This minimized miss-communication and provides instant feedback.

In its simplest form, the document collaboration is utilizable as a tool used in conjunction with a concurrent use of a telephone or video conference. Alternatively, an online conferencing can be utilized for voice or video.

For instance, Skype is an online audio and/or video conferencing system that provides the typical conference solutions. This could be done in a split screen mode with the document collaboration on one part of the split-screen display and the conferencing being shown in another part of the split-screen display. Furthermore, if desired, the base document being worked on (e.g., a Word document) can be shown in yet another part of the split-screen display.

A starting document provides an underlying canvas referenced and utilized in common by all users for joint collaboration. The starting document can be a Word document file, or Excel file, or image file (e.g., JPEG, PDF) or any computer file. The starting document is converted into an importable format for an equivalent image file for its associated display presentation.

This starting document has a respective associated display presentation, which forms the underling image file utilized as the underlying canvas for the collaborative display of the underlying image of the starting document.

In document drafting, the starting document file format is usually a text or word processing [".doc"—Word] file, such as for the Word text document corresponding to the associated display presentation.

This is the base document which has a corresponding underlying image upon which are overlaid all annotations thereafter drawn, written, typed-in, or otherwise provided, responsive to input by each of multiple users each at a respective one of the plurality of computing systems. This collaboration continues iterating, continuing to generate a respective updated version of a collaborative display output and continuing until the result evolves into a final consensus of what the document should be (as shown in its updated version of a collaborative display output having an associated display presentation wherein, ultimately consensus is reached in the form of a final collaborative display output with associated display presentation).

This results in generating a final agreed-to document [whether it be an agreement, a patent application, a prospectus, litigation papers, one or more drawings, or any multi-media object (audio and/or video-visual)], which also are provided in the generation of the display presentation for final collaborative display output, which comprises as the underlying image the respective associated display presentation for the original starting (base document), upon which is overlaid the respective associated display presentations for each of multiple image layers, each comprised of a semi-transparent overlay image for the video presentation representative of respective annotations for each user as stored in a respective one of the multiple layers which annotations are drawn, written and typed-in by each of the multiple users.

The end result of this joint collaboration with multiple users at multiple respective computing systems is to provide a final result obtained by consensus reached by collaboratively annotating relative to the image of the starting document, and relative to the overlaid annotations of each and all of the multiple users. This final result is provided as a video presentation that is the final collaborative display output representing the END RESULT of multiple users annotating relative to a common display of a current updated version of a collaborative display output progressing to generate the display presentation for the final collaborative display output.

With our technology, all users make modifications individually and in parallel, concurrently, in real-time, that are stored in an associatively mapped data layer in memory as associated with the respective user making the input of annotations. Those modifications may or may not be sent to all users. The modifications may or may not be sent to one or more other users. The annotation data for the modifications (or annotations) are selectively sent to other users based on what the defined Role of each of the other users in the defined Team.

For instance, in an Education Team, the appliances with a defined Role of students only send those modifications (edits) made by the Student appliances to the appliances with a defined role of Teachers. The Student appliances do not send to other Students' appliances in terms of communication).

The third component is that each of those appliances can merge the modifications that they have for display on a local display. An example would be in the education mode, if you are a student role, then your appliance always displays the teacher layers/images and your appliance also always displays your own user layer. Whereas only, if you are a teacher role, the user of the teacher appliance can either select to see only the display of the teacher layer (or layers) or alternatively, the display can be of the image from the teacher layer along with the image from the respective student layer(s) for a Student, or you can see all of the displays present at each of the students' appliances shown in multiple small images plus the display for the teacher layer selectively merged with the core/base document along with each individual students' appliances shown in small picture images. The teacher can select from three different views (+/_ views as design choice), or the teacher's appliance can display the choice of the user of the teacher appliance for each of those views, whenever you are in one of those views, that also determines what modifications you can make to the displayed document from that view. In the first example, where you are looking at teacher-only display, you are able to modify the teacher layer. If you are viewing a display for a particular student, then you as the teacher are able to do editing or modifying of that respective student's layer. If you are viewing a display on the teacher's appliance of all the students, then you cannot make any modifications to any of them from the teacher's appliance in this mode.

With a Team, there are three things: we have a team made up of multiple members or users (at least two), each user at a respective appliance. Each member has a role in the team, and has capabilities that are permitted based on the role of the team. Examples of these capabilities include: 1) what modifications a user can make based on their specific role; and 2) what sort of data level mergers are going to be made in providing a display; and 3) who (to which other members/users) do they communicate their modifications to, and 4) in what specific data layers are their modifications stored and what data is stored in which data layers. It is not just about managing which appliances to send the modifications to, but it is what layers to send the modifications to be stored in the receiving appliance, and which data layer the respective data is to be stored in on the receiving appliance.

Consider an example of an education team with teacher and student roles. There are multiple views where the view that is taken as a subset determines other feature sets. For example, the teacher can write and display but the feature set that the teacher activates is dependent on the mode or the view that the teacher puts their appliance into. So if the teacher goes into a teacher mode, then the teacher is going to view a display presentation using only the teacher layer but the modifications the teacher makes will be sent to all students' appliances to be stored in a teacher data layer therein and to be provided as a part of a display presentation thereto. In fact, all other appliances of all students and all teachers will store and display the modifications. Whereas, checkerboard multiple student and teacher mode, then the display presentation shown to each teacher will see a checkerboard layout of screen displays for all students and teachers, each screen display shown in a thumbnail or filmstrip-type display, but only the teacher sill be able to select one of the checkerboard images to bring to full screen and switch to a one-on-one interactive mode. In the multiple screen view mode, there is selection of a screen and/or viewing mode, but there are no modifications or changes or layers that are communications. The teacher can simply move to another view with the exception that any modifications that are happening in real time on a screen being viewed will be shown on the checkerboard. So the teacher can see the other modifications happening in real time, but in multiple screen view-mode, the teacher cannot make any modifications in her role.

A third role for the teacher is a private communications where the teacher touches the screen for one of the students' thumbnails (instead of the teachers). By touching a specific student's thumbnail, the teacher selects a one-on-one mode, where the teacher's modifications appear on that student's screen for viewing by the student in real time, even if the student is also concurrently writing. The student can erase what the teacher has written when in the one-on-one mode, but not what the teacher has written during when the teacher was in the teacher layer mode. The role of teacher and the mode of operation not only affects what the teacher as the appliance in that view can do, but it also affects the rights and privileges of what the receiving appliance can do with the modifications it receives. So if the teacher sent the modification in the teacher mode with the teacher layer only, and with the changes made, then the student, when they receive it, cannot erase or change that modification. But, if the teacher is in a one-on-one private network and makes a change, the student can erase that change.

On the student appliance, the user can always modify the students' layer and can communicate the student layer changes/modifications to all the teachers. So, the student's role does not change, and its user always can selectively see displayed the changes of the student layer. However, teacher changes can select different modes of which data layer the teacher's appliance it is modifying from the teacher layer in teacher mode to a particular student's layer in the one-on-one mode.

On a one-on-one network, the teacher is modifying the student's layer and therefore, the student has access to un-modify it. This determines which layers are being modified.

More specific language or restrictive language to the claim to have specific limitations on what layers are modified, what modifications to which layers are sent to other appliances, and what other appliances display from the merger of which layers and the document.

When an ad-hoc meeting is conducted for collaborative work, each appliance has one user layer file. The user of any appliance can select a portion of said user layer file that is the user layer file for that respective appliance or stored locally at that respective appliance or stored as the user layer file for that respective appliance but stored in one or more of any of the plurality of the appliances. Each appliance has its own respective associated user layer file for storing data for that user/appliance. Each appliance has a respective one user data layer file (out of a plurality of data layers stored in a layer storage memory) associated with that respective appliance. In user edit mode, the respective appliance can make modifications to its own one respective user data layer.

A communicating user of an appliance can select one of the other appliances, and they can select a portion of their own data layer to communicate to one of the other appliances and then the communication select portion is stored. In the one mode, the selected user data layer file for storage of data layers at each appliance as it receives data. Thus, the received data is stored in the respective one user data layer file as associated by the receiving appliance. So it is receiving appliance that stores received edit data for each respective user in respective user data layers. So in laymen's terms, we have a bunch of stands there.

Everyone has their own user selected. They draw a lasso around some annotations that they have made on their display and select them. That is the selected portion. Then, they click on "send" and they can send the selected portion to one or all of the appliances that are in networked communications. The receiving appliance takes those annotations and puts those annotations in the same data layer that the other appliances are currently using for storage of similarly originated edits, for that said user. So the user can thereafter delete them or edit them from there.

User 1 is using an appliance (appliance 1). Appliance 1 has an associated storage user data layer (named "D"). User 2 is using Appliance 2. Appliance 2 has its own associated user layer, a user layer name "R". The two appliances communicate. Appliance 2 makes edits to Page 4 of his music. Appliance 2's user layer R (associated with Page 4) is selected and that portion is sent to Appliance 1. That portion is written into Appliance 1's user layer D (associated with Page 4). Appliance 1 does not write user data layer R on to Appliance 1, and then do a merge of data layer R (for Page 4) and data layer D (for Page 4). This could however also be done, in order to gain the ability to keep the edits sent to you separate from the edits that you were making. [In the music mode, we do that. Essentially that. For the feature set of being able to distinguish edits shared in the document in real time, then wouldn't you want to be able to do what I said, which is to associate the changes you made to a portion of modifications you made for selected portion of your user layer that is associated with a respective selected portion of a common underlying document and your user layer would be communicated and stored as a separate user layer, the R layer for example.] So, Appliance 1, when connected to Appliance 2, would add an R layer and to Appliance 1 and would add a D layer to Appliance 2. So all the appliances would contain data layers for all networked appliances in collaboration so that users could do and undo the edits as they needed to.

Let us suppose a person, user A made changes to a number of particular pages, and has sent the annotation data for the modifications for a first page to another person (user B). User A also sends the annotation data for modification to page two to user C. User A also sends annotation data for modifications to the third page of modifications. User A asks all three of those people, users B, C and D, to modify the pages. Users B, C and D have also have been making some changes, independently, on their own. With the present invention, all that individual input collaboratively can be integrated and work together to result in a complete record of the activity. Each user's annotations are stored in an associatively mapped one data layer. All input of annotations (edits) by a user persists in the storage of the respective annotation data in the respective one data layer. The result of the combining the layers is the completed all-in-one document. Each user sends back to the other users, the annotation data as stored in that user's respective said data layers. By creating user data layers on each appliance, each appliance has a mirror of the content in the set of data layers in local memory of all the other appliances and the users can track changes by user and by time back and forward.

Thus, in the example of document sharing by users where after multiple users entries, a user is unable to allow you to individually take and remove certain edits made by one user or another, such as because the shared document just keeps adding all users changes in time to a single common layer. By contrast, in accordance with one aspect of the present invention, the documents' modifications are separated and stored and organized by user data layer. Prior art document sharing creates a layer for all users' environment. Whereas in accordance with this aspect of the present invention, in an ad-hoc mode, every user that logs on has their own user layer that they are editing. They may also get some edits form some other people and some not. An, everybody actually has a chance to have their set of edits on that document. With prior art document sharing a letter with some blanks left in it, is a common base document that everyone sees and everyone makes their own independent (concurrent) edits to that document. Let us suppose that everyone is customizing the document for a letter which will be going out to a companies a, b, and c. Each user has a, b, and c companies that they are sending it out to. They are making their own custom edits to change that. There is no set of associative data layer storage to individually store annotations. Rather one data layer overwrites all users annotations to a common element atop one another. If user A selects a word "Red", and user B changes it to "Blue", and user C changes it to "Brown" and user D changes it to "Green", then user A sees only "Green" and none of the other comments from other users Wheres with the present invention and associatively mapped data layer storage, each user's edits are viewable and can be turned "on" or "off" selectively. You can make changes and send that change to everybody or just certain people in certain groups and change that clause in there and everybody gets it.

For example, for a particular company, somebody else might want to go and override and change it back because of some contractual relationship or something. That is a peer-to-peer communication implemented by each user having a layer and communicating.

Data layer storage can be centralized or distributed with each local appliance having a layer locally stored. Each appliance could have an associated one of the data layers that is for storing that user's annotation and then centrally stored (in a set of data layers).

In an appliance mode embodiment, each local appliance has computing power and stores the database in the set of data layers (locally storing the multiple data layers in that database).

In a centrally stored embodiment, it would require that the central database be maintained so that the contained layers (or sets of layers) are stored for every user and a merged output is provided to each user comprised of the global or common layer, plus either the individual layer for just that user or the individual layers for all users or a subset of users. This would require that the system differentiate based on who/which user appliance is communicating and if displayed through a browser as to what it would provide an output part of the merged database is to be locally stored for display.

The advantage of a central server is that it always has all the storage for all the appliances available to it. IT could actually potentially do a few more things. It also has not synchronization issues, since with a central server, all storage is all in one place, or a few places, with fewer synchronization issues. There is also fewer synchronization issues because the data layers are all stored in a central place. The disadvantage is that the system always has to be connected to that central server in order to do anything. Users cannot work independently at all. There are also some potential speed issues because you have to connect and go over a communication line to the central server.

In a preferred embodiment, there is also provided for at least two of the users' voice communications provided concurrently with the collaboration via annotations. This is a further parallel of a same-place/same-time work environment.

A voice communication happening at the same time as the document collaboration provides for discussing the collaboration and the suggested changes while they are being made by the user viewing the computer display presentation.

In one embodiment, a PDF file of the printout of the final collaborative display output represents the END RESULT of using the collaboration system in collaborative sessions by multiple users concurrently viewing and annotating relative to a same video display presentation to create a then version of final collaborative display presentation output.

In a preferred embodiment, the collaboration system continuously updates from its initial (or then current) starting document to utilize a new next starting document image that is to be utilized as an underlying display presentation from which to create a next final collaborative display presentation output representative of the next current base underlying image.

In one embodiment, an administrative user who is typing revisions to the starting document file, (e.g., in Word format), can utilize a split-screen display presentation, displaying the final collaborative output display on one part of a large LCD screen in a split screen mode and on the other part of the large screen (in the LCD split screen mode of the display apparatus) there is displayed the display presentation for the in-process starting document file [e.g., such as an open Word document running in Word as the starting document].

Using one part of the display presentation screen for the Word document, then the other part of the display presentation screen is used to see the results of the collaboration and what the substance of the annotations are in the final collaborative display presentation output. The administrative user can utilize that information to decide what changes are needed to be made to the starting document and then to actually make those changes to the starting document itself (e.g., the Word document) so that it corresponds to the final collaborative display presentation output.

Where annotations made by a user during collaboration are input by typing of text, then that text is stored in the collaborative document file format as a portion thereof that is usable in text format (e.g., to copy/paste between documents). The collaborative system permits the administrative user who is revising the starting document to copy and paste to or from any text that was typed by any of the multiple users into the collaborative file and to permit that user to take the copied text and to move it from within the file format of the collaboration technology of the present invention, and thereafter pasting the copied text into a Word (or other) document as text in the proper respective location in the starting document relative to the same corresponding location in the final collaborative display presentation output [since that "output" represents the image of the display presentation of the respective starting document]. Alternatively, or additionally, text can be copied from an external document (e.g., Word, Excel, text, or other document, or an Internet web-page), and pasted into a document in the collaboration technology of the present invention.

This saves a lot of time (especially for longer phrases) both in eliminating the retyping the text, and in eliminating having to re-proof the re-typed text in the Word document.

Consider the case where a Word file corresponds to an original base or starting document, from which an initial version of a collaborative display presentation output was obtained as the underlying image.

Starting from this initial version of a collaborative display presentation output (having a corresponding respective data file format structure and logic), and after many hours of multiple users annotating and creating an updated multilayer file version having a continuously updated collaborative display presentation output, continuing to be updated, until a final consensus is reached having a corresponding respective final collaborative display presentation output.

In one embodiment, there are multiple users who are respective primary deal workers and one or more administrative support workers. The primary deal workers are the ones that concurrently use the collaborative document system to create the final collaborative display presentation output.

A server or server-less networking system can be used.

The collaboration technology of the present invention bridges the "physical presence gap" that makes it hard to work with same documents with multiple users in different locations as compared to working with those documents in the same way as if the multiple users were all in a single room in the same location working on the same physical document(s).

The collaboration technology of the present invention utilize the starting document to provide an underlying canvas upon which the multiple users can reference to individually or concurrently work upon to annotate an overlaid image layer that is visually aligned relative to the respective associated display presentation for the starting document. The corresponding display presentation output is created by layers of overlaid user annotations relative to the underlying image. The final collaborative display presentation output is created utilizing the underlying canvas representative of, and overlays representative of, a final collaborative mutual consensus and agreement, which is represented by the display presentation of the final collaborative display output.

The collaboration technology of the present invention enables users at remote locations ("remote users") to concurrently work together on a common document as though the remote users were physically in the same location working on the same physical document. And, beyond just working on a static common underlying document, there is additionally provided a sense of images of an evolving (with users' annotations overlaid upon the common document).

In accordance with another aspect of the collaboration technology, users in a same physical location ("local user") are able to precisely, visually communicate with annotations overlaid atop a specific visually seen location in a selected document. This is a new level that does not even exist without the the collaboration technology of the present invention.

The collaboration technology of the present invention provides a user the ability to precisely communicate exactly specific thoughts as a visual overlay of that user's input of annotations appearing at the user's selected specific location/position within (aligned atop the display presentation of) a document being worked on collaboratively by a plurality of users as a group (or team, or additionally, members of a group within groups-sub-groups; and members of teams within teams-sub-teams). A user can instantly highlight for all to see, and let other users know specific selected location (words that bother me in a sentence that has been written). A user can look at an image such as a CAT-Scan, and the user can circle or highlight to effectively point all other users to focus on a specific selected region of the CAT-Scan image and this enables each user to immediately mark-up and communicate to other users looking at that same common core image document (in this example, the CAT-Scan image). This would also be highly beneficial to a remote user(s) linked to other users and/or databases (resident local), and/or remote databases that can be accessed. For example, an emergency worker could get access to each work with a schematic of wiring of a phone closet, or of the water piping or ventilation in a public building, etc. This provides an ability to collaborate in an emergency situation occurs such as between firemen and crew, through working and discussing with someone how to fix a problem.

The collaboration technology of the present invention can also be used in business to communicate among remotely located individuals [such as for use in a shareholders' meeting, such as to communicate with the officers of the company, by a plurality of users in (each) participating via a computer display subsystem to collaborate at a conference, providing a way for the attendees to communicate with the presenters, and vice-versa.]

It can also be used for purposes, such as meetings (or conference calls/collaboration sessions) for document preparation, use in lawsuits and discovery (where there are thousands of pages of documents and the collaboration technology of the present invention provides the ability to precisely pinpoint exactly from which discovery step, or which word, or which part of what drawing, or what part of an agreement).

In each of these cases, there is a common core document where the document can be an agreement (or proposal, or legal brief, or prospectus, or marketing plan, etc.), where there is specific language that is not acceptable, the collaboration technology of the present invention allows each and all of multiple users to show other multiple users precisely the location (circle or highlights, etc.) what is not acceptable, and to also precisely correct it (e.g., insert typed or written annotations with arrow pointing to location point for insertion of the annotations), and let all users see instantly what correction is being suggested (and, precisely showing the other users (in their display presentations) what the suggested correction looks like and where it is to appear within the document).

In a preferred embodiment, each user is provided with (voice or video with voice conferencing) concurrently with being provided a related collaborative document display presentation. Multiple people/users can all concurrently type or hand-write via stylus or otherwise annotate, or provide markings of their own ideas, atop the display presentation of the core document. This allows each and all of them to instantly share their ideas with other users. This also provides a display presentation wherein some or all users (on the team) can instantly see all the other users' ideas and specific suggestions.

The collaboration technology of the present invention creates a new environment, a new paradigm that did not previously exist. It creates the ability to collaborate, enhanced in ways that enables concurrently markings of each and all the users, and provides a display of the markings that concurrently appear within the display presentation provided to all the users. The display presentation is shared for viewing by a selected one, some or all users (in real-time, preferably).

In a preferred embodiment, the collaboration technology of the present invention provides for concurrent entry by each user of that users' annotations for a plurality of the users, and provides a concurrent updated display presentation comprised of a base core document image and an image of the users' annotations (appearing aligned atop the core document image within the display presentation (of a combined image display presentation)).

In a preferred embodiment, each user's markings are uniquely identifiable (e.g., by an assigned respective color to identify the respective users' markings) within a combined display presentation provided to all the users within the group/team. The ideas of the users are concurrently expressed, displayed (in a way that identifies them with the user), and shared (ideally in real-time), wherein the annotations as integrated into an updated combined display provided to multiple selected users for all to see concurrently with the ongoing voice and/or video-conference discussion in the shared document (image).

Thus, each user is provided with precision of communication at levels of clarity and achievement that were not really attainable heretofore.

Best of all, the collaboration technology of the present invention provides a key team tool to allow opposing teams of people (users) to actually resolve all issues to closure for a shared document, such as representative of text, graphic, image, multi-media, etc.).

The collaboration technology of the present invention provides a way to synchronize and track user markings/edits, in a time-stamped tracking mode, and can maintain a continuous history of at least to all one user's activity in the collaboration technology of the present invention.

All the people working together on documents (and also concurrently talking either in person in a same room, or remotely talking via phone or video conference) can collaborate in real-time via hand-written annotations, typed edits, inserted images and/or talking [while each and all are viewing (concurrently) the same physical documents display images]. People can collaborate together whether within a same room with all local users, or remotely linked to collaboratively couple users at multiple different locations to collaborate together (with one or more at each sites (e.g., local, or remote relative to each other user. This can be used within a company or law firm, or any group or organization. This can also be used between different groups or organizations. Teams can be formed to communicate within the team with one another. Sut-teams with members from within the team can be formed, to communicate among members of the sub-team, independently of other communications between the team's members. And, there can be multiple sub-teams within a team.

Another use of this technology is to facilitate group collaboration, annotation and use of large amounts of documents. Any user in the group can use bookmarks to locate (mark a location for later reference) things for later discussion (label/name them for use in a table of bookmarks). Thereafter, all the users benefit from this locating and labeling as bookmarks, which simplifies document review so that any user can use only the labeled (e.g. 50) bookmarks to find things instantly and benefit from that organization. Thus, only the relevant 50 bookmarks are needed and used, instead of having to physically go through 10,000 or 100,000 pages. This has valuable beneficial uses in law, research of any kind, engineering, marketing, sales, medicine, music, etc. Plus, it allows any one user of the group to be a leader of the group and to control which page is to be displayed at one, or all, of the users' displays, such as controlling a jump to page X for everyone to be at the same place in the same document (e.g., Go To Bookmark, or Go To Page #).

With the collaboration technology of the present invention, any user can quickly (nearly instantly) find and share with other users on the same team. They can share everything they want. In a preferred embodiment, each user is collaboratively linked together. The users can be in the same room, and/or users can be at remote locations. In a preferred embodiment, each user is also coupled for communicating (e.g., voice, video with the users in the group). For example, each user can be coupled on to a conference call (e.g., video or voice only) with other users on the same team (or on the same sub-team within a team). Alternatively, if all users are local, they can sit in a room together and talk and concurrently provide annotation input via a respective user input responsive to each single user's control. Each user has their own said respective computing appliance (e.g., laptop PC, tablet PC, desktop PC, tough-screen PC systems, etc.) Each user can create and use bookmarks by marking a location in the present display presentation (or use section marks or page jumps) to instantly jump to any place within a library of stored documents, providing for a local display presentation to that user (or to all users including that user). Then, any user can mark annotations via their user input and using their local touchscreen display relative to a base display image. A user can start with a highlighter transparency setting and select as the pen type=marker, and mark up what it is wanted by the presenter to be seen by others in a group of users (e.g., while drawing a circle, saying, "see this area here" (within the commonly displayed image of a specific page of a specific document). Prior solutions required saying "third line on the page, the 12th sentence". However, now with the collaboration technology of the present invention, a user can simply mark its location (such as circle it) (and everyone instantly sees the marking) and say "see this", and everybody is in the same place. When one user on a team marks the display presentation (e.g., highlights it), everyone on the same team get highlights on all users' display presentation screens.

Alternatively or additionally, each user can have one or multiple separate open display presentation windows, with one or more application software display presentation windows using the collaboration technology of the present invention, and with one or more other application software display presentation windows, (such as running a word processor (e.g., WORD, NOTEPAD, TEXTEDIT, QUARK EXPRESS), image processor (e.g., ADOBE PHOTOSHOP, PREVIEW, ADOBE ACROBAT, ADOBE ILLUSTRATOR, COREL DRAW, POWERPOINT, and image viewer (e.g., PREVIEW, ACROBAT, QUICKTIME, etc.).

A user can also select an area to copy from a document in one window (either) and paste it into another document within another window, such as pasting it into a collaborative work in the window that is being worked on.

A user can also cite to the bookmarks within the collaborative document (or otherwise) or to a page number associated with the bookmark.

In accordance with one embodiment, any one (to all) of the users can operate with multiple windows open on that user's computer display, comprised of a display presentation in one window using the collaboration technology of the present invention, and a document, or graphic, or image (e.g., WORD, PHOTOSHOP, etc.) display presentation in another window.

The system described is composed of plurality of appliances on a network forming a team that is working together on a common project. Users collaborate with the team by interacting with Layer Data which is stored in Data Layers that are shared with other team members. Each user accesses a display of information that can be composed of image, video, text, audio and other forms that the appliance can provide and the user view. Each user views a customized display of the information based on selectively accessing the Data Layers. These Data Layers are combined responsive to the Layer Data. The display is thus customized for each user based on the ordering of the Data Layer and the selection of Data Layers. The storage of Layer Data in Data Layers and their selective combination based on the user provides for a flexible and powerful mechanism to facilitate collaboration in the team and meet the changing requirements for each user's need to view different Layer Data and the collaboration occurs.

The Layer Data in the Data Layers is composed of Layer Data Elements which include two items: context and content information. The latter, is the content that is displayed for the user. The content information can be in the form of vector line drawings, graphics, images, tables of data, text, audio, video, gaming data, and other data. The context information is used to provide the display logic the information to properly display the content. Context information provides context parameters for the display of content information in either relative or absolute terms to other Layer Data Elements, in the same or another Data Layer, or to an entire Data Layer. The context parameters can be spatial locations or references to other Layer Data Elements that imply ordering of Data Layer elements. For instance, several Data Layers containing text, e.g., "This i", "s a te", "st.", could be referenced in a particular order using context information. The display would then display them to the user as "This is a test". Also, a Data Layer element could contain an X,Y coordinate that refers to a location on the screen of the display or it could refer to an offset from another Layer Data Element. The context information could also contain other information such as a name which could be used by the display generation to include or eliminate Layer Data Elements based on the context information. If context parameters provide invalid information, such as an X,Y coordinate that would be off screen or a reference to another Data Layer element that is not visible or no longer existing then the display generation can choose to include the said Data Layer element with default information or not include it in the display.

The embodiment of Data Layer structure is illustrated in FIG. 71. This can be implemented using tools in several ways. A relational database can be used. Relational databases can be accessed in various ways but a common method is using Structured Query Language, SQL, statements). The Layer Data can be stored in a Layer Data Table wherein each row is a Layer Data Element. A number of columns in the table make up the context information and other columns provide the content information. Alternatively, a Context Elements Table could contain columns for only the context information and an index column. Each row of said table would represent a Context Element. A Content Elements Table could contain columns for only the content information and an index column. Each row of said table would represent a Content Element. The relational join operation could dynamically create a table containing both context and content information. A SQL SELECT statement with a WHERE clause can be used to implement the Layer Data Element Selection function. The WHERE clause would be formed from the Part specification and context columns. For example, "WHERE ContextPage=5". ContextPage is a column in the Data Layer table. The Page indicates that "page 5" should be retrieved from the Layer Data. The content information can be stored in the relational database as a column as a binary large object, BLOB (see SQL specifications for a BLOB), either in the Data Layer Table directly or in a separate table. The content information can also be stored as a link, or filename, to the content in one of the columns of the Data Layer Table. Those skill in the art of relational databases have many options for the specific structure of the tables that are used for the optimization of performance and the type of content information. This embodiment is preferred if a relational database is available and the system is fast enough to use it.

An alternate embodiment would implement as illustrated in FIGS. 45 and 56. This embodiment uses a hybrid structure for the Data Layers. The Base Data Layer is stored in a database illustrated in FIG. 45 which could be a relational or similar table based database. The Image Table, 4560, contains the content information as a filename (imgname) to the content information as an image in the File System, 4540. The context information is stored in the Doc Table, 4510, DocPage Table, 4520, Value Table, 4530, and Image Table, 4560. The PageImage Table, 4550, is used as part of the linkage of all of these tables to provide the Data Layers. The other Data Layers are pointed to by doodle_file in the Value Table, 4530. The doodle_file is illustrated in FIG. 56. Some of the context information is obtained from the database tables Doc Table, 4510, DocPage Table, 4520, Value Table, 4530. The remaining context information is stored in the doodle_file. The Wrapper Group, 5610, provides the pointers to the Data Layers available. The Layer Groups, 5630, 5631, 5632 provide for the individual Layer Data storage locations. The Layer Groups also contain context information for the Layer Data. The Layer Data storage illustrated in FIG. 56 is optimized for speed while the Base Data Layer image is optimized for storage of large images. This embodiment shows multiple tools implementing the Layer Storage and Data Layers. A system does not have to implement the Layer Storage identically for all Data Layers and can optimization the Data Layer for the system requirements and type of Layer Data. This is a preferred embodiment that illustrates flexibility in the design and optimization of speed when needed.

The context information can include the time that a document was created, the time that a n annotation was created, modified or accessed, the visibility of an annotation, the size of an annotation, image properties, user name, page number, section, chapter, bookmark, Layer Data Element that it is linked to (may be in another data layer), company name, physical location of appliance, location relative to another Layer Data Element, color, font, font size, font style, line width, . . . .

An appliance may be associated with more than one Data Layer. This allows many possibilities for the operation of a team. A team could be composed of multiple subteams. Each subteam would have members to that team. Each team would only view the Data Layers used by their subteam and a few other Data Layers used to collaborate between teams. A coordinator appliance would control those Data Layers. This would allow several teams to operate independently but can publish their results on Data Layers that are visible to other teams. This provides both security and minimizes distractions as multiple teams as subteams work together as one large team. Teams can include more subteams as needed and can be included in larger teams with changing their structure.

Each appliance is assigned a "Role" that it performs in the team and each team is defined by its "Team Type", e.g., how the team should function together. The Team Type and Role provide the rules for the appliance to manage the appliance's use Data Layers and the rules for combining the Data Layers for the display. This includes managing which Data Layer a user can edit and modify, which Data Layers an appliance combines for the display, options for the Data Layer combination, what part of the Data Layer the appliance uses for the display.

Lawyers routinely work with documents that shared with others and many times need to discuss and modify the document before an agreement can be concluded. Many times everyone is not physically available in the same location. They are also not necessarily available at the same time. The use of the collaboration technology of the present invention allows both of these restraints to be eliminated while allowing simultaneous collaboration regardless of location and time. The modifications to the document would have the opportunity to record a time line of what modifications were made by whom and when. This time line could also be erased when the parties make an agreement and this time line is no longer necessary.

Contracts, litigation and licensing have at least two parties, typically composed of lawyers, plaintiff, defendants and clients. Each party needs its own subgroup to discuss, modify and propose changes to the contract, suit or patent. The proposed changes by a party is then communicated to the other parties in the contract in their own private discussions. The lawyer tends to be the person that proposes the changes to the other subgroups and communicates the reasons and significance to the clients in their subgroup. Therefore the lawyer will input data in two layers, one private layer for communicating with the others in their subgroup, and a second subgroup layer for communicating with the other subgroups. Everyone would be able to view the subgroup layer of all subgroups. Everyone would be able to view the private layer for their own subgroup only.

Patents require the development of documents that require the input of the patent attorney and the inventors. Notes by the inventor and review of the patents with the patent attorney can be conducted in real time, despite location differences.

Litigation also provides a unique opportunity for providing a real-time discussion of court documents in a trial. The judge would have access to all layers which provide input from all the lawyers in the courtroom. Each lawyer and the judge would have their own layer that they could provide input. The layers that the jury could see is controlled by the judge so that only the appropriate layers for the jury are shown to them after approved by the judge for their viewing.

Discovery using the collaboration technology of the present invention would allow all parties to review documents, mark their objections and have them reviewed by the judge. This would not require that all the parties be physically in the same room so it can speed up the preparation for trial.

Doctors are increasingly dealing with documents in their practice. These documents are shared between physicians, specialists, pharmacies, insurance representatives, billing departments and of course the patient. Documents include medical records, bills, insurance forms, admitting forms, medical releases, prescriptions and medical results. Many times the people are in very different locations. A collaboration technology of the present invention medical system could ease the time required to collaborate on these documents. Also data rights management can be applied to documents so only those authorized to view a document are allowed to view it or modify it. Patients, nurses, administrators, insurance agents and doctors can fill in forms with all the information about who provided what input at what time. Physicians can collaborate in real time on x-rays, cat-scans and other medical tests.

Engineers and architects create many documents that need to be reviewed by their clients, project managers, manufacturing, construction, procurement and each other. A collaboration technology of the present invention provides that ability to have each person, regardless of location, provide real-time input, review, analysis and reference to the latest documents. In addition, each change is recorded so each party's input can be compared, reviewed and approved.

Shareholder meetings, churches, synagogues and public meetings are real-time events where there can be user interaction with the audience. Questions are routinely ask and documents are routinely shared with the audience. Both can be communicated via an appliance which has large screen or a projector that is viewable by the audience.

Live production requires a team that is in close coordination. As the saying goes, "The show must go on", which is the result of something not going according to the rehearsed plan. The ability of a collaboration technology of the present invention to rapidly communicate the issue and then rapidly communicate the changes provides all the production team to continue while maintaining the best performance.

Other examples of the Team Type are "Music", "Education", "Meeting", "Ad Hoc" and "Social". Teams will be prefixed by their Team Type later in this description such as "Music Team", "Education Team", "Meeting Team", "Ad Hoc Team" and "Social Team".

A Music Team can have the Roles of "Leader", "Member" and "Listener". An Ad Hoc Team uses the same Roles as the Music Team: "Leader", "Member" and "Listener". The Member and Listener Roles are identical in operation when operating within a Music Team. The Leader and Member Roles are identical in operation when operating within an Ad Hoc Team. Otherwise the Roles differ in operation in an Ad Hoc Team or Music Team. The Education Team can have the Roles of "Teacher" and "Student". The Meeting Team can have the Roles of "Presenter", "Facilitator" and "Participant".

The number of Roles for a Team Type is not limited and may be one, two or more. Later in this document we will refer to an appliance by its Role, e.g., Leader Appliance, Member Appliance, Listener Appliance, Teacher Appliance, Student Appliance, Presenter Appliance, Facilitator Appliance or Attendee Appliance.

The appliances working on a team must be operating in a role that is included in a Team Type and may include a "Coordinator Appliance". A Coordinator Appliance is an appliance operating in a Role with "Coordinator" functionality that allows it to define such things as which appliances are included in the team, their Roles and access rights. A "Non-Coordinator Appliance" is simply an appliance that is not a Coordinator Appliance. The Leader Appliances, Teacher Appliances and Facilitator Appliances are examples of Coordinator Appliances for their respective Team Types. There can be many appliances operating on the network so some Team Types require that at least one appliance on the team be a Coordinator Appliance.

Each Teacher Appliance defines which Student and Teacher Appliances are on their Education Team, thereby creating various "Classrooms" of Education Teams. Student Appliances only communicate with the Teacher Appliances in their Classroom by sending their annotations in the particular student's drawing layer. Teacher Appliances communicate with all the appliances in the Classroom or a particular Student Appliance. The Teacher Appliance either sends annotations in the student's drawing layer to a particular Student Appliance and any other Teacher Appliances in the Classroom or a common teacher layer annotation to all the Student Appliances and any other Teacher Appliances in the Classroom.

Likewise, Leader Appliances define the Leader Appliances, Member Appliances and Listener Appliances on their Music Teams. The Leader sends their annotations to all the other appliances in the team in their own layer. This layer is only modifiable by the that particular Leader Appliance. The Leader Appliances can also send other messages such as page turns to the Music Team. The Member Appliances and Listener Appliances on the display the all the Leader Appliance drawing layers in their team. Member Appliances and Listener Appliances operate the same on a Music Team, their operation differs on the Ad Hoc Team described later.

Facilitator Appliances define the Presenter Appliances, Facilitator Appliances and Attendee Appliances on the Meeting Teams. The Presenter appliance has control of the other appliances in terms of what page they are viewing. The Facilitator Appliance controls which appliance is the Presenter Appliances and Attendee Appliances, what data layers are viewed by each appliance and which data layers are editable by each appliance. The Attendee Appliances may be able to turn pages on their own determined by the Facilitator Appliance. The Attendee Appliances will be controlled as to what layers they can view and edit based on control from the Presenter and Facilitator Appliances. The Ad Hoc Team has no Coordinator Appliances and is composed of Leader Appliances, Member Appliances and Listener Appliances. The Ad Hoc Team uses all the appliances available on the network of these Roles. Leader Appliances and Member Appliances can send annotations to another appliance in the Ad Hoc Team, but the Listener Appliances only receive annotations.

By utilizing the teachings of the present invention, a method is provided for displaying collaborative work as input by a plurality of users.

In a first embodiment, the method is comprised of providing annotation data for each of the plurality of users which is representative of the respective annotations by the respective user; storing the annotation data for each respective said user in a memory as associated with said each respective said user; enabling at least one user of the plurality of users to select which of the annotations are selected annotations that are used in generating the display presentation; and providing a combined display presentation to at least one user, the combined display presentation comprised of the selected annotations combined with a base core image.

The annotation data can be provided by any of multiple means, such as via a user input apparatus such as a keyboard, mouse, touchscreen input, stylus and digitizer input, voice recognition, camera recognition, import of images, scans, vector drawings, 2D and 3D models, audio, video or text data. This is discussed in further detail with relation to FIGS. 26, 27, 28, 42 and 43 herein.

The association of each user with his/her respective annotation data is provided by mapping logic whose configuration is responsive to the mapping control that is responsive to one or more control processors. The mapping logic is discussed in further detail with relation to FIGS. 11, 12, 13, 14, 29, 32 and 37 herein. The mapping control is discussed in further detail with relation to FIGS. 15, 18, 22, 24, 27 and 28 herein. The memory is structured to support this association by layer storage. This is discussed in further detail with relation to FIGS. 16, 17, 19 and 20 herein. The memory can be centralized or distributed as discussed in further detail with relation to FIGS. 1, 2, 3, 4, 5, 6, 7, 8, 9 and 10. The enabling of selection by at least one user of the plurality of users to select which of the annotations are selected annotations that are used in generating the display presentation is provided by one or more control processors to which the aforementioned mapping control is responsive. Coordinator control logic is a control processor that is responsible for coordinating all the user displays. The Non-coordinator control logic is responsive to the coordinator control logic. This is discussed in further detail with relation to FIGS. 8, 9, 10, 24, 25, 26, 27, 28, 42 and 43 herein.

The generation of the display presentation is provided by the user display which is responsive to the display logic. The display logic is responsive to the aforementioned layer storage and mapping logic. The display logic is discussed in further detail with relation to FIGS. 24, 27, 28, and 39 herein. The user display is discussed in further detail with relation to FIGS. 24, 25, 26, 27, 28, 42 and 43 herein.

In a further embodiment to the one embodiment, the method is further comprised of enabling at least one user of the plurality of users to select which of the plurality of users is enabled to input the respective annotations therefor.

The global control processor obtains input from the at least one user of the plurality of users and communicates with the all the mapping controls to control mapping logic and display logic for selecting the annotation that is the destination for user input from the respective input device. This is discussed in further detail with relation to FIGS. 8, 9 and 10 herein. There may be a plurality of control processors which obtain input from each respective user. At least one control processor of the plurality of control processors and communicates with the all the control processors in the system to coordinate the selection of which of the plurality of users is enabled to input the respective annotations. The control processors control mapping logic and display logic for the display of annotations for all user displays and the annotation that is the destination for user input from the respective input device. This is discussed in further detail with relation to FIGS. 26, 27, 28, 42 and 43 herein.

In a further embodiment to the one embodiment, the method is further comprised of enabling at least one user of the plurality of users to select which of the users are selected to have their respective annotations selected for use in generating the display presentation.

The global control processor obtains input from the at least one user of the plurality of users and communicates with the all the mapping controls to control mapping logic and display logic for selecting which of the users are selected to have their respective annotations selected for use in generating the display presentation. This is discussed in further detail with relation to FIGS. 8, 9 and 10 herein. There may be a plurality of control processors which obtain input from at least one user of the plurality of users. The plurality of control processors receiving input from said at least one user communicates with the all the control processors in the system to coordinate the selection of the users that are selected to have their respective annotations selected for use in generating the display presentation. The control processors control mapping logic and display logic for the display of annotations for all user displays and the annotation that is the destination for user input from the respective input device. This is discussed in further detail with relation to FIGS. 26, 27, 28, 42 and 43 herein.

In a further embodiment to the one embodiment, the method is further comprised of enabling at least one user, of the plurality of users, to do one of selectively enable and selectively disable utilizing of selected ones of the plurality of users said respective annotations in generating the display presentation provided for viewing to at least one of the plurality of users.

The global control processor obtains input from the at least one user of the plurality of users and communicates with the all the mapping controls to control mapping logic and display logic to selectively enable and selectively disable utilizing of selected ones of the plurality of users said respective annotations. This is discussed in further detail with relation to FIGS. 8, 9 and 10 herein. There may be a plurality of control processors which obtain input from at least one user of the plurality of users. The plurality of control processors receiving input from said at least one user communicates with the all the control processors in the system to coordinate selectively enabling and selectively disabling to utilize of selected ones of the plurality of users said respective annotations. The control processors control mapping logic and display logic for the display of annotations for all user displays and the annotation that is the destination for user input from the respective input device. This is discussed in further detail with relation to FIGS. 24, 25, 26, 27, 28, 42 and 43 herein.

In a further embodiment to the one embodiment, the method is further comprised of enabling at least one user, of the plurality of users, to do one of selectively enable and selectively disable utilizing of selected ones of the plurality of users said respective annotations in generating the display presentation provided for viewing by another said user that is not the at least one user.

The global control processor obtains input from the at least one user of the plurality of users and communicates with the all the mapping controls to control mapping logic and display logic to selectively enable and selectively disable utilizing of selected ones of the plurality of users said respective annotations in generating the display presentation provided for viewing by another said user that is not the at least one user. This is discussed in further detail with relation to FIGS. 8, 9 and 10 herein. There may be a plurality of control processors which obtain input from at least one user of the plurality of users. The plurality of control processors receiving input from said at least one user communicates with the all the control processors in the system to coordinate selectively enabling and selectively disabling to utilize of selected ones of the plurality of users said respective annotations in generating the display presentation provided for viewing by another said user that is not the at least one user. The control processors control mapping logic and display logic for the display of annotations for all user displays and the annotation that is the destination for user input from the respective input device. This is discussed in further detail with relation to FIGS. 24, 25, 26, 27, 28, 42 and 43 herein.

In a further embodiment to the one embodiment, the method is further comprised of displaying the user annotations for each respective said user within the combined display presentation as separately identifiable with the respective user as shown in the combined display presentation.

The control processors communicate setup information to the display logic that configures the display logic to add separately identifiable information for each respective user. The separately identifiable information can be in the form of a different color, a visual label added, a mouse over popup visual label, blinking visual effects, a different text font or character effect, modifying the location of the annotation on the display, 3D layer visualizations and other forms. This is discussed in further detail with relation to FIGS. 39, 42 and 43 herein.

In a further embodiment to the one embodiment, the method is further comprised of generating a separate and independent version of the combined display presentation for each of at least two of the plurality of users. Each said independent version of the combined display presentation is comprised of the respective said annotations of respective selected ones of the plurality of users as combined with the base core image.

The layer storage contains the base core image that is associated with all users. The mapping logic is configured to include the base core image or common data layer and data layers for annotations of respective selected ones of the plurality of users. This is discussed in further detail with relation to FIGS. 29, 32 and 37 herein.

In a further embodiment to the one embodiment, the method is further comprised of associating each respective said subgroup with at least two respective ones of the plurality of individual data layers which are associated with said respective subgroup. Each respective user of the plurality of users is associated with a respective said individual data layer. The method further enables each said respective user to selectively create associated respective said annotations. And the method stores the respective said annotation data for the respective said annotations in the respective said individual data layer associated with the respective user.

The control processors contain the information associating each user with a subgroup. A data layer is associated with each user. The edit level for each respective mapping logic user is setup to point to the respective data layer for each user. This is discussed in further detail with relation to FIGS. 8, 9, 10, 26, 27, 28, 42 and 43 herein.

In a further embodiment to the one embodiment, the method is further comprised of associating each respective said subgroup with at least two respective said individual data layers associated with the respective said subgroup; and associating with an editable layer with each of the respective said subgroups, selectively enabling each respective said editable layer for each of said respective said subgroups, to permit at least one user of the respective plurality of users, within the respective subgroup, to create the annotations provided for display to the users of the respective subgroup.

The control processors contain the information associating a subgroup edit data layer with a subgroup. The edit level for at least one user in the respective mapping logic is setup to point to a subgroup edit data layer. Said at least one user can provide change information to the respective subgroup edit data layer. All users associated with the said subgroup include the subgroup edit data layer in the mapping table for display of the subgroup edit data layer and other data layers as needed. This is discussed in further detail with relation to FIG. 32 herein.

In a preferred embodiment, at least one user selects a plurality of the annotations for a respective plurality of users, for use in generating the combined display presentation.

At least one of the control processors is responsive to said at least one user and communicates the selection of a plurality of the annotations for a respective plurality of users. Said at least one of the control processors communicates the selection to all other control processors. The control processors setup the mapping control for the respective users for use in generating the combined display presentation. This is discussed in further detail with relation to FIGS. 24, 25, 26, 27, 28, 42 and 43 herein.

In the preferred embodiment, each one of the respective plurality of users is separately identifiable in the combined display presentation.

The control processors communicate setup information to the display logic that configures the display logic to add separately identifiable information for each respective user. This is discussed in further detail with relation to FIGS. 39, 42 and 43 herein.

In an alternate embodiment, the method is further comprised of identifying at least one sub-grouping comprised of at least two of the respective plurality of users which form members of a respective separate subgroup of users; selecting the respective annotation data for the respective separate subgroup of users for the at least one said sub-grouping of the plurality of users, to be utilized in generating a first combined display presentation presented for viewing to only those said users in the subgroup of users; generating the first combined display presentation comprising the annotations of all the members of the respective separate subgroup provided for viewing by at least one of the respective plurality of users in the respective separate subgroup; generating a second combined display presentation for viewing by at least one other one of the plurality of users that are not members of the respective separate in the subgroup, wherein the second combined display presentation is comprised of the annotations of only one of the members of said respective separate subgroup and excludes the annotations of all the members except the only one member.

Thus, there can be subgroups of users that interact within themselves independently of the larger group of multiple ones of the subgroups. Within each subgroup, the users/members can see the annotations of some or all of the other members of the subgroup. However, only the designated one (or more if so designated) can see the annotations of the other subgroups, and the other subgroups can only see the annotations of the designated one (or more if so designated) user/member of a respective subgroup. This can be done for one subgroup with multiple members, and the rest of the plurality of users are not in subgroups, or there can be multiple subgroups, each as described above, or there can be multiple subgroups, each as described above plus the rest of the plurality of users are not in subgroups. The present invention works equally well in each of these scenarios as above. This aspect of the invention is discussed in further detail with relation to FIGS. 32, 33, 34, 35 and 36 herein.

With this embodiment of subgroups, the method is further comprised of generating the first combined display presentation comprising the annotations of all the members of the respective separate subgroup provided for viewing by all of the respective plurality of users in the respective separate subgroup.

The control processors contain the information associating each user with a subgroup. A data layer is associated with each user. The mapping table for each respective mapping logic user is setup to point to the respective data layers for respective plurality of users having the same subgroup as the said user. This is discussed in further detail with relation to FIGS. 11, 12, 13 and 14.

In one embodiment, there are at least two separate subgroups of users comprised of at least two said sub-groupings, each said respective separate subgroup comprised of members comprising at least two of the plurality of users, and the method is further comprised of linking one said member of a first one of the at least two subgroups to a different one said member of a second one of the at least two subgroups; providing communication between the one said member and the different one said member, of the annotations of the different one said member and the one said member, respectively; generating a first linked and combined display presentation comprising the annotations of a plurality of the members of the first one of the at least two subgroups combined with the annotations of the different one member; and, displaying the combined display presentation responsive to the generating.

The control processors contain the information associating a subgroup edit data layer with a subgroup. The edit level for first said member of a first one of the at least two subgroups in the respective mapping logic is setup to point to a the first subgroup edit data layer. First said member of a first one of the at least two subgroups can provide change information to the first subgroup edit data layer. The edit level for second said member of a second one of the at least two subgroups in the respective mapping logic is setup to point to a the second subgroup edit data layer. Second said member of a second one of the at least two subgroups can provide change information to the second subgroup edit data layer. The first said member of a first one of the at least two subgroups and the second said member of a second one of the at least two subgroups include in the mapping table for display of the first subgroup edit data layer, second subgroup edit data layer and the respective data layers for respective plurality of users having the same subgroup as the said user. This is discussed in further detail with relation to FIG. 32 herein.

In a further embodiment to the one embodiment, the method is further comprised of generating a second linked and combined display presentation comprising the annotations of a plurality of the members of the second one of the at least two subgroups combined with the annotations of the one member; and displaying to the different one said member the second linked and combined display presentation, responsive to the generating. The education team has two groups, a teacher group and student group. The teacher can display the annotations of all the students, together with the teacher annotations on the teacher display simultaneously. This is discussed in further detail with relation to FIG. 60 herein.

In an addition to the first embodiment, the method is further comprised of organizing the memory as a plurality of mapped data layers; associating each individual data layer of the plurality of mapped data layers with at least one respective one of the plurality of users; storing the annotation data for each respective said user in a respective said individual data layer that is associated with the respective said user; enabling at least one user of the plurality of users to select which of the individual data layers are chosen as selected data layers that are used in generating the display presentation; and providing the combined display presentation comprised of the respective annotations for the respective said users associated with the respective selected data layers, annotations combined with the base core image, responsive to the selected data layers. The users of appliances in a social team can change settings on the appliance to hide one or all of the team member layers. This is discussed in further detail with relation to FIGS. 61 through 70 herein.

In the one embodiment, the method is further comprised of generating a same combined display presentation for viewing by at least two users of the plurality of users for the respective subgroup. The education team has two groups, a teacher group and student group. The teacher can display the annotations of a single the student, together with the teacher annotations on the teacher display. These are the same annotations shown on the said student so each view exactly the same display. This is discussed in further detail with relation to FIG. 59 herein.

In the one embodiment, the method is further comprised of generating a different separate respective combined display presentation for respective viewing by at least two respective users of the plurality of users for the respective subgroup. The teacher can display the annotations of a just the teacher on the teacher display. The students display the annotations of the teacher and the student's own annotation. Every appliance has a different display. This is discussed in further detail with relation to FIG. 58 herein.

In a further embodiment to the one embodiment, the method is further comprised of associating each said individual user with a respective computing appliance; providing the input of the respective annotations for the respective individual user responsive to each respective said individual user; and providing the respective combined display presentation to the respective individual user associated therewith on a respective display apparatus at each respective one of the plurality of computing appliances. The teacher can display the annotations of a just the teacher on the teacher display. The students display the annotations of the teacher and the student's own annotation. Every appliance has a different display. The input device for each appliance is responsive to the respective annotation data layer that is being displayed, e.g., the teacher modifies the teacher layer and every student modifies their own layer. This is discussed in further detail with relation to FIG. 58 herein.

Multiple alternative systems are illustrated and described herein for implementing the one embodiment (as well as other embodiments), utilizing a plurality of computing appliances each with a display apparatus for displaying collaborative work comprised of a display presentation to at least one user of a base core image in combination with selected annotations as input by a plurality of users. One such system for the one embodiment is comprised of input apparatus providing annotation data for each of the plurality of users which is representative of the respective annotations by the respective user responsive to user input at said respective input apparatus; memory storing the annotation data for each respective said user in an area of the memory as associated with said each respective said user; logic enabling at least one user of the plurality of users to select which of the annotations for which of the plurality of users are selected annotations, that are used in generating the display presentation; and the display apparatus providing a combined display presentation comprised of the selected annotations combined with the base core image. The overall system is described in FIGS. 5, 6, 7, 8, 9, 10. The input apparatus and annotation data is described in greater detail in FIGS. 26, 27 and 28. The memory stores are described in greater detail in FIGS. 45, 53, 54, 55, 56 and 71.

The annotation/user selection logic enables at least one user of the plurality of users to select which of the annotations for which of the plurality of users are selected annotations, that are used in generating the display presentation. The annotation/user selection logic can be comprised of pointer lists, database tables, tables, vector lists, and is described in greater detail in relation to FIGS. 11, 12, 13, 14, 29 and 60 herein.

The display apparatus provides a combined display presentation comprised of the selected annotations combined with the base core image. The display apparatus can be comprised of graphic adapters, software code for creating the combined image, specialized graphic processors, and is described in greater detail in relation to FIG. 39 herein. The combined display presentation and its structure can be comprised of an image, display languages such as Postscript, PCL, SVG, and others, is described in greater detail in relation to FIG. 39 herein.

In this system, at least one user selects a plurality of data layers for at least two users of the plurality of users, for use in generating the combined display presentation.

In a preferred embodiment of this system, each of the respective plurality of users is separately identifiable in the combined display presentation.

The preferred embodiment of this system is further comprised of logic for identifying a plurality of sub-groupings of the respective plurality of users as respective separate subgroups of users; memory storing data for each one of the plurality of users in a respective one of a plurality of data layers for at least one said subgroup of users, for use in generating a first combined display presentation, for viewing by only those said users in the subgroup of users; display logic generating the first display presentation comprising the annotations of all the members of the subgroup for viewing by at least one (or some or all) of the respective said users in the subgroup; and wherein the display logic generates a second combined display presentation for viewing by other users who are not in the subgroup that utilizes the annotations of only one said user of the plurality of users in the subgroup.

In an alternate embodiment of the one embodiment, there is one said separate subgroup; wherein each member of that one said separate subgroup is linked to see all members annotations from other members of that one said separate subgroup, and wherein one member of that one said separate subgroup is also linked to all at least one, to all, of the other users who are not members of that one said separate subgroup.

In another embodiment, there are at least two separate subgroups, wherein within each of the at least two separate subgroups each member of that said separate subgroup is linked to see all members annotations from other members of that said separate subgroup, and wherein one member of each of the two said separate subgroup is also linked to show its annotations from that one user/member for viewing to all at least one, to all, of the other users who are not members of that one said separate subgroup.

In yet another embodiment, there are the at least two separate subgroups, wherein within each of the at least two separate subgroups each member of that said separate subgroup is linked to see all members annotations from other members of that said separate subgroup, and wherein one member of each of the two said separate subgroup is also linked to show its annotations from that one user/member for viewing to a respective said one member of the other one of the at least two separate subgroups. Optionally, each of the one member of each of the two said separate subgroup is also linked to show its annotations from that one user/member for viewing by at least one (to all) of the other users who are not members of either one of the two said separate subgroup.

Thus, there can be multiple separate subgroups of users, wherein each of the members of each such separate subgroup interact within themselves independently of the larger group of multiple ones of the subgroups. Within each subgroup, the users/members can see the annotations of some or all of the other members of the subgroup. However, only the designated one (or more if so designated) can see the annotations of the other subgroups, and the other subgroups can only see the annotations of the designated one (or more if so designated) user/member of a respective subgroup. This can be done for one subgroup with multiple members, and the rest of the plurality of users are not in subgroups, or there can be multiple subgroups, each as described above, or there can be multiple subgroups, each as described above plus the rest of the plurality of users are not in subgroups. The present invention works equally well in each of these scenarios as above. This aspect of the invention is discussed in further detail with relation to FIGS. 58, 59 and 60 herein.

In yet another embodiment, the another member of the other one (the second of the at least two subgroups) of the at least two subgroups has a display presentation generated of a second linked and combined display presentation comprising the annotations of a plurality of the members of one to all of the other one(s) of the at least two subgroups, combined with a display of the annotations of the one member of the first of the at least two subgroups. This aspect of the invention is discussed in further detail with relation to FIG. 60 herein. herein.

In a further extension of the system in the one embodiment, the memory is comprised of a plurality of mapped data layers. Each of plurality of mapped data layers is associated with at least one respective one of the plurality of users. The storage provides storing of the annotation data for each respective said user in a respective mapped data layer associated with the respective said user. In this further extension, the system further comprises control logic enabling at least one user of the plurality of users to select which of the mapped data layers are selected data layers that are used in generating the display presentation. The display apparatus provides a combined display presentation comprised of the selected users' annotations combined with the base core image, responsive to the selected data layers. This aspect of the invention is discussed in further detail with relation to FIGS. 15, 18, 22 and 24 herein.

In a preferred embodiment of the systems illustrating the embodiments of the present inventions, there is provided the ability for a user (or more than one user) to select which user or users are permitted to make annotations. This embodiment provides input logic enabling at least one user to select which of plurality of users is enabled to input the annotations for use in generating the display presentation. This aspect of the invention is discussed in further detail with relation to FIGS. 26, 27 and 28 herein.

In an alternate embodiment or additional aspect of this preferred embodiment, there is provided the ability for a user (or more than one user) to select which user or users annotations (for which of the users) is to be utilized in the generation of the display presentation, either for that one user, or for one or more other users. This embodiment provides input logic enabling at least one user to select which of the users are selected to have their respective annotations selected for use in generating the display presentation. This aspect of the invention is discussed in further detail with relation to FIGS. 11, 12, 13, 14, 29 and 60 herein.

In accordance with one aspect of this preferred embodiment, the system is further comprised of control logic enabling at least one user to selectively enable and disable selected ones of the plurality of users to have their respective annotations selected for use in generating the display presentation viewed by at least one of the plurality of users.

Thus, at least one of the users (or more) can select to turn on and off, at will, to select which of the users annotations will be utilized in generating of the display presentation for that one user or for other one or ones of the users. This aspect of the invention is discussed in further detail with relation to FIG. 29 herein.

In another alternate embodiment of this preferred embodiment, the user annotations for each respective said user is provided within the combined display presentation as separately identifiable with the respective user as shown in the combined display presentation. Thus, for example one user can be red, another user blue, etc. Or, users who are members of a first subgroup can have a first set of colors (either different families of colors, or different hues within a same color) and each other subgroup has its own unique and identifiable set of colors. Thus, when viewing the display presentation, it is readily and easily identifiable as to which user of which subgroup made which annotations in the combined display presentation. This aspect of the invention is discussed in further detail previously herein in regard to context information.

In one alternate embodiment, a separate and independent version of the combined display presentation is provide to at least two of the plurality of users within the respective subgroup; and each said independent version of the combined display presentation is comprised of the respective said annotations of selected ones of the plurality of users as combined with a base core image. Thus, one user can see one subset of users annotations as overlaid atop of and aligned to the base core image in a first independent version of a combined display presentation, while another user user can see yet another subset of (the same or overlapping or completely different ones of) users annotations as overlaid atop of and aligned to the base core image in in a second independent version of a combined display presentation combined display presentation. And this can be done without limitations. It can be done for users within a same subgroup, or for users within different subgroups, or for independent users not within any subgroups at all. The users of appliances in a social team can change settings on the appliance to hide one or all of the team member layers. This is discussed in further detail with relation to FIGS. 61 through 70 herein.

In an alternate embodiment of the subgrouping aspect of the present inventions, each of the subgroups is comprised of at least two plurality of mapped data layers associated with said subgroup; and each user is associated with at least one of the mapped data layers that is an editable data layer that can be selectively enabled (or disabled) to permit (or not allow) the respective user to create the annotations for the respective user. The education team has two groups, a teacher group and student group. The teacher can display the annotations of just the teacher annotations on the teacher display or choose to display the teacher annotation a particular student data layers. The teacher's input changes from the teacher layer to the said student data layer in the latter display. This is discussed in further detail with relation to FIGS. 58 and 59 herein.

In the alternate embodiment of the subgrouping aspect of the present inventions, the system can additionally be implemented such that each of the subgroups is associated with at least two plurality of mapped data layers associated with said subgroup; and such that each of the subgroups is associated with an editable layer that is selectively enabled to permit at least one of the respective plurality of users to create the annotations for the respective subgroup. This aspect of the invention is discussed in further detail with relation to FIGS. 61, 62, 63, 64, 65, 66 and 67 herein.

In an option to the alternate embodiment of the subgrouping aspect of the present inventions, a same combined display presentation is generated at, at least two of the plurality of users for the respective subgroup. Thus, those at least two of the plurality of users for the respective subgroup view the combined display presentation of selected annotations and the base core image concurrently while they work in real time together on editing/annotating relative to the same base core image, provide for a collaborative work result. This aspect of the invention is discussed in further detail with relation to FIG. 59 herein.

In an alternate option to the alternate embodiment of the subgrouping aspect of the present inventions, a different separate combined display presentation is generated at, at least two of the plurality of users for the respective subgroup. Thus, each of those at least two of the plurality of users for the respective subgroup view a different combined display presentation of different ones of selected annotations for respective users, combined with the display of the base core image, concurrently while they work in real time on editing/annotating relative to the same base core image, provide for a collaborative work result. Thus, each of the subgroups can view selected members/users of their respective group independently of the other subgroups' users, or different users (whether or not within a same subgroup, can view selected users annotations independently of what another user is viewing of a separate set of selected users (some the same, or all different). This aspect of the invention is discussed in further detail with relation to FIGS. 61, 62, 63, 64, 65, 66 and 67 herein.

Multiple embodiments as described hereinafter, are also illustrated in and further described relative to FIGS. 5, 6, 7, 8, 9, 10, 11, 14, 16, 18, 19, 20, 21, 22, 23, 24, 26, 27, 28, 29, 32, 37, 39, 40, 41, 42, 43, 44, 45, 46, 47, 48, 49, 50, 51, 52, 53, 54, 55, 56, 57, and elsewhere herein.

As illustrated, a first embodiment of the system is a plurality of computing appliances each for use by each of a respective user of a plurality of users in providing for collaboration by respective ones of the users working on a common project having an associated base image display. The system is comprised of layer storage comprising a plurality of separate respective user layers of storage. Each said separate respective user layer provides associatively mapped storage of respective user data associated with a respective display for a respective user of the plurality of users. Each said user layer of storage stores respective user data that is representative of a respective display of annotations as input by the respective user. The system is further comprised of display control logic providing individualized selective control of utilization of each said separate respective user layer for each of the respective one of at least two of the users, as selected layers that are utilized in generation of a combined display presentation. The system also is comprised of display generation providing generation of the combined display presentation utilizing the selected layers for showing the collaboration of the respective ones of the users responsive to the display control logic. Numerous aspects of the invention are discussed further with relation to FIGS. 5, 6, 7, 8, 9, 10, 11, 14, 16, 18, 19, 20, 21, 22, 24, 26, 27, 28, 29, 32, 37, 39, 40, 41, 42, 43, 44, 45, 46, 47, 48, 49, 50, 51, 52, 53, 54, 55, 56, 57, and elsewhere herein.

In an alternate embodiment, each user is associated with a separate display apparatus, which provides a local display presentation of a version of the combined display presentation thereupon. In a further embodiment to the alternate embodiment, the display generation of a local display presentation at each user's respective display apparatus is controlled separately for each user and can provide for inclusion in the generation of the display of: only a base image, the base image and annotations associated with a selected one of the user layers, the base image and the annotations associated with multiple selected ones of the user layers and of the base image and all the annotations as associated with all of the user layers. In a further embodiment, the respective computing appliance for each respective user is comprised of local display control logic providing for selection of associated selected ones of the annotations responsive to selection of the respective users associated therewith. The display generation is responsive to the annotations associated with the selected one of the plurality of users.

In another further embodiment to the alternate embodiment, a same display presentation is provided at each separate display apparatus. In still another embodiment, the display generation provides a separate independent display presentation at each of at least two of the display apparatus that is different. In yet another further embodiment to the alternate embodiment, the display control logic controls selection by user as to usage of respective annotations of the respective user for use in generation of separate associated display presentations at each of at least two of the separate display apparatus.

In one alternate embodiment, the display generation provides for a same display presentation to be provided to each of the plurality of display apparatus. In another alternate embodiment, the respective user data as stored in the respective user layer is changeable only by said respective user associated therewith.

In another embodiment, the display generation logic is responsive to the layer storage and the display control logic to provide generation of a respective said combined display presentation to at least one of the users.

In still another embodiment, the respective user data stored within a selected user layer of storage is changeable by at least two of the users of the plurality of users.

In a third embodiment, the display control logic is responsive to selection by a respective user to provide selection as to utilization of certain selected portions of the user data for use in the generation of the combined display presentation.

In yet another embodiment, the system is further comprised of display enable control logic defining a display enable mode for each of a plurality of respective data layers for each of the respective plurality of users on a user-by-user individual basis as to each individual said user of the plurality of users. The display generation is responsive to the display enable mode for each of a plurality of respective data layers for controlling showing of the selected ones of the annotations in the combined display presentation. In another alternate embodiment, the display control logic provides selection by each respective said user for at least two of the plurality of users, to control the selection of one of including and excluding the utilization in generation of the display presentation of the annotations as associated with a plurality of the respective users. A separate display presentation is provided to each of the plurality of users responsive to the respective selection by each respective said user.

In a preferred embodiment, the system is further comprised of edit control logic controlling permitting of input of the annotations and storage of the respective user data for the annotations, controlled separately as to each separate respective user layer of storage.

In an alternate further embodiment, the layer storage is further comprised of a base layer of storage of base image data representative of a respective base image display. The display control logic provides selection of at least one of the base layer and the plurality of user layers to provide the selected layers to be utilized in the display generation. Thereafter, generation of a combined display presentation is responsive to the selected layers and the base layer. The combined display presentation is comprised of the base image combined with the respective display of images for the respective annotations for the selected layers. In a further embodiment, each of the plurality of computing appliances is associated as a respective one computing appliance for each respective one user of the plurality of users. Each of the plurality of computing appliances is further comprised of its local layer storage. Changes to the respective user data for at least one user is stored in the associated local layer storage of each of at least two of the plurality of computing appliances. Said changes are communicated between each of at least two of the plurality of computing appliances so that the respective said local layer storage of each one of the at least two of the plurality of computing appliances is updated to contain a same singular content comprised at least in part of the changes. Preferably, the updating is done repetitively.

In one further embodiment to the first embodiment, the layer storage is comprised of a centralized layer storage and in a plurality of local layer storage in each of the plurality of computing appliances. Each of the plurality of computing appliances is associated with a respective one of the plurality of users. Each of the plurality of computing appliances is associated with a respective user layer of the respective local layer storage. Changes to the user data in said centralized layer storage and the respective user data for respective changes in said layer storage of at least one of the plurality of computing appliances are communicated between the respective local layer storage and between the centralized layer storage so that the centralized layer storage and the respective local layer are synchronized to each other, and changes are updated repetitively.

In another preferred embodiment, the system is further comprised of communication apparatus providing voice communication between each of at least two of the plurality of users, during the respective display presentation to the respective users. Alternative or additionally, the communication apparatus provides video communications between each of the at least two of the users. Numerous aspects of the invention are discussed further with relation to FIG. 23, and elsewhere herein.

In a fourth embodiment, the layer storage is comprised of local layer storage within at least two of the plurality of computing appliances. The respective user data for respective annotations as input by each said respective user is first stored locally within an associated local layer of said local layer storage, as changed user data that is associated with the respective user of the respective input. The system is further comprised of update logic for copying the changed user data from a respective local layer of storage in of the at least two of the plurality of computing appliances by copying the changed user data from each said local layer for storage in the local layer storage of the one of the plurality of computing appliances to at least one other one of the plurality of computing appliances. In a preferred embodiment to the fourth embodiment, the update logic provides for copying the changed user data from a first said respective one of the computing appliances to all other ones of the other ones of the plurality of computing appliances. Where there are a plurality of local layers in a plurality of computing appliances have changed user data stored therein. The update logic provides for copying any of the changed user data to all of the other ones of the plurality of computing appliances. Thus, as illustrated, the layer storage is distributed among the plurality of computing appliances. Alternatively or additionally, the layer storage is further comprised of central layer storage of all layers for all users. Alternatively or additionally, local layer storage in each said computing appliance provides initial storage of its respective said user's edits which said local layer storage in each said computing appliance of the plurality of computing appliances, is controlled to copy change data between the respective local layer storage. The local layer storage in each computing appliance can store that respective user's edits and/or optional base layer edit data for edits as provided by all users.

Multiple embodiments are illustrated and described in and relative to FIGS. 1, 2, 3, 4, 5, 6, 7, 8, 9, 10, 11, 12, 13, 14, 15, 16, 17, 18, 19, 20, 21, 22, 23, 24, 25, 26, 27, 28, 39, 40, 41, 42, 43, 56, 57, 71, and elsewhere herein, and are further described hereinafter.

In a first embodiment, a plurality of computing appliances are coupled together and managed to provide for collaboration among a plurality of users. Each respective one of the computing appliances is used by and associated with a respective user. Each computing appliance is comprised of a processor, a display apparatus providing a local display presentation optionally an input apparatus, and a communications interface providing coupling of data between itself and at least one other of the plurality of computing appliances.

A memory provides storage that is structured as a plurality of data layers. Each of said data layers is associatively mapped to store data content that is associated with a respective at least one of said plurality of computing appliances (and therefore associated with the respective user thereof at each of the computing appliances). The data layers provide mapped storage in each respective data layer of respective layer data that is representative of annotations originated at at least one of the plurality of computing appliances. In a preferred embodiment, this is done for each of at least two of said plurality of the computing appliances.

The display apparatus at at least one of said plurality of the computing appliances provides a display presentation provided responsive to the at least two of the plurality of the data layers.

Numerous aspects of the invention are discussed further with relation to FIGS. 1, 2, 3, 4, 5, 6, 7, 8, 9, 10, 11, 12, 13, 14, 15, 16, 17, 18, 19, 20, 21, 22, 23, 24, 25, 26, 27, 28, 39, 40, 41, 42, 43, 56, 57, 71, and elsewhere herein.

In a second embodiment, said at least two of said plurality of the computing appliances, provide a common said display presentation generated responsive to said at least two of the plurality of the data layers.

In a further embodiment, at least one of the data layers provides storage of respective base layer data that is representative of a respective display presentation therefor that is utilized as an underlay portion of a combined display presentation. The display apparatus at at least one of said plurality of the computing appliances provides said display presentation generated responsive to said at least two of the plurality of the data layers and responsive to said base data layer.

In another embodiment, at least one of the data layers provides storage of respective base layer data. At least two of said plurality of the computing appliances, provide a same said display presentation generated responsive to said at least two of the plurality of the data layers and responsive to said base layer data.

In yet another embodiment, the display apparatus at at least two of said plurality of computing appliances provide a same said display presentation.

In a distributed storage embodiment, the memory is a distributed to replicate a duplicate set of data layers in local storage, each of the computing appliances within a same group or team.

In still another embodiment, at least one of the plurality of computing appliances has an input apparatus which is responsive to the respective user thereof, to provide annotation data responsive to input by said respective user, for storage as corresponding layer data stored as associatively mapped in a respective one of the data layers for storage in the respective data layer representative of annotations originated at at least said one of said plurality of computing appliances.

In a third embodiment, each respective one of the plurality of computing appliances has an input apparatus which is responsive to the respective user thereof at said each respective one of the plurality of computing appliances, to provide respective annotation data responsive to respective input by said respective user, for storage as corresponding layer data that is stored as associatively mapped in a respective one of the data layers for storage in the respective data layer representative of annotations originated at at least said one of said plurality of computing appliances.

In a further embodiment, the annotation data is representative of annotations, made by the respective user, made relative to and aligned with the display presentation on the display apparatus of said respective one of the plurality of computing appliances.

In another embodiment, each respective one of the plurality of computing appliances has an input apparatus which is responsive to the respective user of said each respective one of the plurality of computing appliances, to provide annotation data responsive to input by said respective user, for storage as corresponding layer data stored as associatively mapped in each respective one of the data layers for storage in the respective data layer representative of annotations originated at, at least said two of said plurality of computing appliances.

In still another embodiment, the display apparatus for at least two of the computing appliances provide a same said display presentation to each said respective user at each of said at least two of the computing appliances. Each said respective user is enabled to provide annotations made relative to said same said display presentation.

In an alternate embodiment, said same said display presentation is comprised of an underlying image which appears as an underlying display relative to which is aligned to a display of the annotations for a respective user made atop of the respective display presentation provided to the respective user.

The underlying image can be representative of a display of one of a Word document, an Excel document, a PowerPoint document, an image document, a text document, a spreadsheet document, a presentation document, a JPEG file, A TIFF file, an MP4 file, and a PDF document.

In a second preferred embodiment, display control logic determines an ordering hierarchy for utilization of the data layers in generation of the display presentation for at least one of the plurality of computing appliances. The display presentation is generated responsive to the ordering hierarchy. This ordering hierarchy can be selected by each user for that user's display presentation choices, or can be selected by one user for other users, or can be selected by a system default setting (or settings). The display control logic determines an ordering hierarchy for each and all of the plurality of computing appliances.

In a fourth embodiment, each respective one of the plurality of computing appliances has an input apparatus which is responsive to the respective user of said each respective one of the plurality of computing appliances, to provide annotation data responsive to input of annotations by said respective user, for storage as corresponding layer data stored as associatively mapped in a respective one of the data layers.

Many display options exist.

At least one of the respective computing appliances has an associated display presentation responsive to the corresponding layer data of the said at least one of the respective computing appliance. At least another one of the respective computing appliances has a display presentation comprising the corresponding data layer of the said at least one of the respective computing appliance and the corresponding data layer of the said at least another one of the respective computing appliances. These and numerous other aspects of the invention are discussed further with relation to FIGS. 32, 33, 34, 35, 36, and elsewhere herein.

In a further embodiment to the fourth embodiment, the corresponding data layer of the said at least one of the respective computing appliance is different than the corresponding data layer of the said at least another one of the respective computing appliances.

In another embodiment to the fourth embodiment, the corresponding data layer of the said at least one of the respective computing appliance is the same as the corresponding data layer of the said at least another one of the respective computing appliances. The at least one of the respective computing appliances has an associated display presentation also responsive to the corresponding layer data of the said at least another one of the respective computing appliances.

In yet another embodiment to the fourth embodiment, the corresponding data layer of the said at least one of the respective computing appliance is different than the corresponding data layer of all of the other respective computing appliances. The at least one of the respective computing appliances has an associated display presentation also responsive to the corresponding layer data of all of the respective computing appliances.

In a further embodiment to the first embodiment, the respective users at at least two of the plurality of computing appliances collaborate concurrently together relative to a common same said display presentation, to permit each of said respective users to create annotations relative to and viewed aligned to said common same said display presentation. The users (at computing appliances) can be local (in the same room) or distant (at at least two different physical locations).

In an alternative embodiment to the first embodiment, the annotations for each of said respective users are stored as respective layer data in a respective said data layer of the plurality of data layers. Each of the respective computing appliances has an input apparatus which is responsive to the respective user of said each respective one of the respective computing appliances, to provide annotation data for said respective user. Said annotation data is stored as respective layer data in a respective one of the data layers, as representative of annotations made by the respective user. The annotations appear atop of and aligned relative to a display presentation to the respective user of a same said display presentation appearing on each said respective one of the computing appliances.

Storage can be provided locally at each of said plurality of computing appliances for storing the annotation data as respective layer data that is thereafter used to locally generate the display presentation at at least a respective one of the plurality of computing appliances.

In a distributed storage embodiment, a duplicate set of data layers is utilized for local storage of annotation data in each of a plurality of computing appliances. The respective set of data layers in the local storage are used in local generation of the display presentation at said each one of said plurality of computing appliances.

In another embodiment, changes to annotation data in a data layer of data storage, as stored in one of the plurality of data layers in local storage are communicated to and modified in the local storage at each one of said plurality of computing appliances. Said changes are an addition of new annotation data, modifications to existing annotation data or deletion of annotation data.

In a further another embodiment, at least two of the respective computing appliances has an input apparatus which is responsive to the respective user of said each respective one of the respective computing appliances. Said input apparatus provides annotation data for said respective user that is stored in a respective one of the data layers, which is a user data layer associated with the respective user of the respective input apparatus.

The layer data that is the annotation data is representative of annotations as made by the respective user and made as aligned relative to and atop of a display presentation on said respective one of the computing appliances. At least one of the computing appliances provides for generation of the display presentation utilizing data from a combination of the at least two of the user data layers and a base image layer that stores base image data representative of a respective base image.

The at least one computing appliance provides for the generation of the display presentation comprising of a combination of a display presentation as associated with the at least two of the user data layers and the associated display of the respective base image associated with the base image data layer. The base image is representative of a common underlying image which forms a common visual display image within the generated display presentation that is provided to the at least two users.

A user of at least one of the plurality of computing appliances can provide annotations that appear in the display presentation. Annotation data representative of the respective said annotations as made by at least one user at one of the plurality of computing appliances are stored as changes to the respective layer data that is stored at another one of the plurality of computer appliances. The respective said annotation data is utilized in generating the display presentation at said another one of said plurality of computing appliances.

The said computing appliance at which a respective user provides the annotations, thereafter (said computing appliance) communicates data for said changes to other ones of the computing appliances, where the communicated data is stored as layer data for storage in a respective said data layer for the respective selected one of said computing appliances (that is, for the selected user thereof).

At least one of the computing appliances has an input apparatus to provide new annotations or modifications to existing annotations and displayed as visually aligned relative to a then current display presentation being displayed to the respective user of the at least one of the plurality of computing appliances responsive to said data layers of the data storage.

At least one of the plurality of said computing appliances thereafter communicates the respective data representative of said input of annotations for storage in a defined one of the data layers in all other ones of the plurality of computing appliances.

In one embodiment, a specific data layer is associated with each respective one of the plurality of computing appliances and is utilized to generate a user specific identifiable display image within the display presentation appearing at at least two of the plurality of computing appliances.

In an alternative embodiment, at least one of the computing appliances is designated as a leader role as a leader computing appliance and is responsive to a respective leader user input to make annotations relative to a respective leader data layer for storage in the memory on said at least one other of the plurality of computing appliances for local display presentation responsive thereto. Numerous aspects of the invention are discussed further with relation to FIGS. 29, 30, 31, and elsewhere herein.

In still another embodiment, at least one specific data layer of the plurality of data layers is utilized by at least two of the respective plurality of computing appliances for generating the display presentation appearing at each of the at least two of the plurality of computing appliances.

In yet another embodiment to the fourth embodiment, at least one of the computing appliances is an editor computing appliance, and has the role designation of editor. User interaction with role control logic of the editor computing appliance designates which data layer part of data storage in the memory is used in creating the display generation from the data storage. The role control logic of the editor computing appliance communicates with all other ones of the plurality of computing appliances so that all of the plurality of computing appliances use the same said data layer part of data storage for creation of the respective display generation at each respective said computing appliance.

In a further preferred embodiment, there are specifically defined respective layers of data storage in the memory that are utilized for storage of respective data representative of the annotations provided at each respective one of the plurality of computing appliances. Respective selected ones of said data layers are used locally in each respective one of the plurality of computer appliances to locally generate the respective local display presentation.

In a fifth embodiment, a plurality of users, at a respective plurality of computing appliances, collaborate among themselves. A respective one computing appliance of the plurality of computing appliances, each is for use by a respective one user of the plurality of users. Each said respective one computing appliance is comprised of a processor, memory, and a display apparatus, and optionally, an input apparatus.

Data is coupled between a first one and a second one of the plurality of computing appliances. Structured storage is provided in the memory as a plurality of data layers associatively mapped so each of said data layers is mapped to a respective at least one of said plurality of computing appliances (and to its user), to provide mapped storage in each respective data layer of respective layer data representative of annotations originated at at least one respective one of said plurality of computing appliances, for each of at least the first one and the second one of said plurality of the computing appliances. And the method provides for a display presentation at the display apparatus of at said at least one of said plurality of the computing appliances generated responsive to said at least two of the plurality of the data layers.

Numerous aspects of the invention are discussed further with relation to FIGS. 1, 2, 3, 4, 5, 6, 7, 8, 9, 10, 11, 12, 13, 14, 15, 16, 17, 18, 19, 20, 21, 22, 23, 24, 25, 26, 27, 28, 39, 40, 41, 42, 43, 56, 57, 71, and elsewhere herein.

In a sixth embodiment, a common said display presentation is provided at said at least two of said plurality of the computing appliances generated responsive to said at least two of the plurality of the data layers.

In a further embodiment to the fifth embodiment, storage of respective base layer data is provided in at least one associated one of the data layers. The base layer data is representative of a respective base image display presentation therefor, that is utilized as an underlay portion of a combined display presentation. The method also provides for said display presentation at the display apparatus at at least one of said plurality of the computing appliances generated responsive to said at least two of the plurality of the data layers and responsive to said base data layer.

In a further embodiment to the fifth embodiment, respective base layer data is stored in at least one associated one of the data layers. The method also provides for a same said display presentation at at least two of said plurality of the computing appliances. Said display presentation is generated responsive to said at least two of the plurality of the data layers and responsive to said base data layer.

In another embodiment, a same said display presentation is provided at the display apparatus of at least two of said plurality of computing appliances.

In yet another embodiment to the fifth embodiment, annotation data is provided, responsive to a respective input by a respective user of the plurality of users. The method also provides for storing the respective annotation data as corresponding layer data stored as associatively mapped in a respective one of the data layers for storage in the respective data layer and representative of annotations originated by the respective user at a corresponding respective at least one of said plurality of computing appliances.

The annotation data can be representative of annotations made by the respective user are made relative to and aligned with a then current display presentation provided to the respective user on a respective said display apparatus of said respective one of the plurality of computing appliances.

In still a further embodiment to the fifth embodiment, annotation data representative of respective annotations is provided responsive to input by said respective user at each respective one of the plurality of computing appliances via an input apparatus which is responsive to the respective user of said each respective one of the plurality of computing appliances. Corresponding layer data is stored in the memory, stored as associatively mapped for each respective one of the data layers. In addition, a display presentation is provided that is representative of respective said annotations as originated at at least said two of said plurality of computing appliances.

In an alternative embodiment, a same display presentation is provided to each said respective user at each of the respective said display apparatus for at least two of the computing appliances.

Thereafter, each said respective user is enabled to provide annotations made relative to said same said display presentation. Numerous aspects of the invention are discussed further elsewhere herein.

Said same said display presentation can be comprised of an underlying image which appears as an underlying display relative to which is aligned a display of the annotations for a respective user made and appearing atop of the respective display presentation provided to the respective user.

The underlying image can be representative of a display of one of a Word document, an Excel document, a Power- Point document, an image document, a text document, a spreadsheet document, a presentation document, a JPEG file, A TIFF file, an MP4 file, and a PDF document.

In an alternate preferred embodiment, control is provided for selecting an ordering hierarchy for controlling utilization of the data layers in generation of the display presentation for at least one of the plurality of computing appliances. The method also provides for generating the display presentation responsive to the ordering hierarchy. The selecting of the ordering hierarchy can be done by one user for controlling that user's display, or by one user to control multiple (or all) users' display. An ordering hierarchy is determined for each and all of the plurality of computing appliances.

Annotation data is provided responsive to input the respective user of said each respective one of the plurality of computing appliances. The annotation data is stored as corresponding layer data stored as associatively mapped in a respective one of the data layers. The display presentation of at least one of the respective computing appliances comprises the respective corresponding layer data. And the display presentation of at least another one of the respective computing appliances comprises the corresponding layer data of said at least one of the respective computing appliances and the corresponding layer data of said at least another one of the respective computing appliances. Numerous aspects of the invention are discussed further with relation to FIGS. 32, 33, 34, 35, 36, and elsewhere herein.

In still another embodiment, the at least one computing appliance provides for the generation of the presentation display comprising a combination of the at least two of the user data layers and a base image data layer representative of a common underlying image forming a part of a common visual display image with the generated display presentation.

In a further embodiment to the fifth embodiment, annotation data representative of respective annotations that appear in the display presentation that are made by at least one user at one of the plurality of computing appliances are communicated to and stored as changes to respective said layer data at another one of the plurality of computer appliances. A respective said display presentation is generated at said another one of said plurality of computing appliances from said respective communicated layer data.

Respective layer data for said computing appliance at which the respective user provides the annotation data is communicated to a different one of the plurality of computing appliances for respective storage as layer data stored in a respective said data layer in the different one of said plurality of computing appliances.

In a further embodiment to the sixth embodiment, associating a specific data layer with each respective one of the plurality of computing appliances. The respective said specific data layer is utilized to generate a respective user specific identifiable display image within the display presentation appearing at at least two of the plurality of computing appliances. Numerous aspects of the invention are discussed further elsewhere herein.

In a further embodiment to the fifth embodiment, at least one specific data layer of the plurality of data layers is utilized by at least two of the respective plurality of computing appliances for generating the display presentation appearing at each of said at least two of the plurality of computing appliances. Numerous aspects of the invention are discussed further elsewhere herein.

In a further embodiment to the fifth embodiment, storing annotation data for respective user input of annotations made at at least one of the computing appliances for storage in the memory on at least one other one of the plurality of computing appliances. The method also provides for a local display presentation on the at least one other one of the computing appliances responsive to the annotation data as stored in the memory of the other one of the plurality of computing apparatus. Numerous aspects of the invention are discussed further elsewhere herein.

In a further embodiment to the previous embodiment, said annotation data from said one of the plurality of computing appliances is communicated for storage in a respective said data layer in the memory of all other ones of said plurality of computing appliances on a same team. Numerous aspects of the invention are discussed further elsewhere herein.

In a further embodiment to the fifth embodiment, user input at a first one of the plurality of computing appliances designates which part of said data layer is stored in the memory is used in creating the display generation from the data storage. The part of the data layer is communicated among all other ones of the plurality of computing appliances so that all of the plurality of computing appliances use the same said part of the data layer for creation of the respective display generation at each respective said computing appliance. Numerous aspects of the invention are discussed further with relation to FIGS. 29, 30, 31, and elsewhere herein.

In still a further embodiment to the fifth embodiment, control logic provides for defining respective said data layers in the memory that are selected data layers that are utilized for storage of respective data representative of the annotations provided at each respective one of the plurality of computing appliances. The respective local display presentation is generated at each respective one of the computer appliances responsive to the selected data layers.

The display generation for each respective one of the plurality of computing appliances is responsive to the selection of which of said data layers are to be used locally.

Multiple embodiments as described hereinafter are illustrated in and described relative to FIGS. 5, 6, 7, 8, 9, 10, 11, 14, 16, 18, 19, 20, 21, 22, 24, 26, 27, 28, 29, 30, 31, 32, 33, 34, 35, 36, 39, 40, 41, 42, 43, 44, 45, 46, 47, 48, 51, 52, 57, 58, 59, 60, 61, and elsewhere herein.

As illustrated in a first embodiment, there is a plurality of computing appliances. Each respective one of the plurality of computing appliances has a user input apparatus to provide respective annotation data as input for the respective user to permit the respective user to provide annotations which appear within a display presentation as an image for viewing and representative of the annotations. A first subset of the plurality of computing appliances comprising at least two of the computing appliances form members of a group. There is provided separate selective communication of the annotation data among the members of the group and there is selective display of the annotation data to selected ones of the members of the group. The annotation data is selectively coupled for distribution to other ones of the plurality of computing appliances in the group for selective viewing at said certain other ones of the plurality of computing appliances. Selection logic is included that permits at least one of the users' to selectively choose which of the other users within the group are selected ones that are to have their corresponding annotations viewed as part of the display presentation for the at least one of the users. The selective display is visible only at the computing appliances of the selected ones of the members of the group. The subset groups in an education team are the teacher/student subgroups and the teacher/classroom subgroups as illustrated in FIGS. 32, 33, 34, 35, 36, 48, 58, 59, and 60. Music teams can have multiple leaders, each with their own set of participants as illustrated in FIGS. 29, 30, 31, 47. The social teams have subgroups as are further detailed in FIGS. 61, 62, 63, 64, 65, 66, 67, 68, 69. The computing appliances are illustrated, inter alia, in FIGS. 5, 6, 7, 8, 9, 10, 11, 14, 16, 18, 19, 20, 21, 22, 24, 26, 27, 28, 39, 40, 41, 42, 43, 44, 45, 46, 51, 52, 57.

In a second embodiment, there are a plurality of separate groups, each said separate group comprising at least two of the plurality of computing appliances. Each of the plurality of computing appliances is associated with a respective separate one of the plurality of users. Annotations made by members of a respective said separate group are communicated only amongst the respective said members of the respective said separate group, for selective storage in an associatively mapped data layer in memory, and for utilization in the display presentation of the annotations made by members of a same respective said separate group. A separate display presentation for that group is generated and is commonly viewable at each said respective computing appliance for each said respective user that is a member of the group, responsive to the communicated annotations.

In a further embodiment, logic associatively maps at least one said member of each of the separate groups as also being an inter-group member of an inter-group group. Annotation data for each said inter-group member is communicated to the respective members of the same said separate respective group as the respective inter-group member and said annotation data is also communicated to other ones of the inter-group members associated with other said separate groups, for each of the other separate groups. Control logic associatively maps members of at least two separate groups into respective separate teams, each said respective said team comprising a separate respective plurality of members of the respective group. Communications among the members of the separate team is provided and used in selective generation of a local display presentation for each respective member of the respective separate team. Also, at least one of the members for each separate team is also an inter-team member that concurrently communicates with all users within the group.

In one embodiment, a coordinator function permits a user to select (e.g., touch) the text that someone else typed (or select the markings of someone else) as selected data, and have the selected data become sub-team-to-sub-team or team-to-team communicating data that is sent (such as by simply touching it, selecting it, and have a button to touch to send it). In an alternate embodiment, at least one of the plurality of users acts as a coordinator which selects selected annotations from the user annotations for each of the plurality of users within a separate group within a group (e.g., such as illustrated in FIGS. 51 and 52).

In a preferred embodiment, there are at least two groups. Each said group is comprised of members from the plurality of users, and communications of respective said annotation data is provided between the members of the group, for each of the groups. A common display presentation is provided to each of the members of a said group, which display presentation is viewable in common by members of that said group only, and is not for viewing by any said members of any other said group, respectively, for each of the groups, respectively.

For each of the groups, there is at least one member that also functions as a representative for the respective group to provide group-to-group communication of selected ones of the annotations for each said respective group and viewed by all members of other said groups, for all the groups working in collaboration.

In an alternate embodiment, one of the users of a respective group coordinates and controls selection of which, if any, of the respective annotation data for the respective users of the respective group is utilized in generating of a combined display presentation for each of the respective users in the respective group. Alternatively or additionally, at least one user of the plurality of users controls selection of and combination of annotation layers used in generating the display presentation for each of the computing appliances to provide at each of the computing appliances a respective display presentation comprised of selected ones of the annotation layers combined together to generate a display presentation comprising a display image combined atop a core-base image as an overlay atop it, of all of the users' annotations shown as aligned relative to and atop of an underlying image of the core base image display presentation.

In another embodiment, a respective user can control how many separate split-screen display screens are displayed as the display presentation, at that user's computing appliance only, or at each and all respective said computing appliances in a group.

In a further alternate embodiment, one user controls which combination of user annotations (preferably selected "by user") are combined and overlaid with the core image and integrated into a combined video display presentation for each of the split-screen display presentations, and which of the users' annotations are combined in which of the display presentations of the split-screen display presentations.

In still another embodiment, there are a plurality of separate screen display presentations provided in a split-screen combined presentation to each of the respective users at each said respective computing appliance. Coordinator logic selects which of the users' annotations are utilized in generating each of the display presentation for each of the respective users' computing appliance. In a further embodiment, a plurality of the screen display presentations are generated in separate (display) windows comprising at least one window displaying just the respective users' annotations combined with the core image as utilized to generate the respective display presentation, for all of the members of the respective group, responsive to collaborating together. A display presentation is generated in a second (display) window of the separate windows, displaying the annotations as made by less than all the members of the respective group, shown as aligned atop the underlying core-base image. In a further preferred embodiment, at least one user provides selection of users for selective groupings or sub-group(s) within a group of users within the groups (or sub-groups). The second window provides a display presentation of the image of the annotations of only the users of the respective sub-grouping combined and aligned atop the image of the underlying core-base image for inclusion within the generated display presentation. There can be multiple windows, of multiple combinations and permutations of user(s) annotations display, and even some windows displaying concurrently displayed additional application software (such as web-browsers, word processing, etc.).

In another embodiment, the display presentations of annotations made by the respective members of a respective group are shown on the screen display presentation for all of the plurality of screen display presentations for the members of the respective group, so that all have the same said display presentation. In an alternate embodiment, at least one of the members of the group is provided with a display of a screen display presentation that is at least in part different than the display presentation provided to other members of the respective group. In another alternate embodiment, the display presentation is comprised of annotations for all members of the respective group as results from concurrently collaborating together. The display presentation is provided as a common display presentation of said annotations provided to all members of the respective group. In yet another alternate embodiment, only the annotations of the selected ones of the members of the respective group are utilized in generating the combined display presentation. In still yet alternate embodiment, only the annotations of a selected said subset of users are utilized in generating the combined display presentation utilized in at least one of said separate windows of the plurality of display presentations.

In another alternate embodiment, multiple different ones of the windows of the display presentation are generated utilizing the respective annotations for respective ones of multiple different selected sub-groupings of users within the respective grouping, to provide the combined display presentation for each of the multiple different ones of the windows.

In a further preferred embodiment, logic controls selective enablement (to permit input of annotations) as to a respective at least one of the plurality of users, to permit creation by that user of associated annotations made relative to a base image display presentation, and provides control of communication of data (and display) representative of the annotations. The annotations are input by each respective user while that user is concurrently being shown a display presentation of the base image. An image of the annotations that are made concurrently by the users of at least two of the computing appliances can also be displayed (while being made, and selectively thereafter) for viewing shown as aligned atop of the display presentation of the base image.

The coordinator logic controls enabling as to each of the users, to permit said user to input annotations and generate annotation data, and controlling determining whether and when to utilize the respective annotation data in the generation of the respective display presentation for each said respective user.

Group control logic controls the selective enabling of use of the data layers and the determining of which ones of the users (of the multiple ones of the users) are selected members that are part of a respective group, and which of the data layers (and therefore which associated users) to use for permitting edit input, and which of the data layers to (use to generate display presentations).

In a fourth embodiment, means for collaboration is provided among a plurality of users at a plurality of computing appliances, includes displaying a display presentation, inputting respective user annotation data, viewing of user annotation data, storing in a memory, selecting the user layer data and generating a combined display presentation. The display presentation is of a base image to be viewed. User annotation data is generated (via user input) by each of a plurality of users, each associated with a respective one of the plurality of computing appliances, each with its own input apparatus to permit input of respective user annotations made relative to the display presentation of the base image. User annotation data is generated by respective computing appliances and viewed by a respective user (each of a plurality of respective users), each associated with a respective one of the plurality of computing appliances, each with its own input apparatus to permit input of respective user annotations made relative to the display presentation of the base image. The respective user annotation data for each respective user is stored in a memory as respective user (layer) data in a respective data layer that is mapped to and associated with the respective user. The user layer data is selected for the associated said respective user for at least two of the computing appliances. A combined display presentation is generated that utilizes a combination of the base image display presentation aligned to and overlaid with the display presentation of the image of the annotation data generated by the at least two of the plurality of users.

In one embodiment, a presentation is displayed to at least one user (and preferably at least two) of multiple separate display windows of display presentation, as a split-screen display. In a further embodiment, a presentation is displayed to at least one user of multiple separate display windows of display presentation, as a split-screen display, and also shows different combinations of multiple users' annotations combined with the base image display, as separate ones of the multiple separate display windows.

In a preferred embodiment, the system is comprised of at least two computing appliances, each of the computing appliances for use by a respective user. Each of the computing appliances is comprised of a processor, memory, communications interface, input apparatus, and display apparatus. Each said display apparatus provides a respective display presentation of a display image comprised of a common shared underlying image. The respective input apparatus is responsive to input by the respective user to provide annotation data representative of a display image of annotations associated with the respective user and made relative to the display presentation of the common shared underlying image. Each of the at least two of the computing appliances provides a combined display presentation comprised of a combination of the display image of the annotations associated with the respective user for at least one of the respective users, shown within the combined display presentation comprised of the display image of the annotations for the at least one of the respective users, which are aligned to and overlaid atop of the common shared underlying image in the combined display presentation. This aspect of the invention is discussed in further detail with relation to FIGS. 5, 6, 7, 8, 9 and 10, herein.

In a further embodiment, a same said combined display presentation is provided for viewing simultaneously at each of the at least two computing appliances. The display presentation of the at least two computing appliances are providing a view of the same annotations edited by the same group of users.

In an alternate embodiment, the annotations are input by said respective user while the display presentation is provided to the respective user of the image of the common shared underlying image. In addition, the annotations are representative of markings made by the respective user relative to the common shared underlying image while the display presentation provided to the respective user is of the image of the common shared underlying image. This aspect of the invention is discussed in further detail with relation to FIGS. 29, 32, 37, 44, 45 and 56, herein.

In yet another embodiment, the common shared underlying image represents a completely solid color. This provides for the initial underlying image to be empty like a new document that the users can begin editing relative to and thereupon (overlaid)).

In still another embodiment, the annotations are shown in the combined display presentation as aligned to and overlaid atop of the display presentation of the shared common underlying image. The annotations as previously described herein are correlated and related to the shared common underlying image by at least their position on the display presentation.

In yet another embodiment, the common shared underlying image is comprised of a base core image representative of a base core document. The base core image can be what is commonly know as a "screen shot" of a base core document that could be represented by many different types of formats other than an image. Such examples include a core image from a file comprising a document from Word, Excel, Finale, AutoCad, PowerPoint, eMail and other programs.

In one embodiment, an evolving base core image embodiment provides for the display presentation provided at at least one said respective computing appliance to be of a display image which starts as a display presentation of only the base core image, and evolves at each finite point of a plurality of finite subsequent points in time to provide a display presentation at each said subsequent point in time, at said at least one respective said computing appliance of a display image of a then current evolved base core image comprising the base core image combined with respective display images for all the annotations associated with the at least one said respective user at said respective computing appliances, as made up to a then current respective said finite point in time. Also, in a preferred embodiment, the display presentation provided at the respective said computing appliance is comprised of a display image of selected ones of the annotations as input by said respective user as made, subsequent to the then current said evolved shared underlying image which are shown within a new image of the combined display presentation comprised of a display image of the selected ones of the annotations which are displayed as aligned to and overlaid atop of the evolved base core image in the new image of the combined display presentation. This process allows annotations and the from selected users to be combined with the current evolved base core image to create a new evolved base core image. This is useful when a document has reached a milestone such as a release date, an approval, or a submission. The document with the current modifications is now the current document so the evolved base core image should change to reflect the milestone because all further modifications should be based on the milestone of the document rather than the previous milestone. This provides for the evolved base core image to be comprised of the base core image combined with the images for all the annotations of at least two users as made up to the respective said finite point in time.

In a further preferred embodiment, the display presentation of the image of the annotations for all the users are shown in the combined display presentation, atop of and aligned relative to the display presentation of the common shared underlying image. The annotations as previously described herein of all "selected" users are correlated and related to the shared common underlying image by at least their position on the display presentation. In this embodiment, all "selected" users have the same display presentation.

In a further embodiment to the evolving base core image embodiment, the combined display presentation changes over time so as to be comprised of display images of selected ones of user annotations that are not included in a then current evolved shared underlying image, which thereafter becomes a next evolved base core image forming a next common shared underlying image which is shown within an updated combined display presentation as a display image of the selected ones of user annotations that are aligned to and overlaid atop of the evolved base core image in the updated combined display presentation. Only selected annotations from the users are used to create the new evolved base core image.

In yet another embodiment to the evolving base core image embodiment, each update of the evolved base core image displays an image of changes made over time, to display ongoing annotations provided by selected ones of the users to provide the evolved core basis image. In a preferred embodiment, the base core image includes visual representations in the display presentation that allow the user to determine when and/or where changes were made to the base core image. These representations can be changes in the evolved base core image such as color, size, line thickness, font weight or font style or it could also be additions to the evolved base core image of text, icons, lines or drawings.

In a preferred embodiment, the common shared underlying image is representative of at least one of a word processing document, a text document, a drawing document, a spreadsheet document, a photo document, an image document, a JPEG file, an MPEG file, a musical score, an audiovisual movie, diagnostic film, a contract document, a proposal document, an x-ray film file, an MRI image file, and a CAT-scan file. This aspect of the invention is discussed in further detail with relation to FIG. 26, herein.

In the preferred embodiment, a plurality of the users' annotations is utilized in the generation of the combined display presentation. This aspect of the invention is discussed in further detail with relation to FIGS. 11, 14, 18, 22, 27, 28, 29, 32, 37, 39 and 56, herein.

An alternative embodiment provides a method for collaboration among at least two computing appliances, each of the computing appliances having an input apparatus, and a display apparatus for use by a respective user of a plurality of users. A display presentation is provided on each of the display apparatus comprising a display image of a common shared underlying image. Annotation data is generated, responsive to a respective input by the respective user of a respective said input apparatus. The annotation data is representative of a display image of annotations made by the respective user relative to the display presentation of the common shared underlying image. The annotations made by each respective user relative are mapped to the display of the common shared underlying image in the combined display presentation. The combined display presentation provides for viewing at the respective display apparatus for each respective said user at at least two of the at least two computing appliances while the respective said user is providing an input of the annotation data. And the combined display presentation is comprised of a display image of the annotations as made by the respective user at at least one of the computing appliances, aligned to and overlaid atop of the common shared underlying image. This aspect of the invention is discussed in further detail with relation to FIGS. 5, 6, 7, 8, 9 and 10, herein.

In an alternative preferred embodiment a same said combined display presentation is provided for simultaneously viewing at the at least two computing appliances.

A display presentation is generated from a base core image for a base core document as the common shared underlying image, which is visually referenced by the respective users of the at least two computing appliances while the respective said users are making input of the respective annotations. This aspect of the invention is discussed in further detail with relation to FIGS. 29, 32, 37, 44, 45 and 56, herein.

In another preferred embodiment, a display presentation of respective annotations is provided for each respective user responsive to the respective input by the respective user at said respective input apparatus. The display presentation of the respective annotations is uniquely identifiable within the combined display presentation as associated with the respective user that provided the respective input. The respective annotations are shown in the combined display presentation as aligned to and overlaid atop of the display presentation of the shared common underlying image, responsive to the selected data layers and the ordering hierarchy for the data layers.

In a further alternate embodiment, an initial display presentation at an initial time is provided to the respective user at each of the at least two computing appliances, of a display image of the common shared underlying image representative of a base core image. Thereafter, at subsequent points in time, an evolved display presentation to the respective user of a display image of an evolved base core image. The evolved base core image at each subsequent point in time is also comprised of the base core image combined with respective images for the respective annotations as made from the initial time up to each said respective said subsequent point in time by at least one said respective user of at least one of the at least two computing appliances as previously described herein. Alternatively, or additionally, the evolved display presentation provides a current shared display of an underlying image that is provided simultaneously at the at least two computing appliances. Each subsequent said evolved display presentation is comprised of selected additional ones of the respective user annotations that are not already in the evolved display presentation which is currently being shown in the current combined display presentation, combined with a display image of the selected additional ones of the respective user annotations, which selected additional ones of the respective user annotations are aligned to and overlaid atop of the currently being shown evolved base core image, to generate the combined display presentation as previously described herein. As described in detail elsewhere herein, the evolved base core image is comprised of the base core image combined with the images for all the annotations of at least two of the plurality of users as made up to a respective finite point in time.

In another embodiment, the generation of the display presentation of the common shared underlying image initially provides a display presentation of only a base core image. Also, the generation of the display presentation of the common shared underlying image thereafter evolves at finite points in time to provide a display presentation of an evolved base core image comprising the base core image as initially provided, combined with the images for all the annotations for at least two users of the plurality of users, as made up to a respective finite point in time. In addition, the display presentation for the evolved core base image is thereafter, until changed again at a next respective finite point in time, comprised of a combination of the annotations for at least two of the users aligned in the combined display presentation for viewing atop of and aligned relative to the display presentation of the common shared underlying image.

In yet another embodiment, the display presentation of the common shared underlying image starts as a display presentation to the respective user of a display image of only a base core image, and evolves at finite points in time, to provide a display presentation to the respective user of a display image of an evolved base core image comprising the base core image combined with the images for all the annotations of at least one user as made up to the respective finite point in time.

As discussed in detail elsewhere herein, in an alternate embodiment, the display presentation of the annotations for all the users are aligned in the combined display presentation for viewing atop of, and aligned relative to, the display presentation of the common shared underlying image. The common shared underlying image can be representative of at least one of a word processing document, a text document, a drawing document, a spreadsheet document, a photo document, an image document, a JPEG file, an MPEG file, a musical score, an audiovisual movie, diagnostic film, a contract document, a proposal document, an x-ray film file, an MRI image file, and a CAT-scan file. This aspect of the invention is discussed in further detail with relation to FIG. 26, herein.

In a second alternate embodiment, communications is coupled between at least two computing appliances, each of the computing appliances for use by a respective user. Each of the computing appliances is comprised of a processor, memory, communications interface, input apparatus, and display apparatus. A display presentation on each of the display apparatus providing for a display image of a common shared underlying image. Annotation data is stored in memory in a respective associated data layer that is associated with the respective user thereof, responsive to input by the respective user via a respective said input apparatus of a respective computing appliance. The annotation data is representative of a display image of annotations made while the display presentation of the image of the common shared underlying image is provided on the respective computing appliance for viewing to the respective user. The annotation data is stored in the memory in a respective one of the data layers as associatively mapped to the respective user. The display image of the annotations made by each said respective user is mapped to appear in the display presentation as an image that is displayed relative to the display of the common shared underlying image in the display presentation, which is provided to the respective user, responsive to the annotation data. A combined display presentation provided at at least one of the computing appliances comprises a combination of the annotations as made by at least one of the respective users and the display image of the common shared underlying image. The display image of the annotations are aligned to and overlaid atop of the common shared underlying image in the combined display presentation. This aspect of the invention is discussed in further detail with relation to FIGS. 5, 6, 7, 8, 9 and 10, herein.

In one further embodiment, the annotations made by the respective user while the display presentation that is provided to the respective user is of the common shared underlying image the display image. The annotations made by the respective user are combined in the combined display presentation to appear relative to the common shared underlying image as aligned relative to and atop of the display presentation of the common shared underlying image.

In a simultaneous viewing embodiment, simultaneous viewing on the respective display apparatus is provided to each said respective user at each of the at least two computing appliances, of a local display presentation of a same said combined display presentation. This aspect of the invention is discussed in further detail with relation to FIGS. 29, 32, 37, 44, 45 and 56, herein.

In a preferred alternate embodiment, an initial display image initially provides the display presentation to the respective user of a display image of an initial common shared underlying image of a display image of only a base core image. The common shared underlying image is changed (updated) at subsequent points in time to create a respective subsequent evolved common shared image for a subsequent respective point in time (comprising the base core image combined with the images for all the annotations of at least one user (or for a combination of selected users) as made up to said subsequent respective point in time). A subsequent display image is provided of the display presentation to at least one user. The subsequent display image is comprised of (at least at a minimum the addition of) an image of selected ones of user annotations that are not currently already included in the initial display image. An updated combined display presentation provides a display image of the selected ones of user annotations shown as aligned to and overlaid atop of the initial display image.

Multiple embodiments as described hereinafter, are also illustrated in and described relative to FIGS. 1, 2, 3, 4, 5, 6, 7, 8, 9, 10, 11, 12, 13, 14, 15, 16, 17, 18, 19, 20, 21, 22, 23, 24, 25, 26, 27, 28, 29, 32, 37, 39, 40, 41, 42, 43, 44, 45, 51, 52, 53, 54, 55, 56, 57 and elsewhere herein.

As illustrated in a first embodiment, the system provides for collaboration and display among a plurality of users. The system is comprised of mapping logic defining a mapped structure for storing a plurality of separate layers of data in a plurality of data layers. The system also includes storage for storing layer data in selected ones of said plurality of separate data layers, responsive to the mapping logic. The mapping logic associates user image data for each of at least two of the plurality of users for storage as respective said layer data in a respective one of the separate data layers. And the system also includes display definition logic controlling which of the plurality of data layers are utilized in providing a display presentation to at least one of the plurality of users. This aspect of the invention is discussed in further detail with relation to FIGS. 1, 2, 3, 4, 5, 6, 7, 8, 9, 10, 11, 12, 13, 14, 15, 16, 17, 18, 19, 20, 21, 22, 24, 25, 26, 27, 28, 29, 32, 37, 39, 40, 41, 42, 43, 44, 45, 51, 52, 53, 54, 55, 56, 57 herein.

In a second embodiment, a respective user input, provided by each respective user, providing respective user data for the respective user. The respective user data for each respective user is stored within structured storage in a respective associated one respective one of the plurality of separate data layers, responsive to the mapping logic. In a further embodiment, for at least one of the plurality of users, there is associated no structured storage nor association of any user input for that at least one of the plurality of users with any specific one of the plurality of layers of data. In a preferred embodiment, at least one respective one of the plurality of separate data layers is utilized for storing in the storage, the input of user image data for said respective user, responsive to the mapping logic. The display definition logic determines which of the plurality of separate data layers is to be utilized for providing the display presentation.

Display mapping logic determines a hierarchical structuring for utilization within the display presentation of each respective said one of the data layers, placed within the combined display presentation according to the mapping logic, to appear atop one another within the display presentation, with a precedence of display presence, for providing a combined display presentation. The system also comprises display generation logic that is responsive to the display definition logic, the storage, the mapping logic, and the display mapping logic, for providing the combined display presentation comprising the display presentation associated with a first said data layer of the plurality of data layers appearing within the combined display presentation as shown atop of the display presentation associated with at least one other said data layer of the plurality of data layers.

Each of the plurality of users is associated with a respective separate computer of a plurality of computers.

Communications control logic provides communication of changes in storage of respective ones of the data layers. The changes are communicated from each said data layer for each said respective separate computer and is communicated to each and all other ones of the plurality of computers for each of the plurality of users.

Layer control logic selectively enables respective ones of the data layers to be utilized in the providing of the display presentation. The display generation logic is responsive to the display definition logic, the storage, the mapping logic, and the layer control logic, for providing the combined display presentation comprising the display presentation associated with a first said data layer of the plurality of data layers appearing within the combined display presentation as shown atop of the display presentation associated with at least one other said data layer of the plurality of data layers.

Enabling logic selectively enables respective ones of the data layers to be utilized in the providing of the display presentation responsive to a user input. In one embodiment, the enabling logic is comprised of control bits in a table stored within the mapping logic for each of the data layers. The control bits define either selective enablement of each of the respective data layers, as selected to be used in providing of the display presentation, and alternatively the control bits define exclusion of use of the respective data layers to not be used in providing of the display presentation. The display presentation is provided responsive to the enabling logic.

In yet another embodiment, at least one of said plurality of data layers further comprises a base image having an associated display presentation data layer for storing base image data. The mapping logic associates the base image data for storage in the base data layer of the plurality of data layers. The mapping logic and the display definition logic are further responsive to and utilize the base data layer to form an underlying image in the combined display presentation, upon which the display presentation of the respective said data layers are positioned atop of as an underlying display presentation of the base image.

Preferably, the system also comprises communications apparatus providing voice and/or video communications between at least two of the plurality of users.

In a third embodiment, base data for a base image is stored in a base layer of data storage as associatively mapped by respective user to an associated base data layer. For each user of a plurality of users, each user's respective input data is associatively mapped and separately stored into a respective at least one independent associated data layer. Storage is selectively enabled on a data layer by data layer basis to permit usage of selected ones of the data layers, providing control of which users are permitted to do editing, and storing the respective input data for said editing for said users that are permitted to do editing, and storing of the respective layer data therefor, in the respective at least one associated data layer. Furthermore, the system (and method) also generates a display presentation from selected ones of the data layers providing a defined hierarchical display structuring for use of the selected ones of the layers of data atop the image of the base data as shown in the display presentation.

In an alternate preferred embodiment, the user input data representative of editing made by each respective said user is stored in associated respective ones of the data layers, and time-related data representative of an associated time order of entry for each said user input data. This permits the system to selectively utilize the stored layer data in the respective data layers for each user, to selectively create a display presentation of selected users and their annotations, and/or by time order of entry, or otherwise.

In still another embodiment, the display presentation provides a representation of the editing of at least two of the users responsive to the respective said input data as contributed by said at least two users, responsive to the respective ones of the plurality of data layers.

In a preferred alternative embodiment to the third embodiment, the generating a display presentation specifies on a layer by layer basis, which data layers to enable for viewing, and which data layers to disable for viewing. Also the display presentation is responsive to overlaying of data layers hierarchically for prioritized viewability in a combined display presentation responsive to the specifying and to the layers of data.

In one alternate embodiment, a same respective one of the data layers for storing of the input data for at least two of the plurality of users.

In a distributed storage embodiment, storage (within the data layers) is distributed among computing appliances of the users. Copies of layer data for each respective data layers of the plurality of data layers are replicated between the computing appliances and stored as duplicate sets of data layers within a local memory with local data layers contained within the respective computing appliance for each of the computing appliances. There is a synchronization of copying of changes among the respective said duplicate sets of data layers.

Contents in the data layers can be representative of at least one of: text, a vector drawing, images, 3D models, audio, video, data tables, executable programs, links, and documents.

In a further preferred embodiment, a list of data layers is maintained wherein each said data layer in the list is associatively mapped by user, controlling selective editability enablement for controlling storage of input of user data within each respective said data layer, and controlling selective use of each said respective data layer in the generating of the display presentation.

In another one embodiment, voice communications is provided between at least two of the plurality of users.

In accordance with yet still another embodiment, a system provides for support of collaboration with a common display among a plurality of users. Mapping logic defines a mapped structure for storing a plurality of separate layers of data in a plurality of data layers. At least one respective separate layer of data is associated with each respective user for at least two separate individual users. Memory storage provides for storing said plurality of separate layers of data, responsive to the mapping logic. The plurality of separate layers of data is stored responsive to the mapping logic. Each said respective one of the separate layers of data is utilized for storing respective edit data (annotation data representative of annotations as input by the respective user for display) for an associated respective user. The edit data is stored as respective changes to the respective layer data, responsive to the mapping logic. Display definition logic defines which of the plurality of separate layers of data are to be utilized as selected layers of data to be combined for providing of a display presentation. Display generation logic is responsive to the display definition logic, the memory storage, and the mapping logic, for providing a display presentation utilizing the selected layers of data combined for providing the display presentation.

In a further alternate embodiment, the display mapping logic controls use in the display presentation of the data layers as appearing atop one another, with a precedence of display presence (of one data layer relative to another data layer) as defined by the display mapping logic. In one preferred embodiment, at least one of said plurality of data layers is further comprised of a base image data layer for storing base image data for an associated base image display. The display mapping logic associates the base image data for storage in the base layer of data of the plurality of data layers. The display generation logic provides a combined display presentation comprising a display presentation utilizing the edit data for the selected layers of data, as appearing atop a display presentation of the base image display that appears in the combined display presentation.

In yet another preferred embodiment, the display definition logic controls which of the plurality of layers of data are utilized in providing the display presentation.

Preferably, at least one respective separate layer of data is associated with storage of layer data for each of at least two said respective users.

In a synchronizing embodiment, a communications interface provides for communication at intervals, of only the changes to content of the layer data, which is communicated so as to keep all the local copies of all the data layers within each local set of data layers, synchronized with each other and containing the same duplicated storage.

In an edit input-based embodiment, a base layer is mapped in storage to an independent exclusive associated data layer to provide for collaborating and displaying image-based viewing. For each user of a plurality of users, respective user input data for each user's respective input is associatively mapped for storage and separately stored in at least one independent respective associated data layer. Storage is selectively enabled in a plurality of data layers, on a data layer by data layer basis, based upon which of the users are allowed to do editing, and storing edit data for said editing, responsive to a respective user input, in at least one respective associated layer of data for input per respective said user. The edit data representative of the input of editing by each said user is stored in separate respective ones of the data layers as associated with said input of editing for each user, so as to maintain separate storage in respective separate ones of the data layers for the respective said input editing as done by each respective said user. Display control logic defines a hierarchy use of selected ones of the data layers in generating a display presentation representative of the input of editing. The display control logic defines a desired structure for logical overlapping (for each said selected data layer) of the respective display presentation associated with each said data layer of the respective said plurality of data layers. Finally, the display presentation as representative of the editing of the users providing the edit data, is generated responsive to logically overlapping the respective plurality of layers of data in accordance with the defined hierarchy for display presentation.

In an alternate (or additional) preferred embodiment, it is specified by one user (designating for all users or by each user for themselves), selecting on a data layer by data layer basis, which data layers are enabled for use in viewing in the display presentation, and which layers of data are disabled and to not include for viewing in the display presentation. Selected ones of the data layers are logically overlaid atop one another in the display presentation wherein the respective data layers are overlaid hierarchically atop each other for prioritized viewability (relative to each other data layer) in the display presentation responsive to the defining the hierarchical ordering, and to the contents of the selected data layers.

In still another further embodiment, at least two users share usage of a same respective one of the data layers, for storing of edit data for each of the at least two users therein.

Multiple embodiments as described hereinafter, are also illustrated in and described relative to FIGS. 5, 6, 7, 8, 9, 10, 11, 14, 16, 18, 19, 20, 21, 22, 23, 24, 26, 27, 28, 29, 30, 31, 32, 33, 34, 35, 36, 37, 38, 39, 40, 41, 42, 43, 44, 45, 46, 47, 48, 49, 50, 51, 52, 57, 58, 59, 60, 61, 62, 63, 64, 65, 66, 67, 68, 69, 70, and elsewhere herein.

As illustrated, a first embodiment of the system is comprised of a plurality of computing appliances logically structured as a main team of the plurality of computing appliances. At least two of the computing appliances have input apparatus and display apparatus. The computing appliances are shown in and discussed relative to FIGS. 5, 6, 7, 8, 9, 10, 11, 14, 16, 18, 19, 20, 21, 22, 24, 26, 27, 28, 39, 40, 41, 42, 43, 44, 45 and 57.

The main team is comprised of a plurality of sub-teams and each of the sub-teams is comprised of at least one of the plurality of computing appliances.

The system includes control logic providing at least two levels of data communication and display presentation, a first level as between all of the plurality of computing appliances on the team, a second set of levels as between those said computing appliances on each same said sub-team. Each of the computing appliances is associated with a respective on said second set of levels.

In addition, a display presentation apparatus provides a display presentation to each of the computing appliances on the same said team, comprising a display presentation responsive to the respective first level and the respective on of the second set of levels as are associated with the respective computing appliance. The teams are further shown in and discussed relative to FIGS. 52 and 53.

In one embodiment, all of the computing appliances are associated with the first level. The single level is further illustrated in and discussed relative to FIGS. 37, 38, 49, 50. In another embodiment, there are additional levels beyond the first level and the second level. The multiple levels are further shown in and discussed relative to FIGS. 29, 30, 31, 32, 33, 34, 35, 36, 46, 47, 48, 58, 59, 60, 61, 62, 63, 64, 65, 66, 67, 68, 69, 70 and 71.

In an alternative (or additional) embodiment, communications apparatus provides audio communications among all the computing appliances that are associated with the same respective said level (e.g., the same one level of the second levels). [See also FIG. 23.]

In another embodiment, a separate communications channel is associated with each said level, and provides a separate coupling of audio and/or data communications among the respective computing appliances associated with a respective same said level.

"Documents" are created during creative "sessions" of user input. In event processing, events (comprising event content) are created responsive to user input. An event document is defined as a logical grouping of event content for a specified selected set of events. Event storage stores all event content data representative of all changes and all events. The event content data is logically processed and its storage is structured and mapped so as to permit selection of a selected grouping(s) of selected events, and "Assembly" of a respective "View" of a presentation that is generated responsive to the selected events that are processed in a defined order in accordance with the event content data. The event processing is exceptional in permitting the user to customize views of display presentations of any one or more of groupings of events, and can do so on-the-fly.

In a preferred embodiment, event content storage is maintained for all the event content for all stored events. It can also be backed up for extra security. In the preferred embodiment, the event content is not deleted (such as from being a "delete" part of an edit process). This event storage of all event content for all stored events can be utilized to enable custom specified documents to be assembled for viewing from the stored events. A presentation is generated responsive to the selected events that are processed in a defined order in accordance with the event content data.

An event document is defined as a logical grouping of event content for a specified selected set of events. In the preferred embodiment, an event document retains a full history of all changes made to that said event document.

Non-event documents can contain some history of changes made [such as by various authors (record/accept changes in office documents)] but a full history of changes is not stored. The criteria for viewing these changes in non-event documents is—all or nothing. In non-event documents you cannot just select to view up to a certain date or select to view just one author (without modifying the document). The non-event document is stored in versions, each at a respective specific time, so that multiple versions of a document are kept in order to preserve historical information. It is difficult to merge edits from multiple authors working on a copy of a normal document into a single document.

Event processing and event documents change and improve upon fundamental components/elements and process steps utilized to create and edit a document.

In the case of a textual document, a non-event document editing system uses an alphanumeric character as its main fundamental element or atom. In the case of a movie or audio editor for a non-event document, the media clip or a frame is used as its main fundamental element.

An event document editing system uses an event (described in more detail later herein) as its fundamental element in its event document. This difference in the fundamental element and its utilization provide many benefits in using an event document editing system.

The benefits of event document architecture, systems and methods, enable an ability to collaborate between authors and also enable an ability to selectively view some, any, or all of the history of the creation of the document.

Since, grouping for viewing of events provides that events can be excluded (and/or selected) by author, time and other criteria. Thus, each user/author can select and have their own custom presentation of the document, or multiple presentation views of the document, wherein the presentation views can be selected by event, or by user, or by date, etc., or by multiple criteria. These selected viewing options enable each user (one, some, all) to individually select (for themselves and/or others), as to what presentation view is displayed. For example, in one viewing, a user can choose to exclude some or all other users' annotations, and for another viewing can choose to include some or all other authors' annotations, and/or choose selective viewing of a presentation at different stages of development from the start to a particular time [and/or based on selection of events]. Note that selection of events can be non-linear, and is not restricted to require including of all events within a continuous time interval. And, the start doesn't have to be limited to when the document was first created. The user of an event document can even view a version of presentation that no one has every seen before (such as by selecting a certain combination of the events)! This provides great flexibility and functionality of collaboration, not otherwise available. In this regard, event processing and event documents can alternatively or additionally be utilized on the Cloud, with cloud-based services.

The following discussion illustrates a preferred embodiment of event processing and event document storage, and mapping utilization.

An event document has sub-component parts ("events") that are structured as an ordered-linear series of events. The ordering is based on when (e.g., relative to other events, and/or time-based, etc.) the respective events are added to the series. A selected event document is viewed by assembling the event contents for a selected set of events into presentation data that is utilized to display a presentation for viewing by a user. This presentation data can also be exported (e.g., as a saved file) to a non-event document. Thus, the document can be viewed at any point in it's development by assembling event content for events for a selected set of events, such as for a series of events over time, starting at any time (starting from event content for a respective annotation input for any selected event), or for a selected plurality of the events irrespective of their order of entry.

Just as important, a version of the document can be created/selected and viewed as if certain events had never occurred, by selecting which events to include and which events to exclude, based on information stored in the events.

Events are normally never deleted from event storage, nor are they changed. The exception is when it is desired to eliminate all history of the events in creating a document. In this case, when an event is deleted or modified, a new event document is created. A new event document can be created from a particular set of events in an existing event document However, when desired to eliminate history, then, once a new set events is selected, then some or all the structured data storage logic and history stored in the series of events is purposely lost. This may at times be useful and desirable, such as when the history of the document should not be shared with someone (such as for security reasons), or when exporting the event document to other non-event document formats (e.g., flattened (such as to a WORD DOCUMENT, POWERPOINT, EXCEL, PHOTOSHOP, audio (MP3, WAV, AIF), video (FINAL CUT PRO, PREMIERE), or other formats)).

In a preferred embodiment, an event is comprised of three items (event context, event reference, event change data). The event context is comprised at least of an event ID which allows other events to refer to this specific event. This event ID can be implemented in many different forms. It may also provide information regarding the order that the events are added to the construction of a document. In an alternate preferred embodiment, where the event ID does not provide this information, then another component of the event context provides this information.

Most documents require an index of the events such as with an order of entry, to properly assemble a presentation of the document. Time is an example of a component for the event context that can provide information to determine the order that events were added to the document. The author who created the event is also an important piece of event information that can optionally be included. This allows an event to be included/excluded based on its author. Other, components that can be part of the event context are: physical location, system identification, company, mailing address, login ID, phone number, user rights, user contact information, etc. There is no limit to the types of and amount of information that can be included in the event context.

The event reference refers to a particular event (e.g., via event ID). Alternatively, it can also refer to a location in the assembled presentation of the document. In one embodiment, the location in the assembled presentation is limited to "beginning" and "end". Alternatively, the location can refer to an offset in the assembled document. The offset and it use depends on the type of document. At least one of the location references must be allowed, e.g., one of "beginning", "end", "offset". This is required in order to add the first event to the document, which cannot refer to another event.

The event change data is the last part of the event. The change data can be an "add" type or "modify" type. The modify change data provides information on how to modify the part of the presentation created by the event that is referred to by the event reference. At minimum, the modify change data must include a "hide" operation. This allows previously added information in the presentation to be eliminated from the presentation for a new selected set of events (approximately equivalent to a traditional "delete"). However, many other operations are possible. For example, for textual documents, these operations comprise font changes, font colors, other formatting, etc. For movie, video, still image, and audio documents, these operations comprise applying various filters, applying transitions, changing brightness, adjusting contrast, controlling audio features, such as loudness, clip in time mark and clip out time mark, length, etc.

The add change data provides information on how to add information to the assembled presentation. For a textual document, the change data can specify to add a series of characters, or can provide a formatting command. A formatting command changes the way that characters following it are rendered in the presentation. A formatting command can be stand-alone or linked. One example of a linked command is where a command comes in pairs, with a start command applied subsequent to its position, and end command, where the effect of the start command is the assembly of the presentation and continues until it is removed when the end command occurs in the process/flow of the assembly of the presentation. Another example of such formatting commands are HTML tags.

These formatting tags are an alternative way of modifying events rather than using a modify change data command structure as discussed above. And, both can be used together or alternatively. A formatting command affects everything after it (after it—within the assembly process conversion into presentation data) in a presentation, whereas the modify change data command only affects a single event. A formatting command for a movie or audio document can define a beginning and end of a scene or track, provide header information describing the track, and many other functions. Movie and audio "add change data" can add media files such as video clips, audio clips, images, animations, etc., to a presentation.

However, all of these relationship commands can be used which can be beneficial. For example, consider where only one event has been selected for the presentation but there are other events in the currently viewed event document. If the user wants to add something after the displayed event, then it is beneficial to "insert after" the event rather than "end" (because . . . ). Likewise, if the user adds something before the event, then it is beneficial to "insert before" the event rather than "beginning". Then, when other events are selected for the presentation the added events above will be included near the originally displayed event and not toward the beginning and end of the document.

This is in addition to the formatting of items in the display presentation that are generated responsive to the events. The format of characters in the displayed presentation can also be modified responsive to the Event Context which can be stored within the event content in the Event Storage in the events. For example, events created by different authors can be displayed in different colors so their respective contributions can be easily seen by any viewer of the document. As another example, it can be selected that hidden characters will not be displayed in a respective presentation, or will be displayed but shown with a line stricken through them.

In some situations, event processing can result in creation of orphan events and dangling events when selecting only some of the entire series of events in a specified respective document. A dangling event occurs when an event has been selected but it references an unselected event. Additionally, if a selected event references a dangling event (directly or through other unselected events) then it is a dangling event. An orphan event occurs when a selected event has no reference to any other selected event, direct or indirect. These events can be selected to be shown, or not shown, in the presentation depending on how the presentation is assembled.

The add change data for a respective event must also define a relationship, defining where to add the information to, in the presentation, relative to the part of the presentation created by the event that is referred to by the event reference. A least one relationship must be defined, but multiple relationships can also be utilized. For example, an "edit reference location of" "beginning" (see above) and a relationship of "insert after" will allow an event to be placed anywhere in the assembly of a document. Likewise, the relationships of "end" and "insert before" also allow an event to be placed anywhere in the assembly of the document. However, all of these relationship commands can be used which can be beneficial. For example, consider where only one event has been selected for the presentation but there are other events in the currently viewed event document. If the user wants to add something after the displayed event, then it is beneficial to "insert after" the event rather than "end" (because . . . ). Likewise, if the user adds something before the event, then it is beneficial to "insert before" the event rather than "beginning" (because . . . ). Then, when other events are selected for the presentation the added events above will be included near the originally displayed event and not toward the beginning and end of the document. There are different add and change data commands, different depending on the document type, etc.

Event Content for Events are stored in Event Storage. An Event Selector provides Selection of a set of Events (a defined grouping) from the Event Storage. A Presentation Processor assembles the Selected Events into Presentation data. The Presentation Data generates a presentation that is displayed to the user that has been selected to see the respective document for the defined grouping. When a user inputs annotations to make changes that are made relative to a then current display presentation of a then selected document, these changes are converted to new Events (by one of many alternative ways), which are stored in the Event Storage for the respective document.

A key benefit of event processing is in versatility in specifying and assembling a presentation. To define a "document", events are selected based on a criteria (or multiple criteria) that defines a respective presentation. Virtually any criteria can be used, and some of which have been discussed elsewhere herein. A set of events defines a document. If all events as entered are in a document, then a selected grouping of events in a document represents a selected set document for viewing presentation. The event context provides criteria to permit selection of events for inclusion in a set such as based on who entered them, when entered, time, etc. It is critical to the selection of the events to create various views of respective ones of various documents, with selection based upon use of components to the event context that provide information that can be utilized for selecting events based on system and user criteria.

The presentation processor starts with a selected event (relative to other selected events) that was added first to the event storage. The event presentation processor applies change data for each selected event to generate respective presentation data and then searches for other events that reference each said selected event with modify change data. Those modifying referencing events that are also selected are applied in the relative order that they were added to event storage. Then the event presentation processor searches for events that reference said event with "add change data". Those events are again processed, recursively.

This is in addition to the formatting of items in the display presentation that are generated responsive to the events. The format of characters in the displayed presentation can also be modified responsive to the Event Context (which can be stored within the event content in the Event Storage in the events. For example, events created by different authors can be displayed in different colors so their respective contributions can be easily seen by any viewer of the document. As another example, it can be selected that hidden characters will not be displayed in a respective presentation, or will be displayed but shown with a line stricken through them.

In some situations, event processing can result in creation of orphan events and dangling events when selecting only some of the entire series of events in a specified respective document. A dangling event occurs when an event has been selected but it references an unselected event. Additionally, if a selected event references a dangling event (directly or through other unselected events) then it is a dangling event. An orphan event occurs when a selected event has no reference to any other selected event, direct or indirect. These events can be selected to be shown, or not shown, in the presentation depending on how the presentation is assembled. Various means can be used to indicate the beginning and end of a dangling phrase, a series of connected dangling events, or orphan phrase, a series of connected orphan events. In a text document, an ellipsis, " . . . ", can precede and follow the dangling phase or orphan phrase. In a video, a short clip can be inserted before and after indicating the beginning and end of the dangling phase or orphan phrase. In audio, a tone or voice message can be inserted before and after.

The display of the presentation can take many forms. As described, it provides many options for the user display, such as to distinguish between the authors of the events, obtain the information about the event at a position in the display, show or hide orphaned and dangling events, etc. However, in all cases, the generation of the display presentation provides the ability to change the view (the presentation display of selected events), by changing the criteria used to select the events.

Referring to the table (10011) "Examples" 1 to 5 as contained hereinafter, there are illustrated five examples of paired tables, which illustrate event entry, event storage, event processing, and display presentation, corresponding to five example situations. The tables on the left show the events in the entry of order, starting from the top of each table, going down to the bottom, for events 1 to 5 (1, 2, 3, 4, 5) in each of the tables on the left, showing the five entered events as entered in event storage. Tables 3, 4, and 5 also include the control logic data table for presentation data assembly, including selection logic selections for a set for a document for events 1 to 5.

Thus, in Example 3, events 1, 3, 4, and 5 are selected as the set of events in the grouping for the document version of Example 3, for events 1 to 5. In Example 4, only events 1, 3, and 4 are selected as the select grouping in the defined document.

And, in Example 5, only events 3 and 4 are in the selected set of selected events in the grouping for presentation.

In Example 1, the letter "A" is entered, then the letter "B" is entered, then the letter "C" is entered (each entered in order), followed by the letter "D", followed by a command at Event 5, fifth in the sequence ordering of the events, specifying the operation to hide the fourth event of the letter "D". Since each event is entered sequentially, inserting after the previous event, the display presentation processing proceeds accordingly (sequentially), and the processing steps and presentation view are shown in the table on the right of the table of Example 1 (and similarly for each of the examples).

For example, in Example 1, the table on the right shows the events applied in the order (from the first column according to the operation in the second column. the table on the right, the second table, shows the "event applied" in the left column, and the resulting display presentation view as shown in the right column. Thus, in the table on the right in Example 1, event 1 is applied (as shown in the left column) and a display presentation is generated of the view of the letter "A" (in the right column). At the next processing state event 2 is applied and the view is "AB". Next, event 3 is applied generating an insert "C" after event-ID 2 generating a display of "ABC". Next, event-ID 4 is applied to insert "D" after event-ID 3, generating a display presentation of "ABCD". Finally, event-ID 5 is applied in the presentation processing, to generate a :hide the event-ID 4" operation (event-ID 4 was for inserting "D"), and generates a display presentation view as shown in the right column of the table on the right of Example 1?? of either "ABC" "D" with a strikethrough "D" or shown as "ABC", depending on whether it is desired to show a redlined version indicating what has been hidden, or to instead show the final clean version.

Referring to Example 2, in the table on the left, the events are shown as entered in the order 1, 2, 3, 4, 5, with first inserting "A", then inserting "D" after event-ID 1, then event-ID 3 insert "C" after event-ID 1, event-ID 4 inserts "B" after event-ID 1, and event 5 hides event-ID 2 which inserts the "D" after event-ID 1. In the table at the right of Example 2, the events are applied in the order indicated 1, 2, 5, 3, 4, which is determined by the event content as stored in event storage.

As shown in the right hand table of Example 2, event 1 is first applied to display the "A". Next, event-ID 2 is applied to show insert "D" after event-ID 1, which creates a display of view of "AD" in the second column of the table on the right. The next row of the table in Example 2 shows that event-ID 5 is processed by the presentation processor which causes to hide event-ID 2 which causes the display generation of "A" with a "D" with a strikethrough the "D", or solely shows the letter "A". At the next row in the table, it shows the next event-ID that is applied is event-ID 3, which provides an operation that inserts "C" after event-ID 1, which generates presentation data for a display of a view of "AC" plus "D" with a strikethrough it, or of only "AC". Finally, the next row of the table shows that event-ID 4 is applied next, which results in an operation of inserting "B" after event-ID 1, and thereby generating a presentation view of "ABC" plus "D" (with a strikethrough) or of only "ABC".

Examples 3 and 4 illustrate two ways of dealing with dangling events. As described above, a dangling event occurs when an event has been selected but refers to an unselected event. Alternatively, if an unselected event references a selected event, it may or may not result in creating a dangling event, depending on what else references it. Example 3 illustrates a case where it has been selected to ignore the dangling events in the display presentation. As illustrated in Example 3, in the table on the left, the events occur in order of event-ID 1, event-ID 2, event-ID 3, event-ID 4, event-ID 5. Event-ID 1 is to insert "A" after beginning, and it is selected. Event-ID 2 is not selected, and is to insert a "B" after event-ID 1. Event-IDs 3, 4, and 5 are selected. Event-ID 3 is to insert "C" after event-ID 2. However, event-ID 2 is not selected, and therefore, it is a dangling event. Similarly, event-ID 4 is to insert "D" after event-ID 3, but since event-ID 3 is a dangling event, then any event referencing a dangling event becomes a dangling event as well. Thus, event-IDs 3, 4, and 5 are dangling events. In the table on the right of Example 3, only event-ID 1 is applied, to generate a display of "A". The dangling events 3, 4, and 5 are not illustrated and not shown in the presentation view of the table on the right.

Example 4 shows another way to treat dangling events, this time by including the dangling events in the generated presentation for display to the user. Thus, the table on the left of Example 4 has the same events as the table on the left for Example 3. However, in Example 4, events 1, 3, and 4 are selected as events (as compared to events 1, 3, 4, and 5, as selected events for Example 3. In this case, event-ID 3, and event-ID 4 are dangling events. Event-ID 5 is not a dangling event because it is not selected. The right table of example 4 in the first row shows event-ID 1 applied to generate a display view of "A". Next, event-ID 3 is selected and is applied that is a dangling event to insert "C" after event-ID 2. As illustrated in Example 4, the table on the right, the display shows a "A . . . C", the " . . . " illustrating that the presentation view shows the user that there is one or more dangling event or events that are not shown to the user in this presentation display. Similarly, in the next row of the table of Example 4, event-ID 4 is applied to the presentation processing, to insert "D" after event-ID 3. Since event-IDs 3 and 4 are dangling, the display again shows that "A . . . CD" as the view for the presentation, with the " . . . " used in the presentation display to illustrate to the user that there is a dangling event occurring after event-ID 1 (after the letter "A").

Example 5 illustrates a treatment of including orphan events in a display presentation. As described above, orphan events occur when a selected event has no reference to any other selected event, directly or indirectly. Directly referencing an event is when the event references another event that is selected. Indirectly referencing an event is when the selected event references another event that is not selected but the unselected event references a selected event directly or indirectly, i.e., there may be a chain of referenced unselected events before the last referenced unselected event references a selected event.

As illustrated Example 5, the table at the left shows the order of entry of events 1, 2, 3, 4, and 5, in that order. The event content, including the event-ID and operation information data is stored in event storage. The selection logic provides which events are selected in the defined group for the selected set to be provided in the presentation view. The event 1 is to insert "A" after the beginning, event-ID 2 is to insert "D" after event-ID 1. However, neither event-ID 1 or event 2 is selected. Event 3 is to insert "C" after event-ID 1, and event-ID 4 is to insert "B" after event-ID 1, and both event-IDs 3 and 4 are selected. Event-ID 5 is to hide event-ID 2, but neither event-ID 2 nor event-ID 5 are selected. The result of this is that the selected events 3 and 4 generate an orphan event condition. The processing of event 3 and event 4 to insert characters after event 1 (which is not selected), results in generating an orphan event.

Furthermore, event-ID 4 to insert "B" after event-ID 1 also creates an orphan event. The display presentation on the table at the right of Example 5, shows the processing of event 3 and event 4 resulting in generating a presentation wherein event-ID 3 is applied first to generate a presentation, " . . . C", the ellipsis added at the beginning to let the user know it follows unspecified text. Then event-ID 4 is then processed by the presentation processor to generate a presentation, " . . . BC". There is not a need to have an ellipsis between B and C since they follow the same event and would be shown together if event-ID 1 was selected.

Example 1—Entering ABC in Order

| Event | Operation | Events Applied | View |
|---|---|---|---|
| 1 | Insert A after beginning | 1 | A |
| 2 | Insert B after 1 | 2 | AB |
| 3 | Insert C after 2 | 3 | ABC |
| 4 | Insert D after 3 | 4 | ABCD |
| 5 | Hide 4 | 5 | ABCD or ABC |

Example 2—Entering ABC Randomly

| Event | Operation | Events Applied | View |
|---|---|---|---|
| 1 | Insert A after beginning | 1 | A |
| 2 | Insert D after 1 | 2 | AD |
| 3 | Insert C after 1 | 5 | AD or A |
| 4 | Insert B after 1 | 3 | ACD or AC |
| 5 | Hide 2 | 4 | ABCD or ABC |

Example 3—Ignoring Dangling Events

| Event | Selected | Operation | Events Applied | View |
|---|---|---|---|---|
| 1 | X | Insert A after beginning | 1 | A |
| 2 |   | Insert B after 1 |   |   |
| 3 | X | Insert C after 2 |   |   |
| 4 | X | Insert D after 3 |   |   |
| 5 | X | Hide 4 |   |   |

Example 4—Including Dangling Events

| Event | Selected | Operation | Events Applied | View |
|---|---|---|---|---|
| 1 | X | Insert A after beginning | 1 | A |
| 2 |   | Insert B after 1 | 3(dangling) | A . . . C |
| 3 | X | Insert C after 2 | 4 | A . . . CD |
| 4 | X | Insert D after 3 |   |   |
| 5 |   | Hide 4 |   |   |

Example 5—Including Orphan Events

| Event | Selected | Operation | Events Applied | View |
|---|---|---|---|---|
| 1 |   | Insert A after beginning | 3 | . . . C |
| 2 |   | Insert D after 1 | 4 (orphan) | . . . BC |
| 3 | X | Insert C after 1 |   |   |
| 4 | X | Insert B after 1 |   |   |
| 5 |   | Hide 2 |   |   |

A plurality of computing appliances, each for use by each of a respective user of a plurality of users, provide for collaboration on a common project having an associated base image display. Layer storage, comprising a plurality of separate respective data layers of storage, stores data in each said separate respective data layer, providing associatively mapped storage of respective user data associated with a respective display for a respective user of the plurality of users. Each said data layer of storage stores respective user data that is representative of a respective display of annotations responsive to a user input by the respective user. The user data is comprised of event content data for respective events that are generated in a defined order of entry relative to other of the events, responsive to the input by the respective user. The event content data is comprised of change reference data, and change content data, wherein the event content data is representative of a unique event, for each input by the respective user. Mapping logic defines a mapping of the event content to a corresponding respective said data layer associatively mapped for the respective user associated with the respective said event.

View control logic selects a plurality of the events as a selected set of events for viewing. Presentation assembly logic, selectively retrieves respective said event content data for said events in the selected set, from respective said data layers, responsive to the mapping logic, and generates presentation data responsive to processing the event content data for said events in the selected set, in a respective defined order of entry relative to other of the events relative to all other of the events in the selected set; and display apparatus providing a presentation responsive to the presentation data.

In a preferred embodiment, the presentation shows the collaboration of the respective ones of the users for the selected set.

In one embodiment, the defined order of entry is determined responsive to at least one of: listing of respective ones of the events in a table responsive to choice by one of the users; listing of respective ones of the events in a table generated automatically by the system; according to a set of default criteria; and analyzing of the event content data for the events in the selected set.

The event content data can be further comprised of event-ID data, which defines the relative order of entry of the respective event to other ones of the events.

The presentation assembly logic can be further comprised of: layer selection logic, responsive to the mapping logic, providing a respective output of said separate respective data layer for each of the respective one of at least two of the users, for each of the events in the selected set; and display generation logic providing generation of the presentation data for the presentation utilizing the event content for selected events from respective storage in respective said selected layers responsive to the layer selection logic, responsive to the respective output.

In another embodiment, the respective computing appliance for each respective user is comprised of local view control logic providing selection of respective selected ones of the events as a local selected set of events, and the display generation at each said respective computing appliance can then be responsive to the event content associated with the local selected set of events.

The local view control logic is responsive to selection by a respective local user as a means to control selection of certain selected ones of said events for use in the generating of presentation data.

Edit control logic, is responsive to the user input, to generate events comprised of the event content data comprising an event-ID, change reference data, and change data. The defined order is determined by the presentation assembly logic responsive to respective said change reference data and respective said event-ID.

The event-ID can be determined by at least one of: (a) a reference to a table; and (b) a relative location to other related event content data.

The layer storage is further comprised of a base layer of storage storing base image data representative of a respective base image display. The display control logic provides selection of the base layer and at least one of the plurality of data layers as a selected data layer that provides respective said event content for the selected events, to be utilized in the display generation, responsive to the mapping logic.

In a multiuser embodiment, each of a plurality of computing appliances is associated with a respective one user of the plurality of users. Each of the plurality of computing appliances is further comprised of local layer storage of data layers. Changes to the respective user data for at least one user is stored in respective associated said local layer storage of each of at least two of the plurality of computing appliances. Changes to the respective user data are communicated between each of at least two of the plurality of computing appliances, to provide updating, so that the respective said local layer storage of each one of the at least two of the plurality of computing appliances is updated to contain a same stored data content comprised at least in part of the changes.

The updating is done repetitively, to keep the systems synchronized so that the users can be working with the same data and the same presentation.

In a central server embodiment, the layer storage can be comprised of sets of data layers stored in a centralized layer storage that is duplicated so that the same sets of data layers that are stored in a centralized layer storage are also stored in a plurality of local data layers of storage in each of the plurality of computing appliances. Each of the plurality of computing appliances is associated with a respective one of the plurality of users. Furthermore. each of the plurality of computing appliances is associated with a respective data layer in said respective local layers of storage in each of said respective plurality of computing appliances. Changes to the user data in any of the sets of local data layers are communicated to all other ones of the sets of local data layers. The storage of the event content data is synchronized and updated repetitively as between each of the centralized layer storage and the local layer storage for each of the respective plurality of local layer storage.

In a dual mode embodiment, voice communication apparatus provides voice communication between each of at least two of the plurality of users, concurrently while the same two users are collaborating and/or editing, and viewing the respective display presentations by each of the respective users.

In another embodiment, the layer storage is comprised of local layer storage within at least two of the plurality of computing appliances. The respective user data for respective annotations as input by each said respective user is first stored locally within an associated local layer of said local layer storage, as change user data (or change data) that is associated with the respective user of the respective input. Thus, the user data as input by each respective user is initially stored locally in local layer storage in that user's respective computing subsytem, for each of the at least two users, and thereafter the layer storage of each of the at least two of the plurality of computing appliances, and the layer storage of the server, where present, are then synchronized and updated periodically.

Update logic provides copying of the changed user data from a respective local layer of storage in at least two of the plurality of computing appliances by communicating the changed user data from each said local layer for storage in the local layer storage of the one of the plurality of computing appliances to at least one other one of the plurality of computing appliances for storage in the respective corresponding said local layers in the local layer storage therein.

The update logic provides for copying the changed user data from a first said respective one of the computing appliances to a selected one or more (up to all other ones) of the other ones of the plurality of computing appliances.

In a fully distributed embodiment, a plurality of local layers in a plurality of separate user's computing appliances (subsystems) each have user data stored therein (such as of changes, annotations, etc.), and the update logic provides copying of any changed user data from the respective layers of any one of the computing appliances to all of the other ones of the plurality of computing appliances.

In a distributed system with central server embodiment, the layer storage is further comprised of central (e.g., centralized server) layer storage providing central server storage of all the local data layers for all of the users, so as to keep a master updated database, which is then communicated to the one or more of the users computer subsystems during synchronization and updating.

In accordance with a multi-user embodiment, a plurality of computing appliances, each for use by a respective user of a plurality of users, are utilized in working on a common project having an associated base image display, and provide associatively mapped storage in a respective data layer, within layer storage comprising a plurality of separate respective data layers of storage of respective user data associated with a respective display of respective user data that is associated with input by a specific respective user of the plurality of users in a defined order relative to other of the events. Each said data layer of storage stores respective user data that is representative of a respective display of annotations as input by a respective said user; wherein the user data is comprised of event content data for respective events generated responsive to the input by the respective said user. The event content data is comprised of respective change reference data, and respective change content data, representative of a respective event, for each input by the respective user.

A plurality of the events are selected as a selected set of events, and the event content for the events in the selected set is processed in a respective order relative to the defined order of the events in the selected set, to generate the presentation data. The presentation data is generated by processing the events for display generation pursuant to logic defined responsive to the event content data; and utilizing respective said event content data for selected ones respective said data layers, to provide the user data for generation of respective said presentation data for a combined display presentation for each respective one of at least two of the users. The combined display presentation is provided responsive to the respective said presentation data for the selected set of events.

In a preferred embodiment, the combined display presentation shows the collaboration of the respective ones of the users, to one or more than one of the users. The combined display presentation is updated periodically. The local display presentations can show the combined collaboration display presentation during and between updating, or it can show new inputs by its respective user as overlays atop the then being shown display presentation for each user based upon its local layer storage (which of course has all data needed for that user even before synchronizing, making it possible to show new inputs by its respective user as overlays atop the then being shown display presentation for each user based upon its local layer storage).

In one embodiment, the respective order of processing is determined responsive to at least one of: listing of respective ones of the events in a table responsive to choice by one of the users; listing of respective ones of the events in a table generated automatically by the system, according to a set of default criteria, and, analysis of the event content data for the events in the selected set.

The display generation of a local display presentation for each user can be locally or centrally controlled. If locally controlled, it can separately provide selective inclusion of the new edit event data usage from the local layer storage to provide the display generation.

Selection of associated selected ones of the events can be provided responsive to automated criteria based selection, and/or based upon a selection made by one, or more, of the respective users. As discussed elsewhere herein, providing the display generation is responsive to the event content for the associated selected ones of the events.

Voice communication can be provided between each of at least two of the plurality of users, during the respective display presentation to the respective users.

Systems and methods are taught herein providing collaborating among a plurality of users each user at a respective associated one of a plurality of computing appliances, providing storage in a respective one of a plurality of data layers within a memory, of respective user data, and provided responsive to a respective input by a respective user, wherein the event content is stored in a respective one of the data layers that is associatively mapped to the respective user providing the respective said input of the event content. The user data, comprised of event content data for respective events, is generated responsive to the input by the respective user. The event content data is comprised of change reference data, and change content data, representative of an event, for each input by the respective user. Selection of a plurality of the events as a selected set of events is provided. A mapping of the event content to the respective data layer is associatively mapped for the respective user associated with the respective said event; processing the event content for the events in the selected set in a defined order, and as defined by the mapping is stored in at least two of the data layers, to generate presentation data. A local display presentation is provided at each of at least two of the plurality of computing appliances responsive to the presentation data for the respective said selected set of events.

A system and methodology provide event processing responsive to users input, to provide a display to the users. Event storage, stores event content for a plurality of events. The event content is comprised of an edit event reference identifying a position relative to another event, and change data. The events are entered in an entry order of input. The events in the selected set can comprise less than all the events between a first event and a last event within an ordering of the entry order of input. Selection means select a plurality of the events as a selected set of events; a presentation processor for assembling the events in a defined order within the selected set of events, utilizing respective change data for each respective said event responsive to a respective edit event reference for each respective said event, to generate a presentation output comprising corresponding presentation data. The presentation data is structured in a format for all the events in the selected set of events, responsive to the respective change data and the respective edit event references. A display apparatus provides a presentation responsive to the presentation data.

The event content is further comprised of a respective event-ID for each respective said event and the presentation data is structured in said format further responsive to the respective event-ID for each respective said event in the selected set of events.

Each respective said event-ID uniquely identifies a respective said event that has corresponding respective said change data associatively mapped thereto. The edit event reference of each said event identifies one of: another one of the events, and a specified position relative to the ordered format of the presentation data.

A plurality of said events are stored in the event storage. Each said event of the plurality of events is entered in a relative order to entry of other ones of the events. Each said event is associated with a respective said event-ID. Certain of the events are entered previous to other of the events. The edit event reference of each respective said event identifies an event-ID associated with at least one previously entered said event.

A plurality of said events are stored in the event storage. Each said event of the plurality of events is entered in a relative order, relative to entry of other ones of the events, wherein certain of the events are entered previous to other of the events. The edit event reference of each respective said event identifies at least one of: a previously entered said event, and a placeholder for a future input of an event with defined parameters.

A user input apparatus, provides a user output responsive to a user input of annotations made relative to the presentation. An event processor, provides an output of at least one additional event responsive to the user input of annotations. Each said additional event is comprised of respective said event content comprised of respective said change data and a respective said edit event reference, representative of each respective said event. The event content, representative of said additional event, is stored in the event storage. The selection means selects a different plurality of the events as a different selected set of events. The presentation processor assembles, in a defined order, the events within the different selected set of events, utilizing respective said change data for each respective said event responsive to respective said edit event reference for each respective said event, to generate a revised said presentation output comprising revised said corresponding revised presentation data. The display generation logic is responsive to the revised presentation data to generate a revised display output. The display apparatus provides a revised presentation responsive to the revised display output.

The selection means selects a plurality of the events, including the additional said event, as a new selected set of events. The presentation processor is responsive to the new selected set of events to generate a new output of corresponding said presentation data. The display apparatus provides a modified presentation responsive to the modified presentation data.

A user input apparatus, provides a user output responsive to a user input of annotations made relative to the presentation; an event processor, providing an output of events responsive to the user input. An additional said event is generated responsive to said user input. The event content for said additional said event is stored in the event storage. The selection means selects a new plurality of the events, including the additional said event, as a new selected set of events. The presentation processor is responsive to the new selected set of events and the event storage, to generate an output of new presentation data. The system further comprises display logic responsive to the new presentation data to generate a new display output. The display apparatus provides a new presentation responsive to the new display output.

In accordance with one embodiment, the presentation data is formatted so as to contain no event-IDs therein, to generate formatted presentation data. Edit logic generates a difference annotation responsive to the user input and the formatted presentation data, to generate a respective said event.

Alternatively, the edit logic generates a difference annotation responsive to the user input and the presentation data, to generate a respective said event.

In one embodiment, the presentation data is formatted into a specific data format containing no event-IDs therein, to generate formatted presentation data.

The specific data format can be any one or more of: MICROSOFT WORD, MICROSOFT EXCEL, MICROSOFT POWERPOINT, WORD PERFECT, ADOBE ILLUSTRATOR, ADOBE IN-DESIGN, HTML, BLENDER, WINDOWS MOVIE MAKER, ADOBE PREMIERE, FINAL CUT PRO, AUDACITY, CAKE WALK, AVID PRO TOOLS, AND PINNACLE STUDIO.

The display generation logic, is responsive to the formatted presentation data, to generate a display output, and the display apparatus provides a corresponding presentation responsive to the display output.

In another embodiment, an edit processor generates revised presentation data responsive to said presentation data and a user input. The display apparatus provides a revised presentation responsive to the revised presentation data. An event generator is responsive to the revised presentation data and the presentation data, to generate the event content for a corresponding said event. responsive to the revised presentation data. A comparison subsystem generates difference annotations responsive to the revised presentation data and the formatted presentation data. An event generator is responsive to the difference annotations and the presentation data to generate corresponding events with respective associated event content for storage in the event storage.

In a preferred embodiment, the selected set of the events is not dependent on any defined order of entry of the events.

In the system, each computer subsystem provides a user input apparatus, providing a user output responsive to a user input of annotations made relative to the presentation. An event processor, provides an output of events responsive to the user input. The user input apparatus, the event processor, and the display apparatus comprise a user interface subsystem. The system is further comprised of: a plurality of the user interface subsystems, each for use by a respective user of a plurality of users; wherein each of the user interface subsystems provides an output of its own respective local event content; wherein the event storage stores respective said local event content that is associatively mapped to the respective said user interface subsystem from which it was output; and wherein the display apparatus of each of said user interface subsystems provides a respective local said presentation.

The selection means selects, for each of the user interface subsystems, from one to a plurality of said events as a respective local selected set of events for its respective said user interface subsystem. The presentation processor and the display generation logic are responsive to the selection means and the event storage, to generate a separate said display output comprised of a local display output for each respective said user interface subsystems. The display apparatus at each of the user interface subsystems provides a respective local said presentation responsive to a respective said local display output.

A system method of processing user interaction are taught.

A base presentation display is provided of a document. An Edit Event is generated (such as responsive to a user input), representative of a defined edit made relative to the presentation of the document at a respective defined location relative to the presentation of the document, responsive to a user input. Event content data for each said Edit Event is stored in the event storage for each of a plurality of Edit Events, wherein the Edit Events are entered in a specific order of entry, wherein the grouping of Edit Events is not dependent of any order of entry of the Edit Events. A grouping of at least one said Edit Event is selected to create a selected set of Edit Events comprising a selected combined group. A modified presentation is provided of respective defined edits of the Edit Events in the selected set, overlaid atop the presentation of the document, responsive to the event storage and the selected combined group, responsive to the Edit Events in the selected combined group.

The selected combined group can comprise any of the Edit Events from the storage.

The events are entered in an entry order of input, identifying a position relative to another event. The selection of the events in the selected set can comprise less than all the events between a first event and a last event within an ordering of the entry order of input.

Additional user Edit Events are provided responsive to additional user input, defining further changes made relative to the modified display presentation. Said additional user Edit Events are stored in the event storage.

In one embodiment, there are a plurality of selected combined groups, where each said selected combined group defines a respective different combined view of a respective said modified display.

In accordance with another aspect of the present invention, there can also be a subsequent selection of another selected grouping of events, and the corresponding providing of another said presentation responsive to the another selected grouping of events and to the event storage.

Additional user Edit Events are generated responsive to additional user input defining further changes made relative to the modified display presentation. Said additional user Edit Events re stored in the event storage. Another selected grouping of Edit Events can be selected to define a new selected set of events. And, another said presentation is then provided responsive to the another selected grouping of events and the event storage.

In a preferred embodiment, the Edit Events are not deleted from the event storage during the processing of the user interaction. Thus, unlike in other editing solutions (such as WORD, ADOBE PHOTO SHOP, ADOBE PREMIERE, APPLE FINAL CUT PRO, etc.) which can delete entries by users subsequent to input entry, in accordance with one aspect of the present invention, there is no deleting or erasing of the entered input. This provides many options and benefits.

There can be a plurality of separate selected combined groups, wherein each said selected combined group is associated with a respective combined view for the selected combined group, corresponding to a respective said modified presentation. The generating of the respective modified presentation is responsive to selection of a respective said combined view.

The generating of the presentation is responsive to analyzing for each Edit Event, the operation associated with said event, and an associated edit event reference, in a defined order of processing of the Edit Events, for the selected combined group.

The Edit Event is comprised of change data and an associated edit event reference, provided responsive to a user input. The change data defines an operation associated with the Edit Event. The associated edit event reference defines a relative location in the presentation for providing the operation associated with said Edit Event.

The generating of the modified presentation is further comprised of: analyzing the operation associated with each respective said Edit Event in the selected combined group, and the associated edit event reference for said respective Edit Event in the selected combined group, for all of the Edit Events in the selected combined group; assembling respective said presentation data responsive to the analyzing; and providing a respective display presentation for the selected combined group responsive to the assembling said respective said presentation data.

Each respective said edit event reference provides a link relative to one of: another said Edit Event and a position within the presentation of the document. The change data defines operations to be performed at the location as defined by the associated edit event reference.

A new selected combined group of a different plurality of the Edit Events is selected from the event storage; generating new modified presentation data responsive to the change data and associated edit event reference data for each said Edit Event in the new selected combined group. A new display presentation is provided responsive to the new modified presentation data.

The presentation is comprised of at least one: of a text document display, a still image display, an audio output, a video presentation, an audiovisual presentation, a movie, modeling software output, 3-D animation, a 3-D model, a 2-D model, and a software application output.

A file output is generated representative of, and responsive to, the selected combined group of Edit Events.

The file output can be one or more of: a multi-media file, an audio file, a video file, an image file, a 3-D model file, a text document file, and a software application-related file.

The respective defined location is comprised of one of: a specific respective said Edit Event, a beginning location of the presentation, a location within a respective said Edit Event, a fixed position in the presentation, and an end location in the presentation.

In a preferred embodiment, a master Edit Event history log list is maintained as each of the Edit Events are added to the event storage.

A system and method are provided for user interaction and document processing via event generation and processing. At any point in time, an underlying document (ranging from, at the start of editing with a presentation display of a blank document, or working with a presentation display of a non-blank document (such as a prior draft, and/or in-process annotated version(s), and/or an image of anything relative to which a user can make annotations that can result in a respective combined display presentation of the underlying image combined with the selected ones of the annotations, selected by criteria such as user, time, location, etc., wherein the respective combined display presentation is generated responsive to respective display presentation data, and is associated with and representative of a specific combination view of edit events the grouping of which define the elements of a display presentation. A second version of a display presentation can be provided by selecting the events associated with a respective one or more users' annotations to have the respective events therefor be utilized to form a selected set that is used to generate said display presentation data.

User input is processed to generate additional events (sometimes also called edit events) representative of and responsive to a user input made relative to the first display presentation. Each event is comprised of event content comprising a document change and an edit reference. The event content is generated in a defined entry order of input, and in a preferred embodiment, is stored with metadata or other criteria that can be used to facilitate selection for inclusion in a respective said selected set of events. Each respective edit reference identifies a position for utilization of a respective said document change, wherein a respective said document change defines operations to be performed at the respective said position defined by the respective said edit reference associated with said respective said document change. Each said edit event is stored in event storage.

A selected edit list is generated for a set of selected edit events representative of a respective said specific combination view, wherein the selected edit list defines which of the edit events stored in the event storage are selected events that are utilized to generate a revised display presentation responsive to the event storage. The events in the selected edit list can comprise less than all the events between a first event and a last event within an ordering of the entry order of input. [Thus, for example, less than all the events entered in a sequence can be chosen to be used excluding one of more from the sequence that is selected as the selected set that generates the respective presentation.] Revised display presentation data is generated responsive to said selected edit list. A respective revised display presentation is generated responsive to said respective revised display presentation data. This can be repeated over and over again, iteratively.

The method as in claim 1, further comprising: For example, a second selected edit list for a second set of selected events can be selected by a user on one or more computing subsystems. Second display presentation data, representative of a respective second display presentation, is generated responsive to said second selected edit list and to the event storage, and a respective second display presentation is generated responsive to the second display presentation data.

The method as in claim 1, each said edit reference provides at least one of: a respective link to a respective specific position; a link to a specific position in the display presentation data; a link to a relative position in the display presentation data; a link to a position of one of the edit events; a position relative to another one of the edit events; and a respective link to a respective relative location in the revised display presentation data.

The method as in claim 1, the display presentation data has a beginning and an end. The position is comprised of one of: a specific respective said edit event; the location within the display presentation data containing change data provided an edit event referred to by said position; a relative location within the display presentation data containing change data provided an edit event referred to by said position; the beginning of the display presentation data; and the end of the display presentation data.

The method as in claim 1, there can be a plurality of users, each at an independent computing subsystem, wherein each of the plurality of users provides separate and independent entry of edit events.

The method as in claim 1, the document change defines operations to be performed on the display presentation data by modifying the display presentation data at the respective said position defined by the respective said edit reference associated with said respective said document change.

The method as in claim 1, each respective said document change defines operations to be performed relative to another said edit event at the respective said position defined by the respective said edit reference associated with said respective said document change.

The method as in claim 1, selection of the selected events within said selected edit list is independent of the order that the edit events are added to the event storage.

In accordance with another embodiment of the present invention, a system and method for document creation and editing by at least one user is provided, comprising:

providing a display presentation of a respective document responsive to respective display presentation data; storing event data representative of respective events in document storage, said event data comprised of a respective document change and a respective edit reference for a respective event, and representative of a respective document edit relative to the display presentation of the respective document; wherein the respective edit reference defines a location for applying the respective document change; wherein the respective document change provides information on how to modify the display presentation; the method further comprising: selecting a set of the events as a selected set of events; generating revised display presentation data responsive to the selected set of events and the document storage; and providing a revised display presentation of a respective revised document responsive to the respective revised display presentation data.

The method as in claim 9, each said edit reference provides information to locate one of: another said edit event; another said document change; a specific location at which to apply the respective change data relative to the respective display presentation. A respective location in the respective display presentation data; information on where to utilize the respective said document change relative to a beginning of the document; information on where to utilize the respective said document change relative to an end of the document; information on where to utilize the respective said document change relative to a beginning of the display presentation data; and information on where to utilize the respective said document change relative to an end of the display presentation data.

A new selected edit list can be generated responsive to selection of a new selected set of events, said selected edit list defining a respective selected combined view of up to a plurality of document edits that define a respective said revised display presentation. Respective revised display presentation data is generated responsive to the respective said selected edit list and the document storage.

The method as in claim 9, each said respective document change provides information on at least one of: how to modify another said document change as located by the respective said edit reference, and where to insert the respective document change relative to one of before and after another said document change as located by said respective edit reference.

Edited display presentation data is generated responsive to the respective document changes in the events in the selected set of events. Difference edits are generated responsive to comparing said edited display presentation data and said display presentation data. The event data is generated responsive to said difference edits and said presentation data.

Edit data is stored for a plurality of respective edits, corresponding to respective said events, comprising a respective said selected set of events, for each of a plurality of selected sets of events. Each respective said selected set of events is comprised of a respective separate edit reference for each respective document edit in said respective selected set of events. The revised display presentation data is generated responsive to selection of one of the plurality of said respective selected set of events.

Each respective said document edit further comprises metadata defining conditions associated with creation of each respective said document edit; and wherein the revised display presentation is generated responsive to said metadata.

A respective said selected edit list is generated responsive to said metadata.

The metadata comprises at least one of: user identification, time of entry of a respective said event, duration of a respective said event, properties of a respective said document change, location of the user, identification of a respective associated said set of events, audio, video, image, comments, graphics data, and so forth.

In one embodiment, each said document change comprises: document data comprising at least one of: text, formatting, audio, video, graphics, and image data.

In another embodiment, each said document change comprises: a document operation comprising at least one of: insert-after causing the associated document data to be inserted after the said associated document edit located by said associated edit reference in said display presentation; insert-before causing the associated document data to be inserted before said associated document edit located by said associated edit reference in said display presentation; hide-reference causing the associated document data to hide said associated document edit located by said associated edit reference in said display presentation; and replace-reference causing the associated document data to replace said associated document edit located by said associated edit reference in said display presentation.

In accordance with another embodiment, a system for document processing and interacting with a user, is comprised a document processing system comprising: document storage for storing events representative of document edits relative to a document having a beginning and an end; wherein each said document edit is comprised of a respective document change and a respective edit reference; wherein the document edits are generated in a defined entry order of input; wherein each respective said document change provides information on how to modify the document with the respective said document edit at a location as located by each respective said edit reference; selection logic responsive to said user selection of a selected set of document edits, comprised of one of: no said document edits, one said document edit, and a plurality of said document edits; wherein the document edits in the selected set can comprise less than all the document edits between a first document edit and a last document edit within an ordering of the entry order of input; display generation logic for generating presentation data responsive to said selected set of document edits; and a display apparatus providing a display presentation responsive to the presentation data.

The respective said document change provides information for display of a respective document edit at a respective location as defined by the respective said edit reference at one of: a location relative to the location referenced by said edit reference, before the location referenced by said edit reference, and after the location referenced by said edit reference.

The edit reference provides one of: information to locate another document edit contained in the document storage, information to locate the beginning of the document, and information to locate the end of the document.

In another embodiment, there are a plurality of users, each said user providing input of document edits and having a display apparatus for said user; the system further comprising: a plurality of said selection logic and a plurality of said display generation logic, one of each for each said user, to provide control for each said user of selection of a respective said selected set of document edits, and to provide generation of a separate respective said display presentation for each said user.

In this multi-user embodiment, there are a plurality of document processing systems; a network coupling said plurality of document processing systems; wherein said selected set of document edits, is communicated, from one of the of document processing systems to at least one of a plurality of other ones of the document processing systems, as a communicated selected edit list via said network; and wherein each corresponding said display generation logic of a corresponding one of the plurality of document processing systems, locally generates respective said display presentation data responsive to said communicated selected edit list.

A system of collaboration is provided for use by a plurality of users. The system is comprised of at least two computing appliances. Each of the computing appliances is comprised of a processor, memory, communications interface, input apparatus, and display apparatus. Each of the at least two computing appliances provides a presentation of a display image of an underlying image on said display apparatus. Each of the input apparatus is responsive to an input made by a respective user thereof, to generate respective annotation data representative of a display image of annotations made by the respective user at an associated location on the presentation of the display of the underlying image (the display presentation). An event generator is responsive to the annotation data, to generate events comprising event content that is stored in event storage. The event content is generated in an entry order of input. Selection logic defines a selected set of events having an associated presentation view display generated responsive thereto, wherein the events in the selected set can comprise less than all the events between a first event and a last event within the entry order of input. Display assembly logic generates display data for a respective presentation view responsive to processing, in an order defined by the event content for the selected events in a respective said selected set of events. Display generation apparatus is coupled to the display apparatus and generates a display presentation thereupon, responsive to the display data. In one embodiment, the event storage is provided by the memory of the computing appliances. The event content can be initially stored in the memory of the computing appliance for which the respective event content was generated by the respective input apparatus of said computing appliance. In another embodiment, the event content in the memory of the computing appliances is synchronized periodically.

The event content for each event is comprised of respective change data and of respective change reference data defining the associated location for utilization of the respective said change data. The change reference data of the event content for each said event can further be comprised of relative order data, and/or location data.

In another embodiment, there is also a server computer subsystem in communications with the user's systems. The input apparatus at at least two of the computing appliances is responsive to input by a respective user to generate local user data comprising in part respective annotation data. The communications interface couples said local user data to the server computer subsystem. The server computer subsystem processes the local user data for a plurality of local users and generates global display data responsive thereto. The server computer subsystem communicates the global display data to the respective communications interfaces at each of the at least two computing appliances, for storage in the respective memory of each of the at least two computing appliances for use therein to locally generate an updated global base presentation. The global display data is used to locally generate a presentation of the updated global base presentation, at each of the at least two computing appliances.

The reference display presentation, such as of an underlying image, can be any one or more of a solid color blank image (e.g., a solid color background empty screen), a screen display of a visual image, a visual of a text document, a visual of a drawing document, a visual of an x-ray, a video, and/or a photographic still image.

In a preferred embodiment, there are a plurality of different selected sets of event content. View control logic stores reference data for each said selected set. The reference data identifies selected events mapped by each respective said selected set.

In an alternative embodiment, the reference display presentation can be replaced, at a first time occurring after an elapsed period of time, with a replacement underlying image. Thus, as work progresses, a new collapsed flattened view of a specific combination of events for a specific selected set can be thereafter utilized as the reference display presentation that provides the reference image relative to which thereafter the user input is made (that is, it is made relative to the replacement reference display presentation (e.g., of a new underlying image).

In another embodiment, the replacement reference display presentation is comprised of a representation of the display presentation for a respective said set of events overlaid atop the previously used reference display presentation. The replacement reference display presentation can be comprised of a representation of a document file. The document file can be comprised of one or more of: a text document, a graphic file, a still photo image, a movie video image, a flattened image of a selected set of events at a previously occurring time, and a list of edit events.

There is a defined order associated with each said selected set of events. The display assembly logic generates the display data for a respective said presentation view, responsive to processing respective said change data in accordance with the respective associated said change reference data, for each respective said event in the respective said selected set of events; and wherein the processing is sequenced in the defined order of the events responsive to the respective said selected set of events.

A view document is stored defining the event content and the respective said selected set of selected events for a respective said presentation view.

In another embodiment, each of the at least two of the computing appliances provides a display presentation of the input of annotations for each of the respective users, aligned relative to and overlaid atop of a same said underlying image in a same combined display presentation at each of the at least two of the computing appliances.

In a preferred embodiment, there is simultaneously provided a same combined display presentation for viewing at at least two computing appliances. For example, in one embodiment, the combined display presentation starts as a presentation of only the reference display presentation (e.g., an underlying image), and thereafter the combined display presentation evolves over time, to provide a presentation comprising the reference display presentation (e.g., the underlying image) plus the overlaid annotations, generated responsive to (from) the selected set of events.

To maintain concurrency of the display provided to each of the users working together, the event storage at each of the at least two computing appliances is updated and synchronized every so often.

The annotations for any one, or for two or more of the users, can be utilized in the generation of the combined display presentation.

In one embodiment, the event generator is responsive to the annotation data and the display data to generate the events.

A system and methodology are set forth for user editing with event generation and processing. An edit controller providing an output of event content data for respective edit events responsive to user input by a respective user, wherein the events are entered in a defined order of input. Event storage provides for storing the event content data for the edit events. Grouping selection logic specifies selected ones of the edit events (from zero to a plurality of the edit events) to be a part of a selected grouping of selected said edit events, as a respective selected set of events. Note: there can be multiple ones of different selected sets of events, each with its own associated presentation. The selection of edit events within the grouping selection is not dependent on the defined order of input of the edit events, wherein selection of the events in the selected grouping can comprise selection of less than all the events between a first event and a last event within a time window within the defined order of input. Each said edit event is comprised of event content comprised of respective change data and respective edit event reference data specifying where to apply the respective change data; the system further comprising: a presentation processor providing a presentation output responsive to the selected grouping and the event storage. A presentation apparatus provides a presentation display responsive to the presentation output.

The system as in claim 1, the presentation processor retrieves and processes selected ones of the events from the event storage that are utilized in a defined order of processing of the selected ones of the events to generate a respective said presentation output, responsive to the events in the respective said selected grouping or the respected selected set of events.

The defined order of processing of the events is responsive to said selected grouping.

The system as in claim 1, in one embodiment, there are a plurality of users, each with a respective said user input interface to provide a respective said user input, and the system further comprises: an event processor subsystem comprised of the event storage and the presentation processor; an edit processor subsystem comprised of a local said user input interface (120), a local said edit controller (112), and a local said presentation apparatus; wherein there are a plurality of the event processor subsystems and a plurality of the edit processor subsystems. The system further comprises a plurality of peer subsystems comprised of a network interface and a respective one said event processor subsystem and a respective one said editor subsystem, and wherein the network interface of each said peer subsystem is coupled to a respective said network interface of other said respective peer subsystems.

The presentation display is comprised of at least one of a still photo image, still video, motion video, a photographic image, a graphic, animation, any computer generated display, audiovisual, audio, etc.

The system as in claim 4, in a multiuser embodiment, the system is responsive to multiple user inputs from multiple different ones of the users to create the events, and each of the peer subsystems provides its own separate selection of edit events as a selected grouping, and locally generates a respective local said presentation output responsive thereto.

In one embodiment, a same said presentation display is provided concurrently to all the users.

The event storage is comprised of at least one of: respective local memory in each of the peer subsystems; respective local memory in each of the event subsystems; respective local memory in each of the editor subsystems; and respective memory in a central server.

Where there are a plurality of selected sets of events, each said selected set of events having an associated said presentation display, the selection of a respective said selected set of events results in providing of the respective said associated said presentation display, that is provided responsive to the respective said selected set of events.

Each said respective set of events is associated with a corresponding presentation view of the associated said presentation display that is generated responsive to a respective said set of events; and wherein respective said presentation data is generated responsive to selection by the respective user of a respective corresponding said presentation view.

The edit events are stored in a defined order within the selected grouping, and the defined order of processing is provided responsive to the defined order of processing of respective said selected grouping.

The selected grouping can be comprised of an ordered list of the events in the selected set of events, and the event content for the events in the selected set of events.

The respective edit event reference defines one of: a specific location in the presentation output and a relative location referencing another of the event locations, with the respective said change data.

In another embodiment, the selection logic is responsive to the event storage, and to a previous selected set of events to provide a current said selected set of events; wherein the presentation processor is responsive to the current said selected set of events to provide a corresponding said presentation output. The presentation apparatus provides a corresponding presentation display responsive to the corresponding said presentation data.

In accordance with yet another aspect of the present invention, a system and method of editing relative to a presentation, are provide, comprising: storing event content data in event storage for a plurality of edit events, the event content data for each respective said edit event comprising respective change data and respective edit event reference data defining a relative location for the respective said change data; selecting a set of the edit events from the event storage as a selected grouping, wherein selection of the edit events for said selected grouping of the edit events is not dependent on order of entry of the edit events; and, generating a presentation responsive to the selected grouping and the event storage.

New edit events are generated responsive to a user input during a first time, representative of changes made during the first time relative to the presentation. Respective said event content for the new edit events is stored in the event storage. A set of the edit events from the event storage are selected as a new set of events for a new selected grouping of the edit events; and generating a new presentation responsive to the new selected grouping and the event storage.

Entry of the edit events is made sequentially in separate entry groupings, via the user input; and any of the respective said edit events from any of the separate entry groupings, can thereafter be combined with any other said edit events from any other said entry grouping, to define a respective new selected grouping, for use in generation of a respective new said presentation responsive thereto.

A plurality of the edit events are entered in a sequence in a specific order from a first said edit event to a then current last edit event, forming a set of input edit events; and the respective plurality of the edit events within a respective said selected grouping of edit events, is comprised of less than all the edit events in the sequence in the set of input edit events, and excludes at least one of the edit events from within the specific order.

The edit events can be combined in any order to form the selected set.

In accordance with still another embodiment, a system and method for user editing, comprising: providing an output of event content for respective edit events responsive to a user input; wherein the edit events are entered in a defined order of input, wherein each said edit event is comprised of event content comprised of respective change data and respective edit event reference data specifying where to apply the respective change data; storing the event content data for the edit events in event storage memory; selecting from zero to a plurality of the edit events as a selected grouping of selected said edit events, as a selected set of the edit events; wherein selection of the events in the selected grouping can comprise selection of less than all the edit events between a first event and a last event within a time window within the defined order of input; providing a presentation output responsive to the selected grouping and the event storage; and, providing a presentation display responsive to the presentation output.

The respective edit event reference defines one of: a specific location in the presentation output and a relative location referencing another of the event locations.

The method as in claim 20, further comprising:

The presentation output is generated responsive to retrieving selected ones of the edit events from the event storage responsive to said respective said selected grouping; and processing the edit events in a respective order of processing to generate a respective said presentation output, responsive to the respective said selected grouping.

The method as in claim 20, the presentation display is comprised of at least one of still photo image, still video, motion video, a photographic image, a graphic, animation, audiovisual, and audio.

In accordance with one aspect of the present invention, a system and method provide for a display to a user as a part of editing by that user relative to the display. There can be from one, up to a plurality of event subsystems, wherein each of the plurality of event subsystems is comprised of event storage and a communications interface. The event storage stores event content for a plurality of events, wherein the plurality of events comprised of event content comprising an edit reference, an event-ID, and change data; the system further comprising: a plurality of computing subsystems. Each of the plurality of computing subsystems is comprised of a user input apparatus, a display apparatus, and a communications interface for coupling of data between each respective said communications interface and the communications interface of one of: at least one of the other ones of the plurality of computing subsystems and at least one of the plurality of event subsystems. At least one of said user input apparatus provides an output of a plurality of events responsive to a respective user input, the system further comprising: means for selecting at least one of the plurality of the events as a selected set of events. A plurality of presentation processors for assembling respective said event content, for each respective said event of the events in the selected set of events, into an ordered format comprising the change data, responsive to respective said event-IDs and respective said edit references for the selected set of events, to generate an output of corresponding presentation data. The ordered format is comprised of the change data and the event-ID. A plurality of display logic responsive to the presentation data to generate a display output. The display apparatus at at least one of the computing subsystems provide a presentation responsive to the display output.

The events within the selected set of the events is not dependent on the defined order of entry of the events.

The system as in claim 1, the input apparatus at at least two of the computing subsystems is responsive to its respective said user input, and responsive thereto provides a respective output of respective said events and respective said event content that is stored in the event storage.

The display on at least two of the computing subsystems provides a respective said presentation responsive to the display output. It can be a same presentation as the other the computing subsystem or a different presentation on each of the computing subsystems.

In one embodiment, at least two of the computing appliances are further comprised of a local event storage, a local presentation processor, and local display logic.

The system as in claim 1, in another embodiment, at least one of the user input apparatus is responsive to an additional said user input to provide a respective said user output of additional said event data representative of a new said event.

The presentation processor is responsive at least in part to the new said event to generate modified presentation data. The display logic generates a modified display output responsive to the modified presentation data. The display apparatus is responsive to the modified display output to provide a modified presentation.

In another embodiment, there are a plurality of client subsystems, wherein each of the plurality of client subsystems is comprised of at least one respective said computing system of said plurality of said computing subsystems, one of the plurality of presentation processors; and wherein said system provides for coupling of data between said computing subsystem, said one of the plurality of presentation processors, and at least one of the plurality of said event subsystems, and provides for selecting selects a plurality of the events, comprising at least in part the additional said event, as a new selected set of events. The presentation processor is responsive to the new selected set of events to generate a new output of corresponding presentation data. The display logic is responsive to the new output of corresponding presentation data to generate a modified display output. The display apparatus at said at least one of the computing appliances, provides a modified presentation responsive to the modified display output.

Where there are at least two of the computing subsystems, each of the computing subsystems is further comprised of a local event storage, a local presentation processor, and local display logic. At least one of the local user input apparatus outputs a new event responsive to a respective new said user input, wherein the respective said event content for the respective new event is stored in the respective local event storage of the at least two computing appliances. Each respective said local presentation processor is responsive to respective said local event storage, comprising at least in part the new event, to generate respective new presentation data. Respective said local display logic is responsive to the respective new presentation data to generate a respective local modified display output. A respective said display apparatus at said at least one of the computing appliances, provides a modified presentation responsive to the respective local modified display output from the at least one of the computing appliances.

The event storage is distributed among the plurality of computing subsystems.

The system as in claim 3, where there are at least two of the user input apparatus, there is provided separate outputs of respective said events; wherein the selected set of events is comprised of at least one said event from each of the at least two said user input apparatus. The display apparatus provides a respective said presentation responsive to said selected set of events.

The system as in claim 1, a separate display presentation is provided at each of at least two said computing subsystems responsive to a respective selected set of events. Different ones of the events are within the respective selected set for each respective said separate display presentation.

In another multi-user embodiment, there are a plurality of peer subsystems. Each of the plurality of peer subsystems is comprised of one of the event subsystems and one of the computing subsystems. One of the event subsystems selects at least one of the plurality of the events; and wherein said at least one of the plurality of events is coupled between said respective event subsystems, said respective computing subsystems, and other ones of the plurality of peer subsystems at one computing subsystem of a plurality of computing subsystems. An output of a plurality of events is provided responsive to a respective user input, wherein each of said plurality of events is comprised of respective event content comprising an edit reference, an event-ID, and change data. The event content for the plurality of events is stored in event storage. At least one of the plurality of events is selected from the event storage, as a selected set of events. Respective said event content, is assembled for each respective said event of the events in the selected set of events, into an ordered format comprising the change data, responsive to respective said event-IDs and respective said edit references for the selected set of events, to generate an output of corresponding presentation data; wherein the ordered format is comprised of the change data and the event-IDs; and providing a presentation responsive to the presentation data.

A display output is generated responsive to the presentation data. A presentation is provided responsive to the display output.

In accordance with the present invention, event processing systems and methodologies are provided, comprising: providing a corresponding event to a plurality of users responsive to an input of an addition made relative to a base document; structuring an ordered linear series of events responsive to a plurality of separate user inputs; creating a monotonically increasing event index and storing said event index as a part of event content that is associated with said events that are added to the series; selecting up to a plurality of the events to be used together as a defined set of events for generating a presentation display of a respective presentation view; processing the event content for the defined set as a linear series of events responsive to the event index; and, providing a presentation display responsive to the processing of the event content data.

The selecting of which of the events are to be used in a defined set can be changed at multiple times to change the corresponding presentation display generated responsive thereto.

Event information is associated with each said event. The events are processed to determine which of the events are to be included in the processing and which of the events to exclude from the processing, responsive to respective said event information of each of said events. The event information can be comprised of one or more of: user comments, user-ID, company, location, author time of day, and a date, etc.

A selection is made of a specific defined set of events, and a combined base document is created as a single base event having a corresponding combined display image corresponding to processing of all the events in the respective specific said defined set.

Thereafter, all history of individual said events in said specific defined set of events is eliminated from storage, and the single base event is thereafter utilized to generate a view of the combined base document.

The presentation display for the combined base document is exported to another document format.

In one embodiment, the event content is comprised of at least one atom, wherein the atom is comprised of a fundamental component; and wherein each said fundamental component is comprised of at least one of: a pixel, a video frame, an audio sample, a character, word, paragraph, letter, numeral, number, date, punctuation, formatting control, HTML tags, and XML tags. The atom is further comprised of an atomic operation on a respective said fundamental component and an atom reference in at least one of a present event and a previous event. Each said atom is further comprised of an atomic operation, a fundamental component, and an atom reference, where the atomic operation modifies where and how a respective said atomic is viewed; and where the atom reference determines which said atom is to be modified by the respective atomic operation.

In accordance with one aspect of the present invention, the atomic operations is comprised of at least one of: an "insert before" operation; an"insert after" operation;

and, the atomic operations is comprised of at least one of: a "replace" operation; and a "hide" operation.

In accordance with another aspect of the present invention, the atomic operation is comprised of at least one of: an "insert before" operation, a "show" operation, a "font-style" operation, a "background-color" operation, a "fore-color" operation, a formatting operation, and a "font" operation.

A respective presentation display for a respective selected said presentation view of a respective selected said defined set, is processed to create a flat single layer document. This may at times be useful; such as when the history of a document should not be shared with someone for security reasons.

A defined set history of events is stored responsive to input of the events, and, selection of certain of said events as a respective said defined set with an associated view of the presentation display, is provided responsive to the defined set history.

In accordance with another aspect of the present invention, an event generator provides a corresponding event to a plurality of users responsive to an input of an addition made relative to a user input interface providing structuring for an responsive to a part of event content that is associated with said events that are added to the series. Selection logic selects from zero up to a plurality of the events to be used together as a selected set of events, for generating a presentation display of a respective presentation view. Presentation assembly logic, provides processing of the event content for the defined set as a linear series of events responsive to the event index. A display of apparatus provides a presentation display responsive to the processing of the event content data.

A defined set history of said defined sets is stored in memory and maintained and updated.

When an event is added to storage, a new defined set of events is generated and stored in said defined set history. Thus, a complete history of all display presentation screens is fully maintained and can be easily recreated.

In a preferred embodiment, each said event is comprised of: a monotonically increasing event index; and, event information providing change reference information and change data about the event.

The event information is further comprised of some sort of criteria, such as time or date or, author data providing information about who created the event; and the event information is utilized to selectively control utilization of the respective event in the generation of the presentation display.

In an alternate embodiment, selection of the events for a respective said selected set, are selected based upon criteria that define a respective associated presentation view.

The processing of the event content generates a selected said presentation view of a presentation display. The processing is comprised of: starting with a respective said selected event having a lowest said event index; applying the respective said event content data for the selected event for use in construction of display data of the selected view; searching for said events that reference the respective said selected event to determine referenced events; sequencing the referenced events starting with a lowest said event index, and processing the referenced said events to generate respective said display data therefor; and, generating the respective said selected presentation view of the presentation display responsive to the display data.

In yet another embodiment, the event information is further comprised of content data; and the formatting of characters in the presentation display is selectively modified responsive to the event information in the selected events.

In still another embodiment, the formatting information is further comprised of a hide operation that causes at least one of: associated event content data is not displayed in the presentation display; and associated event content data is displayed in the presentation display showing a line drawn through said associated event content data.

Processing of a respective said event results in producing an orphan event when that respective said event is itself a selected event, but that respective said event has no reference to a selected event. In this situation, it can be selectively controlled to provide a presentation display that provides a viewable indication of any said orphan events present in a respective said selected view. These orphan events can appear in the presentation as bolded, or of a different color than other parts of the display, or can appear stricken out within the display, or can be excluded from being shown in the display.

Processing of a respective said event produces a dangling event when that event itself has been selected but that respective said event references an unselected event that is not a part of the selected set of events. The presentation display can selectively provide a viewable indication of any said dangling events for the respective selected view. These dangling events can appear in the presentation as bolded, or of a different color than other parts of the display, or can appear stricken out within the display, or can be excluded from being shown in the display.

As discussed above herein, the selecting of which of the events can be done responsive to at least one of: distinguishing between authors of the events; obtaining information about the event based upon a relative position of the event in the presentation display; selecting between one of showing the presentation and hiding and not showing in the presentation, of at least one of orphaned events and dangling events; and, selecting at least one from a plurality of selectable views of alternative respective presentation displays, responsive to at least one said user changing of a criteria used to select the events.

The formatting operation can be comprised of one or more of font, colors, kerning, page layout information, margins, and paragraph styles. The paragraph styles can be comprised of HTML style, CSS style, etc.

BRIEF DESCRIPTION OF THE FIGURES

The present invention may be better understood by reference to the following drawings along with the detailed description of the following drawings.

FIG. 1 illustrates a system with Global Layer Storage with Mapping Logic.

FIG. 13 shows system embodiment with a Mapping Logic for distributed mapping, alternative to and similar to FIG. 12, but having a separate one of the Mapping Logic for distributed mapping included for each user and included in each user display appliance.

FIG. 14 shows a system embodiment of a mapping layer logic with edit logic and for distributed mapping, alternative and similar to FIG. 12, but where the Mapping Logic/table does not have storage or logic for a user as in FIGS. 11 and 12, and where there is an additional element in FIG. 14 that is not in FIG. 13, which additional element provides logic to define for each user a definition of the edit permission level, which provides definition and permissions as to whether or not editing is permitted for a respective particular user, and as to which level that particular user should be editing.

FIG. 18 illustrates an alternative embodiment of FIG. 15, which is similar to FIG. 15, with the exception that there is now Layer Edit Logic so that the network interface may now receive information about a layer that needs to be edited, and which provides the information to edit it, and which communicates that information to and with Layer Storage with edit logic 1700.

FIG. 26 illustrates an embodiment of a display computing appliance with display and input device, similar to FIG. 25, but with the addition of an input user device at the user display computing appliance which is used, inter alia, to communicate with the network storage to provide changes to the Network Data Layer.

FIG. 27 illustrates an embodiment of a display computing appliance with mapping storage, user display logic, user display and user layer editing logic, similar to FIG. 24 with the addition of a user input device and Layer Edit Logic, inter alia, to allow the display computing appliance to make changes to the Layer Data in network storage that's stored elsewhere.

FIG. 29 illustrates music team Mapping Logic for distributed Data Layers.

FIG. 32 illustrates education Mapping Logic for distributed Data Layers.

FIG. 37 illustrates ad hoc Mapping Logic with distributed Data Layers.

FIG. 38 illustrates data flow of user-to-user edits in an Ad Hoc team.

FIG. 47 illustrates roles within a music team, showing multiple roles and the functioning of the appliance and what layers are used by a particular appliance and how it depends on its role, and showing how any edits that may be made will depend on the role that an appliance is functioning in.

FIG. 61 illustrates a social team where the owner, Frankie, is viewing all the messages.

FIG. 62 illustrates a social team where the owner, Frankie, is viewing messages between himself and his manager, John.

FIG. 63 illustrates a social team where the owner, Frankie, is viewing is messages from his groupies.

FIG. 64 illustrates a social team where the owner, Frankie, is viewing threads of messages that he has participated in.

FIG. 65 illustrates a social team where the owner, John, is viewing all the messages.

FIG. 66 illustrates a social team where the owner, John, is viewing messages between himself and Frankie.

FIG. 67 illustrates a social team where the owner, John, is viewing threads of messages that he has participated in.

FIG. 68 illustrates a social team where the owner, Mary, is viewing all the messages available to her.

FIG. 69 illustrates a social team where the owner, Mary, is viewing all the threads she has participated in.

FIG. 70 illustrates a social team where the owner, Frankie, is viewing threads of messages that he has participated in with an expanded view.

FIG. 75C provides a table of token types based on the granularity selected in subsystem embodied in FIG. 75B.

FIG. 75D illustrates psuedo-code that could be used in an embodiment of the granularizied comparison subsystem using a processor and memory.

FIG. 75G provides a table of token types based on the granularity selected in subsystem embodied in FIG. 75B for a media stream document.

FIG. 76A illustrates event storage for a text document and the state flow of the presentation processor assembling the events.

FIG. 76B illustrates the presentation data at various states as the presentation data is assembled by the presentation processor with events as shown in FIG. 76A.

FIG. 76C illustrates the formatted presentation data at various states responsive to the presentation data in FIG. 76B.

FIG. 76D illustrates event storage for a media stream document and the state flow of the presentation processor assembling the events.

FIG. 76E illustrates the presentation data at various states as the presentation data is assembled by the presentation processor with events as shown in FIG. 76D.

FIG. 76F illustrates the formatted presentation data at various states responsive to the presentation data in FIG. 76E.

FIG. 77A depicts a state flow on an event processing system using a flow chart where the user changes generate new events.

FIG. 77B depicts a state flow on an event processing system using a flow chart where the user changes generate difference annotations.

FIG. 77C depicts a state flow on an event processing system using a flow chart where the user changes generate formatted presentation data.

FIG. 82A illustrates text events stored in different layers.

FIG. 82B illustrates text events stored in a table structure.

FIG. 82C illustrates the display presentation for two different selections of events as illustrated in FIGS. 82A and 82B.

FIG. 84B illustrates prior art documents saving different versions.

FIG. 84C illustrates prior art recorded changes in document editors.

FIG. 84D illustrates prior art undo operations.

DETAILED DESCRIPTION OF FIGURES

This is a detailed description of the figures STD 1938.

FIGS. 1-10 illustrates alternate embodiments and various configurations of the invention.

Figure 1:
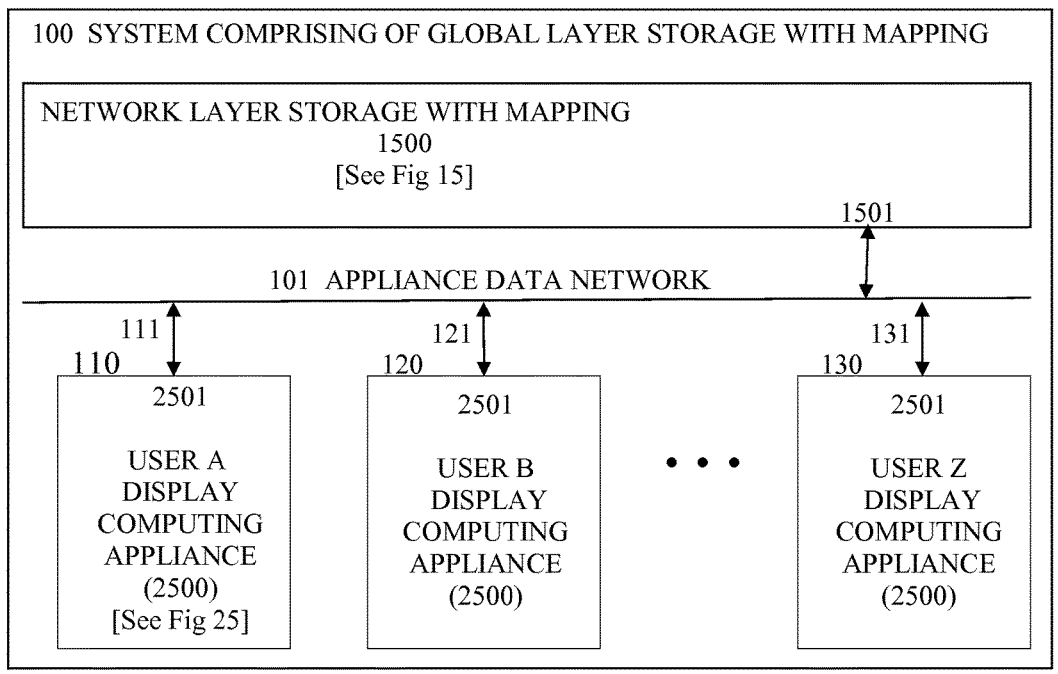
FIGS. 1-84D illustrates various configurations and embodiments of the invention with various features and functionality.

FIG. 1 illustrates a first embodiment comprising a system with Global Layer Storage with mapping. In a preferred embodiment of this system, it is comprised of Network Layer Storage, 1500, with mapping in a global location. In other words, Global Layer Storage is provided at one location that is on a connected Appliance Data Network of a plurality of appliances, communicating and providing information to the plurality of computing appliances each with their own display. The connected Appliance Data Network in this embodiment is comprised of a connection; 1501, 111, 121, 131; of each subsystem; 1500, 110, 120, 130 respectively; to the Appliance Data Network, 101. The Display Computing Appliances 110, 120 and 130. These are instances of a Display Computing Appliance 2500 as described in further detail in FIG. 25. The Network Layer Storage, 1500, is described in further detail in FIG. 15. It should be noted that in this embodiment shown in FIG. 1 and the embodiments illustrated in FIGS. 2, 3, 4, 5, 6, 7, 8, 9 and 10 that three Display Computing Appliances; as embodied in FIG. 24, 25, 26, 27 or 28; are shown but any number more than one is acceptable.

Figure 2:
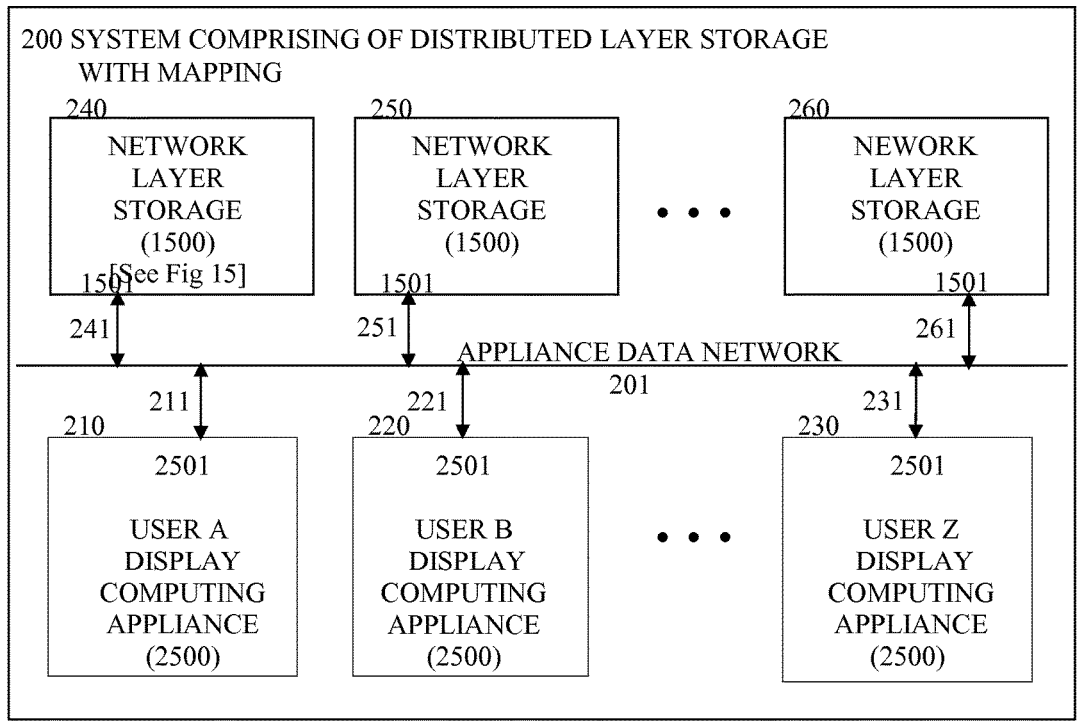
FIG. 2 illustrates a system with Distributed Layer Storage with Mapping Logic.

FIG. 2 illustrates a system with Distributed Layer Storage with mapping. There are multiple distributed networked layer storage at separate locations; 240, 250, 260; on the connected Appliance Data Network and each having mapping within the storage coupled to a plurality of user display computing appliances; 210, 220, 230; each with their own display. The connected Appliance Data Network in this embodiment is comprised of a connection; 241, 251, 261, 211, 221, 231; of each subsystem; 240, 250, 260, 210, 220, 230 respectively; to the Appliance Data Network, 201. In this embodiment a specific Data Layer is stored only once in one of the Network Layer Storage locations, 240, 250, 260. The Display Computing Appliance, 2500, is the embodiment of blocks 210, 220 and 230 and is described in further detail in FIG. 25. The Network Layer Storage, 1500, is described in further detail in FIG. 15. The number of Network Layer Storage locations and Display Computing Appliances can be the same or different. It should be noted that in this embodiment shown in FIG. 2 and the embodiments illustrated in figures; 4, 6, 7, 9 and 10; the physical location of the Network Layer Storage and the user display computing appliances may be in the same physical location or they may be in their own separate physical locations. Some appliances may have Network Layer Storage in the same physical location as a Display Computing Appliance or even integrated within the appliances, or some may not. The choice configuration is quite flexible and compatible with the present invention. Likewise three Network Layer Storage; embodied as shown in FIGS. 15, 18, 19, 20, 21 and 22; instances are shown in FIGS. 2, 4, 6, 7, 9 and 10 but any number above one is acceptable.

Figure 3:
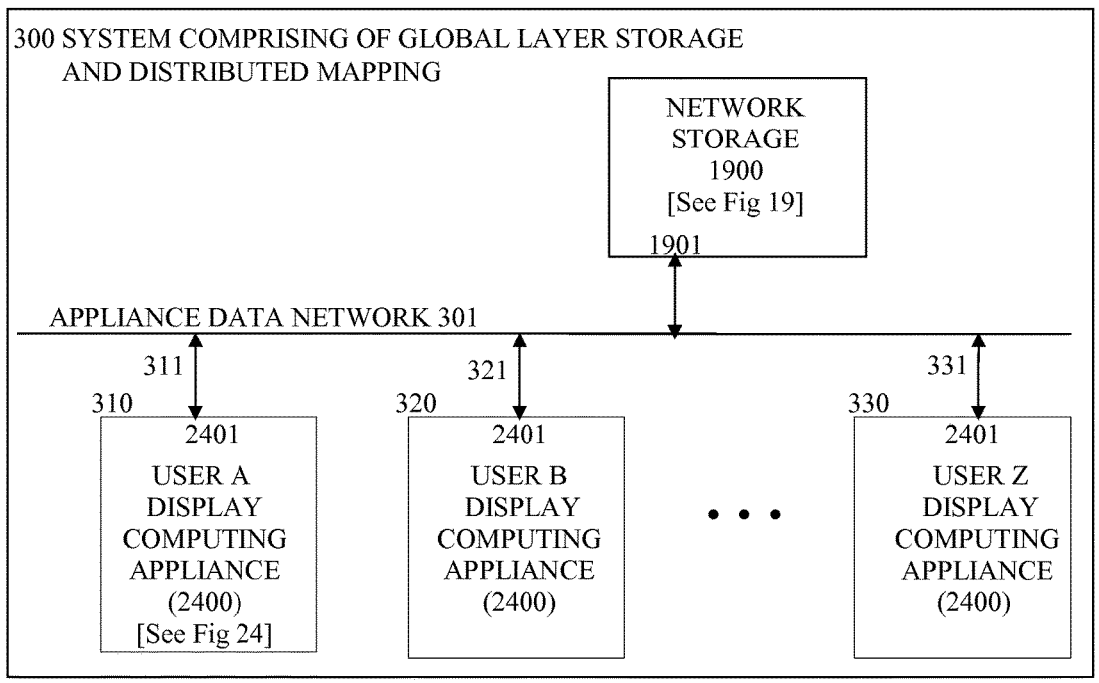
FIG. 3 illustrates a system with Global Layer Storage and distributed Mapping Logic.

FIG. 3 illustrates a system with Global Layer Storage and distributed mapping as illustrated in this embodiment. Global network storage, 1900, is concentrated in one location, communicating via the connected Appliance Data Network to a plurality of display computing appliances each having local mapping in the particular appliances to provide logic to map the global Data Layer storage. The connected Appliance Data Network in this embodiment is comprised of a connection; 1901, 311, 321, 331; of each subsystem; 1900, 310, 320, 330 respectively; to the Appliance Data Network, 301. The Display Computing Appliance, 2400, is the embodiment of subsystems 310, 320 and 330 and is described in further detail in FIG. 24. The Network Layer Storage, 1900, is described in further detail in FIG. 19.

Figure 4:
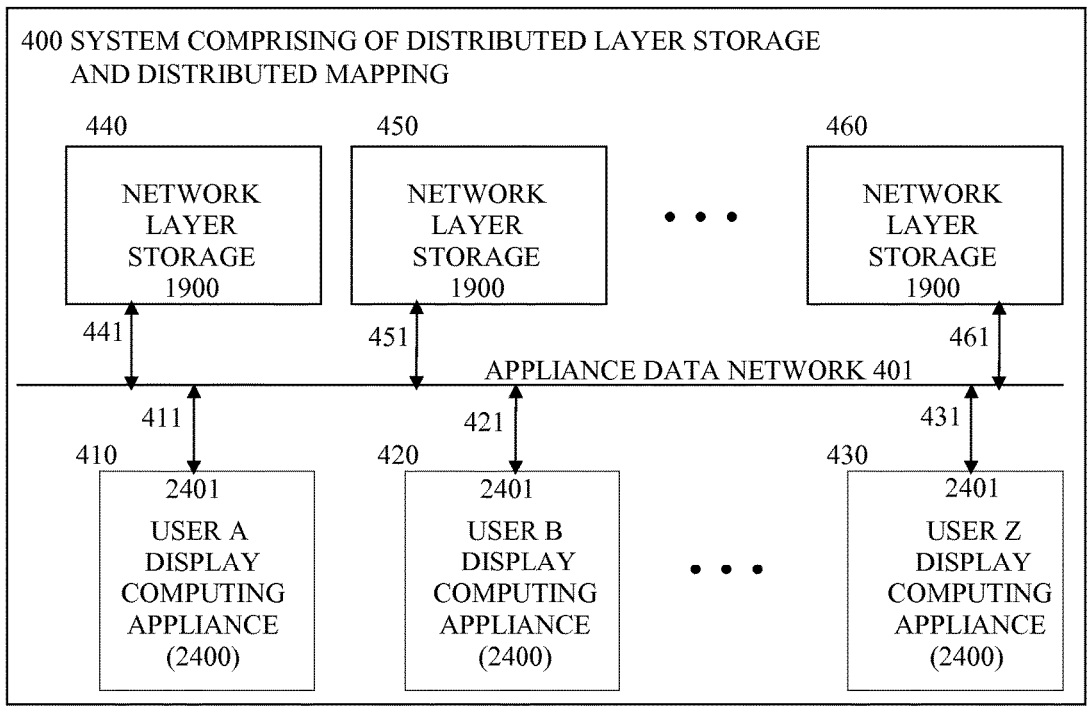
FIG. 4 illustrates a system with Distributed Layer Storage and distributed Mapping Logic.

FIG. 4 illustrates a system with Distributed Layer Storage and distributed mapping, as illustrated in FIG. 4, the system here has a plurality of networked layer storage locations; 440, 450, 460; which are in communication via the connected Appliance Data Network with a plurality of user display computing appliances; 410, 420, 430; which each containing a display and mapping for the layer storage. The connected Appliance Data Network in this embodiment is comprised of a connection; 441, 451, 461, 411, 421, 431; of each subsystem; 440, 450, 460, 410, 420, 430 respectively; to the Appliance Data Network, 401. In this embodiment a specific Data Layer is stored only once in one of the Network Layer Storage locations, 440, 450, 460. The Display Computing Appliance, 2400, is the embodiment of subsystems 410, 420 and 430 and is described in further detail in FIG. 24. The Network Layer Storage, 1900, is the embodiment of subsystems 440, 450 and 460 and is described in further detail in FIG. 19.

Figure 5:
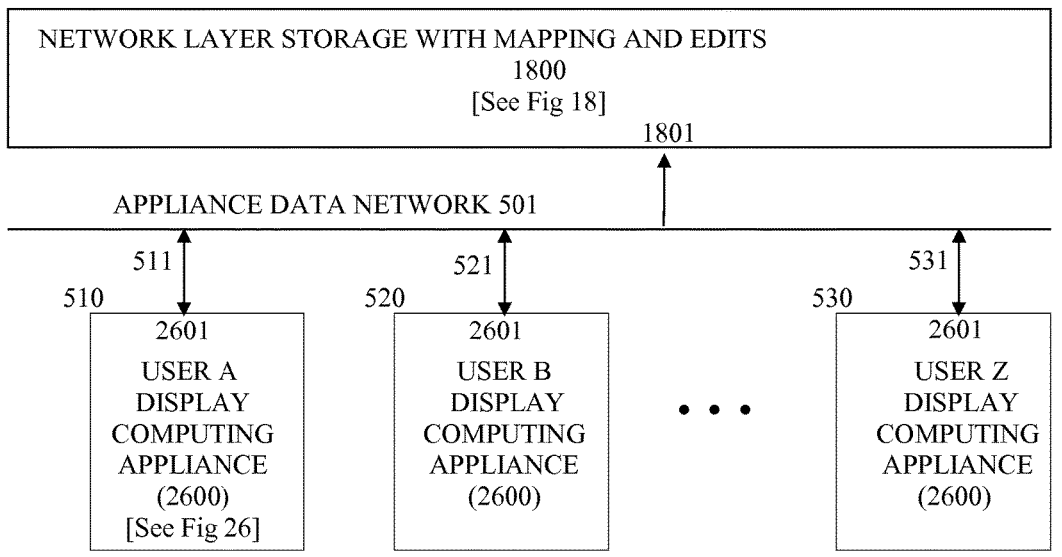
FIG. 5 illustrates an embodiment of a system with Global Layer Storage with Mapping Logic and layer-edit logic.

FIG. 5 illustrates an embodiment of a system with Global Layer Storage with mapping and layer-edit logic. This is similar to FIG. 1 with the exception that editing logic is added to both the Network Layer Storage and to each display-computing appliance. Thus, particular layers can be edited by a selected user, and results in causing modifications to the respective layer storage, and in accordance with one aspect of the present invention, can also selectively alter the composite display presentation on one or more selected ones of the user display computing appliances, depending on the mapping provided. The connected Appliance Data Network in this embodiment is comprised of a connection; 1801, 511, 521, 531; of each subsystem; 1800, 510, 520, 530 respectively; to the Appliance Data Network, 501. The Display Computing Appliance, 2600, is the embodiment of subsystems 510, 520 and 530 and is described in further detail in FIG. 26. The Network Layer Storage, 1800, is described in further detail in FIG. 18.

Figure 6:
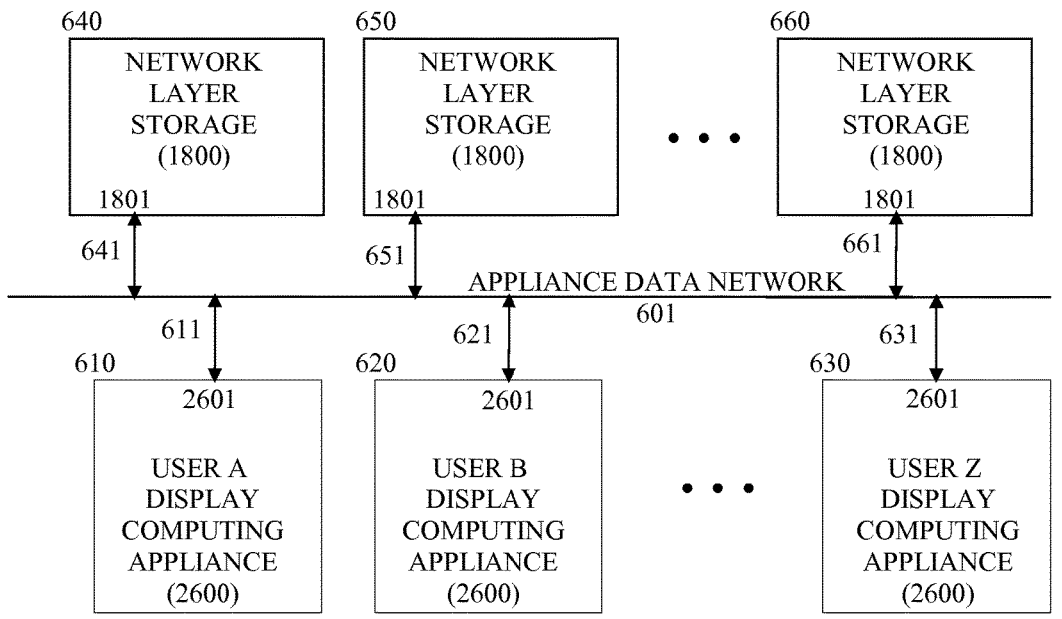
FIG. 6 illustrates embodies a system with Distributed Layer Storage with Mapping Logic and Data Layer Edit Logic.

FIG. 6 illustrates an embodiment of a system with Distributed Layer Storage with mapping and Data Layer edits. This is similar to FIG. 2 with the exception that editing logic has been added to both the Network Layer Storage. There are a plurality of Network Layer Storage memory; 640, 650, 660; and a plurality of user display computing appliances; 610, 620, 630; each and all of which has editing logic added to facilitate selectively allowing the user to make changes to the respective zero, one or more layers as determined by the Mapping Logic. The connected Appliance Data Network in this embodiment is comprised of a connection; 641, 651, 661, 611, 621, 631; of each subsystem; 640, 650, 660, 610, 620, 630 respectively; to the Appliance Data Network, 601. In this embodiment a specific Data Layer is stored only once in one of the Network Layer Storage locations, 640, 650, 660. The Display Computing Appliance, 2600, is the embodiment of subsystems 610, 620 and 630 and is described in further detail in FIG. 26. The Network Layer Storage, 1800, is the embodiment of subsystems 640, 650 and 660 and is described in further detail in FIG. 18.

Figure 7:
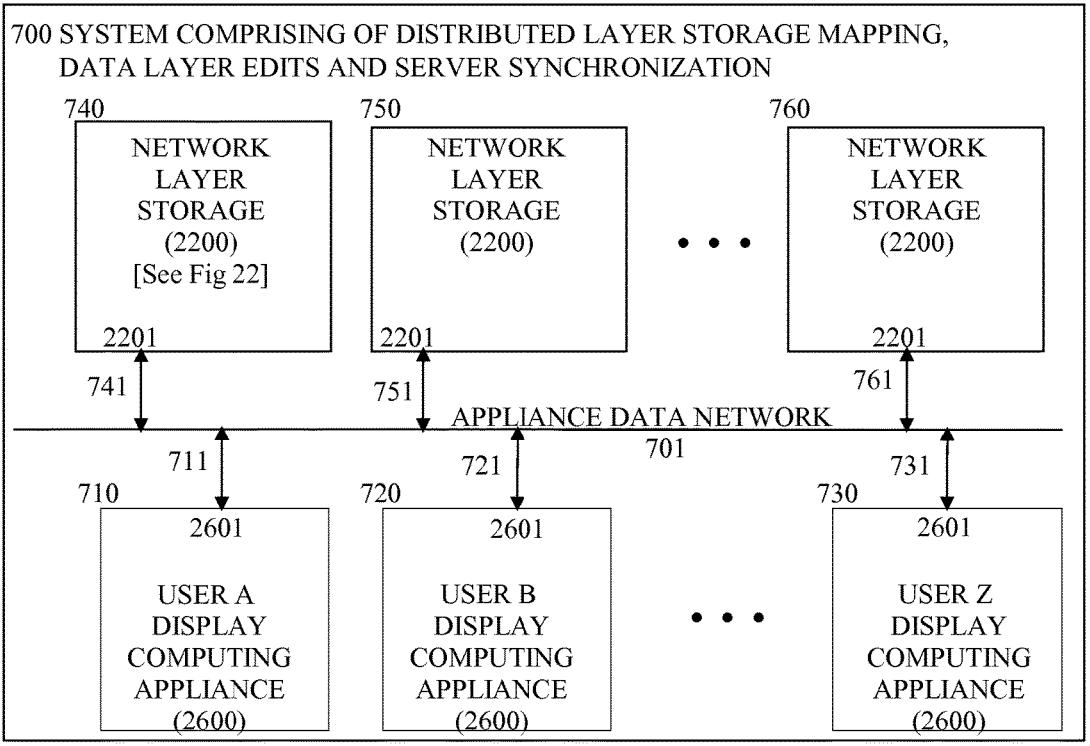
FIG. 7 illustrates an embodiment of a system with Distributed Layer Storage with mapping and Data Layer Edit Logic and server synchronization.
Figure 9:
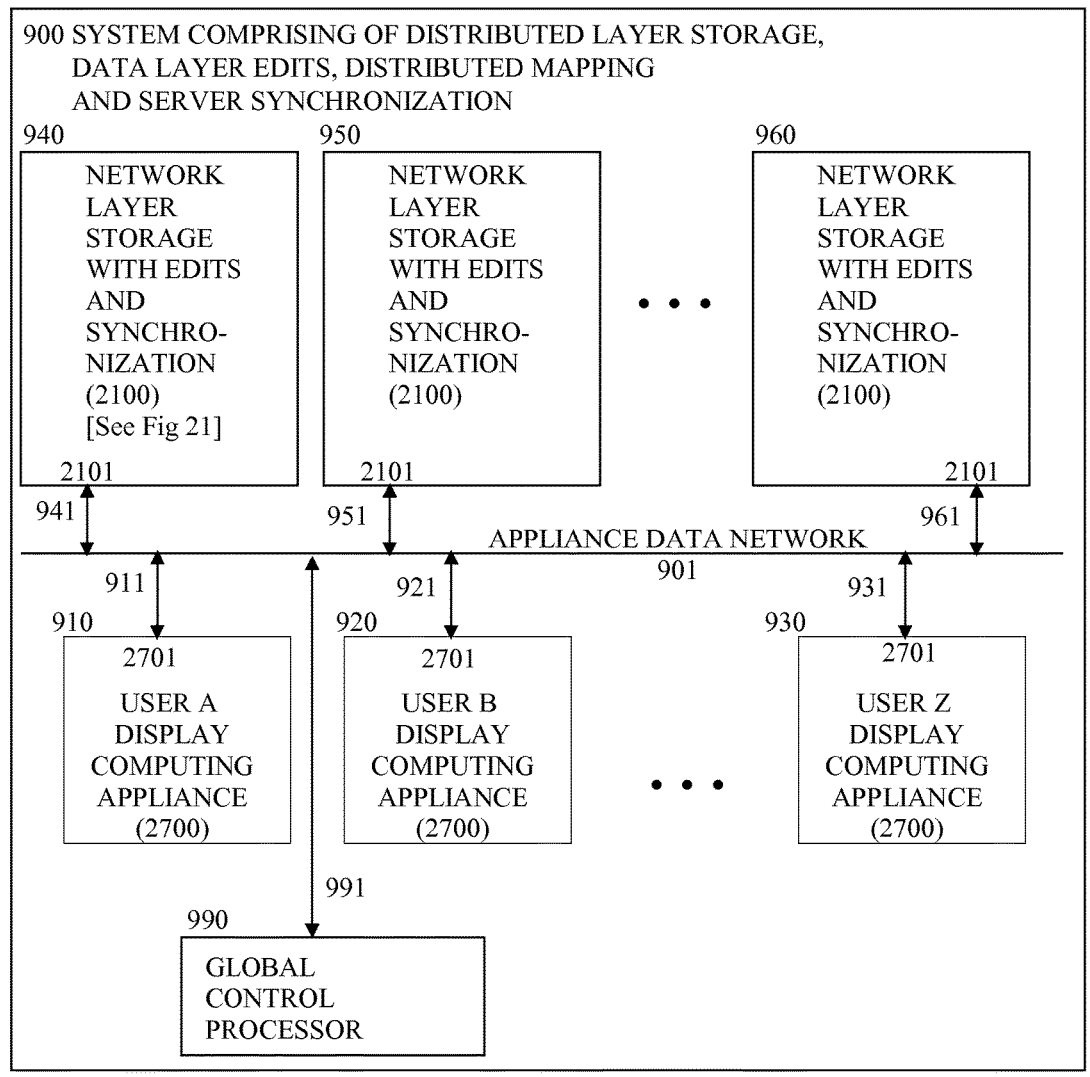
FIG. 9 illustrates an embodiment of a system of Distributed Layer Storage, Data Layer Edit Logic, distributed mapping and server synchronization.
Figure 10:
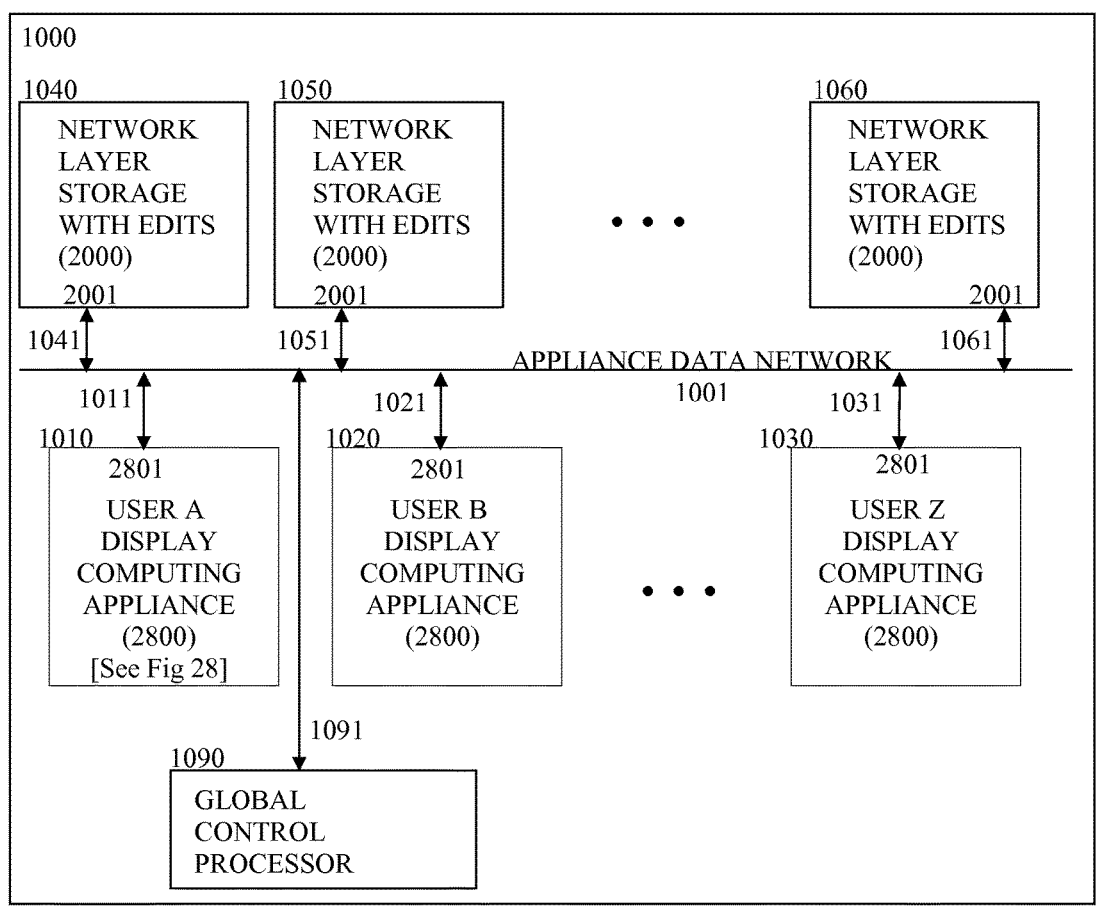
FIG. 10 illustrates embodies a system of Distributed Layer Storage, Data Layer Edit Logic, distributed mapping and client synchronization.

FIG. 7 illustrates an embodiment of a system with Distributed Layer Storage with mapping and Data Layer edits and server synchronization. This system is similar to FIG. 6 with the exception that each of the Network Layer Storage devices has server synchronization provided for and included in the storage device. The connected Appliance Data Network in this embodiment is comprised of a connection; 741, 751, 761, 711, 721, 731; of each subsystem; 740, 750, 760, 710, 720, 730 respectively; to the Appliance Data Network, 701. The Display Computing Appliance, 2600, is the embodiment of subsystems 710, 720 and 730 and is described in further detail in FIG. 26. The Network Layer Storage, 2200, is the embodiment of subsystems 740, 750 and 760 and is described in further detail in FIG. 22. This embodiment includes the synchronization logic with the Network Layer Storage, 2200. The embodiment illustrated in this FIG. 7 and the embodiments illustrated in FIGS. 9 and 10 provide for synchronization that allows for the same updated data for a respective particular layer to be stored in memory devices at multiple locations in each one of the Network Layer Storage devices, and allows the display computing appliances to access that respective layer from any one of the Network Layer Storage devices. The server synchronization provides the logic that makes sure that when a change is made to a layer in one of the Network Layer Storage devices that the change is communicated to all of the other Network Layer Storage devices that have the same respective layer stored in them, so that the respective layer has its Layer Data updated to contain the same information. This allows for a much more flexible storage network and the Network Layer Storage devices can optionally be, or not be, physically co-located with a respective one of the user display appliances. Alternative, or additionally, some of the user display appliances may have Network Layer Storage, while others do not. Also, it is not a requirement of the present invention that all layers are stored in each and all Network Layer Storage devices. The synchronization is only required when at least two of the Network Layer Storage devices contain a same respective layer, ie., duplicate copies, so that those storage devices can be maintained to have identical Layer Data stored for that respective same layer. In addition, there is no restriction on how many locations a particular layer is duplicated. Obviously, this provides for a very flexible choice of storage options that allows for static or dynamic allocation of storage for layers which can be optimized for tradeoffs in storage requirements, network traffic/bandwidth/latency and the complexity of managing multiple copies storage.

Figure 8:
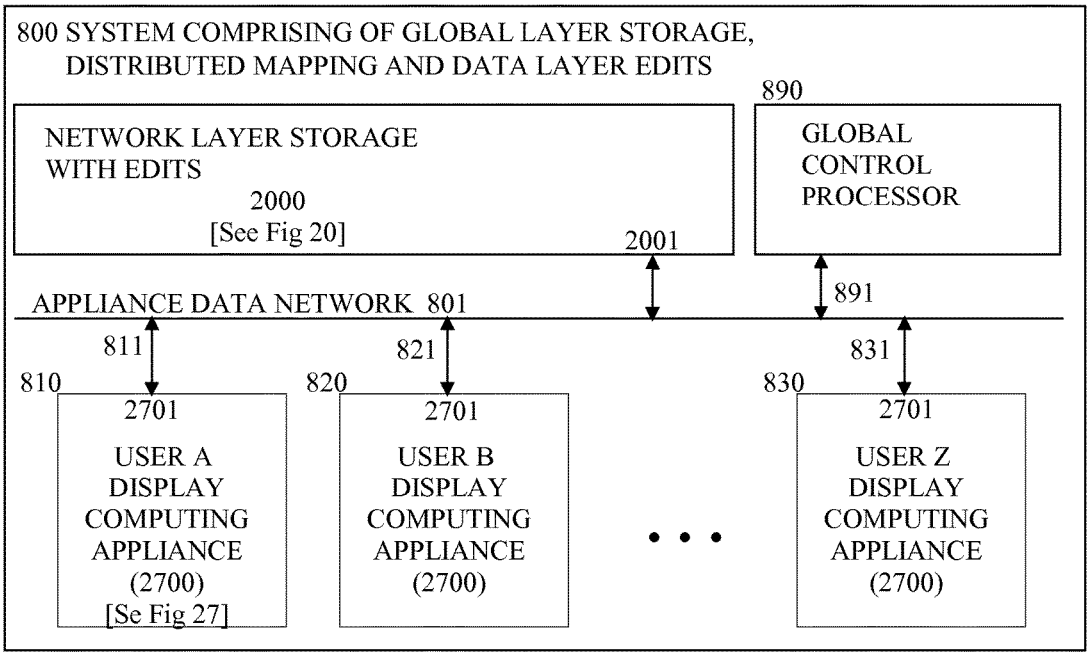
FIG. 8 illustrates an alternative system similar to FIG. 3, and shows an embodiment of a system of layered data storage with Global Data Layer Storage, distributed mapping and Data Layer Edit Logic.

FIG. 8 illustrates an embodiment of a system is similar to FIG. 3. FIG. 8 illustrates an embodiment of a system of layered data storage with global Data Layer storage, distributed mapping and selectively providing for Data Layer edits. In this illustrated embodiment of the system, there is a centralized global Network Layer Storage coupled for communication with multiple computing display appliances. The Mapping Logic is done at each appliance and, different from the system of FIG. 3. There is Edit Logic which has been added to each user display computing appliance and to the Network Layer Storage, so that for a selectively enabled user, the enabled user can make changes to a particular respective mapped edit layer. In addition, a Global Control Processor, 890, is included which works in conjunction with the Control Processors in the Display Computing Appliances, 810, 820, 830. The connected Appliance Data Network in this embodiment is comprised of a connection; 2001, 811, 821, 831, 891; of each subsystem; 2000, 810, 820, 830, 890 respectively; to the Appliance Data Network, 801. The Display Computing Appliance, 2700, is the embodiment of subsystems 810, 820 and 830 and is described in further detail in FIG. 27. The Network Layer Storage, 2000, is described in further detail in FIG. 20. Note that the Global Control Processor, in this embodiment and in the embodiments illustrated in FIGS. 9 and 10, is not required to be present. Some systems do not require centralized coordination of activities and the Global Control Processor would have nothing to do so can be eliminated.

FIG. 9 illustrates an embodiment of a system of Distributed Layer Storage, Data Layer edits, distributed mapping and server synchronization. This is similar to FIG. 4 with the exception that logic and storage to selectively permit Data Layer edits have been added so that selectively enabled ones of the users may change data stored for a particular layer, and there is server synchronization. The server synchronization logic in the Network Layer Storage, 2100, allows change data for a layer to be stored in multiple Network Layer Storage devices and locations and the server synchronization makes sure that once a change is made to Layer Data for a respective layer in one network storage device and location that the respective change to the respective Layer Data is synchronized and that an identical change is to respective Layer Data in all other locations that said respective layer exists. The connected Appliance Data Network in this embodiment is comprised of a connection; 941, 951, 961, 911, 921, 931, 991; of each subsystem; 940, 950, 960, 910, 920, 930, 990 respectively; to the Appliance Data Network, 901. The Display Computing Appliance, 2700, is the embodiment of subsystems 910, 920 and 930 and is described in further detail in FIG. 27. The Network Layer Storage, 2100, is the embodiment of subsystems 940, 950 and 960 and is described in further detail in FIG. 21. In the illustrated embodiment of FIG. 9, the user display-computing appliance may selectively access a respective layer from any of the network storage devices and locations that contains that respective layer. The user display-computing appliance also contains Edit Logic to selectively allow the user to make and communicate changes to the Network Layer Storage.

FIG. 10 illustrates an embodiment of a system of Distributed Layer Storage, Data Layer edits, distributed mapping and client synchronization. This is similar to FIG. 9 with a difference being that the synchronization is contained in the user display computing appliance and not the Network Layer Storage. Thus, in the embodiment of FIG. 10, it is the responsibility of each user display-computing appliance that when there is a change made at that respective user display-computing appliance to data for a respective layer in one network storage layer location that the user display-computing appliance synchronizes the change in the data for the respective layer so as to make the change in the data for the respective layer in all the network storage devices and locations so as to maintain that the respective data for the respective layer is identical in all layer storage devices. In this embodiment, the user display-computing appliance can selectively access the respective Data Layer from any one of the network storage devices/locations and the network storage layer device/location can be (or not be) co-located with each user display-computing appliance. The connected Appliance Data Network in this embodiment is comprised of a connection; 1041, 1051, 1061, 1011, 1021, 1031, 1091; of each subsystem; 1040, 1050, 1060, 1010, 1020, 1030, 1090 respectively; to the Appliance Data Network, 1001. The Display Computing Appliance, 2800, is the embodiment of subsystems 1010, 1020 and 1030 and is described in further detail in FIG. 28. The Network Layer Storage, 2000, is the embodiment of subsystems 1040, 1050 and 1060 and is described in further detail in FIG. 20.

Figure 11:
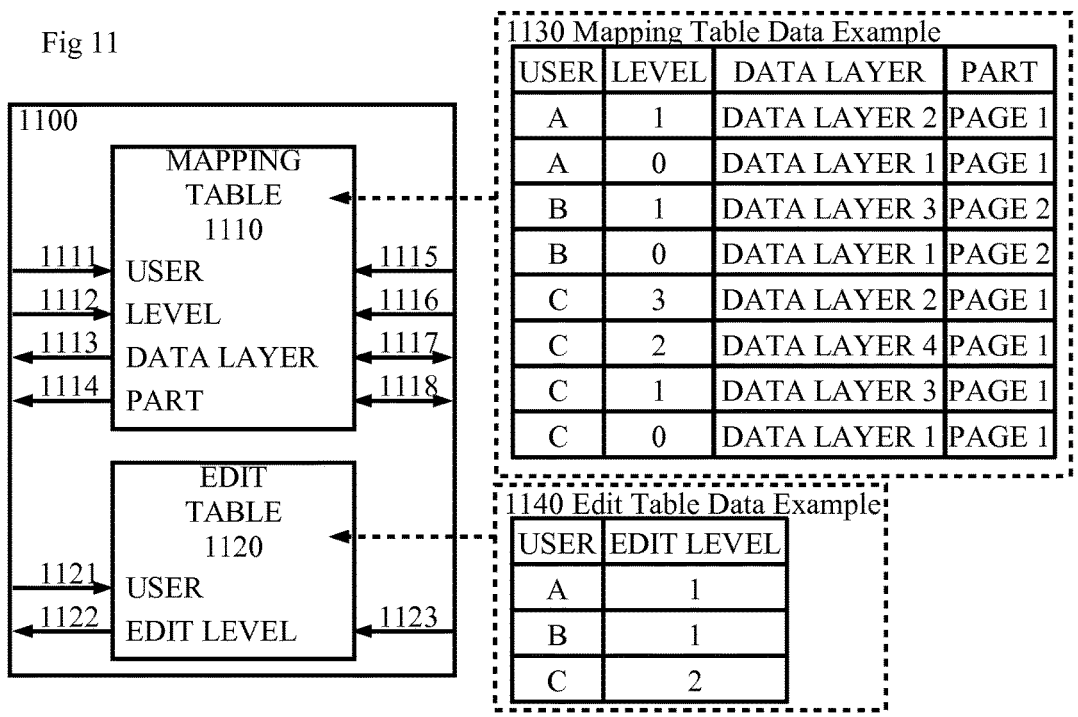
FIG. 11 illustrates an embodiment showing the mapping storage logic with edit logic and layer partitioning for global mapping.

FIG. 11 illustrates an embodiment of the mapping storage logic with Edit Logic and layer partitioning logic for global mapping. This mapping storage logic is used when the Mapping Logic is distributed and therefore each user at each user display-computing appliance is capable of having their own information for their mapping. The Mapping Logic is responsive to the display logic, which determines when to update the display. The display logic selects a particular user and communicates that to user input, 1111. The level input, 1112, is responsive to the display logic which starts with level 0 to obtain the first Data Layer pointer, 1113, and part, 1114, for the first layer of the display. The Network Layer Storage is responsive to the Data Layer pointer and part. The display logic in turn is responsive to the Network Layer Storage and receives the first desired portion of Layer Data. The display logic then increments the level to 1 to obtain the second portion of Layer Data for combining with the first layer for the display. The display logic continues to increment the level and combining the resulting portion of Layer Data with previous portions of Layer Data until an invalid Data Layer pointer is obtained indicating that no more layers are to be included in the display. The ordering of the Data Layers for display, since a layer layered hierarchically for display on top of another one may be different in appearance than the layers ordered the other way. The mapping table, 1110, provides a mapping (such as a pointer or data layer name) to each of the Data Layers that should be used and a description of the part of the Layer Data to use. For instance, one may want to only display the top part of the Data Layer so display mapping layers for the part would indicate that the Data Layer for only the top part be used for display. This Mapping Logic, 1100, also includes an Edit Logic, 1120, (such as a table with control logic) which is used to determine which layer should be used for editing for which user at each user display-computing appliance and when editing is to be allowed. The Edit Logic requires that it be indicated which user it is that the information is wanted for on the edit user input, 1121, and it provides the edit level on edit level output, 1122, which would then be used later in the Mapping Logic (or table) to find the particular pointer to the Data Layer which the changes would then be made to, and stored in. This storage Mapping Logic also includes an input to the Edit Logic (table), 1120, to be able to change the edit level in the Edit Logic for a particular user responsive to the mapping control logic. The Mapping Logic (table), 1110, also has inputs for the user, 1115, level, 1116, Data Layer, 1117, and part, 1118, to allow the mapping control logic to make changes to these mapping tables for the operation of the system. The Mapping Table Data Example, 1130, shows a case where there are 3 users and 4 Data Layers. User A is displaying 2 different layers. User B is displaying 2 layers, 1 of which is shared with user A and B. User C is displaying 4 layers, 1 of which is shared with user A and B, another is shared only with B, another is shared only with A, and the last layer is only displayed by C. In addition, user B is displaying a different part of the layer than either A or C. The Edit Table Data Example, 1140, shows a case, in conjunction with the Mapping Table Data Example, wherein user A is editing Data Layer 2, user B is editing Data Layer 3 and user C is editing Data Layer 4.

Figure 12:
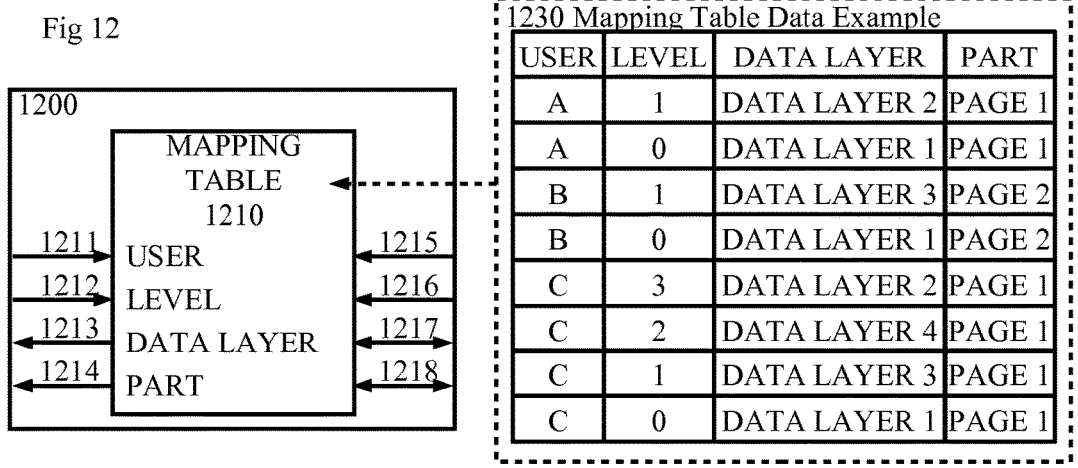
FIG. 12 illustrates an embodiment showing Mapping Logic with layer partitioning for global mapping, alternative to and similar to FIG. 11 with the exception that it does not include the edit logic as shown in FIG. 11.

FIG. 12 illustrates an embodiment of a system with Mapping Logic with layer partitioning for global mapping. This is similar to FIG. 11 with the exception that it does not include the Edit Logic, 1120, that is in FIG. 11. Table 1210 is similar to table 1110. Signals 1211, 1212, 1213, 1214, 1215, 1216, 1217 and 1218 are similar to signals 1111, 1112, 1113, 1114, 1115, 1116, 1117 and 1118 respectively. Other than that, the operation of this is similar to that of the system of FIG. 11. Example data for table 1210 is shown in 1230.

FIG. 13 shows the embodiment of a Mapping Logic for distributed mapping. This is similar to FIG. 12 except that with distributed mapping, there is a separate one of the Mapping Logic included for each user that is included in the user display-computing appliance. However, there is only the one user information in the Mapping Logic or table for each user, and therefore, there is no user input in this mapping table to select an entry by user, since the Mapping Logic in the user appliance all applies to a particular respective user. Again, the Mapping Logic is responsive to the display logic, which determines when to update the display which increments the level to obtain the Data Layer pointers and part information to find the associated part of the associated Data Layer in the correct order to create a combined display. The mapping control logic has input to the Mapping Logic (table) in order to modify the values of the table during operation. Table 1310 is similar to table 1210. Signals 1312, 1313, 1314, 1316, 1317 and 1318 are similar to signals 1212, 1213, 1214, 1216, 1217 and 1218 respectively. Other than that, the operation of this is similar to that of the system of FIG. 12. Example data for table 1310 is shown for three users in 1330, 1331 and 1332.

FIG. 14 shows the embodiment of mapping layer logic with edits and for distributed mapping. Table 1410 operates exactly as Table 1310 in FIG. 13. Edit Table 1420 is similar to operation as Edit Level 1120 except that with distributed mapping, there is a separate one of the Edit Level included for each user that is included in the user display-computing appliance. However, there is only the one user information in the Edit Level for each user, and therefore, there is no user input to select an entry by user, since the Edit Level in the user appliance all applies to a particular respective user. Signals 1122 and 1123 are similar to signals 1422 and 1423 respectively. The edit level provides a mapping for a respective user at a respective user display-computing appliance, which mapping determines which Data Layer is a respective assigned level that the particular user should be using for editing. It should be noted that there is also an ability to put a value in the edit level that would indicate that the user is not able to edit any level. As one example, for no edit permission, the edit level could be set to an invalid level value, and if that value was accessed by the edit Mapping Logic (e.g., mapping table), it would provide an invalid Data Layer pointer, and therefore, no Edit Data Layer would be assigned, and thus, nothing could be edited for that respective user. Example data for table 1410 is shown for three users in 1430, 1431 and 1432. Example data for edit level 1420 is shown for three users in 1440, 1441 and 1442.

Figure 15:
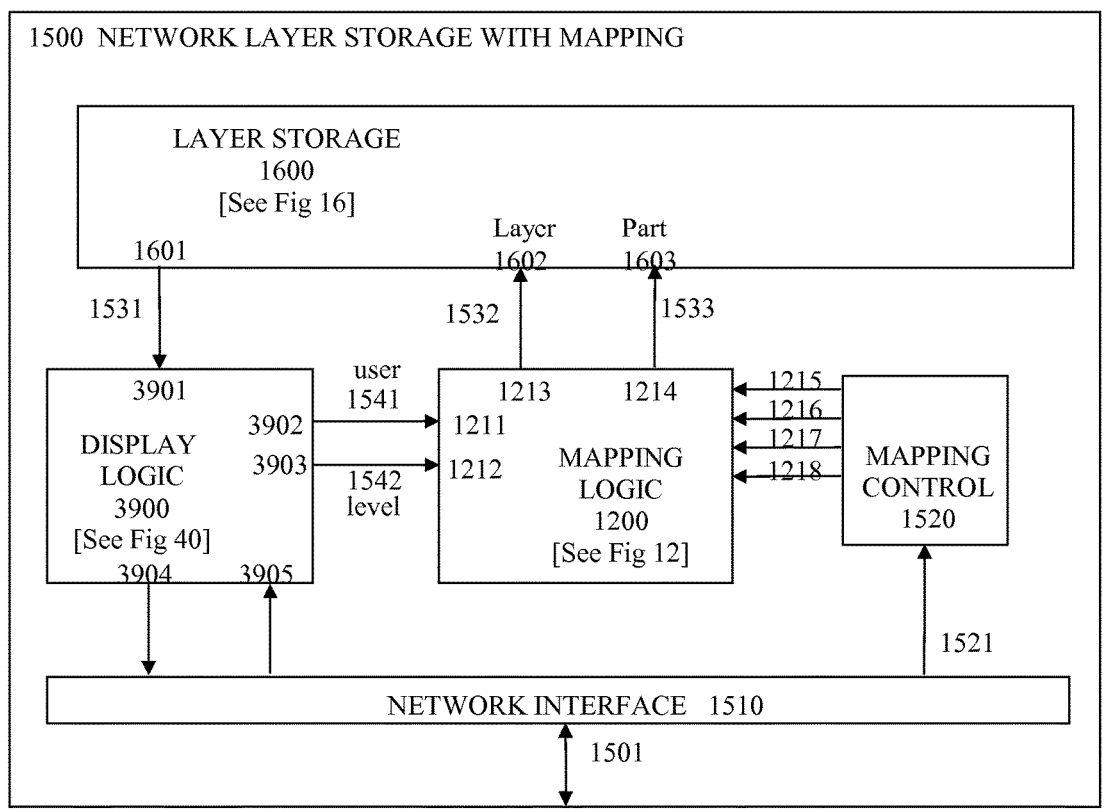
FIG. 15 illustrates the Network Layer Storage with mapping, and with, inter alia, layer storage display logic, which combines the layers dependent on the Mapping Logic.

FIG. 15 illustrates an embodiment of Network Layer Storage with mapping. This embodiment comprises layer storage display logic, which selectively combines for use in display respective selected ones of the layers responsive to the Mapping Logic. Layer data is obtained from layer storage, 1600, (further described in FIG. 16) on data path 1601 which is coupled via 1531 to signal 3901 of the display logic, 3900, (further described in FIG. 39). The desired layer data is selected by signal layer, 1602, and signal part, 1603, which specify which data layer and what part of the data layer to retrieve in layer storage 1600. Signal 1213 is coupled to 1602 via 1532 and signal 1214 is coupled to 1603 via 1533 from the mapping logic 1200 (further described in FIG. 12). The mapping logic, 1200, is setup through the signals 1215, 1216, 1217, and 1218 sent from mapping control, 1520. The mapping control is responsive to messages sent through the connected Appliance Data Network, 1501, translated by the network interface, 1510, and coupled via 1521 to the mapping control, 1520, from a plurality of Control Processors 2550 (see FIG. 25) to allow the Mapping Logic, 1200, to be modified. The Control Processors send messages based on role of the user and the specific embodiment. The modifications of the Mapping Logic, 1200, control which Data Layers are combined for display and their order for each user. The display logic, 3900, (further described in FIG. 39) generates the signal user, 3902 and signal level, 3903, which is coupled to the mapping logic, 1200, to signals 1211 and 1212 via 1541 and 1542 respectively. The layer data retrieved, 3901, previously described herein, is combined into display presentation data for the user on signal 3904. Signal 3904 is coupled to network interface, 1510, that sends the display presentation data via the appliance data network, 1501, to the appropriate display computing appliance. The display logic, 3900, obtains layer data combination parameters via signal 3905 that control how the layer data is combined. Signal 3905 is coupled to the network interface, 1510, which receives the layer data combination parameters from the appliance data network, 1501, from a plurality of Control Processors 2550.

Figure 16:
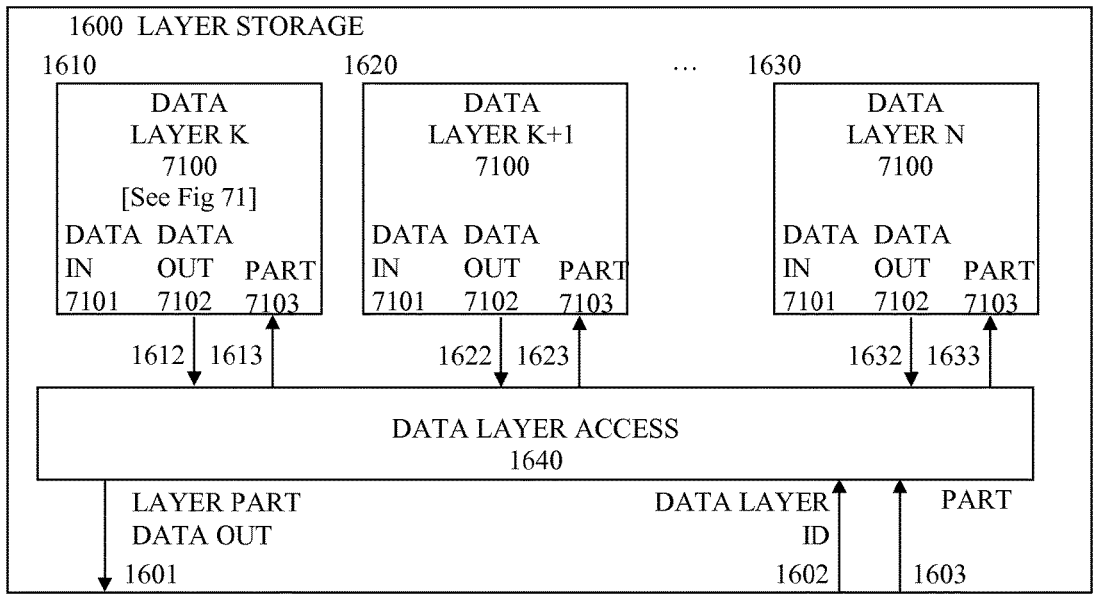
FIG. 16 illustrates details of the Layer Storage (as shown in FIG. 15 and several other illustrated embodiments as illustrated and described elsewhere herein).
Figure 71:
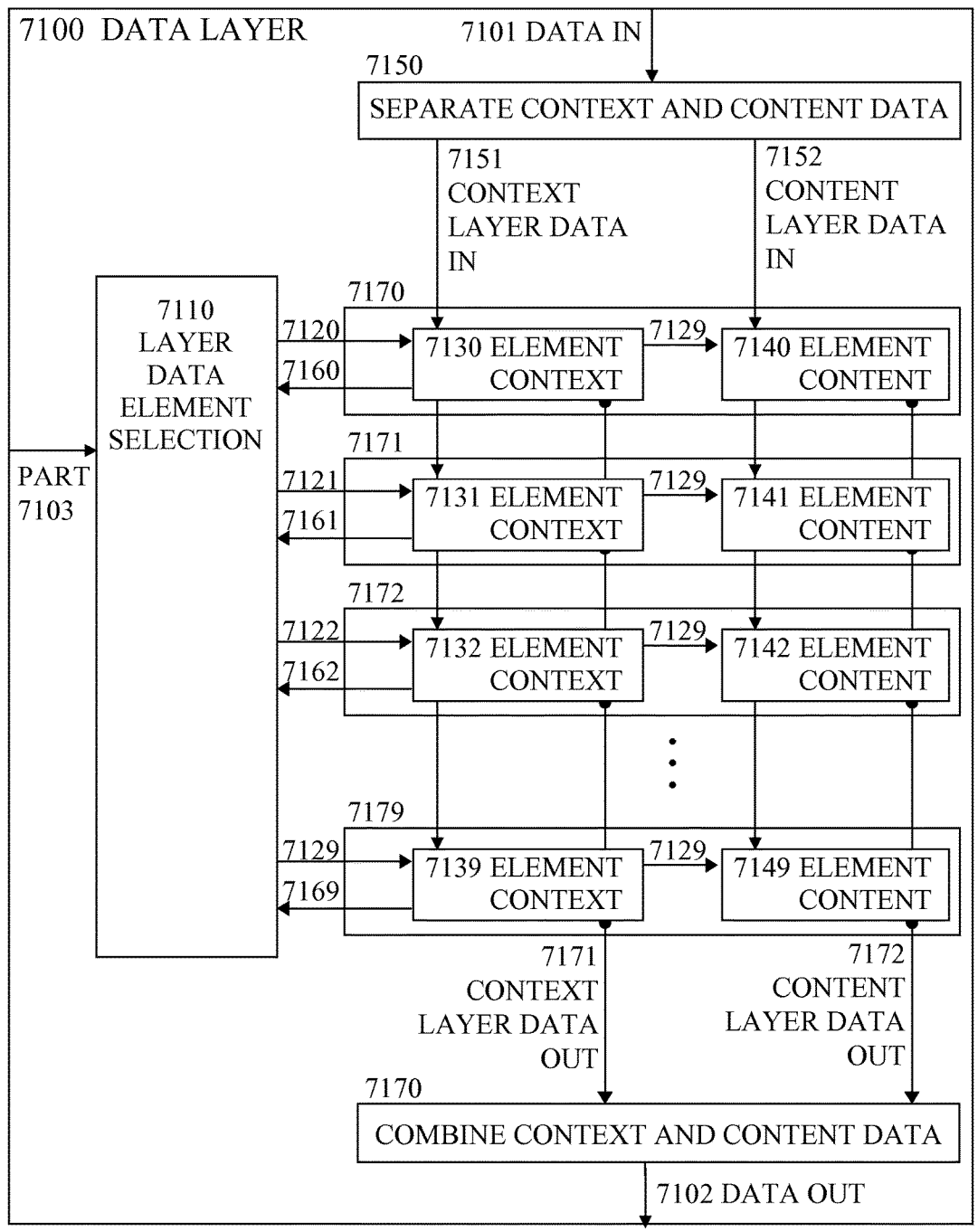
FIG. 71 illustrates Layer Data that contains Layer Data Elements with context and content information.

FIG. 16 illustrates an embodiment of a system showing layer storage, as illustrated and utilized in FIG. 15 and other embodiments. In this embodiment, there are multiple Data Layers, 1610, 1620, 1630, storing Layer Data and there is Layer Data Access Logic, 1610, to allow the system to access a particular Data Layer. The Data Layers, 1610, 1620, 1630 are each illustrated in block 7100 as shown in FIG. 71. Layer Storage 1600 does not use the Data In, 7101, input of Data Layer 7100 in elements 1610, 1620, 1630. The system is not limited to three Data Layers, there may be any number of Data Layers at any given time. The Data Layer Access Logic provides a mapping (e.g., a pointer or data layer name) for a respective particular Data Layer responsive to Mapping Logic, 1200 in FIG. 15 in one embodiment. The Data Layer ID, 1602, input (responsive to the layer output, 1213, FIG. 12, in said embodiment) identifies a particular Data Layer; 1610, 1620, or 1630. The part, 1603, is coupled via 1533 to the part, 1214, that defines a portion of said Layer Data which is communicated via connection 1613, 1623 or 1633 respectively. The data layer access, 1610, is coupled with signals 1602 and 1603. Signal 7103 of 1610 is coupled to 1613. Signal 7103 of 1620 is coupled to 1623. Signal 7103 of 1630 is coupled to 1633. Signal 7102 of 1610 is coupled to 1612. Signal 7102 of 1620 is coupled to 1622. Signal 7102 of 1630 is coupled to 1632. The signal 1603 is sent to one of the signals 1613, 1623 or 1633 depending on the signal 1602. The corresponding data output, 1612, 1622 or 1632, respectively provides a portion of the requested Layer Data which is conveyed to the Layer Part Data Out, 1601, by means of the Data Layer Access, 1610. This provides the means to access a particular Data Layer and provides for output of the respective Layer Part Data Out, 1601, of Layer Data.

Figure 17:
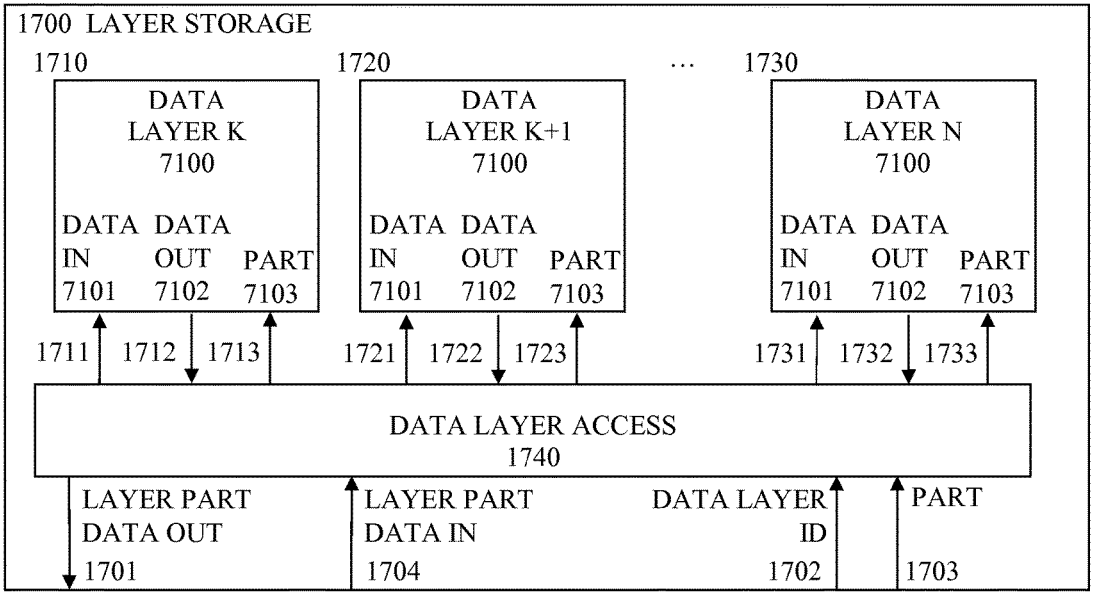
FIG. 17 shows an embodiment of Layer Storage with edit logic.

FIG. 17 illustrates an embodiment of a layer storage with Edit Logic for edits. This is used in various embodiments. It is similar to FIG. 16 with all the same functions of FIG. 16, plus with the addition of the ability to accept change data for a portion of a for a specific Data Layer. In this embodiment, there are multiple Data Layers, 1710, 1720, 1730, (similar to 1610, 1620, 1630 in FIG. 16) storing Layer Data and there is Layer Data Access Logic, 1710, (similar to 1610 in FIG. 16) to allow the system to access a particular Data Layer. The Data Layers, 1710, 1720, 1730 are each an instance of subsystem 7100 as illustrated in FIG. 71. The system is not limited to three Data Layers, there may be any number of Data Layers at any given time. The Data Layer ID input, 1702, and Part input, 1703, are responsive to the Mapping Logic, 1100, Mapping Control, 1820, and Layer Edit Logic, 4000, in one embodiment described in FIG. 18. The Layer Part Data Out, 1701, provides the current state of the portion of Layer Data described by inputs 1702 and 1703. The Layer Part Data In, 1704, is change data responsive to the Layer Edit Logic's, 4000, output, 4002, (in said embodiment) is used to replace the portion of Layer Data. Layer Part Data In, 1704, is result of processing by the Layer Edit Logic, 4000, (in said embodiment) to modify the specified contents of the portion of Layer Data with changes responsive to user input. Data Layers may be created at any time by the system by specifying a Data Layer ID that does not exist in Layer Storage 1700 and providing Layer Part Data In, 1704. A Data Layer, 1710, 1720, 1730, will be eliminated when a Data Layer has contains no Layer Data. If the Data Layer ID, 1702, identifies a non-existent Data Layer then Layer Part Data Out, 1701, contains no data. Data layer access, 1710, uses the data layer id, 1702, to select on of the data layer storage subsystems, 1710, 1720 or 1730. The layer part data in, 1704, and part, 1703 are coupled by data layer access, 1710, to the aforementioned selected subsystem, 1710, 1720 or 1730 and coupled to the corresponding data in and part inputs, 7101 in 1710 via 1711 and 7103 in 1710 via 1713, 7101 in 1720 via 1721 and 7103 in 1720 via 1723, or 7101 in 1730 via 1731 and 7103 in 1730 via 1733. The selected subsystem 1710, 1720 or 1730 modifies a portion of the layer data stored within based on the change data on data in, 7101 and the part, 7103, specifying the portion.

Figure 18:
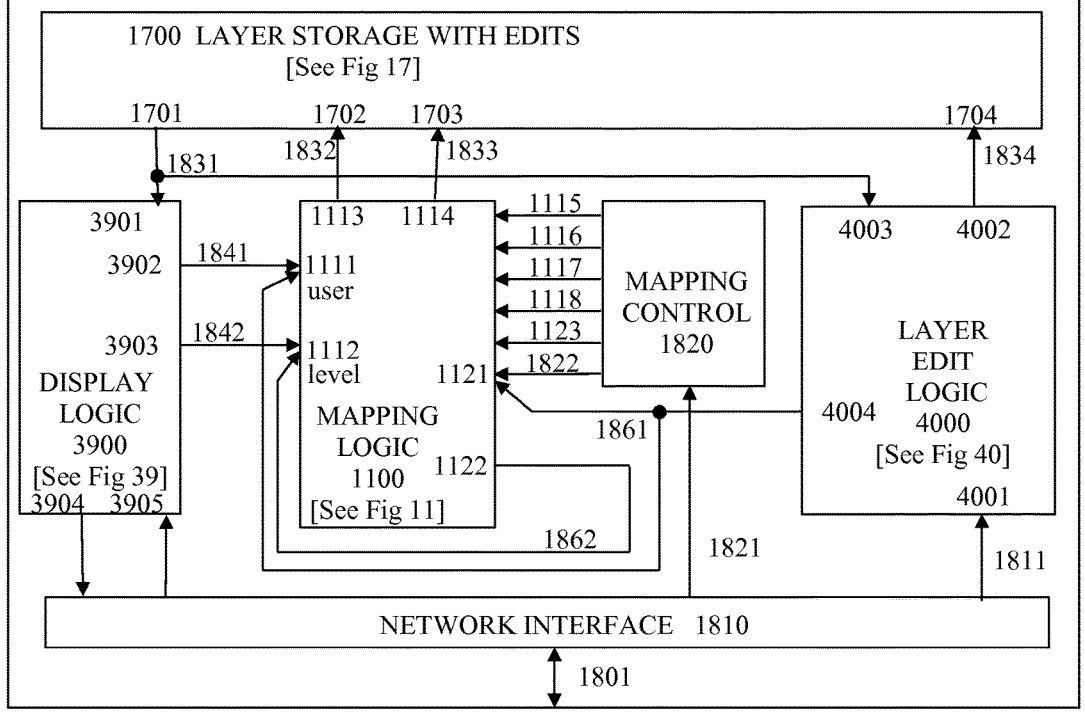
FIG. 18 shows an embodiment of a Network Layer Storage with Mapping Logic and edit logic.

FIG. 18 illustrates an alternate embodiment of the present invention, showing a system that is similar to FIG. 15 but with the addition of Layer Edit Logic, 4000, which provides for the network interface, 1810, to receive information defining permission to allow a respective selected Data Layer to be edited and provides the information on which Data Layer to edit and communicates change data from the respective user at the respective user display-computer appliance for storage in the respective Data Layer in the layer storage with edits 1700. The change data is received via the appliance data network, 1801, from a display computing appliance (see FIG. 5 or 6) which is coupled to the network interface 1810 that sends the change data via 1811 which is coupled to the Layer Edit Logic 4000, via 4001. The Layer Edit Logic is responsive to the change data provided on input 4001. This initiates a series of events. First, the user information is stripped from the change data request and output on 4004 and connected to the Mapping Logic, 1100, via 1861 to inputs 1121 and 1111. Inputs 1121 and 1111 are shared and each can independently trigger a request for the edit level. The Mapping Logic outputs the edit level on 1122 and is coupled to the level input, 1112, again a shared input via 1862. Now that the level and part are provided on inputs 1111 and 1112, the Mapping Logic outputs Layer Data pointer and part on outputs 1113 and 1114. These are connected to inputs 1702 and 1703 respectively. The layer storage is responsive to these inputs and outputs the edit portion of Layer Data on output 1701. This is information is conveyed via 1831 to input 4003 of the Layer Edit Logic, 4000. The Layer Edit Logic combines the edit portion of Layer Data with the change data and outputs the modified portion of Layer Data on 4002 which is coupled to 1704 via 1834. Finally, the layer storage with edits replaces the edit portion of Layer Data with the modified portion of Layer Data. The rest of the operation is similar to 1500 in FIG. 15. The signals 1701, 1702, 1703, 1111, 1112, 1113, 1114, 1115, 1116, 1117, 1118, 1801, 1821, 1831, 1832, 1833, 1841 and 1842 in FIG. 18 are similar in operation to 1601, 1602, 1603, 1211, 1212, 1213, 1214, 1215, 1216, 1217, 1218, 1501, 1521, 1531, 1532, 1533, 1541 and 1542 in FIG. 15 respectively and are described in detail in FIG. 15. In addition, subsystem 1700 in FIG. 18 is similar in operation to subsystem 1600 in FIG. 15 for retrieving layer data to generate the display and is described in detail in FIG. 15.

Figure 19:
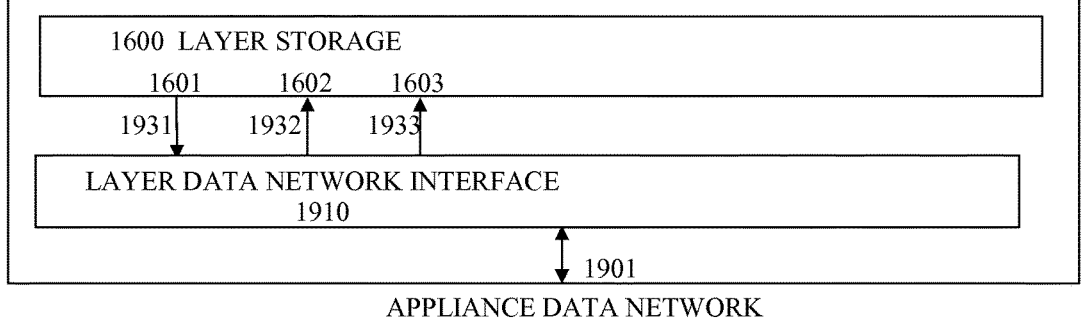
FIG. 19 shows an embodiment of a Distributed Layer Storage, with basic Layer Storage with a Layer Data network interface that allows it to communicate with the user display appliances and contains Layer Storage 1600.

FIG. 19 illustrates an alternate embodiment of the present invention showing Distributed Layer Storage. As illustrated in FIG. 19, layer storage, 1600, is illustrated with Data Layer network interface, 1910, that allows the layer storage to communicate with the user display computing appliance as shown in two embodiments in FIGS. 3 and 4. These embodiments are similar to the embodiments shown in FIGS. 1 and 2 respectively except that the Display Logic, 3900; Mapping Logic, 1300; and Mapping Control, 2420, is now located in the Display Computing Appliance, 2400. Layer Part Data Out, 1601 is coupled via 1931 to the layer data network interface, 1910, and then to network 1901 that is coupled (in FIG. 3 or 4 and 24) to the Display Logic, 3900 in one of the specific Display Computing Appliances; 310, 320, 330 or 410, 420, 430. The display computing appliance receiving the layer data is the same as the Display Computing Appliance that sends to the data Layer, 1313, and Part, 1314. Signals 1313 and 1314 are coupled through the appliance data network, 1901, (see FIG. 3 or 4 and 24) and coupled via the layer data network interface, 1910, to 1602 via 1932 and 1603 via 1933. The effective operation illustrated in FIG. 19 is the same in FIG. 15 except that the display logic, mapping logic and mapping control are moved from the the layer storage and into the display computing appliance.

Figure 20:
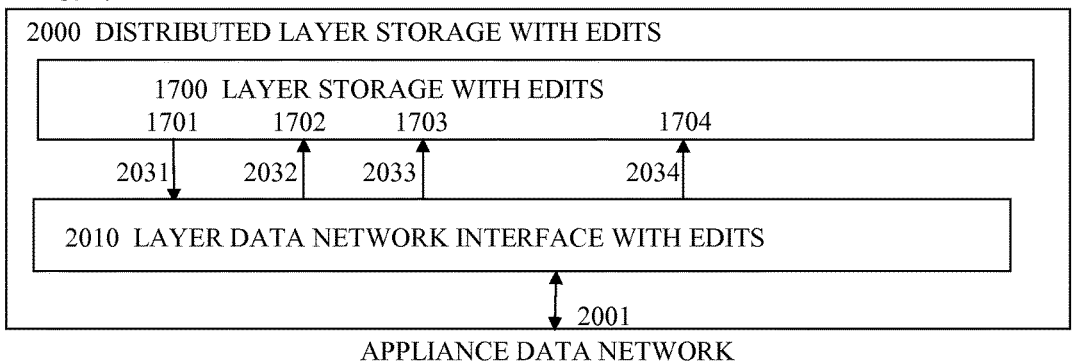
FIG. 20 illustrates an embodiment of Distributed Layer Storage structure with edit logic providing an embodiment with logic to allow the Layer Storage to be modified for editing.

FIG. 20 illustrates an alternate embodiment showing a system having Distributed Layer Storage structure with edit logic. This is similar to that shown in FIG. 19. However, this illustrated embodiment includes edit logic within Layer Storage With Edits, 1700, to selectively allow respective Data Layer in the layer storage to be modified for editing, permitting a respective user at a respective user display-computing appliance to make edits. The change data is output on 4002 in display computing appliance 2700 or 4102 in display computing appliance 2800 and coupled to the appliance data network, 2001 (see details in FIGS. 8 and 27 or FIGS. 10 and 28). The change data is coupled from the layer data network interface 2010 via 2034 to 1704. Similar to subsystem 1900, the signals 1702 and 1703 are similarly coupled from the display computing appliance via coupling 2032 and 2033 respectively to provide the layer storage with edits, 1700, the data layer and part to modify the storage based on the change data. The signals 2031, 2032, 2033 and 2001 are similar in operation to signals 1931, 1932, 1933 and 1901 for retrieving layer data and described in detail in FIG. 19. The effective operation illustrated in FIG. 20 is the same in FIG. 18 except that the display logic, mapping logic, layer edit logic and mapping control are moved from the the layer storage and into the display computing appliance.

Figure 21:
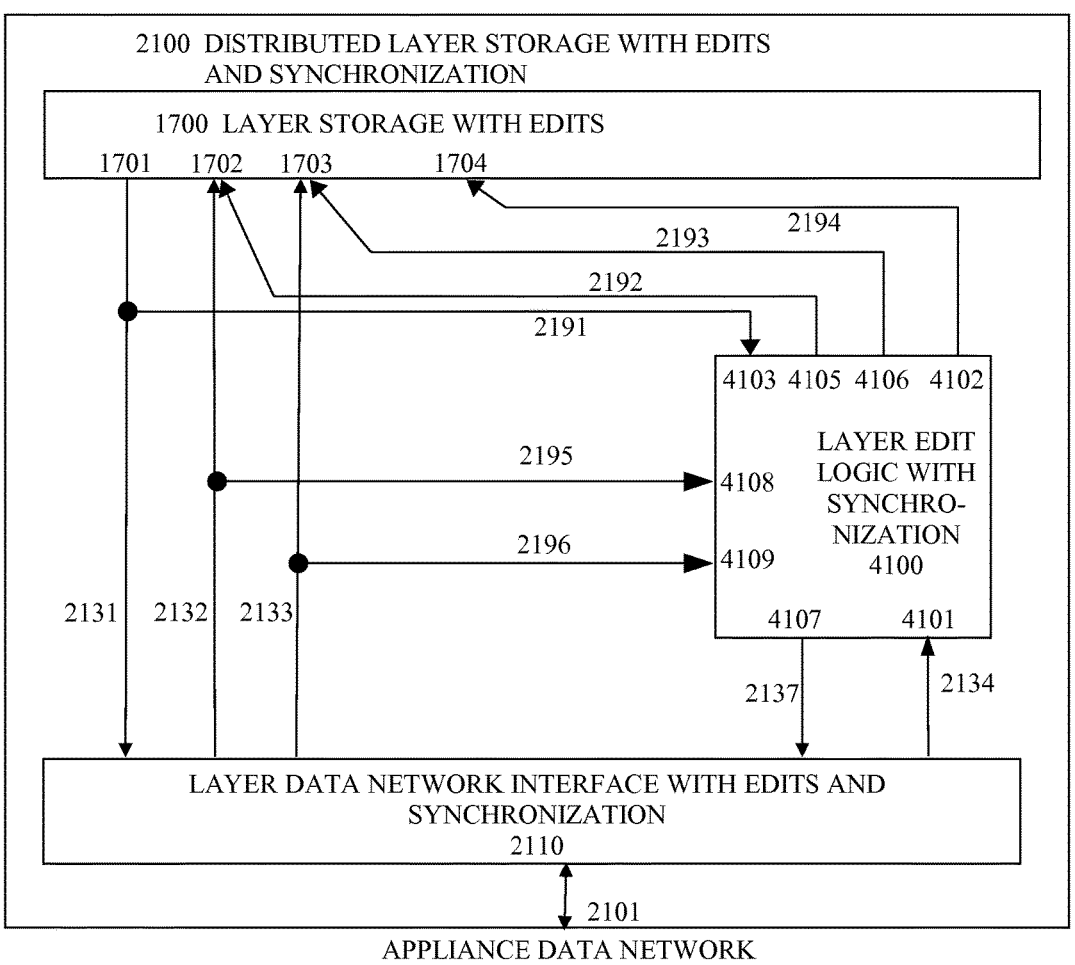
FIG. 21 shows the embodiment of a Distributed Layer Storage structure with edit logic and synchronization, similar to FIG. 20 with the addition that there is synchronization logic added so that when edits are made to a particular layer then those changes are communicated to other distributed Network Layer Storage elements to maintain the data in the proper defined layer at all places where that information needs to be stored.

FIG. 21 shows another embodiment of the present invention, showing a Distributed Layer Storage structure with edit logic and synchronization logic. This is similar to FIG. 20, with the addition of synchronization logic so that when edits are made to so as to change the Layer Data as stored in a particular layer of the Data Layers, then those changes are selectively communicated to other distributed Network Layer Storage elements for local storage of the respective change in the respective particular layer of the respective local Data Layers, so as to maintain the Layer Data in the respective Data Layer in all the places that that Data Layer is stored. Since in this embodiment, a respective particular layer can be stored in multiple elements, the system needs to have all those elements synchronized and updated so as to contain the same data, and the synchronization logic maintains that data integrity. The signals 2131, 2132, 2133, 2134 and 2101 are similar in operation to signals 2031, 2032, 2033, 2034 and 2001 for retrieving layer data and editing layer data and described in detail in FIG. 20. The only difference is that the change data, 2134, is coupled through the layer edit logic, 4100, to 4102 and then coupled by 2194 to layer data in, 1704. The synchronization logic in 4100 outputs change data information on 4107 and is coupled by 2137 to the layer data network interface, 2110, to send the change data information on the appliance data network, 2101, to the other layer storage locations that may have duplicate data layers so the layer data remains identical. When 2134 receives change data from synchronization logic in another layer storage, the synchronization logic, 4100, separates out the layer to sync, on 4105 and part to sync, 4106. The current layer data 4103 is responsive to 4105 and 4106 by coupling 4105 to 1702 via 2192 and coupling 4106 to 1703 via 2193. 1701 is responsive to 1702 and 1703. 1701 is coupled to 4103 via 2191. Finally, 4102 is responsive to both 2134 and 4103 and is coupled to 1704 via 2194 which replaces the change data in the layer storage, 1700. The effective operation illustrated in FIG. 21 is the same in FIG. 22 except that the display logic, mapping logic and mapping control are moved from the the layer storage and into the display computing appliance but the layer edit logic with synchronization remains in the layer storage.

The synchronization logic can operate in different synchronization modes. There are 3 illustrated modes: one is a change sync mode, which allows all the changes made to the respective Layer Data in a respective Data Layer responsive to a respective user's edits, to be communicated to all layer storage locations that are storing the same layer regardless of user. In the full sync layer mode, all Layer Data in a respective Data Layer is communicated to all layer storage locations that are storing the same layer regardless of user. This mode is usually used only infrequently and at one location. There are times when the synchronization fails due to network failures, some layer storage not being available during operation and other failures. In this case, the best copy of the layer storage needs to be communicated with the layer storage that is not synchronized with the other layer storage, i.e., the layer storage is not an exact duplicate and the synchronization logic has lost track of what to do. This mode restores the synchronization and then the mode can be returned to the normal state of Change Sync Mode. The Full Sync Mode requires significant bandwidth to communicate all Layer Data to all the duplicate copies and is generally impractical to always perform so is only done when necessary. The last mode is the No Sync Mode which turns off the synchronization for a particular layer storage location. This could be used for a graceful way to remove layer storage from the system or to make changes offline and then implement them quickly by making changes to this layer storage then changing the mode to Full Sync Mode, and finally back to Change Sync Mode. Each layer storage location and Data Layer stored in said location can be set to one of these modes independently. However usually all are set to Change Sync Mode.

Figure 22:
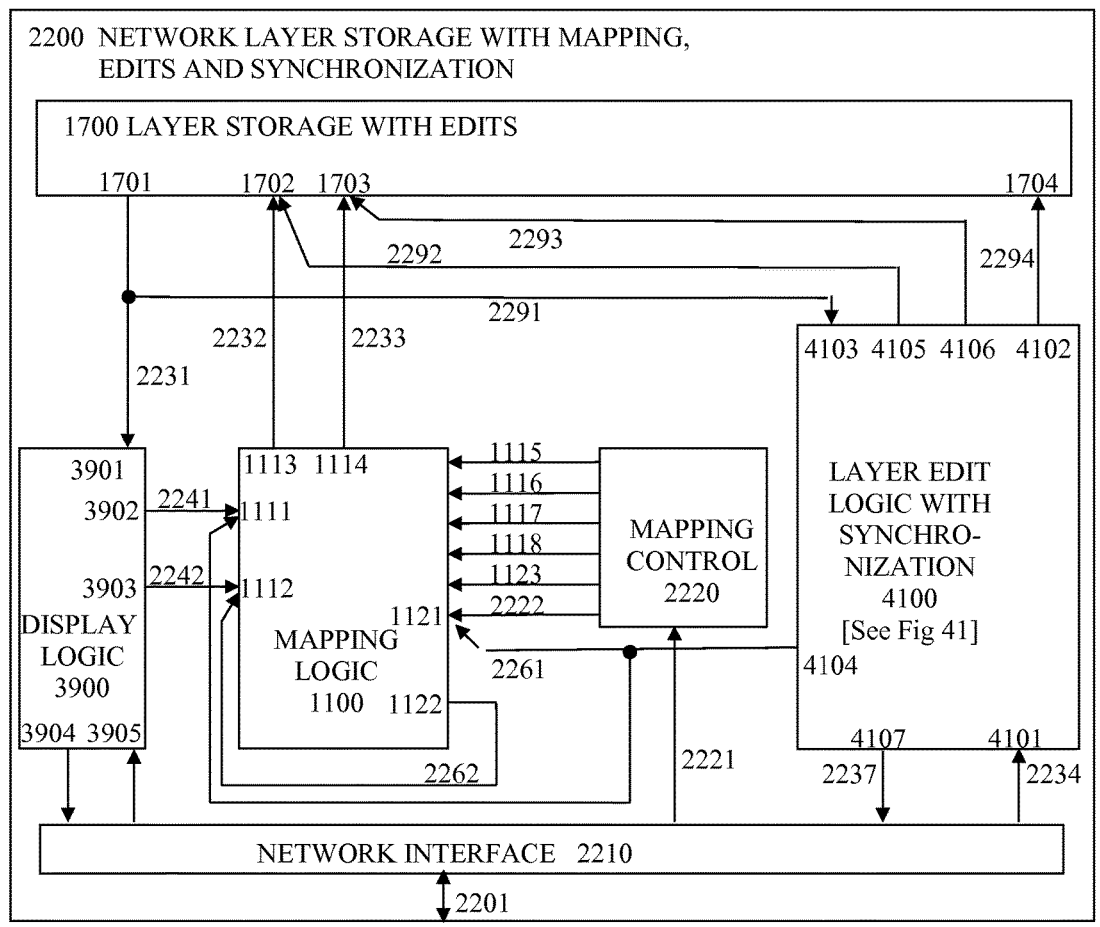
FIG. 22 is similar to FIG. 18 and contains all of the elements and functions of FIG. 18, with the addition of synchronization logic which, similar to FIG. 21, maintains data integrity across Network Layer Storage elements as in FIG. 18.

FIG. 22 illustrates an alternate embodiment of the present invention, showing a system similar to FIG. 18, but with the addition of synchronization that involves signals which, similar to FIG. 21, maintains the data integrity across the distributed Network Layer Storage elements as in FIG. 18. Signals 2211, 2231, 2232, 2233, 2241, 2242, 2222, 2261, 2262, 2201 in FIG. 22 are similar to 1811, 1831, 1832, 1833, 1835, 1836, 1822, 1861, 1862, 1801 respectively in FIG. 18 and are discussed in detail there. Signals 2291, 2292, 2293, 2294, 2234 and 2237 in FIG. 22 are similar to signals 2191, 2192, 2193, 2194, 2134 and 2137 respectively in FIG. 21.

Figure 23:
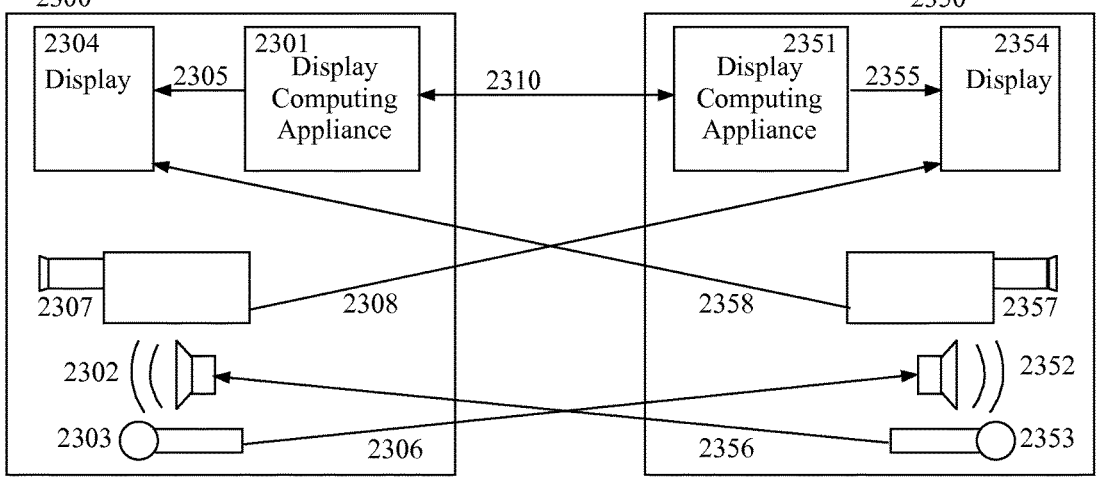
FIG. 23 illustrates simultaneous document collaboration, video, voice and audio communications.

FIG. 23 illustrates an embodiment of the present invention wherein simultaneous document collaboration, video, voice and audio communications occur in the same system. Illustrated in FIG. 23 are two multimedia collaboration systems 2300 and 2350. Contained within the multimedia collaboration systems is a display computing appliance, 2301 and 2351 respectively. The display computing appliances communicate via connection 2310. Such communication is detailed elsewhere in this document as described in FIGS. 1 through 10 and elsewhere herein. A display, 2304 and 2354 respectively, is contained in each multimedia collaboration system. The output of the display computing appliance 2301 is coupled to the display 2304 via signal 2305. Likewise, the output of the display computing appliance 2351 is coupled to the display 2354 via signal 2355. The displays provide a visual output for the user of each display computing appliance. A speaker, 2302 and 2352 respectively, a microphone, 2303 and 2353 respectively, and video camera, 2307 and 2357 respectively, are contained in each of the collaboration systems. Microphone, 2303, is cross coupled via 2306 with the speaker, 2352. Likewise, microphone, 2353, is cross coupled via 2356 with the speaker, 2302. This system of speakers and microphones allows the users of the collaboration systems to carry on an voice conversation while using the display computing appliances 2301 and 2351. Video camera 2307 is coupled to the display 2354 via signal 2308. Video camera 2357 is coupled to the display 2304 via signal 2358. The display, 2304, will simultaneously provide a video output from signals 2305 and 2358. Likewise, the display, 2354, will simultaneously provide a video output from signals 2355 and 2308. The video along with the voice provides for a simultaneous video conferencing ability along with the display computing appliance's document collaboration.

This illustration shows both voice and video used simultaneously with the display computing appliances. However, only the voice or the video could be used with the display computing appliance. The connections 2306, 2356, 2308, 2358 and 2310 can be separate physical connections or can be combined in a single, fewer, or networking type physical network connections. The signals 2306, 2356, 2308 and 2358 can be analog or digital in nature. Other multimedia collaboration systems can be added with voice and video capabilities. In cases of 3 or more multimedia collaboration systems, the microphone and camera signals, similar to 2306 and 2308, can be optionally coupled to the display and speakers of one or a plurality of other multimedia collaboration systems providing video conferencing capabilities for more the one user. In addition, the source for the audio could be provided by another source other than a microphone such as a digital audio file, video file, tape recorder, MIDI file or other audio source. Likewise, the video does not need to be supplied by a video camera and could be provided by a digital video file, video tape, or other video source.

Figure 24:
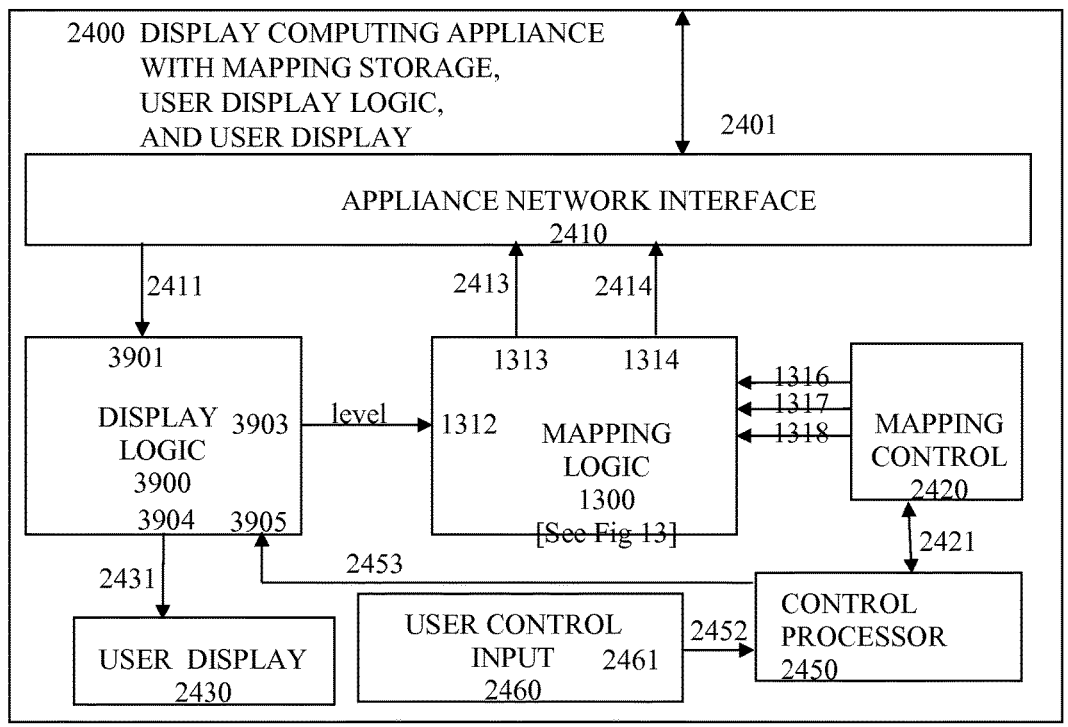
FIG. 24 illustrates an embodiment of the display-computing appliance with mapping storage, user display logic and a user display.

FIG. 24 illustrates another embodiment of the present invention, showing a system comprising a display computing appliance with Mapping Logic, an appliance network interface, user display logic, Control Processor, and a user display, (also referred to as a user appliance). This user appliance accesses the network storage through the appliance network interface, 2410, which is coupled with the appliance data network, 2401, that is coupled to network layer storage, 1900. (See FIGS. 3, 4 and 19) The Mapping Control, 2420, is coupled responsive to the Control Processor, 2450, via 2421, which is used to control the operation of the user appliance by defining the Data Layers and parts used to make up the display to the user. The Mapping Logic, 1300, is responsive to and modified by mapping control, 2420, coupled via level 1316, data layer 1317 and part 1318. The mapping control sets the level and can obtain the value of the data layer and part which would then be reported back to the control processor. Also the mapping control can set the level and set the value of the data layer and part obtained from the control processor. The display logic, 3900, is responsive to the Control Processor, 2450, for setup. The portion of Layer Data is responsive to a the Mapping Logic, 1300, which in turn is responsive to the display logic, 3900, via level, 3903, coupled to 1312. The Mapping Logic, 1300, is responsive to level on 1312, and outputs a Layer Data pointer, 1313, and part, 1314, which is coupled to layer storage via the appliance network interface, 2410, and the connected Appliance Data Network connector, 2401. The display logic is also responsive to portion of Layer Data from layer storage coupled by the connected Appliance Data Network connector, 2401, appliance network interface, 2410, and data path 3901. In this manner the display logic changes the level, 3903, and obtains layer data on 3901 which is used to build a display presentation for output on 3904. The display presentation, 3904, is coupled via 2431 to the user display, 2430. The user control input, 2460, provides input via mouse, keyboard, touchscreen, voice recognition, video recognition and other devices to provide user control of the operation of the system. The user input is coupled to the control processor, 2450, via 2452.

Figure 25:
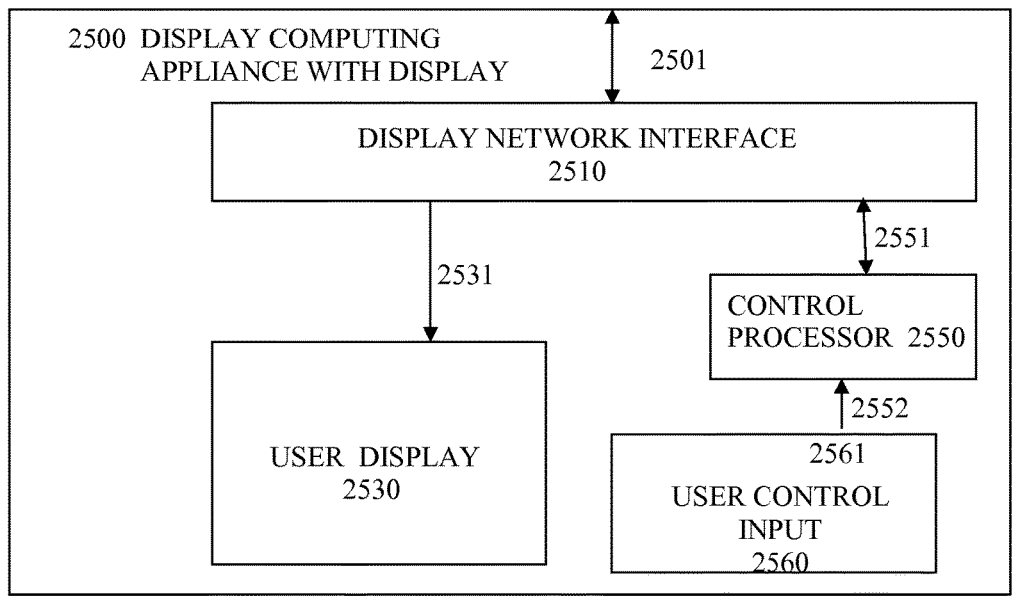
FIG. 25 illustrates a display-computing appliance with display, where the user appliance has an interface to access network storage that's stored elsewhere, and a user display.

FIG. 25 illustrates another embodiment of the present invention, showing a system comprising a display computing appliance with display, 2530, Control Processor, 2550, and an interface, 2510, (also referred to as a basic user appliance) to access network storage, Mapping Logic, display logic and mapping control via the connected Appliance Data Network. This particular embodiment requires that the network storage also provide logic to provide an output defining a combined display of various Data Layers for a local display on a respective basic user appliance for a particular respective user. The User display receives a display presentation from the display network interface, 2510, coupled by 2531. The display network interface receives the display presentation from the coupled appliance network 2501 which is coupled to network layer storage, 1500 (see FIGS. 1, 2 and 15.) The user control input, 2560, provides input via mouse, keyboard, touchscreen, voice recognition, video recognition and other devices to provide user control of the operation of the system. The user input is coupled to the control processor, 2550, via 2552. The control processor is coupled with other control processors in the system (see FIGS. 1 and 2) via signal 2551 coupled with the display network interface, 2510, and the appliance data network, 2501. The control processor is also coupled with network layer storage, 1500, in the system (see FIGS. 1, 2 and 15) via signal 2551 coupled with the display network interface, 2510, and the appliance data network, 2501.

FIG. 26 illustrates an alternate embodiment of the present invention, showing a display-computing appliance with display, 2630, Control Processor, 2650, and input device, 2640. This is similar to FIG. 25 with the addition of an user input device at the user display-computing appliance which user input device is used to communicate with the network storage to provide communication of changes to respective Layer Data in a respective Data Layer in the network storage. The signals 2652, 2651, 2631 and 2601 are similar to 2552, 2551, 2531 and 2501 respectively in FIG. 25 and are described in detail therein. FIG. 26 uses network layer storage, 1800 or 2200 (see FIG. 18 or 22 instead of 15). display computing appliance, 2600, is included in embodiments illustrated in FIGS. 5, 6 and 7 instead of FIGS. 1 and 2. There is an additional coupling from the user control and annotation input device, 2640, via 2641 to the display and input network interface, 2610. User supplied changes for the document are sent on this path and then are coupled via the appliance data network, 2601, to the layer edit logic in network layer storage, 1800 or 2200 (see FIGS. 5, 6, 7, 18 and 22). The user input device provides an interface between the user and the system to provide data of various types for changes to Layer Data. Textual data can be provided with a physical keyboard, virtual keyboard on a touch screen, virtual keyboard using a mouse, mouse gestures, camera gesture recognition, voice recognition, import from a file or network data transfer and other means. Images are provided by mouse, touchscreen input, stylus and digitizer input, camera, and import of images from a file or network data transfer in the form bitmap images such as JPEG, TIFF, PNG, GIF and many other formats, vector drawings, 2D and 3D models and other means. Video is provided by camera, and import of video from a file or network data transfer in the form of a sequence of images or computer simulations such as AVI, MPG, FLV, M1V, M4P, MOV, MPEG, OGG, VOB, WMV, DirectX, OpenGL, many other formats and other means. Audio is provided by microphone, and import of video from a file, CD, DVD, iPod, MP3 player, cell phone or network data transfer in the forms such as WAV, WMA, AIFF, the audio portion of aforementioned video, many other formats and other means.

FIG. 27 illustrates another embodiment of the present inventions, showing a display-computing appliance with Mapping Logic, 1400, mapping control, 2720, user display logic, 3900, Control Processor, 2750, user display, 2730, user input device, 2740, and Layer Edit Logic, 4000, for a respective user. This embodiment is similar to FIG. 24 with the addition of a user input device and Layer Edit Logic to allow a user of the display-computing appliance to make changes to the Layer Data that is communicated to the layer storage. This embodiment also contains Mapping Logic utilized for that respective user and the display logic for that respective user, and the user display device to provide a presentation responsive to the display logic. The synchronization for the system is performed in the network layer storage with edits and synchronization, 2100. See FIGS. 9 and 21 for the rest of the system. The user control and annotation input device, 2740, is coupled with the control processor, 2750, via 2752 to all the user to control various aspects of the system. The user control and annotation input device is also coupled via 2741 to the layer edit logic, 4000, to provide user changes to the document presented on the user display, 2730. The layer edit logic uses the current layer data, on 4003, which is coupled via 2791 to the appliance network interface with edits. The current layer data is obtained when accessing layer data for the display presentation, detailed later. The layer edit logic combines the user changes to the document with the current layer data and outputs the change data on 4002 and sends it via coupling 2715 to the appliance network interface with edits, 2710. The appliance network interface with edits in turn sends the change data to the network layer storage with edits and synchronization, 2100 (see FIGS. 9 and 21) to change the layer data that is stored. The control processor is responsive to other control processors in the system and the global control processor, 990, via the coupling of the control processor to the appliance network interface with edits, 2710, via 2751 and the appliance data network, 2701. The mapping control 2720 is responsive to setups from the control processor, 2750, via 2721. The display logic 3900 is responsive to setups from the control processor via 2753. The mapping logic, 1400, is responsive to the mapping control, 2720, via 1416, 1417, 1418, 1423 as described in FIG. 14. The mapping logic uses the output from 1422 coupled to the level, 1412, to look up the data layer, 1413, and part, 1414, when user changes to the document are being processed in layer edit logic, 4000, so the current layer data is available on 2791 for editing. The display logic, 3900, also sets the level, 3903, for creating the display presentation. The mapping logic uses this output from 3903 coupled to the level, 1412, to look up the data layer, 1413, and part, 1414. The data layer is coupled by 2713 to the appliance network interface with edits, 2710, to the appliance data network, 2701, which is coupled to 1702 in the network layer storage, 1800 (see FIGS. 9 and 18). Likewise, part is coupled by 2714 to the appliance network interface with edits, 2710, to the appliance data network, 2701, which is coupled to 1703 in the network layer storage, 1800. If there are multiple network layer storage instances such as 940, 950, 960 shown in FIG. 9, then the control processor and appliance network interface with edits determine which of the instances to communicate with on the appliance data network. The requested layer data responsive to data layer and part is output on 1701 in the selected network layer storage, 2100. The layer data is coupled to the appliance data network, 2701 and the appliance network with edits, 2710, couples the layer data to 3901 via 2711 for the display or 4003 via 2791 for edits. The display logic combines the layer data for each level and outputs the display presentation on 3904. The display presentation is coupled to the user display, 2730, via 2731.

Figure 28:
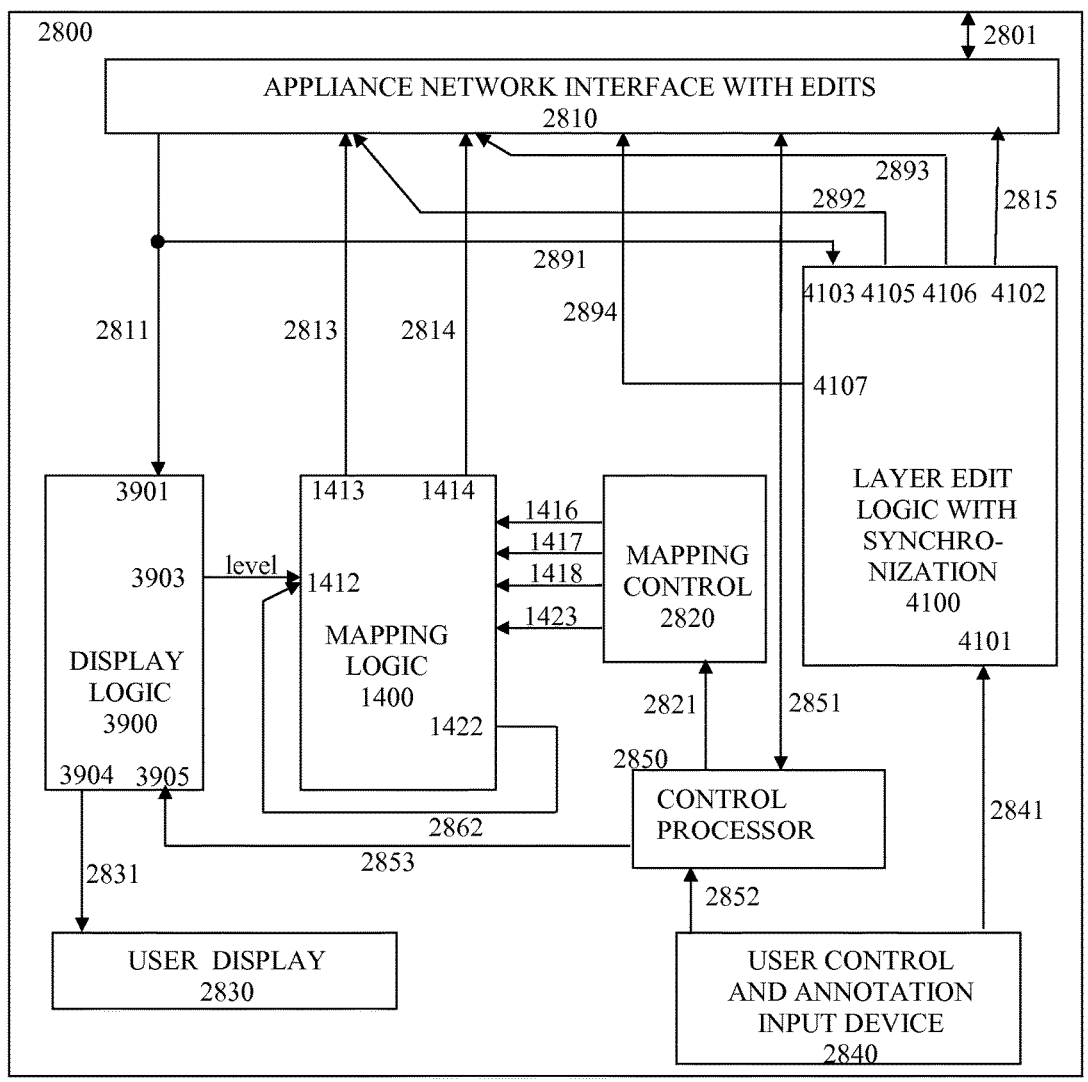
FIG. 28 illustrates an embodiment of a display computing appliance with mapping storage, user display logic, user display, user layer editing logic and synchronization logic, similar to FIG. 27 with the addition of synchronization logic.

FIG. 28 illustrates an alternate embodiment of a display-computing appliance with Mapping Logic, 1400, mapping control, 2820, user display logic, 3900, user display, 2830, user Layer Edit Logic with synchronization, 4100. This embodiment is similar to FIG. 27, with the addition of synchronization as in FIG. 22. The signals 2892, 2893 and 2894 in FIG. 28 are similar to signals 2292, 2293 and 2294 are used for synchronization as described in FIG. 22. The signals 2841, 2852, 2851, 2853, 2862, 2831, 2811, 2813, 2814, 1416, 1417, 1418, 1423 and 2801 in FIG. 28 are similar signals 2741, 2752, 2751, 2753, 2762, 2731, 2711, 2713, 2714, 1416, 1417, 1418, 1423 and 2701 respectively in FIG. 27. This embodiment is used when synchronization is not part of the network data storage, but is instead distributed and contained in every user appliance. It is then the responsibility of each user appliance to communicate changes to all other locations (e.g., other user appliances) of Network Layer Storage to make changes to a respective particular layer if that respective particular layer is it stored in multiple locations.

FIG. 29 illustrates an example of a setup of the Mapping Logic as embodied in Mapping Logic, 1400, as illustrated in FIG. 14 for a music team where the Mapping Logic is distributed in each display computing appliance. This example has two display computing appliances, leader 1 and leader 2, in the leader role and two display computing appliances, member 3 and member 4, in the member role. All the Control Processors on the team of display computing appliances are responsive to a Control Processor in display computing appliance that is assigned a leader role. The Control Processors add the Data Layer of the leader display computing appliance that is being edited to their mapping control to be displayed. Thus a leader always has their layer displayed on all appliances in the team. This example has two leaders so both are displayed. Leader 1 is displaying a common layer, optional 2 layer, optional 1 layer, leader 2 layer and leader 1 layer. The leader 1 layer is being edited by leader 1 because the edit level is set to 4 and the leader 1 layer is level 4 in the mapping table. The user of leader 1 does not see the optional 3 layer, member 3 layer or member 4 layer because they are not in the mapping table. Leader 2 is displaying a common layer, leader 1 layer and leader 2 layer. The leader 2 layer is being edited by leader 2 because the edit level is set to 2 and the leader 2 layer is level 2 in the mapping table. The user of leader 2 does not see the optional 1, optional 2, optional 3 layer, member 3 layer or member 4 layer because they are not in the mapping table. Member 3 is displaying a common layer, optional 3 layer, leader 2 layer, leader 1 layer and member 3 layer. The member 3 layer is being edited by member 3 because the edit level is set to 4 and the member 3 layer is level 4 in the mapping table. The user of member 3 does not see the optional 1 layer, optional 2 layer, or member 4 layer because they are not in the mapping table. Member 4 is displaying a common layer, leader 2 layer, leader 1 layer and member 4 layer. The member 4 layer is being edited by member 4 because the edit level is set to 3 and the member 4 layer is level 3 in the mapping table. The user of member 4 does not see the optional 1 layer, optional 2 layer, optional 3 layer, or member 3 layer because they are not in the mapping table. This example show the flexibility of the display options for each display computing appliance in the system. The roles of each display computing appliance define the operations of the Control Processors which can quickly change the Mapping Logic to provide dynamic display options for the users. The example in FIGS. 29, 32 and 37 can also be applied to the embodiment of the Mapping Logic 1100, 1200 and 1300. The setup for Mapping Logic, 1300, is identical to Mapping Logic, 1400, except that the edit level is not included. Mapping Logic 1100 and 1200 are similar to 1400 and 1300 respectively except that all the mapping tables are combined into one table that contains another column for the user. Similarly, the edit levels are combined into one table with another column for the user. Examples of a setup are provided with each of the respective Mapping Logic elements, 1100, 1200, 1300 and 1400.

Figure 30:
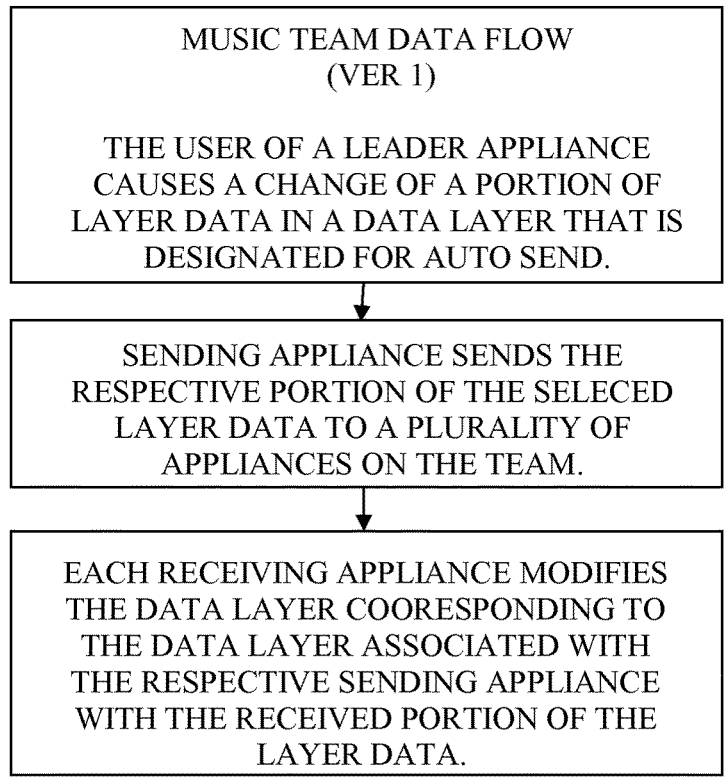
FIG. 30 illustrates a first method of data flow for a music team.

FIG. 30 illustrates the music team data flow for a the first embodiment. Some team roles allow a portion of Layer Data to be sent from its original Data Layer to a different Data Layer. This flow diagram illustrates the steps for a system as illustrated in FIG. 9. This embodiment describes the receiving appliance making the determination of which Data Layer to put the portion of Layer Data.

Figure 31:
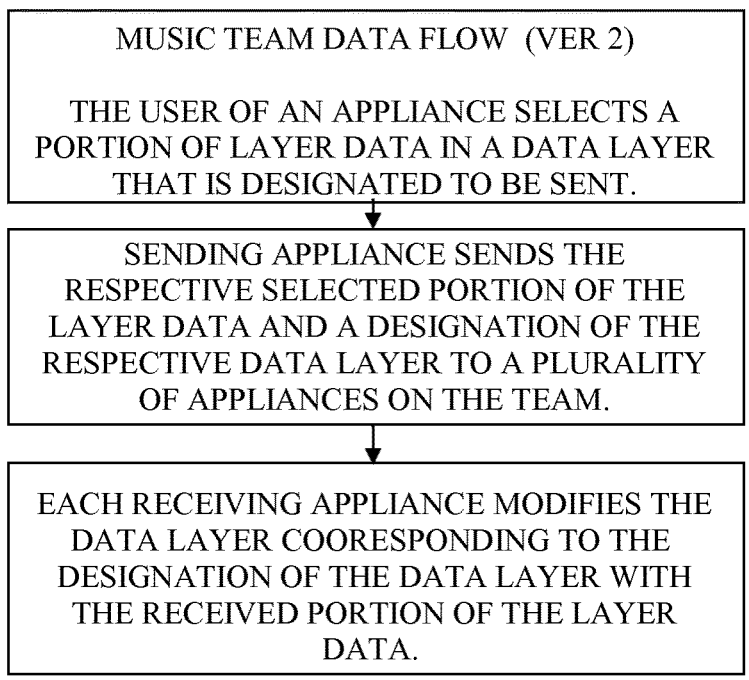
FIG. 31 illustrates a second method of data flow for a music team.

FIG. 31 illustrates the music team data flow in a second embodiment of that workflow. This flow diagram illustrates the steps for a system as illustrated in FIG. 9. This embodiment describes the sending appliance making the determination of which Data Layer to put the portion of Layer Data.

Figure 60:
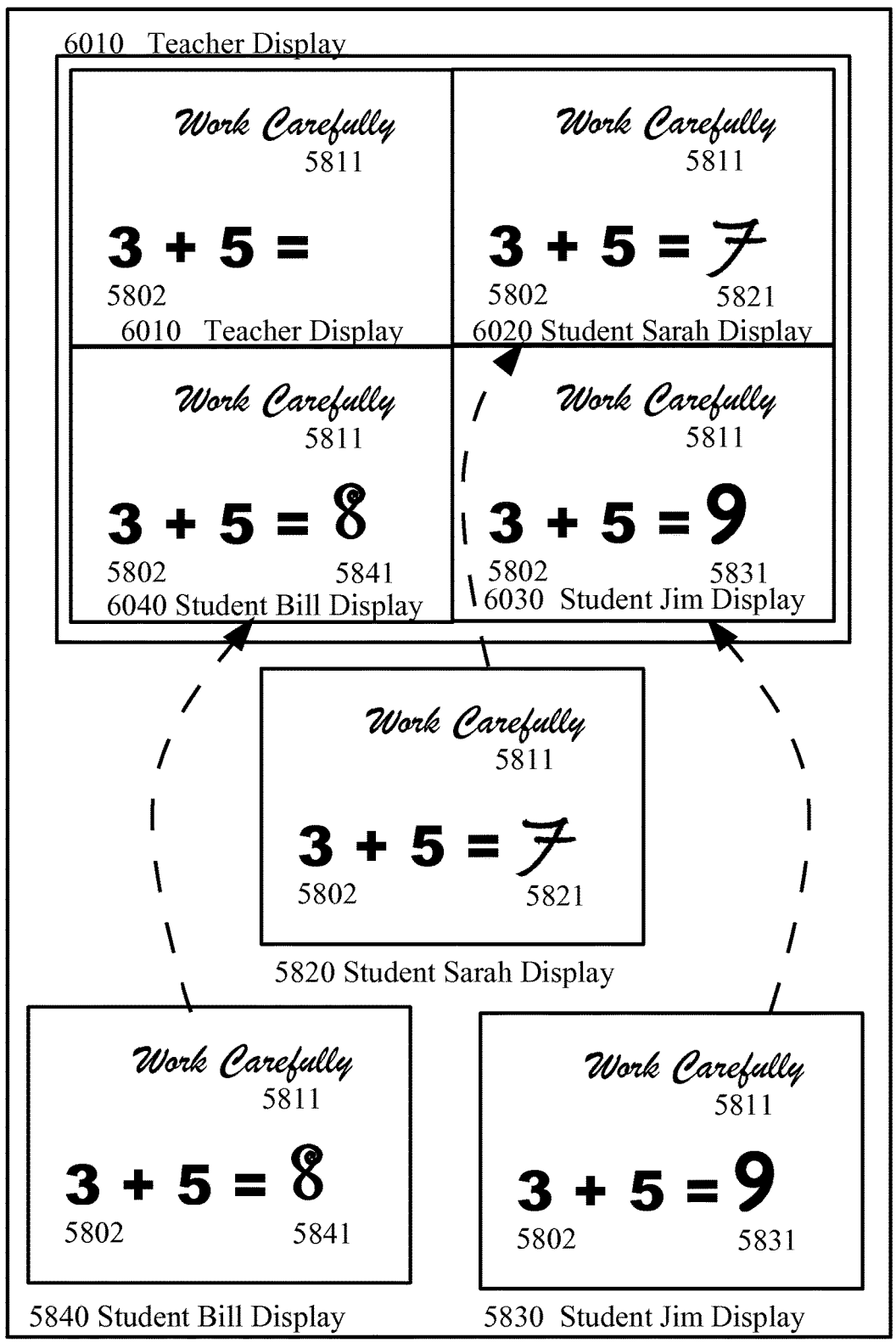
FIG. 60 illustrates an education team with one teacher and three students where the teacher is monitoring the entire classroom's progress.

FIG. 32 illustrates an example of a setup of the Mapping Logic as embodied in Mapping Logic, 1400, as illustrated in FIG. 14 for an education team where the Mapping Logic is distributed in each display computing appliance. This example has one display computing appliance, teacher, in the teacher role and a plurality of display computing appliances, student 1, student 2, student 3, . . . , in the student role. All the Control Processors on the team of display computing appliances are responsive to a Control Processor in display computing appliance that is assigned a teacher role. The Control Processors add the Data Layer of the teacher that is being edited to their mapping control to be displayed. Thus a teacher always has their layer displayed on all appliances in the team. This example has one teacher but multiple teachers are allowed, however all teachers share the same Teacher Data Layer. This example illustrates the entire class viewing the same part, lesson 6 but this does not have to be the case. However, the teacher's Control Processor may communicate with the student Control Processors and prohibit the students from changing the part being viewed, or alternatively allow one or all the students change the part, e.g., move on to lesson 7. A student always shows 3 Data Layers, the Common Data Layer, the Teacher Data Layer and the student's own Data Layer as illustrated in the example setup "Student Y Mapping Logic". The student always edits their own Data Layer but the Teacher Data Layer is always included on the display. A teacher has three difference modes for display: teacher mode, multi-mode and teacher-student mode. The teacher mode displays 2 Data Layers, the Teacher Data Layer and Common Data Layer as illustrated in the example setup "Teacher Mapping Logic in Teacher Mode". The teacher edits the Teacher Data Layer (multiple teacher appliances would edit the same Data Layer) and since the students are viewing this Data Layer they receive the edits as well but can't modify them. The multi-mode displays the Teacher Data Layer and all the Student Data Layers as shown in FIG. 60. The teacher display logic operates in a multi-view mode. The common layer, level=0, is reduced in size and duplicated combined for the display multiple times. Then every other layer is reduced in size and placed over one of the copies of the Common Data Layer. The resulting display provides an overview of everyone in the class. The example of the Mapping Logic setup is shown in "Teacher Mapping Logic in Multi-Mode". Alternative embodiments would allow the Mapping Logic to include the Common Data Layer with different parts to correspond to the parts that are currently being used by each student. The student layer would then have a part corresponding to the current student's part. This is accomplished with communication between the Control Processors. The teacher-student mode is identical to the mapping for a specific student. This allows the teacher to modify that Student's Data Layer and work one-on-one with the student to correct their mistakes or give private comments as shown in the section "Teacher Mapping Logic in Student Mode for Student X". Since the teacher is modifying the student's layer the student can make changes to the teacher's comments. An alternative embodiment would create another Data Layer for each student for the teacher to edit and visible only on the respective student's appliance. This would allow the teacher to make private edits on for a student but not allow the student to edit them.

Figure 33:
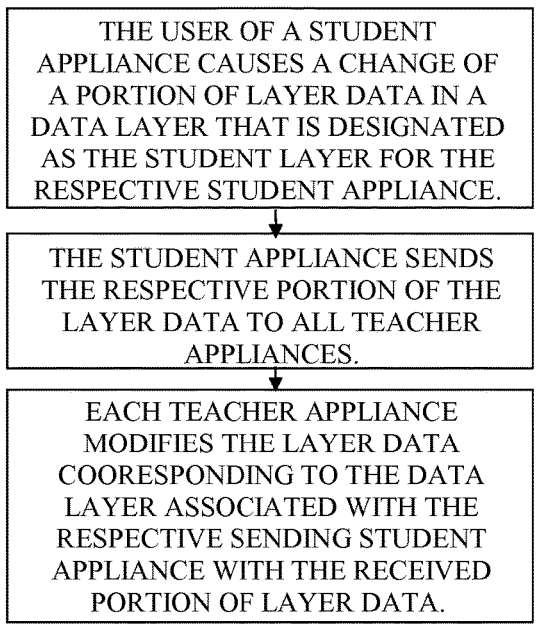
FIG. 33 illustrates a first method of data flow for a student in an education team.

FIG. 33 illustrates the team data flow for an education team, for a student, for a first embodiment. This flow diagram illustrates the steps for a system as illustrated in FIG. 9. This embodiment describes the receiving teacher appliance of student portion of Layer Data making the determination of which Data Layer to put the portion of Layer Data.

Figure 34:
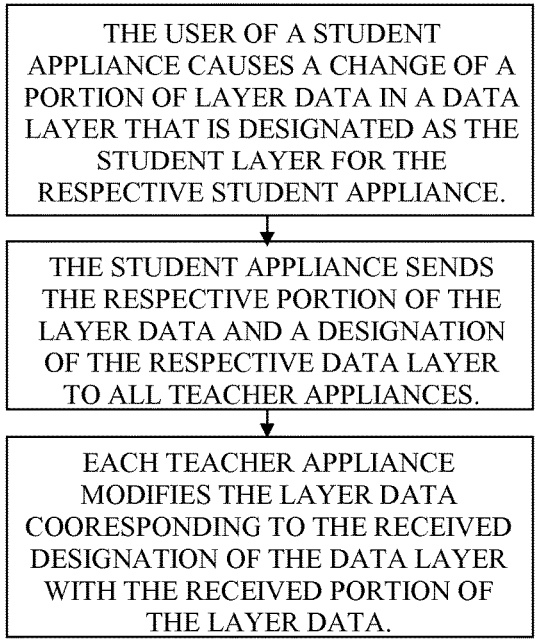
FIG. 34 illustrates an alternative data flow for the student for an education team.

FIG. 34 illustrates an alternative data flow for an education team, for the student. This flow diagram illustrates the steps for a system as illustrated in FIG. 9. This embodiment describes the sending student appliance of student portion of Layer Data making the determination of which Data Layer to put the portion of Layer Data.

Figure 35:
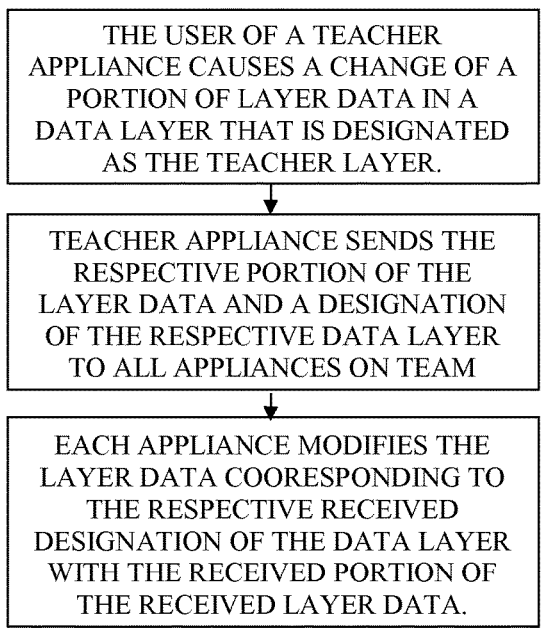
FIG. 35 illustrates data flow for a teacher for an education team.

FIG. 35 illustrates the team data flow for an education team, for a teacher. This flow diagram illustrates the steps for a system as illustrated in FIG. 9. This embodiment describes the receiving appliance of teacher portion of Layer Data making the determination of which Data Layer to put the portion of Layer Data.

Figure 36:
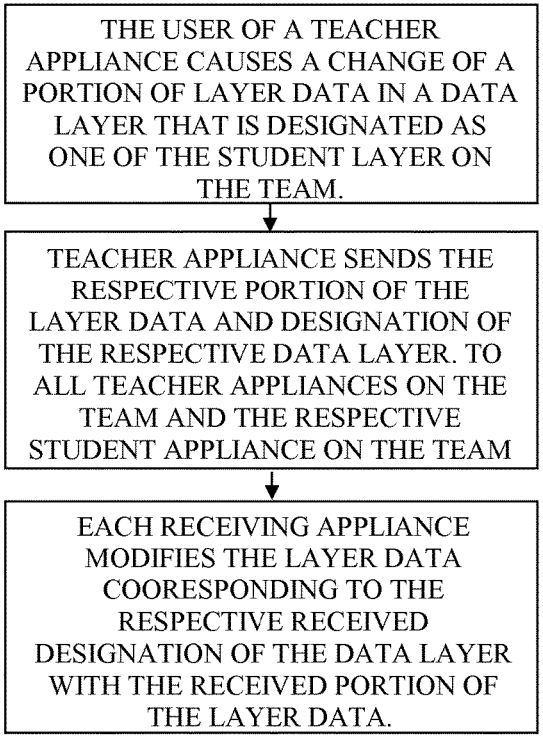
FIG. 36 illustrates education team data flow for student layer edits made by the teacher.

FIG. 36 illustrates the education team data flow for student layer edits made by the teacher. This flow diagram illustrates the steps for a system as illustrated in FIG. 9. This embodiment describes the sending teacher appliance of teacher portion of Layer Data making the determination of which Data Layer to put the portion of Layer Data.

FIG. 37 illustrates an example of a setup of the Mapping Logic as embodied in Mapping Logic, 1400, as illustrated in FIG. 14 for an ad hoc team where the Mapping Logic is distributed in each display computing appliance. This example has a plurality of display computing appliances, member 1, member 2, member 3, . . . , in the ad hoc role. The ad hoc role does not put many limits on each appliance. Each appliance is allowed to select whatever Data Layers they choose to display and what ever part to choose. In this example, member 1 is displaying page 7 of the Common Data Layer, notes 1 Data Layer and member 1 Data Layer. Member 1 is editing their own Data Layer, member 1. Member 2 is displaying page 8 of the Common Data Layer, member 1 Data Layer and member 2 Data Layer. Member 2 is editing member 1's Data Layer, not their own. Note that member 2 is editing a portion of the Data Layers that neither member 1 or 3 are currently viewing, however, if member 1 or 3 changes their part to page 8 they would obtain the changes being made by member 2. Member 3 is displaying page 7 of the Common Data Layer and member 1 Data Layer. It is not editing any layer and just monitoring member 1's activities. The Control Processor of each appliance could change the Mapping Logic responsive to user input. Alternative embodiments would allow the Control Processors to communicate and prohibit some settings, e.g., an appliance could prohibit viewing or editing of their Data Layer.

FIG. 38 illustrates data flow of user-to-user edits in an Ad Hoc team. The flow chart illustrates to steps that the user and Display Computing Appliances follow to share edits. Initially, the user on the sending appliances selects a portion of the layer data in a data layer. They the user selects appliances that the should receive the selected layer data. The layer data is sent to those appliances. The receiving appliances do not store the received layer data in the same data layer. They store a copy of the layer data in the data layer that the receiving appliances has marked for edit. The sending and receiving appliances thus copy layer data from one data layer to a different data layer. Each appliance then has an unique combination of layer data from other appliances and the layer data generated on their own respective appliance.

Once copied into the edit data layer of the appliance, each appliance can selectively send it to another appliance, remove or modify the layer data.

Figure 39:
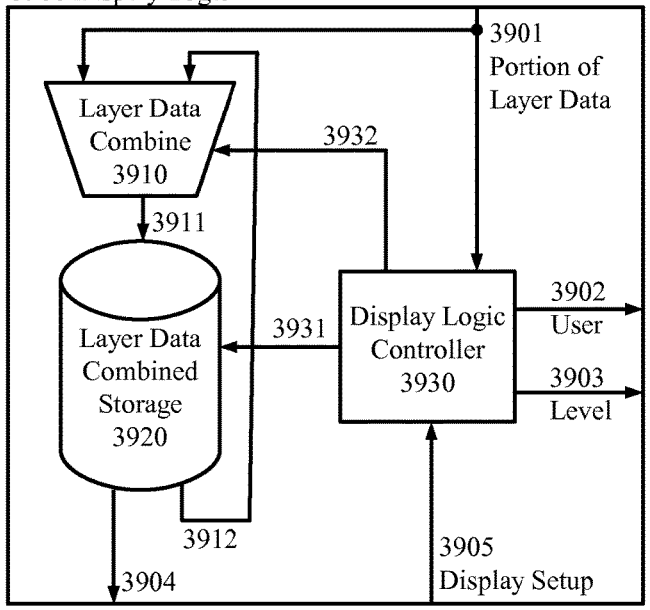
FIG. 39 illustrates an embodiment of display logic, where the display logic has a storage for combined Layer Data, a Display Logic Controller and a means to combine layers and where the result is then sent to the display.

FIG. 39 illustrates another embodiment of display logic. This display logic has Layer Data Combined Storage, 3920, for combined Layer Data, a Display Logic Controller, 3930, and a logic means, Layer Data Combine, 3910, to combine layer data from Data Layers for multiple Data Layers, and a connection, 3904, to send the result to the display for presentation. The Display Logic Controller, 3930, receives a display setup, 3905, from the Control Processor, e.g., the user to display. It then outputs the user on 3902 and successive levels, 3903, starting with 0 to the Mapping Logic. The layer storage is responsive to the Mapping Logic and provides a portion of layer data, 3901. The Display Logic Controller senses when no portion of layer data is available to stop the process and indicate via connection, 3931, to the Layer Data Combined Storage, 3920, to output the result on display out, 3904. When a valid portion of layer data is present on 3901, the Display Logic Controller, 3930, indicates via 3932 to the Layer Data Combine, 3910, to combine in a specified way the portion of layer data with the current Layer Data Combined Storage, 3920, via 3912. The Layer Data Combine, 3910, outputs the combination result on 3911 and the Layer Data Combined Storage, 3920, is instructed by the Display Logic Controller, 3930, via 3931 to store this combined result.

Figure 40:
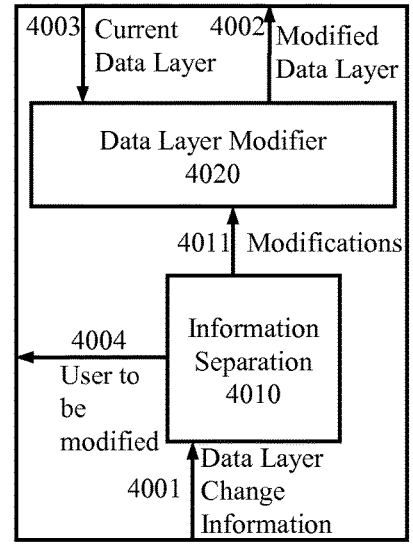
FIG. 40 illustrates Layer Edit Logic.

FIG. 40 illustrates an embodiment of the Layer Edit Logic, 4000, which is responsive to Data Layer change information, 4001, that is obtained from user input. The information separation, 4010, is responsive to the Data Layer change information and provides two outputs: user to be modified, 4004, and modifications, 4011. The Mapping Logic is responsive to the user to be modified and the Layer Storage is responsive to the Mapping Logic which provides the Current Data Layer coupled via 4003. The Data Layer modifier, 4020, is responsive to both the Current Data Layer and modifications and applies the modifications to the Current Data Layer and outputs the modified Data Layer, 4002. The modified Data Layer is then coupled to the the Layer Storage where it replaces the current layer data.

Figure 41:
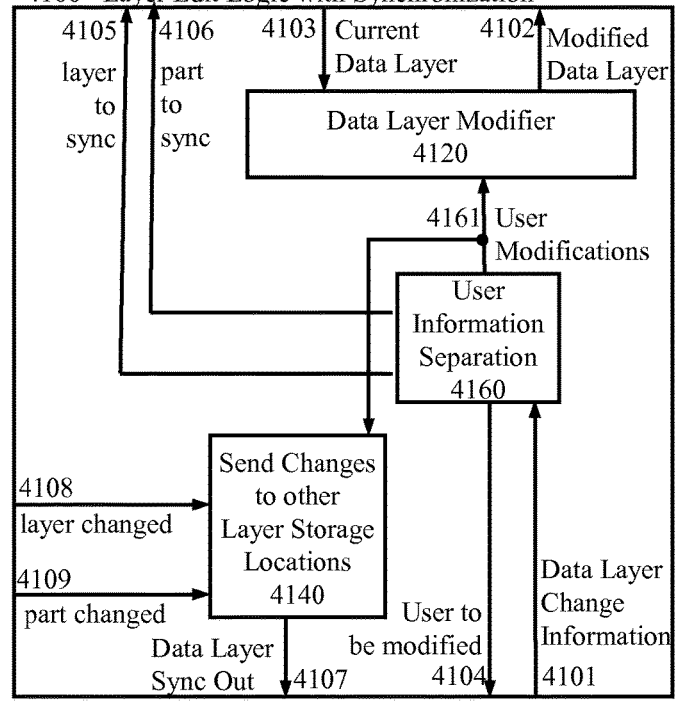
FIG. 41 illustrates Layer Edit Logic with synchronization logic.

FIG. 41 illustrates an embodiment of Layer Edit Logic with synchronization, 4100. This is similar to the embodiment, 4000, in FIG. 40 but with the addition of synchronization of multiple copies of Data Layers. The elements 4101, 4160, 4161, 4120, 4103, 4102 are functionally equivalent to 4001, 4010, 4011, 4020, 4003, 4002 respectively. The "send changes to other Layer Storage locations", 4140, otherwise known as "send changes" is responsive to the user modifications, 4161. The layer changed, 4108, and part changed, 4109. Signals 4108 and 4109 are active when a display computing appliance makes a change in the layer storage. 4108 and 4109 are coupled to the Mapping Logic which is responsive to the user to be modified, 4104. Send changes combines these inputs and sends it to other Layer Storage locations that have a duplicate of the layer changed via coupled by Data Layer Sync Out, 4107, which is connected Appliance Data Network. Data Layer Sync Out is received from the connected Appliance Data Network from other instances of Layer Edit Logic, 4100 on Data Layer Sync In, 4101. The user information separation, 4160, provides three outputs, layer to sync, 4105, part to sync, 4106, and user modifications, 4151. 4105 and 4106 are only output when a synchronization change occurs, when initiated by a user the user to be modified, 4104 is active. Thus the operation varies depending on the source of the change. The synchronization process bypasses the Mapping Logic because it is dependent only on the Layer Storage. The layer to sync and part to sync are sent directly to the Layer Storage which is responsive to those signals and returns the Current Data Layer, 4103. Similar to user modifications, a synchronization change is applied to the Current Data Layer, 4103, and the Data Layer Modifier, 4120, outputs a Modified Data Layer, 4102, which is used to replace the Current Data Layer in layer storage.

Figure 42:
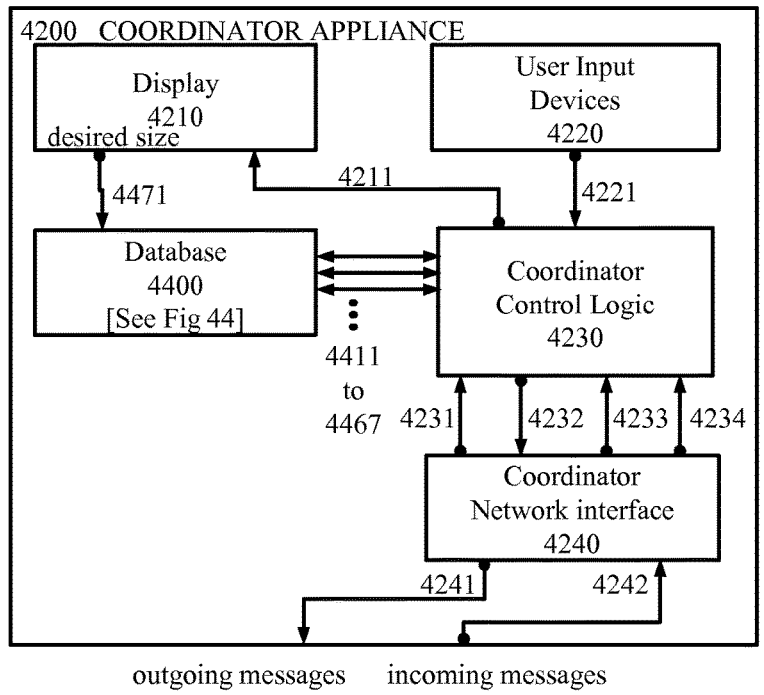
FIG. 42 illustrates an embodiment of a coordinator appliance that has coordination functions on a team.

FIG. 42 illustrates an embodiment of a coordinator appliance that provides coordination functions on a team. The illustrated embodiment of the coordinator appliance is comprised of a user input, 4220, coordinator logic, 4230, database, 4400, coordinator network interface, 4240, and a display, 4210. The user input devices, 4220, includes all the inputs used by the user of the appliance such as keyboards, mouse, touch screen, pen tablets, microphones, cameras, etc. These inputs coupled to the coordinator control logic, 4230, via 4221. The coordinator control logic evaluates this input, 4212, and messages from the network, 4231, 4233, 4234, to determine create a presentation for the display. The coordinator control logic is also responsive to the database, 4400, and the assigned role for the appliance. Coordinator appliances generally lead the team and determine which appliances are part of the team. The assigned role helps determine how to create the display presentation and what messages should be sent to other appliances via 4232. The coordinator network interface, 4240, handles the network communications and keeps track of other appliances on the network. Outgoing messages, 4241, are sent to other appliances both for identification and controlling other appliances. Incoming messages, 4242, contain both identification and control information. The database, 4400, contains information about the current state of the appliance but also the Layer Storage. The display presents information to the user. Many times this is visually on a computer screen, but may also take other forms such as sound, music, static images, movies, flash, interactive games, projectors, tactile feedback (resistance to movement in a joy stick, or vibration), motion of objects, etc.

Figure 43:
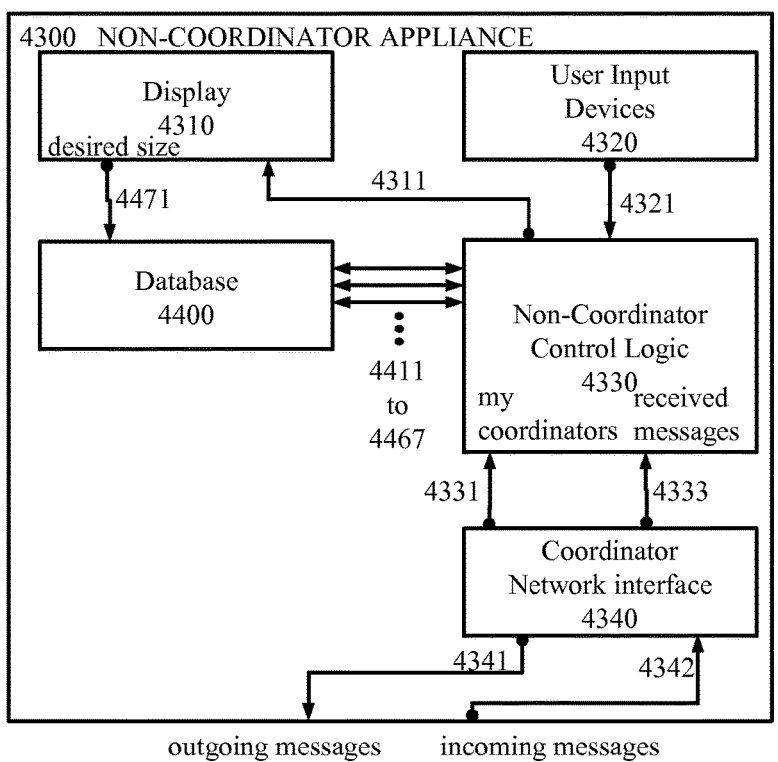
FIG. 43 illustrates a non-coordinator appliance, similar to a coordinator appliance but without coordinator control logic.

FIG. 43 illustrates an embodiment of a non-coordinator appliance. It is similar to the illustrated coordinator appliance as in FIG. 42, having a user input, but instead of having coordinator database logic and coordinator network interface and logic, the illustrated non-coordinator appliance has non-coordinator control logic. The embodiment in FIGS. 42 and 43 is that the control logic is different as to what messages are sent and not sent. A non-coordinator appliance is a member of a team but is not a leader. For example, in an educational team, the teacher role is a coordinator appliance and the student appliances are non-coordinators. The facilitator role in a meeting is the leader of a meeting team. Participants in a meeting are non-coordinators. The presenter in a meeting team is also a participant but has different functionality than a participant. However, the presenter could be assigned both the facilitator and presenter roles.

Figure 44:
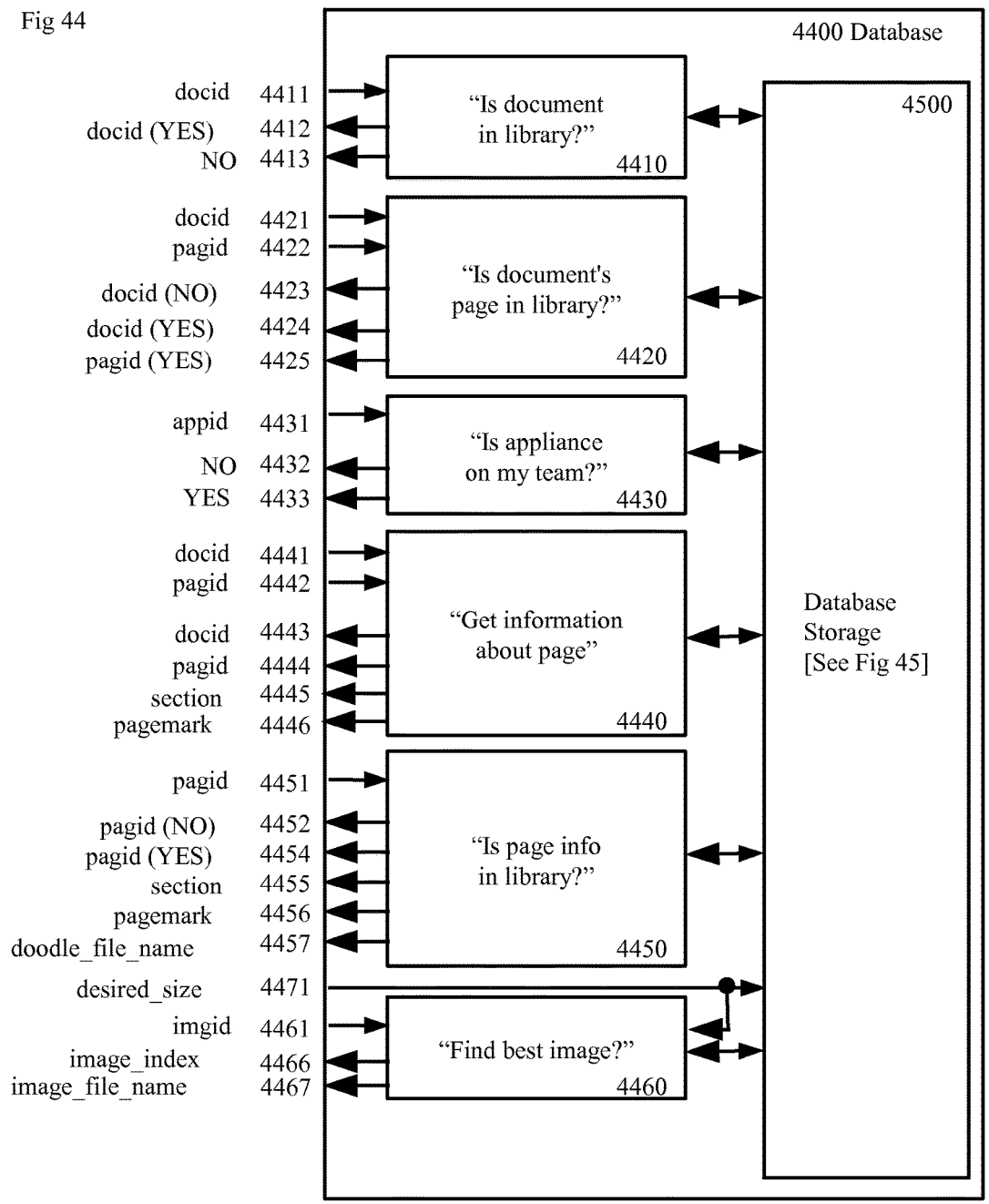
FIG. 44 illustrates a database system that provides control information and Data Layer storage.

FIG. 44 illustrates an embodiment of a database, 4400. The database has two basic parts: database storage, 4500, and information gathering functions as illustrated by 4410, 4420, 4430, 4440, 4450 and 4460. The database storage provides a structured method for storing and retrieving information. A common form of this is a relational database which provides tables of information that can be joined together to provide complex, yet efficient, searches for the stored information. However, other methods can be used which may be similar to a relational database but not meeting the standards for a relational database, such as indexed lists, b-trees, linked-lists and other methods. Some of these can provide the same information but with a significantly different structure than a relational database. In this embodiment, the docid is a unique descriptor of a unique document. The pagid is a unique descriptor of a unique page within a document (identifies part of layer data). The imgid is a unique descriptor of a unique set of images which comprises the common base layer for a page of a document (part of layer data). image index selects on the unique set of images for a imgid. Each image in the set is visually identical to the others in the set except that it is a different resolution. image file name is the file that contains the image data for a given imgid and image index. The appid is a unique descriptor of a specific appliance on the network. The section and pagemark are a user-friendly description of a specific page (pagid) in a document (docid). Doodle file name is the name of a file that contains the layer data for a specific page (pagid). The desired size is a signal responsive to the display that provides the optimum size for the display. "Is document in the library?", 4410, receives an docid on 4411, and queries the database storage, 4500, and returns a yes (and the docid), 4412, or no, 4413. "Is document's page in the library?", 4420, receives an docid, 4421, and pagid, 4422, and queries the database storage, 4500, and returns yes and the docid, 4424, and the pagid, 4425; or no and docid, 4423. "Is appliance on my team?", 4430, receives an appid, 4431, and queries the database storage, 4500, and returns yes, 4432, and no, 4433. "Get information about page", 4440, receives an docid, 4441, and pagid, 4442, and queries the database storage, 4500, and returns the docid, 4443, pagid, 4444, section, 4445, pagemark, 4446. "Is page info in library?", 4450, receives a pagid, 4451, and queries the database storage, 4500, and returns yes and pagid, 4454, no and pagid, 4452, section, 4455, pagemark, 4456, and doodle file name, 4457. "Get information about page", 4440, receives an docid, 4441, and pagid, 4442, and queries the database storage, 4500, and returns the docid, 4443, pagid, 4444, section, 4445, pagemark, 4446. "Find best image?", 4460, receives an imgid, 4461, and desired size, 4471, and queries the database storage, 4500, and returns image index, 4466, and doodle file name, 4467.

Figure 45:
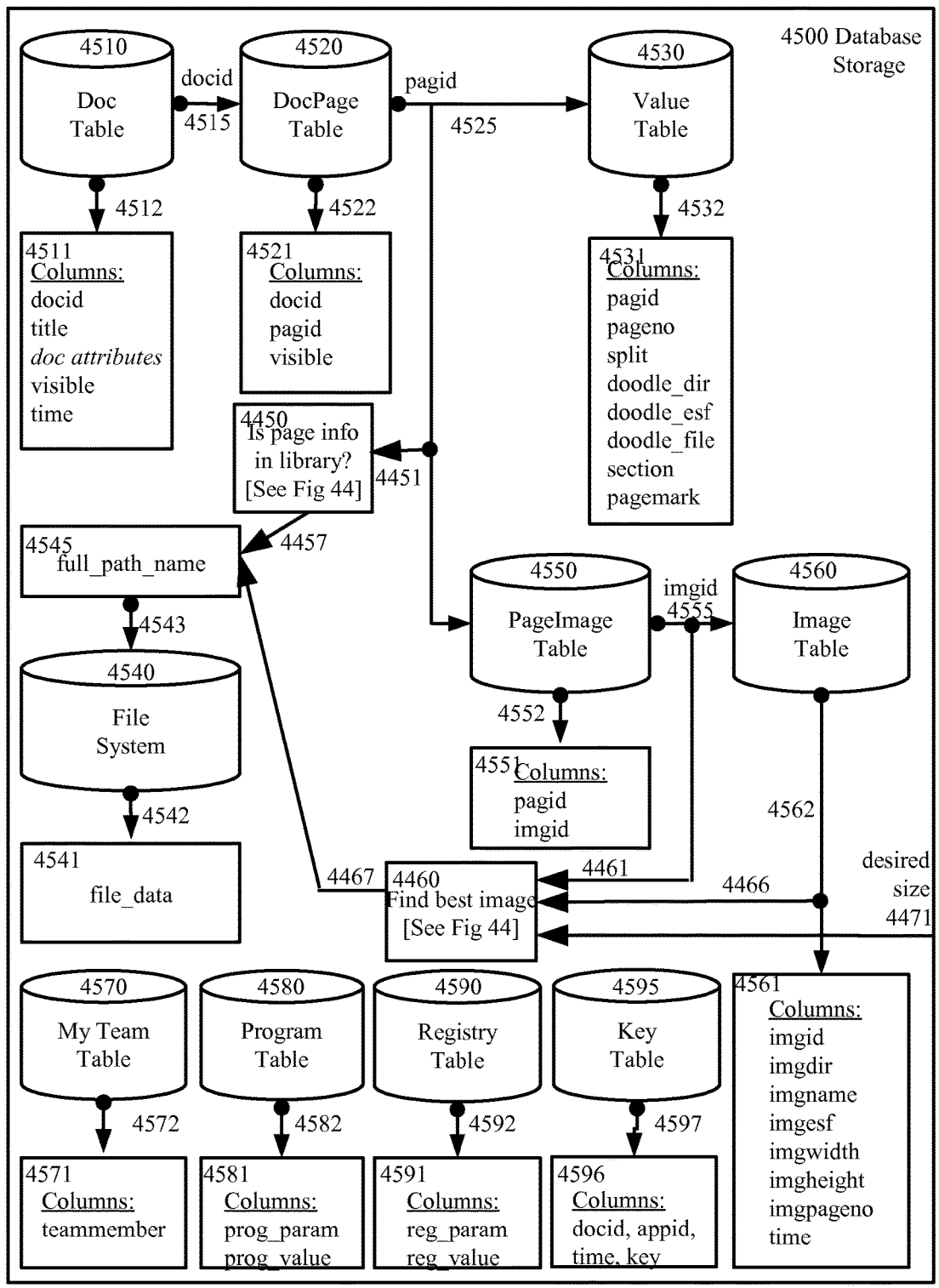
FIG. 45 illustrates the embodiment of database storage contained in the database system illustrated in FIG. 44.

FIG. 45 illustrates an alternate embodiment of Database Storage, 4500. The database storage is composed a plurality of tables and a file system, 4540, for storing large amounts of data, e.g., layer data. The tables could be implemented in a number of ways included the use of a relational database, group object structure (5300) using properties as column values, b-tree files, etc. The tables have rows and columns. The ordering of the columns is not important, but the ordering of the rows is important in some tables. In this case, some implementations will need to add a column sortable values to keep track of the preferred order. The doc table, 4510, and docpage table, 4520, need to maintain ordering of the rows and the others do not. Ordering is important in these tables because the order of the rows define the order that the user sees the documents and pages within the document. The tables are: doc table, 4510, docpag table, 4520, value table, 4530, pageimage table, 4550, image table, 4560, my team table, 4570, program table, 4580, registry table, 4590, and key table, 4595.

The tables are coupled together by common columns. When a row in one table and a row in another table have a common column and the values are the same then the other columns in each of the tables are related. This is called a join in a relational database. The doc table is coupled, 4515, to the docpage table via a common column docid. The docpage table is coupled, 4525, to the value table, 4530, and pageimage table, 4550, via a common column pagid. The pageimage table is coupled, 4555, to the image table, 4560, via the common column imgid. The rows of the doc table represent a set of documents in a particular order, much like books carefully placed in a bookshelf. The columns in the doc table, 4511, are the docid, title, visible and time. The docid is a unique identifier of the document. The title is the title of the document. Visible determines whether the document will be shown or hidden. Time is the date the document was created. Other document attributes can also be stored in other columns. The rows of the docpage table represent a page in each document and the order of the rows put the pages in order as they are in a book. The columns are docid, pagid, and visible. There are usually many rows with the same docid, one for each page in the document but each row has a different pagid. This allows pages to be quickly reordered in using just this table. The visible column allows an individual page to be shown or hidden. The value table has the following columns: pagid, pageno, split, doodle_dir, doodle_esf, doodle_file, section and pagemark. The pagid is used to couple the rows of the docpage table and the pagid values are unique in each row of the value table. The pageno column provides a page number for the page which is used for the display for the user. The split value is provides a location on the page where it can be split between the top and bottom halves for display. The doodle_dir provides a directory in the file system, 4540, where the a plurality of Data Layer store their layer data for this page in a doodle file. The doodle_esf provides for a container file like zip that contains the doodle file. The doodle_file provides the name of the file in the file system or in the doodle_esf container. Section provides a descriptive name of this page and all pages that follow in this document until a new section is provided for the user. Pagemark provides a descriptive name of this page only for the user. The pageimage table, 4550, has two columns: pagid, imgid. The pagid values are unique in each row of the pageimage table. The imgid usually is unique but not always. This allows an image to be duplicated by using the same imgid value for two different pagid's. The image table, 4560, provides the location and attributes of the base common images used as the common layer data for the page. The columns in the image table are imgid, imgdir, imgname, imgesf, imgwidth, imgpageno, time. The imgid is a unique identifier for a set representations of a visually identical image to the user. There are multiple images stored at different resolutions but visually look the same to the user. This reduces the computations required by the appliance to resize an image to fit on a particular display, the closest best fit can be selected that has been precomputed and stored. The imgdir provides the directory in the file system where the image is located. Imgesf is the file name of a container that can hold many files like a zip file. Imgname is the file name of the image on the file system directly or the name in the imgesf if provided. imgwidth and imgheight provide the width and height of the image so the optimum image can be selected.

Since there can be multiple rows with the same value of imgid, the image index indicates which of the rows contains the selected image for a page and display. Find best image, 4460, uses the imgid, 4565, matching image table rows, 4562, and the desired size, 4471, to find the best image location, 4467. The location is combined in the full_path name, 4545. The file system, 4540, is responsive to the full_path name coupled by 4543 and outputs the file data, 4541, via 4542 which is the image data to be sent to the display. The "Is page info in library?", 4450, is responsive to the pagid coupled by 4525 and 4451. The output, 4457, provides information about the page including the Layer Storage except base Common Data Layer (doodle) location.

The full_path name, 4545 is responsive to the page information and creates a description of the location of the Layer Storage for the file system, 4540. The file system is responsive to the coupling signal 4543, and outputs via 4542 to the file_data, 4541, which is the Layer Storage except the base Common Data Layer for processing by the display logic in the coordinator control logic or non-coordinator control logic.

The my team table has one column which is teammember. This table has a list of team members on their team. This table is only present on a coordinator appliance. The program table has two columns, prog_param and prog_value. Each row of the program table has a prog_param value which defines parameter for the application. The prog_value in the same row is the value for the prog_param is the value for the parameter. These parameters are used to define a number of items for the appliance like its name, the current document and page being displayed and many other items that need to be remembered when the appliance is turned off and then back on. The registry table has two columns, reg_param and reg_value. It is similar to the program table but is used for installation parameters and on some cases may be stored in a different manner than the other tables. The key table has the following columns: docid, appid, time, key. This table is used to store encryption keys that some of the content may be using. The key column contains the key for a document specified by docid and for a specific appliance specified by appid. A group of documents may have been created at the same time and can have the same key so they are identified with the time column.

Figure 46:
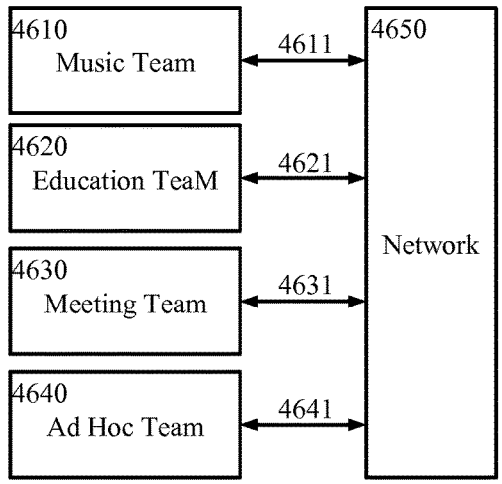
FIG. 46 illustrates an embodiment wherein multiple teams are each separately made up of multiple appliances and can each co-exist on the same network but act as independent teams, showing a music team, an education team, a meeting team and an Ad Hoc team.

FIG. 46 illustrates an alternate embodiment of the present invention, showing a system wherein multiple teams each are made up of multiple appliances, and wherein the multiple teams can co-exist on the same network, but act as independent teams. All teams communicate over a common network, 4650, and connections 4611, 4621, 4631, 4641. As illustrated in FIG. 18, there is shown a music team, 4610, an education team, 4620, a meeting team, 4630, and an Ad Hoc team, 4640. The music team is shown as optimized for people collaborating using music to rehearse, edit, and/or perform the displayed music. The education team is shown as optimized for a system operating in a classroom setting where there is a teacher and multiple students collaborating. The meeting team is sown as optimized for the use during a meeting for collaboration of multiple people, where there are multiple participants, each having an input device with one or more (some) making presentations and with each member having the ability to make their own separate input onto the team presentation. The Ad Hoc team is shown as optimized for collaboration of informal gatherings of people so that they can each communicate with their own ideas to a common display, and provides a system to facilitate those meetings. Many other teams are possible, four have been shown in this illustration.

Figure 47:
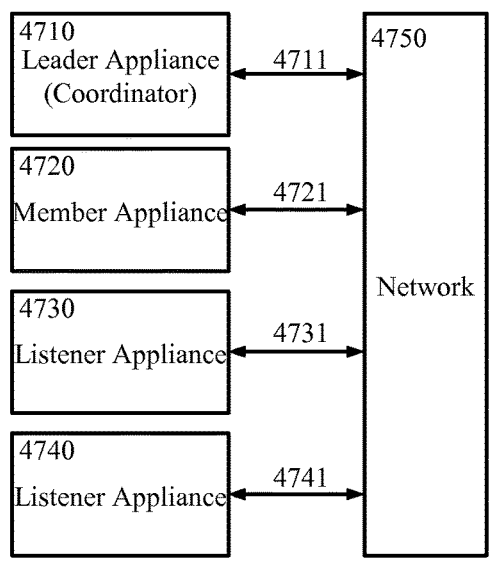

FIG. 47 illustrates roles within a music team. There are shown multiple roles and the functioning of the appliance. What layers are used by a particular appliance depends on its role. Any edits that may be made will depend on the role that an appliance is functioning in. The team communicates over a common network, 4750 and connections 4711, 4721, 4731, 4741.

In a music team, there can be a leader appliance, 4710, which is the coordinator, and the leader appliance can make changes to and communicate these changes (ranging from edits to a display document, to page jumps, to document ordering, to import or export, etc.) with all the other appliances. There may be multiple leader appliances on a team.

A member appliance, 4720, is one that generally listens to what the leader appliance is doing but may be able to have some other limited functionality (such as making local-only edits, or local-only page jumps, or local-only document order changes).

A listener appliance, 4730 and 4740, is similar to a member appliance, but it is strictly only able to listen to commands and input from the members and leaders, and cannot make any changes by itself.

Figure 48:
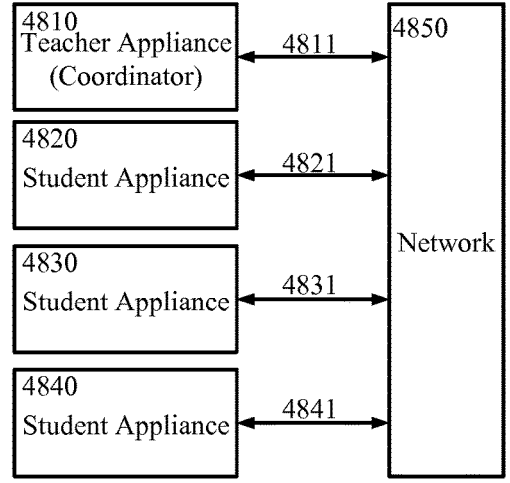
FIG. 48 illustrates roles in an education team, showing the case where there are two different roles: the teacher and the student.

FIG. 48 illustrates roles in an education team. In the illustrated embodiment, there are two different roles: the teacher and the student. The team communicates over a common network, 4850 and connections 4811, 4821, 4831, 4841. As illustrated, the teacher, 4810, (or all teachers on a team) has the ability to communicate with all the students, 4820, 4830 and 4840, as well as with any other teacher on a same team that may be on the team and can selectively choose for communication with and to students as either to the entire class or to an individual selected student. The teacher appliance can also select to view in real-time all of the students' appliances' displays at once in a multi-screen mode. As illustrated, the student appliance communicates only with the teacher (or teachers, but not with other students) so that the teacher is aware of what the student is doing and themselves. The student is not able to communicate with other students.

Figure 49:
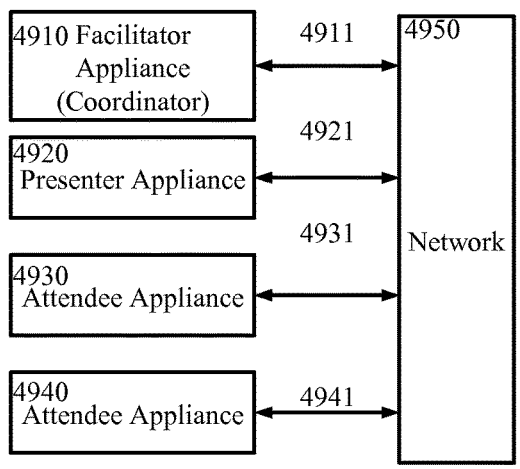
FIG. 49 shows appliance roles in a meeting team, showing the case where there are three different roles, which can change during the course of a meeting, the three roles being facilitator, presenter and attendee.

FIG. 49 shows an embodiment of appliance roles in a meeting team. The team communicates over a common network, 4950 and connections 4911, 4921, 4931, 4941. As illustrated, three are different roles. The roles of a particular appliance can change during the course of a meeting. The three illustrated roles are facilitator, presenter and attendee. The facilitator, 4910, is the appliance that determines which appliances are allowed to be at and in the meeting and determines and decides which appliances are permitted to be a presenter and which appliances are an attendee, 4930 and 4940. The presenter, 4920, is allowed to have his/her edits sent from his/her appliance to the appliances of other members of the team. The presenter can selectively control which page the respective users at each appliance in meeting is looking at. The facilitator can selectively change which appliance is the presenter. Individual attendees have more limited control. At the discretion of the facilitator appliance, an attendee appliance may or may not be permitted to communicate with other appliances. A meeting can have different presenters at different times. The facilitator an change who (which appliance) is enabled as a presenter. Usually there are multiple attendees and one presenter, however there are cases when multiple presenters are desired. Multiple presenters can be confusing to the attendees in a meeting but there are times when two or more people are mutually presenting. In extreme cases, everyone could be assigned the presenter role. There can be times when there is no presenter, such as times in between different presenters or during breaks. A presenter and facilitator has all the functionality of an attendee.

Figure 50:
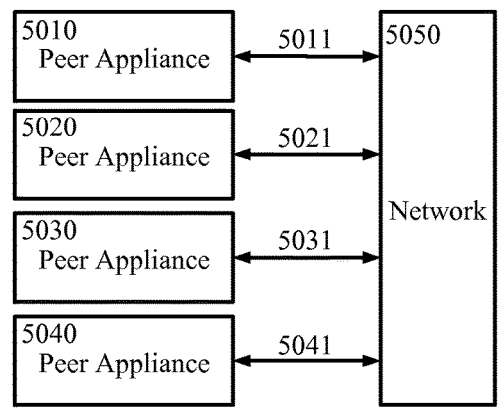
FIG. 50 shows appliance roles in the Ad Hoc team, where there is illustrated only one role, wherein each appliance has the same functionality and communicates with any of the other appliances as desired.

FIG. 50 shows appliance roles in the Ad Hoc team. As illustrated, in an Ad Hoc team, there is only one role. The team communicates over a common network, 5050 and connections 5011, 5021, 5031, 5041. Each peer appliance, 5010, 5020, 5030 and 5040, has the same role and functionality as the other appliances, and can selectively communicate with any one or multiple or all of the other appliances, as desired. The Ad Hoc of team gives each appliance a great deal of flexibility, and does not require the structure that the other types of teams have.

Figure 51:
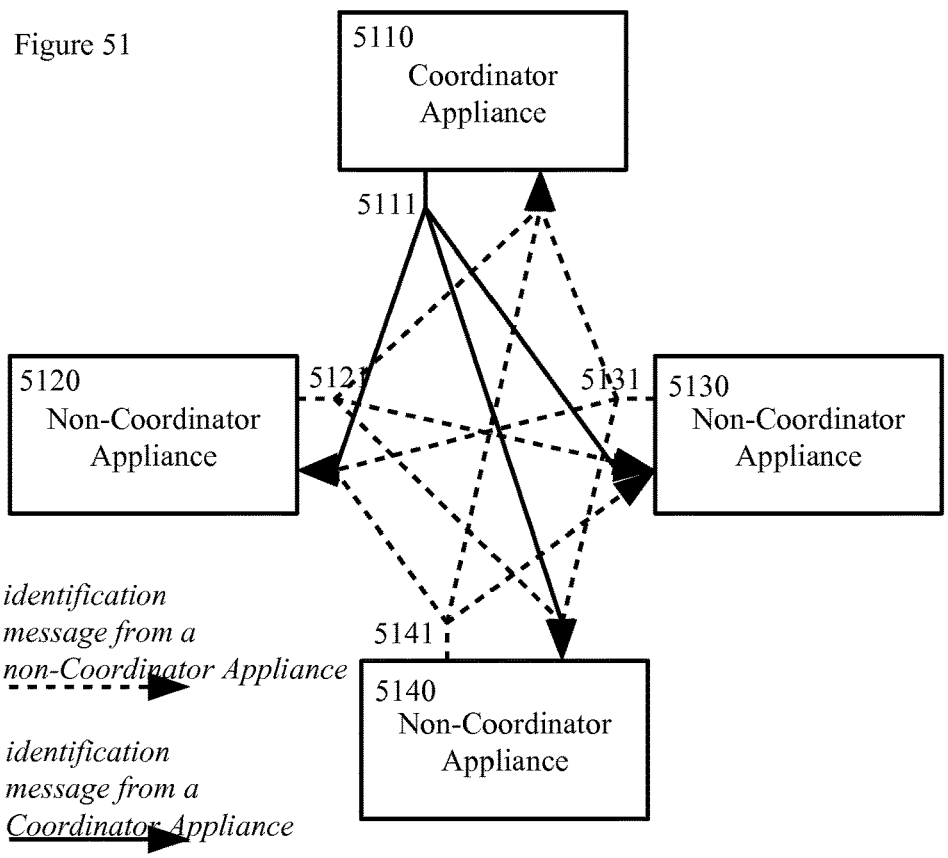
FIG. 51 shows identification messages in a team.

FIG. 51 shows identification messages in a team. A coordinator appliance, 5110, receives messages, 5121, 5131 and 5241, from all other appliances, 5120, 5130 and 5140, indicating what role and what capabilities each appliance has. The coordinator appliance can then send messages, 5111, to all the other appliances to indicate what role they have in a particular team and whether they are on the team and what that appliance functionality is. In some teams, there may be multiple coordinator appliances. In some embodiments, the team can be made up of all coordinator appliances (as in an Ad Hoc team). However in the case of a meeting team or education team, there is generally one coordinator appliance and all the rest are non-coordinator appliances.

Figure 52:
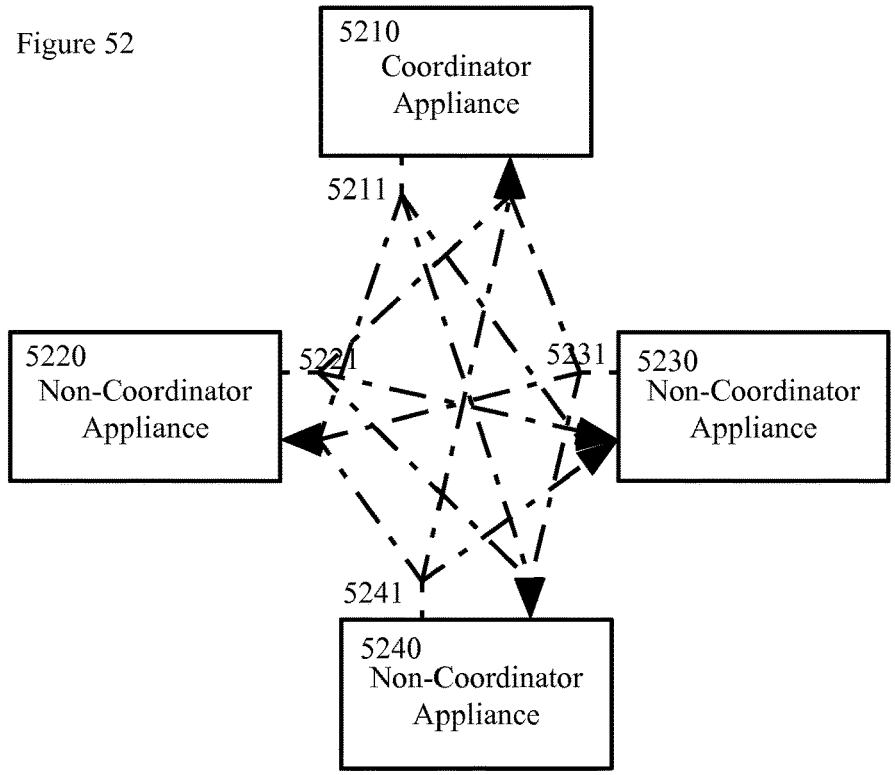
FIG. 52 shows conversational messages in a team.

FIG. 52 shows conversational messages in a team. Regardless of whether an appliance is a coordinator appliance, 5210, or a non-coordinator appliance, 5220, 5230 and 5240, each appliance has an ability to send messages, 5211, 5221, 5231 and 5241, between one appliance and one or all the other appliances. Whether a message is sent, or not, is dependent on the logic of the role and the team, and is controlled according to the role of the respective appliance on a respective team. For example, in general, the rule is that an appliance will not send a message to a appliance that is on a different team. Therefore, the logic for the roles in respective appliances determine which appliance a message is sent depending on what that other appliances' role is.

Figure 53:
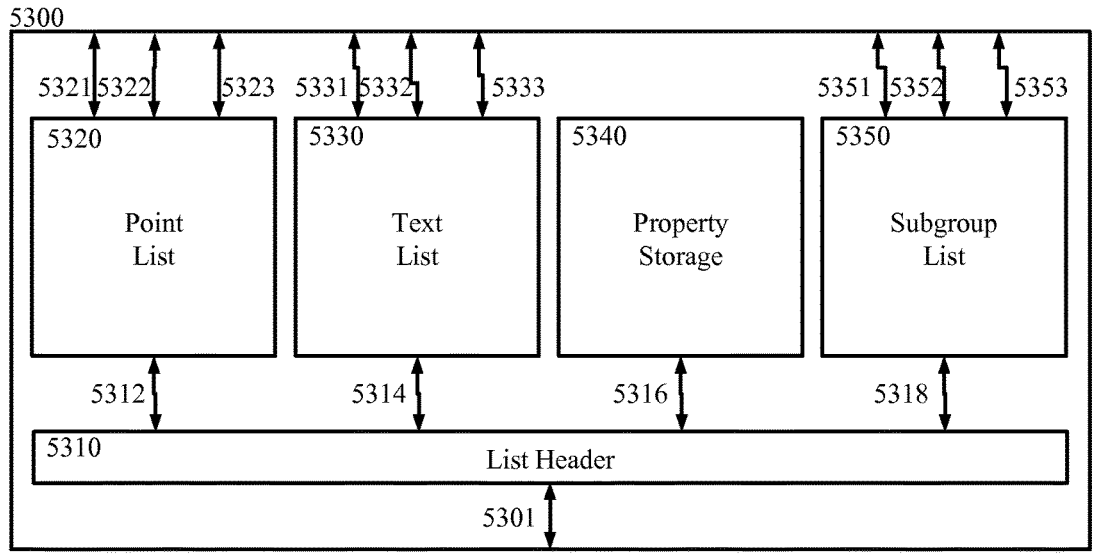
FIG. 53 illustrates an embodiment of a structure used to contain Layer Data.

FIG. 53 illustrates an embodiment of a group object, 5300. This is a container object for other group objects, text objects, point objects and properties stored in memory. The subgroup list, 5350, is coupled to the list header, 5310, via 5318 and contains an ordered list of pointers to a plurality of group objects as shown by links 5351, 5352 and 5353. While 3 links are shown here in the subgroup list, point list and text list any number of links can be in the list including none. The ordering of the subgroup list allows groups to be traversed in a specific order, this is important later when used to define drawing operations and the order that items are drawn. This list defines a group tree of expanding subgroups. The point list, 5320, is coupled to the list header, 5310, via 5312 and contains an ordered list of pointers to a plurality of point objects as shown by links 5321, 5322 and 5323. The point objects in the list define a vector that can be used to draw lines. The text list, 5330, is coupled to the list header, 5310, via 5314 and contains an ordered list of pointers to a plurality of text objects as shown by links 5331, 5332 and 5333. Each text object in the list is drawn with the provided text in the object and in the order in the text list. Property storage, 5340, provides for a value responsive to a property in property storage which is communicated via 5316. Any number of properties are available and subgroups can access the properties in any of their parents. A subgroup can redefine a specific property and then the subgroup will use that value instead of the value from the parent. In this manner, the text font, text color, text style, line width, line color, line style and other properties can be defined to control the appearance of the lines and text drawn. In addition, a visible property can be set which controls whether a group object is to be drawn or skipped. These properties are used later to define Data Layers (see FIG. 56).

Figure 54:
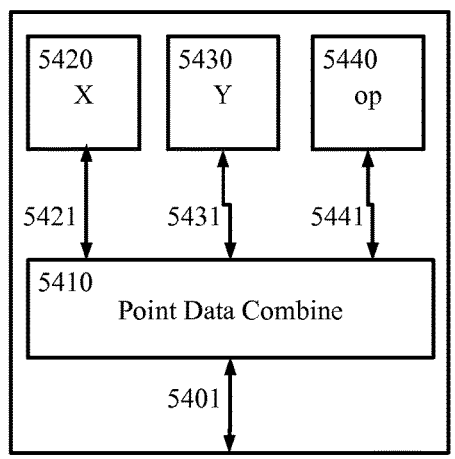
FIG. 54 illustrates an embodiment of a structure used to contain Layer Data vector information.

FIG. 54 illustrates an embodiment of a Point Object, 5400. The point object stores three items, an X location, 5420, Y location, 5430, and op, 5440, or operation to be performed. The operations minimally are move to and draw to but other draw operations are possible. When used in a point list, 5320, the point objects allow you to move to an XY location, draw to a plurality of other XY locations, and then start again with another move to as many times as desired to make a vector drawing. Note that properties in the property storage of one of the containing group objects can be used to modify how the lines are drawn (color, width, . . . ).

Figure 55:
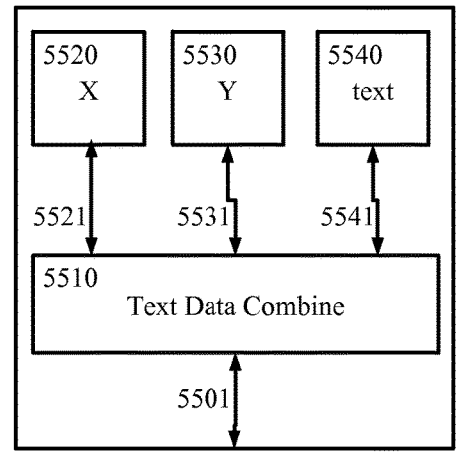
FIG. 55 illustrates an embodiment of a structure used to contain Layer Data textual information.

FIG. 55 illustrates an embodiment of a Text Object, 5500. The text object stores three items, an X location, 5520, Y location, 5530, and text, 5540. When used in a text list, 5330, the text objects allow you to place text at an XY location in the order of the text list. Note that properties in the property storage of one of the containing group objects can be used to modify how the text is drawn (font, style, color, . . . ). As with point objects, text objects in their respective list share the same property values. If you wish some objects to use different property values then place them in their own group object and link to it in the subgroup list.

Figure 56:
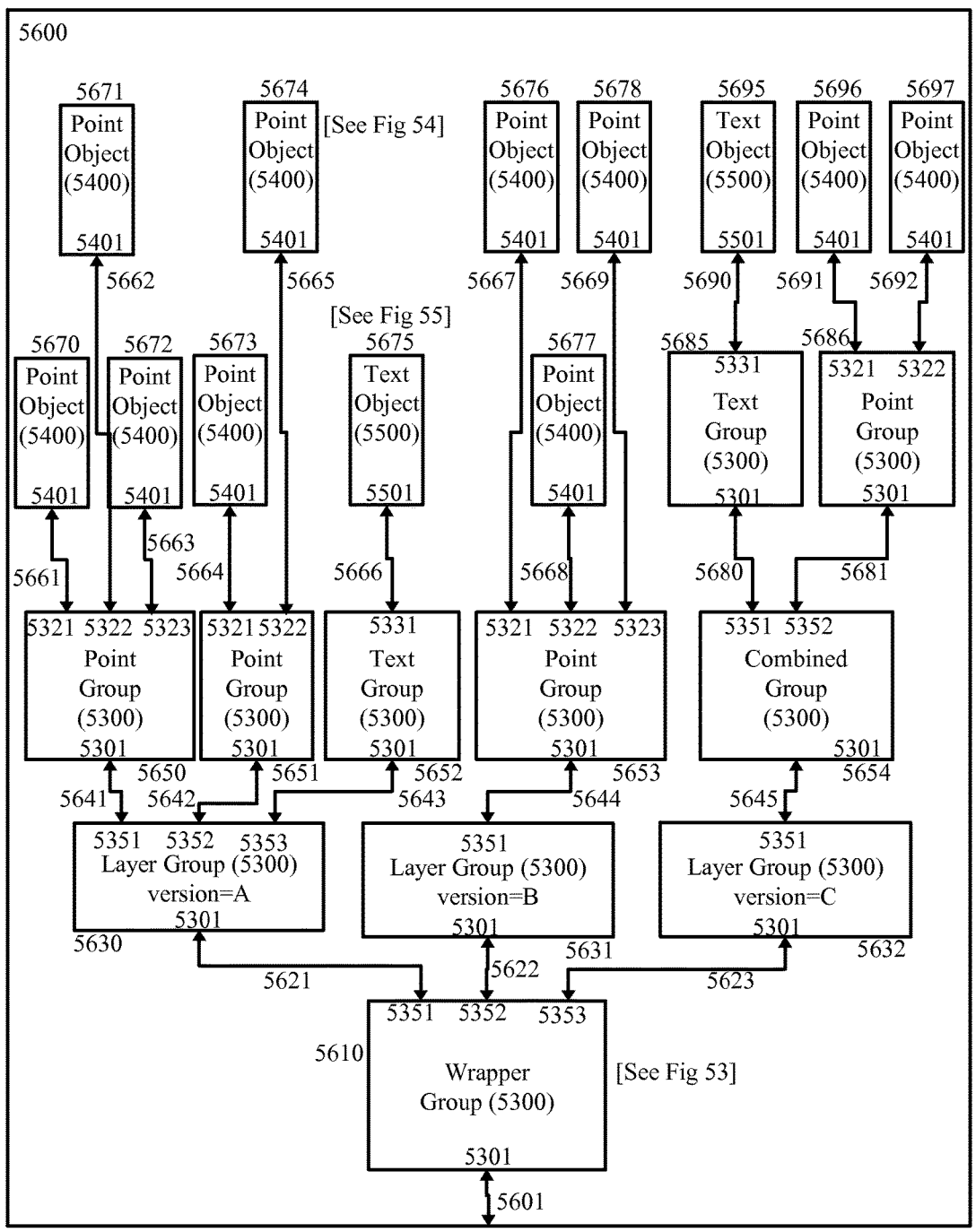
FIG. 56 illustrates an embodiment of a structure used to contain Layer Data combining group objects, point objects and text objects illustrated in FIGS. 53-55.

FIG. 56 illustrates an embodiment of a Annotation Wrapper Group, 5600. The annotation wrapper group provides an alternative embodiment for the combination of storage of layer data and Mapping Logic. This embodiment stores a part of the layer data except the common image stored elsewhere. The wrapper group, 5300, is entered from link 5601. The wrapper group has a subgroup list that points to group objects that define the Data Layers. Shown in this example are 3 Data Layers, layer group, 5630, 5631 and 5632, linked by 5641, 5642 and 5643 respectively, however any number of Data Layers can be defined. A version property is defined in each layer group. In this manner the layer data can be selected by traversing only the group tree where the version property matches the desired Data Layer. For instance, Data Layer A would be contained in layer group 5630, similarly Data Layer B would be contained in layer group 5631 and lastly Data Layer C would be contained in layer group 5632. Each layer group contains a subgroup list that provides the layer data for the Data Layer. Layer group, 5630, contains 3 subgroups: two point groups, 5650 and 5651, and one text group, 5652, coupled by 5641, 5642 and 5643 respectively. Layer group, 5631, contains just 1 subgroup: point group 5653 coupled by 5644. Layer group, 5632, contains just 1 subgroup: combined group 5654 coupled by 5645. The point groups, 5650, 5651, 5653 and 5686, and the text groups, 5652 and 5685, each have property values that define how the respective points and text are drawn. The point groups link their respective point lists, 5320, to point objects, 5670, 5671, 5672, 5673, 5674, 5676, 5677, 5678, 5696, 5697, via links 5661, 5662, 5663, 5664, 5665, 5667, 5668, 5669, 5691, 5692 respectively. The text groups link their respective text lists, 5330, to text objects, 5675 and 5695, via links 5666, 5690 respectively. The combined group, 5654, allows for a more complex structure of drawing items by containing a subgroup list with a text group and point group. This allows properties to be set once in the combined group, 5654, e.g., color property, and then the text and point groups, 5685 and 5686, do not need to set this property and will use the property in the combined group 5654. Also, the combined group, 5654, can set its visible property to hidden and then the text group, 5685, and point group, 5686, will not be drawn but can be easily drawn by changing the visible property in the combined group to show. Quite complex tree structures can be created for the layer data and only some of the simpler structures are shown, however, the structure shown in this example provides a very flexible and useful structure for layer data. For instance, when layer data B needs to be delivered to an element in the system for processing, only the link 5622, needs to be passed to access the data.

Figure 57:
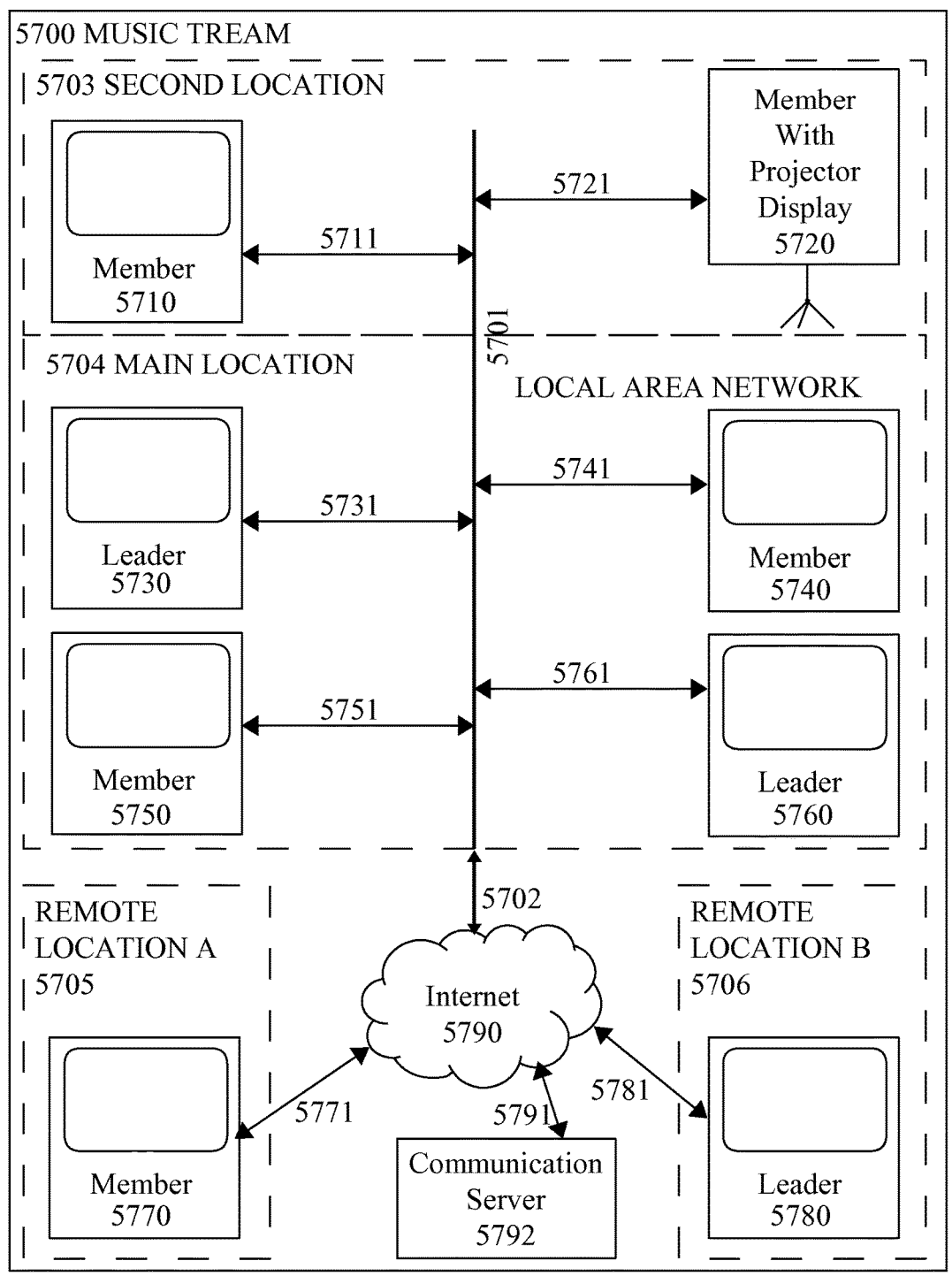
FIG. 57 illustrates a system of appliances connected via a local area network and the Internet in various physical locations.

FIG. 57 illustrates an embodiment of a Music Team. A music team is composed of one or more leader appliances, 5730, 5760 and 5780, and a number of member appliances, 5710, 5720, 5740, 5750 and 5770. The appliances are connected to a network. Appliances 5710, 5720, 5730, 5740, 5750 and 5760 are connected to a local area network, 5701, via connections 5711, 5721, 5731, 5741, 5751 and 5761 respectively. Although connected to the same local area network, appliances 5710 and 5720 are in a physically different room than appliances 5730, 5740, 5750 and 5760 but the operation is identical. The local area network, 5701, connects to the Internet, 5790, via connection 5702. Appliances 5770 and 5780 are in different remote location and connected to the Internet, 5790, via connections 5771 and 5781. The Internet connections generally do not allow the connections 5702, 5771 and 5781 to communicate directly. In some cases this is possible with the use of static IP addresses or VPN connections, and then the appliances 5770 and 5780 can communicate with the other appliances just as if they are in the same room. When this is not available, most of the time, then the connections 5702, 5771 and 5781 communicate with a static connection on the Internet 5791 which is coupled with a communication server, 5792. The communication server relays messages between the connections 5702, 5771 and 5781. In this manner, appliances 5770 and 5780 can communicate with the other appliances just as if they are in the same room. Some appliances may have special displays such as 5720, which has a projector attached and may users can view the display.

Figure 58:
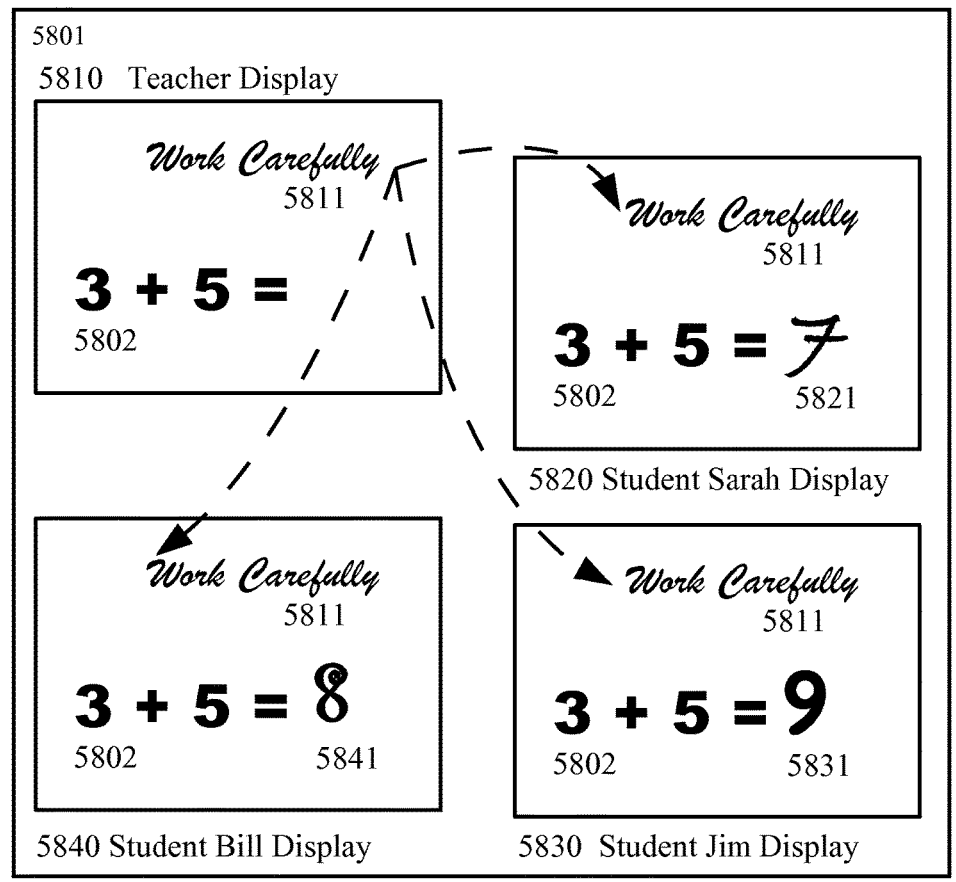
FIG. 58 illustrates an education team with one teacher and three students where the teacher is communicating to the entire classroom.

FIG. 58 illustrates an education team, 5801, with one teacher, 5810, and three students, 5820, 5830, 5840, displays where the teacher is communicating to the entire classroom. All appliances view the background image, 5802, as the Base Data Layer. The teacher can write an annotation, 5811, on their appliance in the Teacher Data Layer, (in the example shown, the word "Work Carefully"). Each student is also viewing the Teacher Data Layer so each student immediately sees the annotation, 5811, on their appliance also. Each student appliance has a unique Data Layer that they view and edit. Each student sees the Teacher Data Layer and their own Data Layer. Thus, Sarah, 5820, views the Sarah Data Layer and the Teacher Data Layer. Jim, 5830, views the Jim Data Layer and the Teacher Data Layer. And Bill, 5820, views the Bill Data Layer and the Teacher Data Layer. Each student is doing the assignment as well. Student Sarah, 5820, wrote "7", 5821, as her answer in the Sarah Data Layer. Student Jim, 5830, wrote "9", 5831, as his answer in the Jim Data Layer. Student Bill, 5830, wrote "8", 5841, as his answer in the Bill Data Layer. In this mode of operation the teacher does not see the students' work because the teacher only views the Teacher Data Layer.

Figure 59:
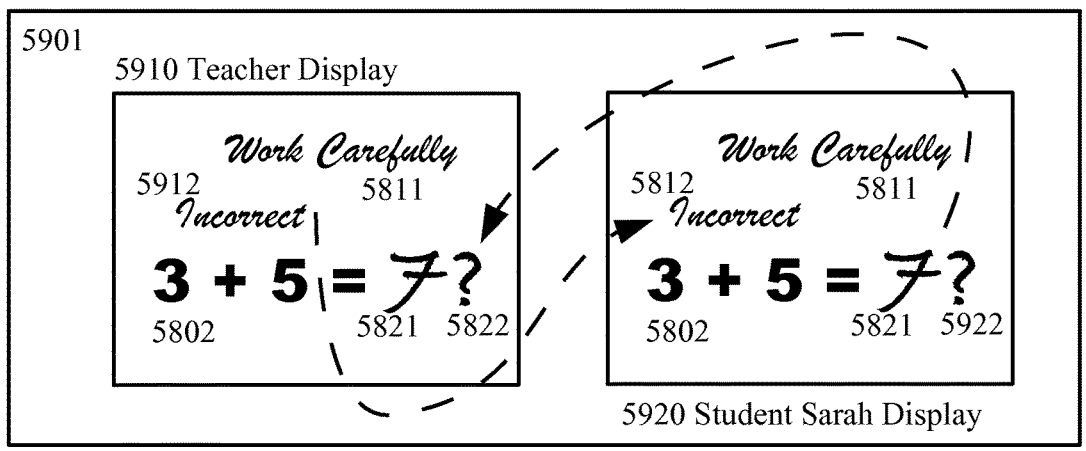
FIG. 59 illustrates an education team with a teacher interacting with a student one-on-one.

FIG. 59 illustrates an education team, 5901, with a teacher, 5910, interacting with a student, 5920, one-on-one. Illustrated is Sarah which is viewing the Sarah Data Layer and Teacher Data Layer. The teacher is viewing the Teacher Data Layer and a specific student's Data Layer, in this example the same as Sarah, 5920. Both the student and teacher edit the Sarah Data Layer. This allows the teacher and the student to make annotations in the specific student's Data Layer which are visible by both, but not the entire classroom. In this illustration, the teacher wrote "Incorrect", 5912, which is also viewed on the Sarah display 5920. The student responded with a "?", 6022, which the teacher views on their display, 5910. None of the other students are viewing this interaction between Sarah and the teacher so Sarah can be more confident in asking a question. Nor are the other students bothered by the Sarah/teacher interaction.

FIG. 60 illustrates an education team, 6010, with one teacher, 6010, and three students, 5820, 5830 and 5840, where the teacher is monitoring the entire classroom's progress. The student displays are the same as in FIG. 58. This illustrates an embodiment of a Teacher multi-view screen. The display screen, 6010, is shown with 3 reduced size images of the screens of various appliances. Shown is a 2 by 2 grid of reduced size display screen images but a different grid is possible such as 3 by 3, 4 by 4, 5 by 5, etc. The preferred embodiment is uses the same division vertically as horizontally because the aspect ratio of the reduced images is the same as the original. Alternatively, 3 by 4, 2 by 3 and other divisions are possible. Alternatively, some of the reduced images can overlap on another and when highlighted they move to the top of the display so they can be fully seen. The teacher can view a version of each student on a portion of the teacher display, 6010. Each student version uses a scaled version of the background image, 5802, as a Data Layer as well as the teacher and specific student layer. In this illustration, student display, 5820, is shown in the teacher display, 6010 as 6020. Student display, 5830, is shown in the teacher display 6010 as 6030. Student display, 5840, is shown in the teacher display 6010 as 6040. The teacher display, 5810 as shown in FIG. 58, is shown in the teacher display 6010 as 6010. When a student modifies their own Data Layer, the teacher is updated with the annotations made by the student in their part of the display. The teacher can select one of the portions of the teacher display, 6020, 6030 or 6040, to enter the mode as shown in FIG. 59 for a teacher-student one-on-one session. The teacher can select the portion of the teacher display, 6010, to enter the mode as shown in FIG. 58 for working with the entire classroom.

FIG. 61 illustrates a social team where the owner, Frankie, 6103, is viewing all the messages 6111, 6112, 6113, 6114, 6115, 6116, 6117, 6118, 6119, 6120, 6121, 6122, 6123, 6124, 6125, 6126, 6127 and 6128 on a display 6101. These messages are displayed in various combinations in FIGS. 62, 63, 64, 65, 66, 67, 68, 69 and 70, responsive to the user, 6103 in this figure, and selections by the user. Frankie is a recording artist and does concerts. He is using Chat to keep in touch with his fans and his manager, John. This chat team is composed of three entities: user and owner (Frankie), user (John) and a Groupie subteam. The Groupie subteam is composed of many users, in this example: Mary, Jim, Sally, Jane, David, Fred, Randy, Kim and Bill and FrankS. User Frankie can use two different Data Layers, Frankie and FrankS. As the owner, Frankie can has control of who can join, what Data Layers they can view and what Data Layers they can modify. John is allowed to view all Data Layers but does not have a Data Layer in the Groupie subteam. Frankie can see everything that is going on but only Frankie will be able to see his messages. The Groupie subteam users each have a separate Data Layer but they can only view Data Layers in the Groupie subteam. The Groupie subteam can communicate with each other and can communicate with Frankie only if Frankie uses the FrankS Data Layer. In this figure the user, Frankie, 6103, has selected to view all the messages available.

FIG. 62 illustrates a social team where the user, Frankie 6203, is viewing messages, 6111, 6114, 6120, 6125 and 6128 between himself and his manager, John 6204, on display 6201. Frankie can keep in touch with his manager, John, without the clutter of the fans. His responses to John are not viewed by the fans. The Data Layers for the Groupie subteam are not displayed, including FrankS Data Layer. The John Data Layer is visible because the user has requested that Data Layer. The Frankie Data Layer is visible because that is the user's Data Layer. They are combined by the display logic, 3900 (see FIG. 39).

FIG. 63 illustrates a social team where the user, Frankie 6303, is viewing is messages 6112, 6113, 6115, 6116, 6117, 6118, 6119, 6121, 6122, 6123, 6124, 6126, and 6127 on a display 6301. Frankie can keep in touch with his fans, his responses or messages to the fans are seen by everyone. All the Data Layers in the subteam, Groupies, 6301, are shown. The Frankie Data Layer and John Data Layer are not visible. John's messages, 6111, 6120, 6128 are in the John Data Layer and are thus not shown. Only the message, 6124, from Frankie in the FrankS Data Layer is shown. Messages 6114 and 6125 from Frankie are not shown because they are in the Frankie Data Layer. These messages combined by display logic 3900.

FIG. 64 illustrates a social team where the user, Frankie 6403, is viewing threads of messages that he has participated in. Frankie can see the message threads that he has participated in. Here is a thread with his manager and with the fans. Note how this eliminates extraneous messages. A more expanded view of the thread could also be shown (see FIG. 70). All Data Layers are shown but only messages in all layers that are directly referenced by a Frankie Data Layer or FrankS Data Layer message are shown. One thread of messages is shown because of Frankie's messages 6114 and 6125 in the Frankie Data Layer referenced to John. John starts the thread of messages with message 6111 to Frankie to which Frankie responds with message 6114. John responds with message 6125 and Frankie finishes the thread of messages with message 6128. This single thread of messages contains two messages from Frankie but any number could be included. A second thread of messages is shown because of Frankie's message 6124 in the FrankS Data Layer to Jane's message 6119. David's message 6118 is included because it was responded to by Jane's message 6119. Russ' message 6117 is included because it was responded to by message 6118. Jane started the thread of messages with message 6116 which was responded to by message 6116. Only one message, 6124, from Frankie is in this thread of messages. Only messages directly responded to Frankie's message 6124 in the FrankS Data Layer are included by the display logic 3900.

FIG. 65 illustrates a social team where the user, John 6503, is viewing all the messages. John can keep track of everything going on the in the chat room for Frankie. Since John has viewing rights for all Data Layers, all Data Layers are shown. The messages shown are the same as in FIG. 61. Only the user 6503 is different in display 6501 from the display 6101 with user 6103.

FIG. 66 illustrates a social team where the owner, John 6603, is viewing messages between himself and Frankie. John can keep in touch with Frankie without the clutter of the fans. His responses to Frankie are not viewed by the fans. The Frankie Data Layer is visible because the user has requested that Data Layer. The John Data Layer is visible because that is the user's Data Layer. The Data Layers for the Groupie subteam are not displayed, including FrankS Data Layer. They are combined by the display logic, 3900.

FIG. 67 illustrates a social team where the owner, John 6703, is viewing threads of messages that he has participated in. All Data Layers are shown but only messages in all layers that are directly referenced by a John Data Layer are shown. One thread of messages is shown because of Frankie's messages 6114 and 6125 in the Frankie Data Layer referenced to John. John starts the thread of messages with message 6111 to Frankie to which Frankie responds with message 6114. John responds with message 6125 and Frankie finishes the thread of messages with message 6128. This single thread of messages contains three messages from Frankie but any number could be included. Not illustrated in this figure is the possibility that John could have responded to a message in the Groupie subteam in the John Data Layer. For instance, John, could have responded to message 6127 with a message of "We should remove this spammer". This response would only be visible to Frankie and not to anyone in the Groupie subteam (except Frankie). This would create a thread of messages that John participated in and would be shown in this display, 6701, if John had responded to a message as such.

FIG. 68 illustrates a social team where the user, Mary 6803, is viewing all the messages available to her. Mary is one of the fans. She and the other members of the Groupies subteam can't view the private messages between Frankie and John. Since Mary is only a member of the Groupies subteam, she can only have the Groupies subteam member Data Layers visible. The Frankie Data Layer and John Data Layers are not visible but the FrankS Data Layer is visible. Thus the messages 6112, 6113, 6115, 6116, 6117, 6118, 6119, 6121, 6122, 6123, 6124, 6125, 6126 and 6127 on a display 6801.

FIG. 69 illustrates a social team where the user, Mary 6903, is viewing all the threads she has participated in. Since Mary is only a member of the Groupies subteam, she can only have the Groupies subteam member Data Layers visible. The Frankie Data Layer and John Data Layers are not visible but the FrankS Data Layer is visible. Mary only sent one message 6112. No one responded to said message and so only said message is displayed. When and if someone does, she'll be able to easily see the response in context.

FIG. 70 illustrates a social team where the user, Frankie 7003, is viewing threads of messages that he has participated in with a detailed view, 7004, on display 7001. Frankie can see expanded messages (all branches) of a thread he participated in. This is similar to FIG. 64. The element 6404 in FIG. 64 indicates a normal My Threads view and the element 7004 in FIG. 70 indicates a My Thread detail. There is no difference in the thread of messages that include messages, 6111, 6114, 6120, 6125 and 6128. The second thread has messages 6121, 6122, 6123 and 6126 also included in addition to the messages in FIG. 64. Message 6121 is included because it is in response to message 6116 which was directly included in the normal My Threads view. Message 6122 is included because it is in response to message 6119 which was directly included in the normal My Threads view. Message 6123 is included because it is in response to message 6122. Message 6126 is included because it is in response to message 6123. These messages are combined by the display logic, 3900.

FIG. 71 illustrates an individual Data Layer, 7100, that contains layer data that is segmented into Layer Data Elements, 7170, 7171, 7172, 7179. This illustration shows four (4) Layer Data Elements making up the layer data but any number of Layer Data Elements are possible. Each Layer Data Element contains context and content information. Layer Data Element 7170 contains an element context, 7130 and an element content, 7140. Layer Data Element 7171 contains an element context, 7131 and an element content, 7141. Layer Data Element 7171 contains an element context, 7131 and an element content, 7141. Layer Data Element 7172 contains an element context, 7132 and an element content, 7142. Layer Data Element 7179 contains an element context, 7139 and an element content, 7149. The context information, 7160, 7161, 7162, 7169, from each Layer Data Element, 7170, 7171, 7172, 7179, is coupled to the Layer Data Element selection, 7110. In one embodiment, Part, 7103, is responsive and coupled to 1612, 1622, 1632 in FIG. 16. In another embodiment, Part, 7103, is responsive and coupled to 1712, 1722, 1732 in FIG. 17. Part provides an input to the Layer Data Element Selection, 7110, which selects one or more Layer Data Elements within the layer data, 7100. The selection of an element is indicated on signal 7120 for Layer Data Element 7170, 7121 for Layer Data Element 7171, 7122 for Layer Data Element 7172, 7129 for Layer Data Element 7179. Part, 7103, can specify more than one Layer Data Element. The specification provided by Part may include "Select all Layer Data Elements", "Select no Layer Data Elements", "Create a new Layer Data Element", or a selection based on comparison with context information from the respective Layer Data Elements. Successful comparisons will cause the layer element selection signals 7120, 7121, 7122, 7132 to be asserted for the respective Layer Data Element. Element selection signal 7120 is coupled to element context, 7130, and element content, 7140. Element selection signal 7121 is coupled to element context, 7131, and element content, 7141. Element selection signal 7122 is coupled to element context, 7132, and element content, 7142. Element selection signal 7129 is coupled to element context, 7139, and element content, 7149. Element contexts, 7130, 7131, 7132, 7139, output the context information on context layer data out, 7171, and is coupled to Combine Context And Context Data, 7170. Element Contents, 7140, 7141, 7142, 7149, output the content information on Content Layer Data Out, 7172, and is coupled to Combine Context And Content Data, 7170. Combine Context And Context Data provides Data Out, 7102, that contains all the context and content information of all the Layer Data Elements that are asserted by signals 7120, 7121, 7122, 7129. If none of the signals 7120, 7121, 7122, 7129, are asserted then Data Out, 7102, contains no data. In one embodiment, Data Layer Access, 1710 via 1712, 1722 or 1732 in FIG. 17 is responsive and coupled to Data Out, 7102. In another embodiment, Data Layer Access, 1610 via 1612, 1622 or 1632 in FIG. 16 is responsive and coupled to Data Out, 7102. Data In, 7101, provides replacement layer data for a Layer Data Element, 7170, 7171, 7172 or 7179. Data In is responsive to and coupled to Data Layer Access, 1710, via 1711, 1721 or 1731 in FIG. 17. Data In, 7101, is coupled to Separate Context And Content Data, 7150. Separate Context And Content Data divides the data into two parts, the context information which is output on Context Layer Data In, 7151, and content information which is output on Content Layer Data In, 7152. Context Layer Data In, 7151, is coupled to the Layer Data Elements to Element Contexts, 7130, 7131, 7132, 7139. Content Layer Data In, 7152, is coupled to the Layer Data Elements to Element Contents, 7140, 7141, 7142, 7149. Part, 7103, asserts a single signal, 7120, 7121, 7122 or 7129, to one of the Layer Data Elements. The selected Layer Data Element, 7170, 7171, 7172 or 7179, replaces the information in its respective Element Context (7130, 7131, 7132 or 7139) and Element Content (7140, 7141, 7142 or 7149) with Context Layer Data In and Content Layer Data In. If "Create a new Layer Data Element" is specified by Part, 7103, then a new Layer Data Element is created and Context Layer Data In and Content Layer Data In is stored in the said new Layer Data Element. Data Out, 7102, contains a duplicate of the Data In, 7101, when Data In is used to create or replace Layer Data Element layer data.

Figure 72A:
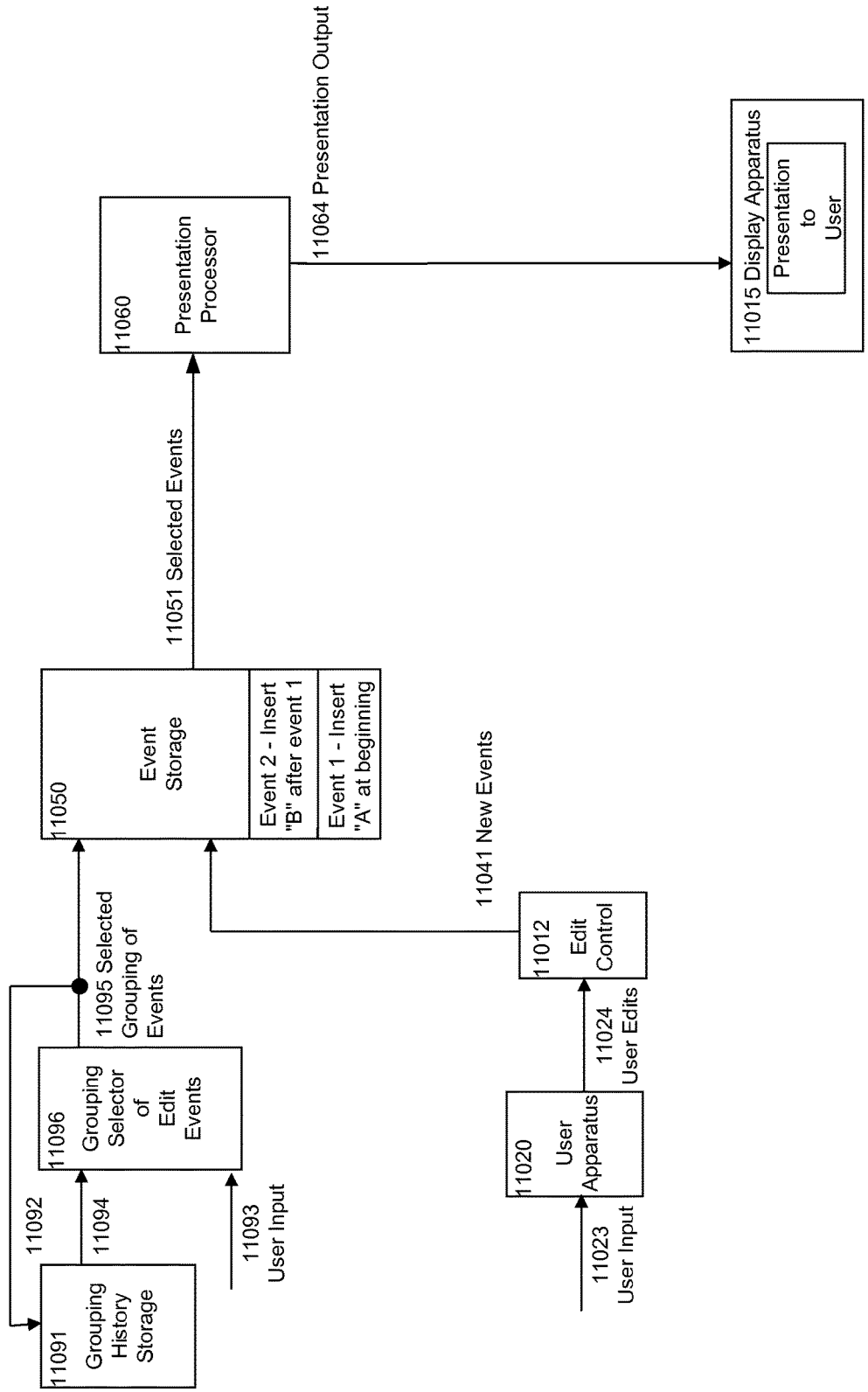
FIG. 72A illustrates an event processing system providing for user input of new events.

Referring to FIG. 72A, a first embodiment of an event processing subsystem (11000) is illustrated. The event processing system (11000) is comprised of a user input apparatus (11020), which is responsive to a user input (11023), which provides an output (11024) of user input data, which is coupled to an input of control logic (11012). The control logic (11012) provides an edit control subsystem, which processes the user input data (11024) to generate an output of events (11041). Each new edit event (11041) is comprised of event content (also referred to as edit event data) as is illustrated in other figures, and the discussion related thereto, such as FIG. 72B, 72C, 72D and 72E.

In a preferred embodiment, the event content is comprised of an edit reference, an event-ID, and change data. The events are entered in a defined order of entry by one user, or by a plurality of users. Either way, there is a defined order of entry, both with reference to a single user's order of entry, and globally, with reference to the entry of order of each and every event relative to each and every other event.

The new event output (11041) is coupled to event storage (11050), which provides storage of the event content. As illustrated in FIG. 72A, the event storage 11050 is shown with two stored events therein. As illustrated, the first stored event is event "1", which stores the event-ID "1", the edit reference "insert at beginning" and the change data ("A"). Similarly, the second stored event (as illustrated) is comprised of the event-ID ("event 2"), the edit reference "insert after event "1"", and the change data ("B").

As illustrated in FIG. 72A, these events are stored in event 1 storage which is "event "1""—"insert ("A") at beginning". This illustrates, in context, the meaning of the event-ID, edit reference, and change data for a respective event.

A grouping selector (11096), which is responsive to a user input (11093), event data (11097) and grouping history data (11094), provides logic for selecting from zero to a plurality of the events from the event storage (11050) to define a selected set of events (11095), responsive to either a user input or other logic. The selected set of event (11095) are coupled to grouping history storage (11091) via 11092. The grouping history storage is updated responsive to the selected set of events.

In a preferred embodiment, each event in the grouping is identified by its respective event-ID. Alternative ways of referencing (in addition to "Event-ID") which events are in the selected grouping output (11095) can also be provided for. The events can be alternatively identified by a pointer to the storage of the event, an index into a table that stores the event, a count that identifies the event in a linked list of events, and numerous other ways mechanisms for identifying storage as practiced by databases, and other physical storage structures.

In an alternative embodiment, the event content is comprised of an edit reference (which provides a mechanism for identifying the event relative to another event), and the change data, such that no separate event-ID is required. In this manner, the defined order of entry of the events is retained, without requiring the specific assignment of an event-ID. For example, this can be done by always adding events to the end of a table, linked list or array of events. The edit reference would identify an event by a count of how many events it was previous to the current event. Since events are never deleted before the current event and always added after the current event the count will always reference a specific event.

The event storage (11050) is responsive to an input thereto as received from the grouping selector (11096) output (of a selected grouping of a selected set of events (11095)), to provide an output (11051) of event content for the selected set of events from the event storage (11050), representing the event contents for the respective stored events for the selected set.

A presentation processor (11060) provides a presentation output (11064) responsive to the output of event content for the selected events (11051). The presentation processor (11060) assembles the event content for each of the events in the selected set of events defined by the selected grouping of the set of events (output (11095)), and assembles the event content into an ordered format comprising the change data and the event-ID (in a preferred embodiment), responsive to the event-IDs and the edit references comprising the event content for the selected set of events, so as to generate the presentation output (11064) of the corresponding presentation data.

In an alternate preferred embodiment, the event-ID is not included in the presentation output, and the presentation data is formatted with no event-IDs therein, to generate formatted presentation data. In FIG. 72A, the presentation data is used for display only so the event-ID's are not required to provide a presentation to the user. This would be especially useful when generating an output for a standard viewing application such as ADOBE ACROBAT, VLC MEDIA PLAYER, WINDOWS MEDIA PLAYER, ITUNES . . . FIGS. 72C, 72D and 72E also generate formatted presentation data in other preferred embodiments where standard applications also provide editing capabilities.

In another embodiment, the presentation data is formatted into an application specific data format with no event-ID therein. Examples of such application-specific formats are a word processing document file, a spreadsheet document file, a video format file, an audio file, or other applications specific data format for a file. A display apparatus (11015) is responsive to the presentation output (11064) to provide a presentation thereupon of the display presentation output to a user.

Figure 72B:
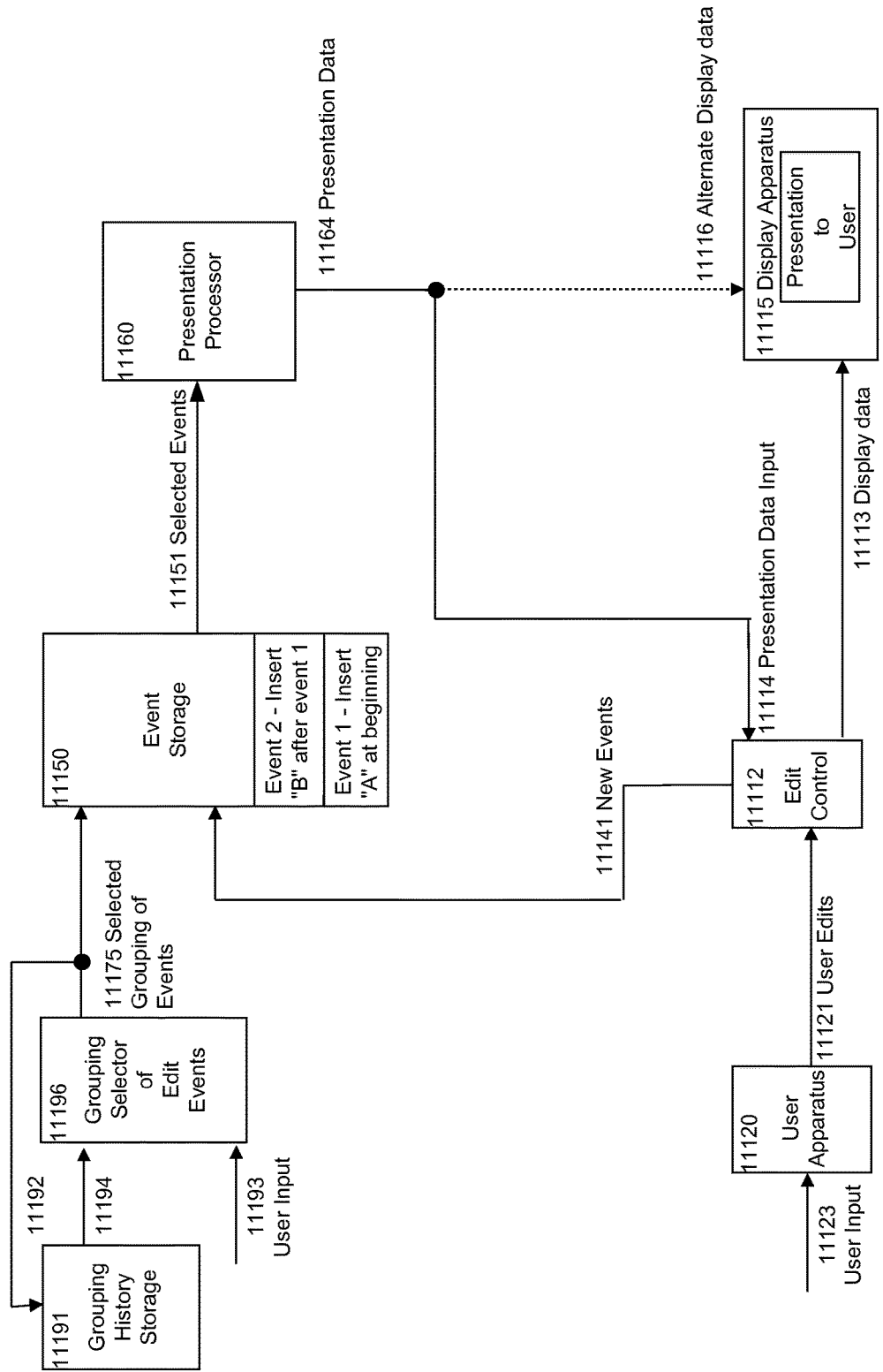
FIG. 72B illustrates an event processing system providing for user input of new events based on presentation data generated from a presentation processor using events in event storage.
Figure 72C:
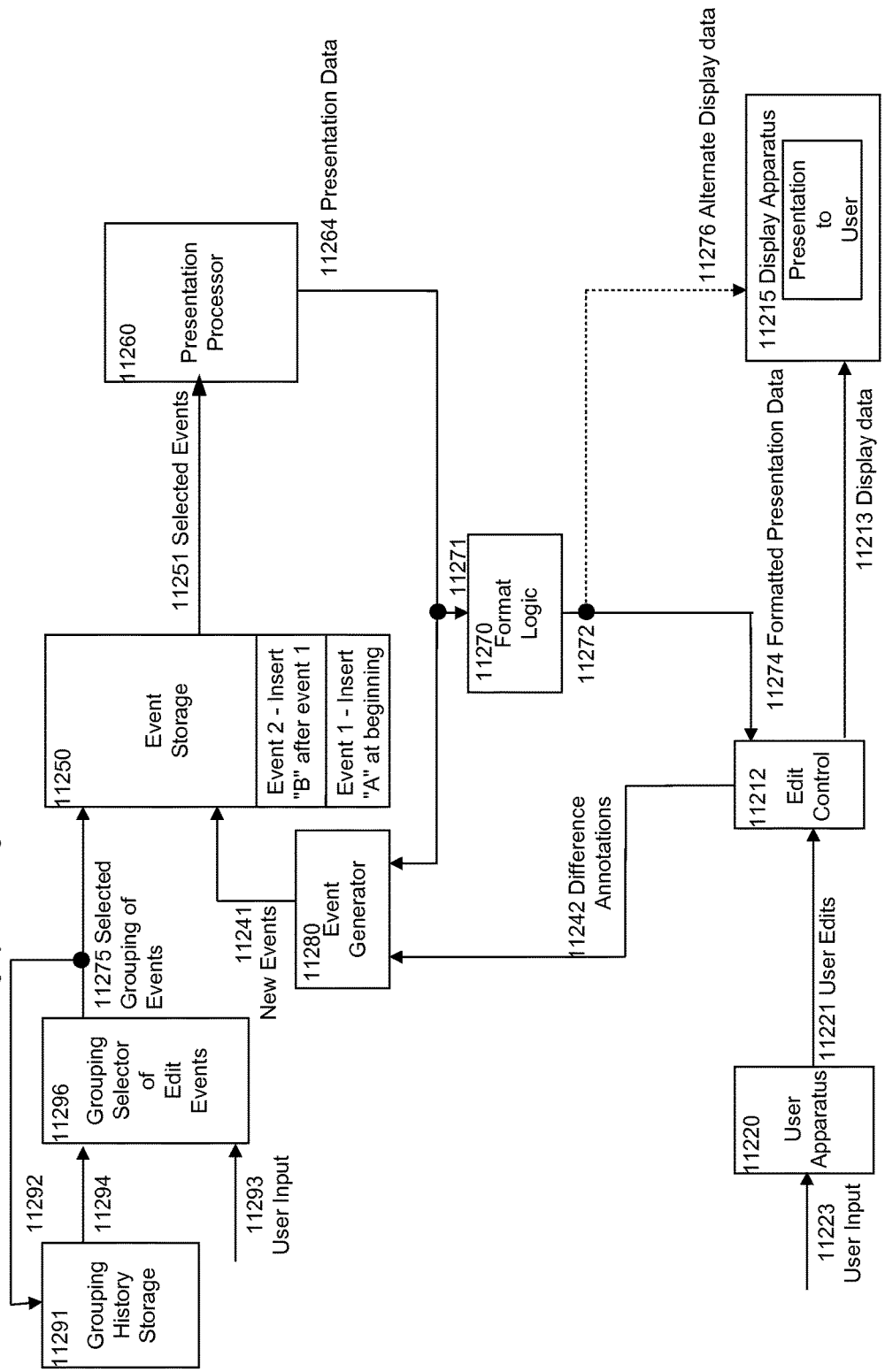
FIG. 72C illustrates an event processing system providing for user input of new events using difference annotations based on formatted presentation data generated from a presentation processor using events in event storage.
Figure 72D:
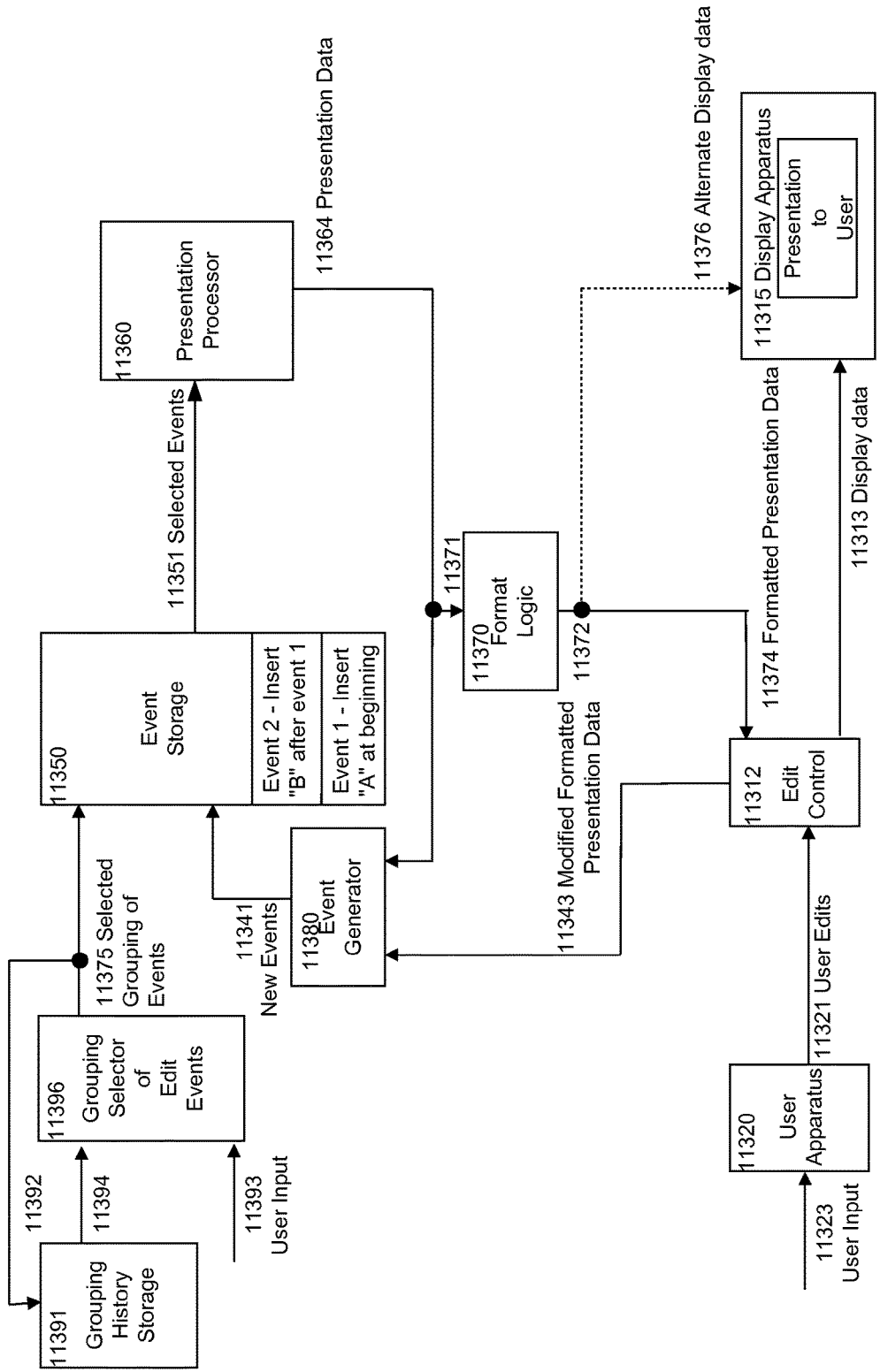
FIG. 72D illustrates an event processing system providing for user input of new events using modified formatted presentation data based on presentation data generated from a presentation processor using events in event storage.
Figure 72E:
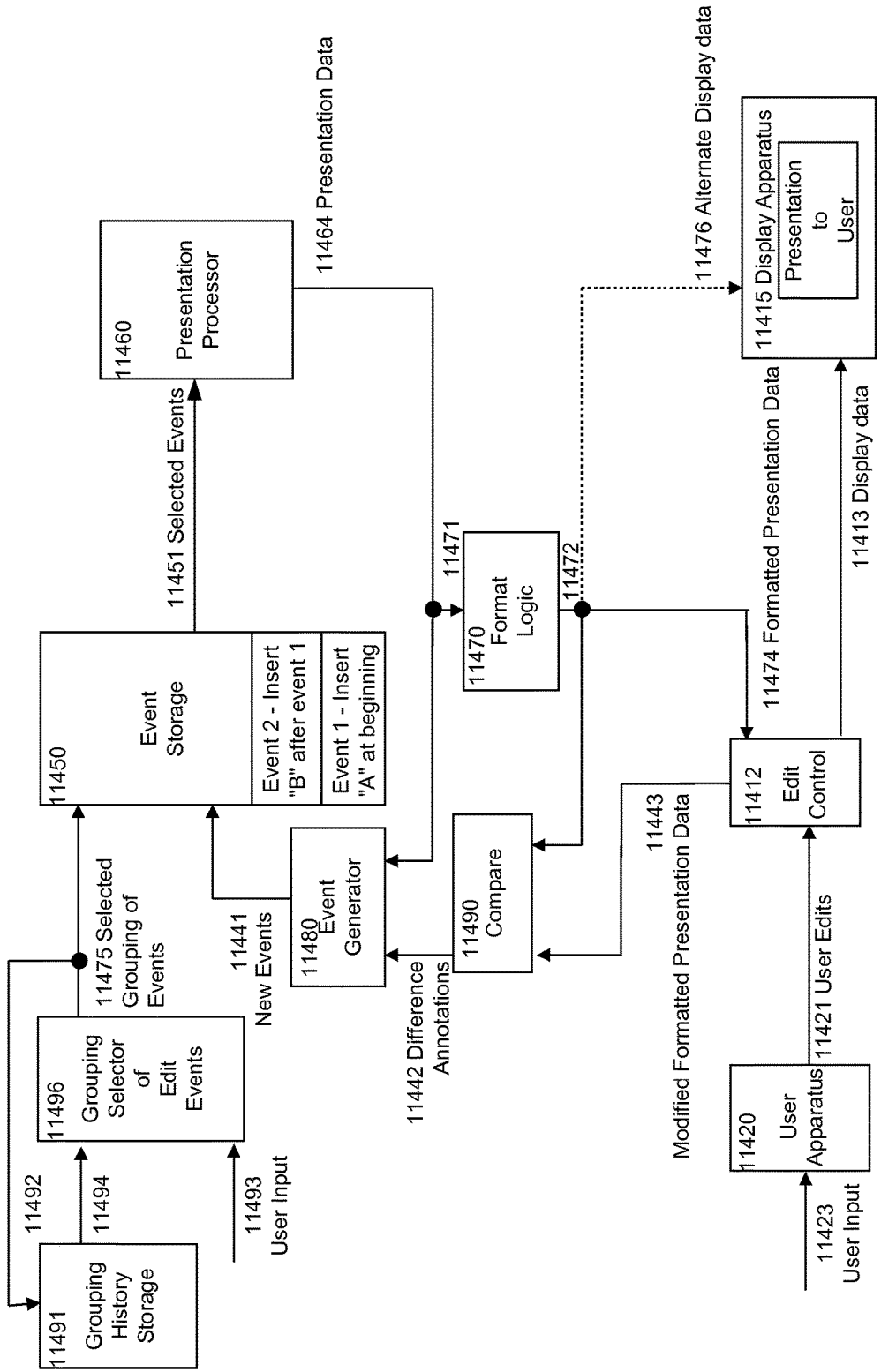
FIG. 72E illustrates an event processing system providing for user input of new events using modified formatted presentation data based on formatted presentation data generated from a presentation processor using events in event storage.

Referring to FIG. 72B, another alternative preferred embodiment of an event processor system (11100) is illustrated, wherein new events (11141) are generated responsive to both (1) the current presentation data (corresponding to the presentation as then being provided to the user), and (2) to the user input data (11123) as output from the user input apparatus (11120), which are processed to provide an output of the new edit events (11141). As illustrated in FIG. 72B, a user input apparatus (11120) provides an output of user input data (11121) representative of user edits. The output (11121) is coupled to the control logic (11112).

A grouping selector (11196) [analogous to the grouping selector (11096), as discussed above with reference to FIG. 72A], which is responsive to a user input (11193), event data (11197) and grouping history data (11194), provides an output (11175) of a selected set (defining a selected grouping of edit events) [analogous to (11095) of FIG. 72A]. The output (11175) is provided as an input to event storage (11150). The event storage (11150) is analogous to the event storage (11050) of FIG. 72A, and the storage of event content therein of event 1 and event 2 is the same. The selected set of event (11175) are coupled to grouping history storage (11191) via 11192. The grouping history storage is updated responsive to the selected set of events.

The event storage (11150) provides an output (11151) of event content for the selected event or events as per the selected set output. The event content output (11151) is coupled to the presentation processor (11160) which provides a presentation data output (11164), responsive to processing of the event content for each event of the plurality of events in the selected set of events, to provide an output of an ordered format, comprising a grouping of the change data and event-ID (for each event in the defined set, in a defined order, responsive to the event-IDs in the edit references for the event content in the events for the selected set of events.

The presentation processor (11160), event storage (11150), and grouping selector (11196) are analogous to those of FIG. 72A. However, at this point, FIG. 72A and FIG. 72B diverge. In FIG. 72B, the presentation data output (in a preferred embodiment) is coupled to an input of the control logic (11112). The control logic (11112) provides an output of display data (11113), which is coupled to the display apparatus (11115) to provide a presentation to the user on the display apparatus (11115). The display data output (11113) is generated by the control logic (11112) responsive to processing of the presentation data (11113), and can also be responsive to additional input of user edits (11121) to provide a display presentation on the display apparatus (11115). In one case, that presentation is of the presentation data (11113) as output from the presentation processor (11160). In another case, the presentation is of a combination of the presentation data output (11113) from the presentation processor (11160) as combined with the user edits (11121), to generate a presentation showing how the user edits have altered or modified an existing presentation. Additionally, the control logic (11112) provides an output of event content for new events (11141) coupled to the event storage (11150) for storage of the new events therein.

Alternatively, the presentation data output (in a preferred embodiment) can also be coupled directly to the display apparatus (11115) per the alternate display data input (11116). This alternate embodiment can be used to display the presentation on the display apparatus independent of the edit control (11112) or if the edit control can is not able to provide the display data (11113).

FIG. 72C illustrates another embodiment of an event processing system (11200), which utilizes the generation of difference annotations (11242) by the control logic (11212) responsive to the user input of user edits (11221) and the input of the formatted presentation data (11274) to provide an output of the difference annotations (11242). The difference annotations (11242) are coupled as an input to an event generator (11280), which also has a second input coupled to receive the presentation data output (11264) from presentation processor (11260). Event generator (11280) generates event content for new events [a.k.a., new edit events] (11241), which are coupled to the event storage (11250) for storage of the event content therein. Grouping selector (11296), which is responsive to a user input (11293), event data (11297) and grouping history data (11294). Grouping history storage (11291) via 11292 is responsive to selected set of events (11275), event storage (11250), presentation processor (11260), user apparatus (11220), which is responsive to a user input (11223), and display apparatus (11215) are analogous to the corresponding subsystems of FIG. 72B in the (11100) series having corresponding last two digits in the numbers.

However, FIG. 72C differs from FIG. 72B as follows. In FIG. 72C, the presentation processor (11260) provides presentation data output, coupled to format logic (11270) and to the event generator (11280). The presentation data output (11254) is coupled as an input (11271) to format logic (11270). The format logic (11270) processes the presentation data (in a preferred embodiment) to be formatted with no event-IDs therein, to generate formatted presentation data output (11272), which is coupled as an input (11274) of formatted presentation data (in a preferred embodiment)

coupled to control logic (11212). Control logic (11212) is responsive to the input of user edits (11221) and to the input of the formatted presentation data (11274) to provide an output of difference annotations (11242) coupled as one input to event generator (11280). The other input to the event generator (11280) is the presentation data (11264) as output from the presentation processor (11260). As illustrated, the event generator (11280) is responsive to the modified presentation data and to the difference annotations (11242) [as output from the control logic (11212)], to generate an output of event content for said new events output (11241), which event content is thereafter stored in the event storage (11250). Additionally, the control logic (11212) is responsive to the formatted presentation data (11274) [as output from the format logic (11270)] and the user edit data (11221), to provide an output of display data (11213), and the display output (11213) is coupled as an input to the display apparatus (11215) [such as an LCD display, a projector, audio speakers, a CRT, etc.], which provides a presentation to the user responsive thereto.

In an alternative embodiment of FIG. 72C, the formatted presentation data output (11272) of the format logic (11270) is also coupled directly (as shown by the . . . (dashed) line) to the input (11276) of the display apparatus (11215) to permit providing of a presentation to the user responsive thereto.

FIG. 72D another alternative embodiment to that as shown in FIG. 72A-FIG. 72C. As shown in FIG. 72D, an event processing system utilizes an output of modified formatted presentation data (11343) [coupled from the control logic (11312)] to provide an input to the event generator (11380), which responsive thereto, and responsive to the presentation data output (11364) [from the presentation processor (11360)], provides an output of new events (11341) which is coupled as an input to the event storage (11350) for storage of respective event content therein.

Many of the numbered component elements of FIG. 72D, which are similarly numbered to the correspondingly numbered components of FIG. 72C, are analogous thereto. Thus, the numbered element components 113XX of FIG. 72D are mostly analogous to the 112XX components of FIG. 72C, e.g., 11251/11351, 11271/11371, 11275/11375, 11291/11391, 11292/11392, 11293/11393, 11294/11394, 11296/11396 and 11296/11397. However, FIG. 72D differs from FIG. 72C, in the following ways, in addition to the event generator differences as discussed above herein). Control logic (11312) [of FIG. 72D] is responsive to the user apparatus (11320), which is responsive to a user input (11323), output of user edits (11321) and to an input (11374) of the formatted presentation data output (11372) of the format logic (11370), to provide for generation of modified formatted presentation data (11374) [as opposed to FIG. 72C, wherein the format logic (11270) provides for output of difference annotations (11242)]. Control logic (11312) provides an output of display data (11313) provide a display [presentation] which output (11313) is coupled to the display apparatus (11315), which, responsive thereto, provides a presentation to the user thereof.

Alternatively, the formatted presentation (11372) output from the format logic (11370) is coupled as alternative display data (11376), directly coupled as an input to the display apparatus (11315) which, responsive thereto, provides a presentation (e.g., audio, video, any display) to the user on the display apparatus (11315). The display data output (11313) can either be the same as the modified formatted presentation data output (11343), or it can be different, as response to, but not limited to, the user providing edits on user input (11323).

In one case, the input of user edits (11321) are coupled through the control logic (11312), and those edits are combined with the formatted presentation data (11374) by the edit control logic to provide a display output (11313) which generates a presentation view showing the formatted presentation data output (11374) with the user's edits shown at the appropriate place therein. However, there can be a different presentation (view) if the user edits (11321) are processed in a delayed manner, such as in a batch mode, or via coupling to a network or a cloud, then the processing of the user edits and the formatted presentation data to generate modified formatted presentation data that is used to generate (and coupled to the event generator used to generate) new edit events. The separate output (11376) can be different from, or the same as, the display data output (11313).

In one embodiment, the display data output (11313) from the control logic (11312) is provided anew for each input of user edits (11321) to the control logic (11312). Thus, the presentation to the user on the display apparatus (11315) is updated with each input of edits. The output (11313) from the control logic (11312), of the modified formatted presentation data (11343), can either be provided each time the user provides edits, in the same manner as the display output (11313), or alternatively, can be provided at periodic intervals as processed by the control logic (11312), either automatically or manually based upon a user input.

In one alternate embodiment, the display output (11313) is the same as the modified formatted presentation data output (11343). In other embodiments, the display output (11313) and the formatted presentation data output (11343), can be separate and different outputs, which can sometimes be the same and sometimes be different, or can always be the same, or can always be different.

As shown in FIG. 72D the edit control (11312) outputs modified formatted presentation data (11343) and inputs formatted presentation data (11374) in a format such as WORD ".doc", POWERPOINT (.ppt), video editor formats, HTML, audio editor formats, etc. These embodiments of the edit control logic (11312) can comprise a computer and a standard document editors such as WORD, POWERPOINT, WORDPERFECT, word processors, presentation tools and others. The user input (11323) is provided to the user apparatus (11320). The user apparatus and display apparatus (11315) are connected to the computer that the standard document editor is running. The formatted presentation data can also be communicated to the standard document editors using OBJECT LINKING AND EMBEDDING (OLE), COMPONENT OBJECT MODEL (COM), DISTRIBUTED COMPONENT OBJECT MODEL (DCOM), DYNAMIC DATA EXCHANGE (DDE), application linking APIs, etc. Likewise the modified formatted presentation data can use the same communication means. The advantage of this embodiment is that it allows current document editors to be integrated into an event document system so the user can use a tool that they are comfortable with but still gain the advantages of an event document system. The disadvantage is that the event processor may have significant computational requirements to determine the new events. Ambiguities exist in exactly how the user modified the document (but the end result looks the same). The events created in this embodiment may not be exactly the same as the events generated by user but the resulting document will be the same. For instance, if two clips are added to a video this system before the modified formatted presentation data is output, the event processor will not be able to determine which was added first by the but will add both clips as predefined by logic (or the user will need to intervene with further input to provide more information). In addition, there can be ambiguity as to what was actually done by the user. The display was initially "A" and the user added an "A" so the display is "AA". Which "A" was added, the first one or the second? The modified formatted presentation data ("AA") doesn't tell you which it was so the event processor will need to pick one of those choices. Usually, this doesn't matter since the result looks identical. Another example shows this more dramatically but the result looks the same. Suppose the original display is "lone" and the modified display is "lone gone". Did the user add "gone" to the end or did they add and an "one g" after "l"? Or did the user add "gunmen" then delete "u", "m" and "n" (last one in "gunmen"), then add an "o" after "g"? It is impossible to tell without more information, but the ability to use standard editors allows the embodiment to be quickly adopted and implemented quickly.

The embodiment of the edit control (11212) in FIG. 72C requires modifications to current document editors or custom document editors to be integrated into an event document system. In this case, the edit controller keeps track of changes to the formatted presentation data as the user inputs them. The difference annotations provide information that indicates where the modified formatted presentation data and the formatted presentation data are identical and where and what the modified formatted presentation data contains different information and where the formatted presentation data that was deleted. This can easily be kept track of by the edit controller as the user deletes information from the display (creating a difference where no new information is added and the formatted presentation data is replaced with nothing or where the different information in an existing difference is removed). If information is added to the display then the a new difference is created that replaces nothing or the information is inserted into difference information of an existing difference. In the examples above, this embodiment would specify exactly which "A" (the first or second) was added to create "AA". There would be no ambiguity as to where the characters in "lone" ended up in "lone gone". However, it would not indicate the order or exactly how the display ended up at "lone gone". Of course if the difference annotations were output after every change to the display by the user this history would be captured but that may not be an efficient way to operate the system. In many cases multiple changes would be submitted to the event processor at once with one difference annotation output. This embodiment does not capture all the history of how the document was modified but does capture the end result exactly between submissions of the difference annotations. This reduces the computational requirements on the event processor because the compare logic is not required in the system 11200 in FIG. 72C. The event generator compares the difference annotations (11242) to the presentation data (11264) and can create the new events (11241) because the presentation data contains the change data and the corresponding event-ID which is used in the edit reference in the new event. The event generator assigns the event-ID of each new event as it is created.

The embodiment of the edit control (11112) in FIG. 72B requires modifications to current document editors or custom document editors to be integrated into an event document system. A disadvantage of this embodiment is that it requires modifications to current document editors to be integrated into an event document system. In this case, the edit controller creates a new event every time a change was made. The presentation data (11114) contains not just the change data from the selected set of events but also the event-IDs corresponding to the change data. Thus, the new event can be created since we know that a change was made in reference to an event-ID, which is used in the edit reference in the new event. The edit controller can save up these new events and submit them to the event processor in a batch mode or as they occur on output new events 11141. An event-ID must be assigned to the new events. This can be done in several ways: the edit controller can assign unique event-IDs as the new events are created, the event processor can provide the edit controller with a unique event-ID as the events are created, and the edit controller can generate temporary event-IDs (needed so new events can refer to older new events before being submitted to the event processor for storage) and the event storage (11150) would assign permanent event-ID's before storing in the events in event storage (the edit references would also need to be modified if they referred to a temporary event-ID). The advantage of this embodiment is that all the history of the user changes are captured and there is no ambiguity as to exactly how the user modified the document. Thus this embodiment will provide the exact information of how the user modified "lone" to get "lone gone" in the example above.

FIG. 72E illustrates another alternative embodiment of an event processing system. The event processing system (11400) is shown, utilizing both modified presentation data [(11443) (output from control logic (11412))] and compare logic (11490) to generate the new events (11441). Many of the components of FIG. 72E are the same functionally to those of FIG. 72D, such that (114XX) is the same as (113XX) (e.g., 113113/11413, 11315/11415, 11351/11451, 11371/11471, 11375/11475, 11376/11476, 11391/11491, 11392/11492, 11393/11493, 11394/11494, 11396/11496 and 11396/11497), except for: 1.) the addition in FIG. 72E of compare logic (11490) in the path between the control logic (11412) and format logic (11470), and 2.) the resultant providing of an output of difference annotations (11442) from the compare logic (11490), which output (11490) is coupled as an input to event generator (11480). Another input of the event generator (11480) is coupled to receive presentation data output (11464) from presentation processor (11460). Responsive to these two sources of input, event generator (11480) provides an output of event content for respective new events (11441) coupled to event storage (11450) for storage of said event content therein. As shown in FIG. 72E, responsive to a user stimulus (11423), the user input apparatus (11420) provides user input data of user edits (11421) coupled to the control logic (11412), which is also responsive to an input of formatted presentation data output (11474) coupled from the format logic (11470), to provide for generation of an output of modified formatted presentation data (11443) which is coupled as one input to compare logic (11490). The formatted presentation data output (11472) from the format logic (11470) is coupled to the other input of the compare logic (11490). The compare logic (11490) provides an output of difference annotations (11442) responsive to a comparison of its inputs. The output of the difference annotations (11442) from the compare logic (11490) is coupled as one input to the event generator (11480). The presentation data output (11464) from the presentation processor (11460) is coupled as an input to another input to the event generator (11480), and is also coupled as an input to the format logic (11470) [The operation of the format logic (11470) is as described with reference to format logic (11370) of FIG. 72D]. The event generator (11480) is responsive to its inputs to provide an output of new events (event content for new events) (11441), which said event content is stored in event storage (11450), as illustrated in FIG. 72E.

This embodiment of the edit control (11412) is identical to the embodiment shown in FIG. 72D of the edit control, 11312.

Figure 73A:
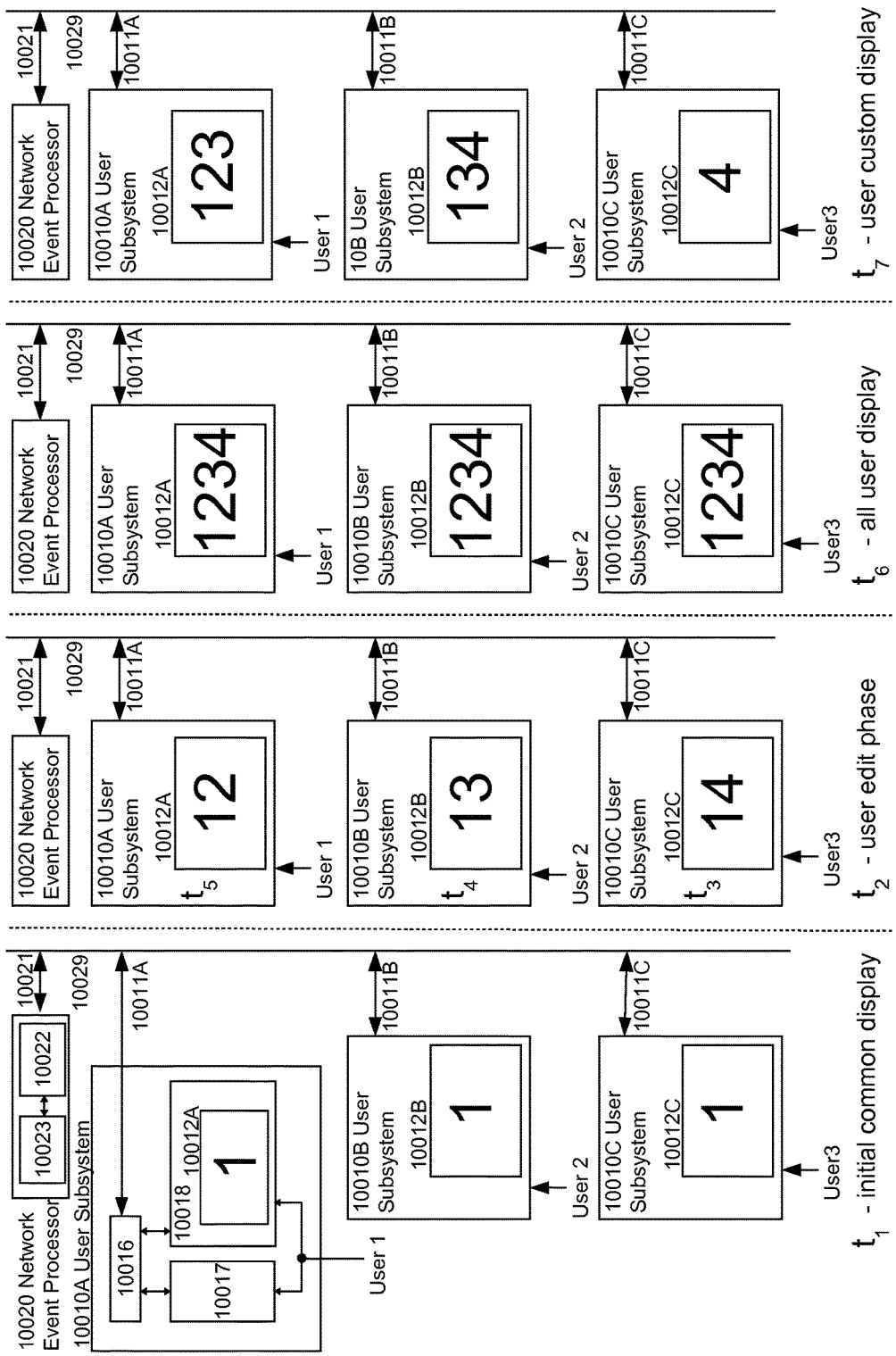
FIG. 73A illustrates a collaborative multi-user system for text-based documents using a central server for event storage. The figure depicts the user displays at different times as the users interact with the system.
Figure 73B:
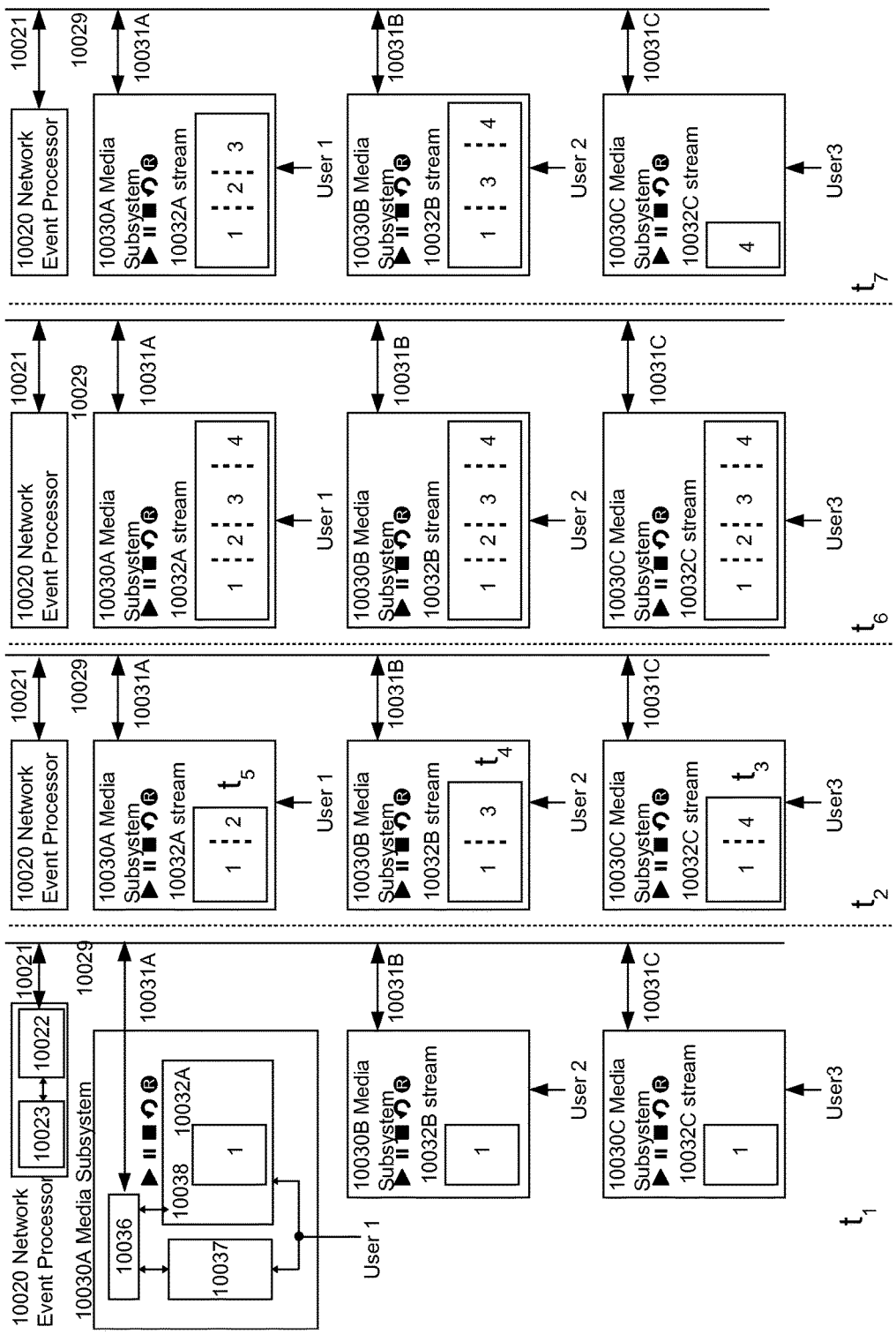
FIG. 73B illustrates a collaborative multi-user system for media-based documents such as video and audio using a central server for event storage. The figure depicts the user displays at different times as the users interact with the system.
Figure 73C:
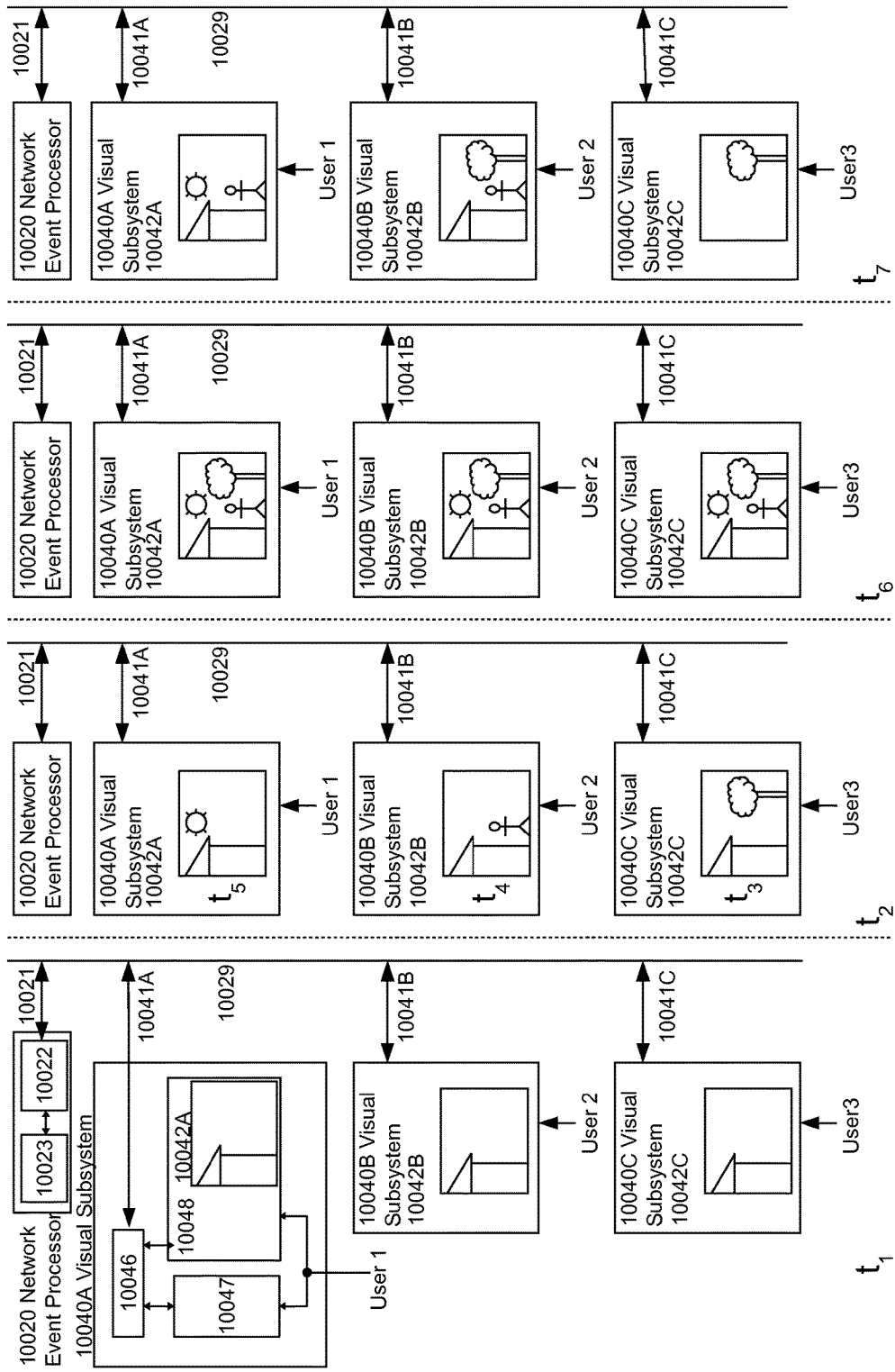
FIG. 73C illustrates a collaborative multi-user system for visual-based documents such as image, 3D models, drawings and POWERPOINT using a central server for event storage. The figure depicts the user displays at different times as the users interact with the system.

FIG. 73A, FIG. 73B, and FIG. 73C illustrate alternative embodiments of multi-user based event processing systems. As illustrated in FIG. 73A, FIG. 73B, and FIG. 73C, a plurality of user subsystems are shown therein, with a network event processor coupled via a communications interface to provide for selective processing and generation of a presentation display of the events. The figures, FIG. 73A, FIG. 73B, and FIG. 73C, provide a state flow diagram and a time sequence illustration of the processing of the input of events and edits by three users, and also illustrates how the inputs of the users are processed over time to generate and provide a presentation output on the display apparatus. FIG. 73A illustrates an event processing system at network level, for a document (such as a word processing document, a spreadsheet document, or other text document). FIG. 73B provides the same type of illustration but for a media-based system (such as where there is an audio file or video file, a media stream, etc.). FIG. 73C illustrates an alternative network-based multi-user system, for an image-based system (such as still, video, 3-D models, 2-D models, etc.).

Figure 78B:
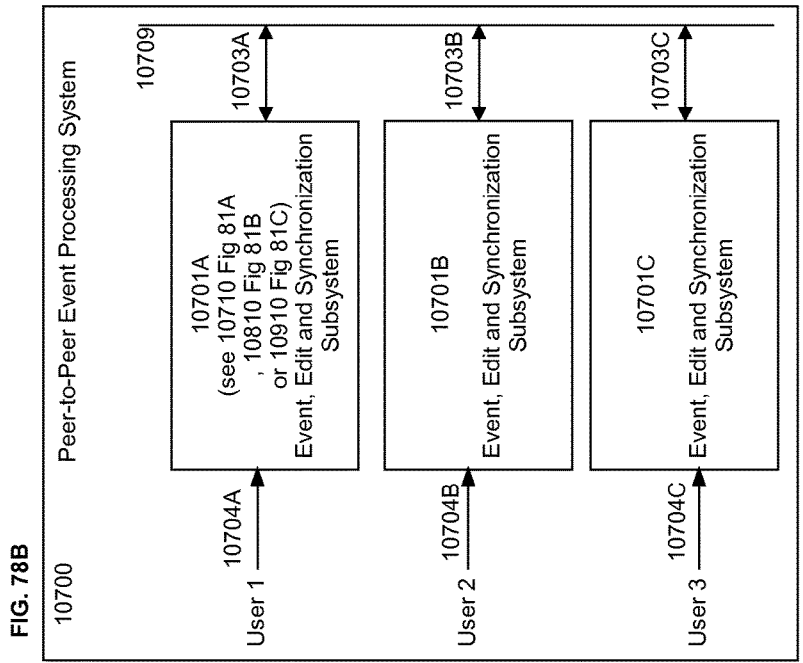
FIG. 78B illustrates a multi-user event processing system utilizing peer-to-peer distributed processing.
Figure 78A:
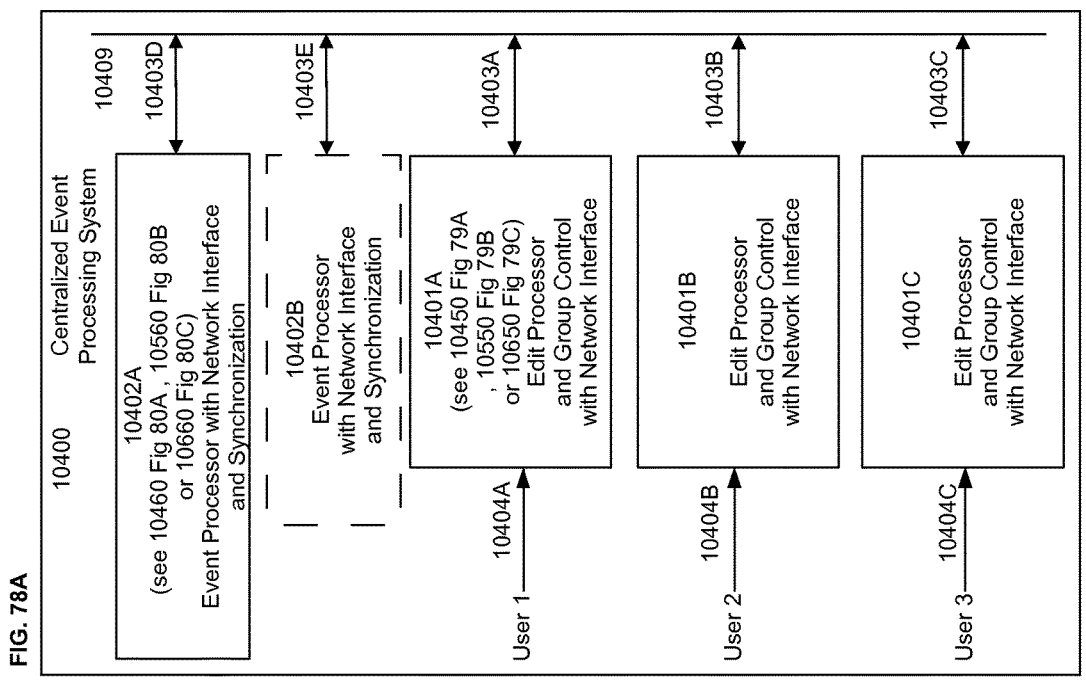
FIG. 78A illustrates a multi-user event processing system utilizing at least one central server.
Figure 80A:
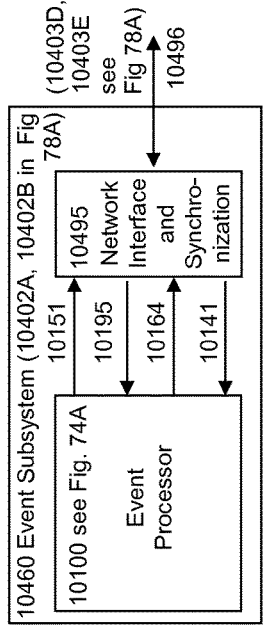
FIG. 80A illustrates an embodiment of the event subsystem (10460) as shown in FIG. 78A (10402A and 10402B) utilizing subsystems shown in FIG. 74A (10100).
Figure 80B:
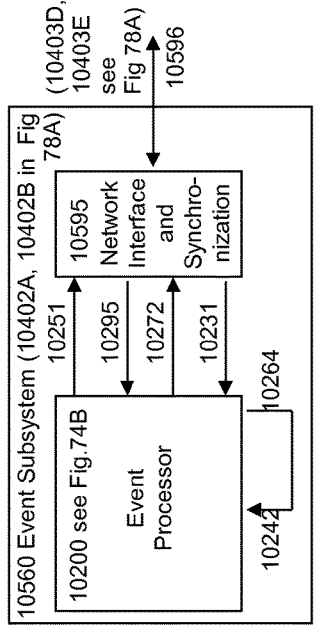
FIG. 80B illustrates an embodiment of the event subsystem (10560) as shown in FIG. 78A (10402A and 10402B) utilizing subsystems shown in FIG. 74B (10200).
Figure 80C:
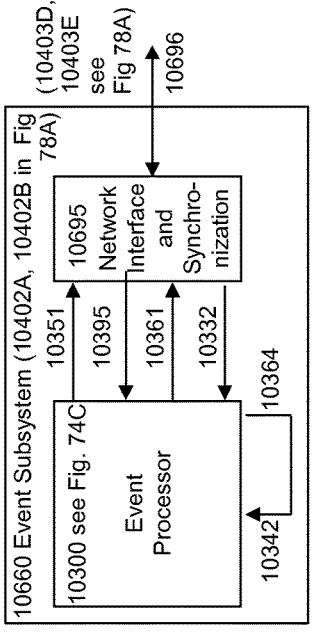
FIG. 80C illustrates an embodiment of the event subsystem (10660) as shown in FIG. 78A (10402A and 10402B) utilizing subsystems shown in FIG. 74C (10300).
Figure 79A:
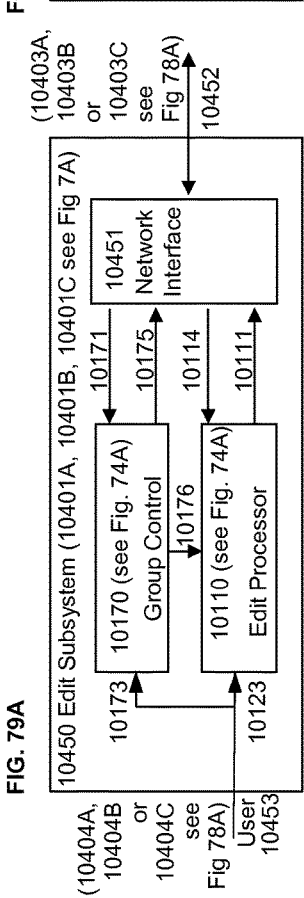
FIG. 79A illustrates an embodiment of the edit subsystem (10450) as shown in FIG. 78A (10401A, 10401B and 10401C) utilizing subsystems shown in FIG. 74A (10170 and 10110).
Figure 79B:
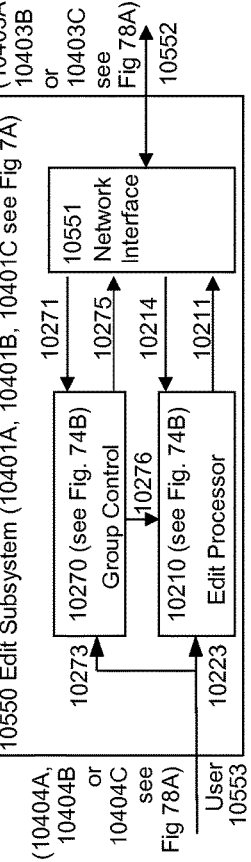
FIG. 79B illustrates an embodiment of the edit subsystem (10550) as shown in FIG. 78A (10401A, 10401B and 10401C) utilizing subsystems shown in FIG. 74B (10270 and 10210).
Figure 79C:
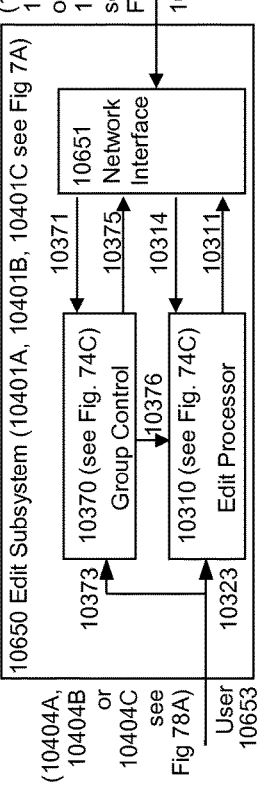
FIG. 79C illustrates an embodiment of the edit subsystem (10650) as shown in FIG. 78A (10401A, 10401B and 10401C) utilizing subsystems shown in FIG. 74C (10270 and 10210).

The system as illustrated in FIG. 73A, along with the time sequencing of output and state flow, are illustrated in further detail in system block diagrams and detailed circuit block diagrams in FIG. 78A, FIG. 79A, and FIG. 80A in combination, FIG. 79B, and FIG. 80B in combination, and FIG. 79C and FIG. 80C in combination. FIG. 73A also corresponds to FIG. 74A, which provides a detailed block diagram and state flow chart illustrating the entry and processing of events to generate a presentation on a display apparatus.

As illustrated in FIG. 73A, there are a plurality of user subsystems, 81A, for user 1, 81B for user 2, and 81C for user 3. The user subsystems are coupled via communications interface 10016 to an output 82A, 82B, and 82C [for 81A, 81B, and 81C] to couple output data (10021) from each subsystem to a communications bus interface network (or network or cloud), which couples the data (10021) to the communications interface (10022) of network event processor (10020) (in a preferred embodiment), which provides centralized event processing. The communications interface 10022 is coupled to the event processor 10023. The communications interface 10016 couples to the group selector logic 10017. The editor logic displays the presentation on display 83A, 83B, and 83C for each user. Elements 10016, 10017 and 10018 are also contained in 81B and 81C although not shown for clarity since the resulting displays is the focus of this figure. Elements 36, 37 and 38 in FIG. 2B function similarly to elements 16, 17 and 18 respectively. Elements 46, 47 and 48 in FIG. 2C function similarly to elements 16, 17 and 18 respectively.

FIG. 73A is divided into four columns indicating (and corresponding to) multiple phases of user edits, at multiple times. The first column on the left of FIG. 73A, illustrates an initial common display presented to all users, at a first time ($t^1$). The second column from the left shows at time ($t^2$), where one or more users are making edits to an initially displayed presentation of selected events. That initially displayed presentation can be based upon already stored data, or something new that a user enters.

As illustrated in FIG. 73A, at time (t1), (the first column) the display apparatus 83A, 83B, and 83C, respectively, for user 1, user 2, and user 3, provide a display presentation of the number ("1") as a presentation on the display apparatus. During the time interval of time ($t^2$) (the second column from the left), user inputs occur at time ($t^3$), time ($t^4$), and time ($t^5$). At time ($t^3$), user 3 provides an input of an edit providing an input of the number 4 after the number 1. At time ($t^4$), user 2 provides an input of the number 3, to be placed after the number 1. Above that, at time (t5), user 1 provides an input of the number 2 after the number 1, in the display. In the third column from the left in FIG. 73A, at time ($t^6$), all the events are processed by the network event processor and the processed data is coupled via the communications bus interface (10029) to couple corresponding presentation data output via communications data interface 82A, 82B, and 82C, respectively, for users 1, user 2, and user 3, to provide an updated display presentation of all of the user edits as in the proper order/sequence as inputted at the respective times. The order of the inputs is analogous to a single user input, wherein the latest in time input takes priority in the sequence, so that at time ($t^5$), the user 1 instructed the system to put a 2 after the 1. This takes precedence over an earlier time when, at user 2, said at time ($t^4$), to put a 3 after the 1. Subsequent to that, at time ($t^5$), user 1 said to put a 2 after the 1.

In the third column from the left in FIG. 73A, at time (t6), the display on all of the users' displays provides 1, 2, 3, 4, in the sequence in the manner as described. Other alternative priority methodologies can alternatively or additionally be utilized, such as one (or a plurality) of user(s) are given priority of their work so their events are are always processed before the non-priority users. Additionally, the users or the user subsystem can provide different ways of specifying the location in the presentation data where the event content is inserted. This example, only shows that the event content is inserted after another event. The event could be inserted before another event also. It could also be inserted at a fixed place in the presentation. Insert at beginning or insert at end are the most common fixed locations. However, some embodiments may choose to allow inserts at some fixed offset (forward or backward) from an event or the beginning or end of the presentation data. The offset could be counted in events or in document entities (atoms or tokens). The offset could also be a physical location relative to an event for media that is image-based or for textual media placement on a page.

As illustrated in FIG. 73A, one methodology of prioritizing ordering of the user event input is illustrated. Alternatively, for other embodiments, other rules of ordering and sequencing can be followed, to provide for different functionality as desired for that system. The ordering of the user events is determined by selecting the proper edit reference and by the presentation processor. For example, suppose the user is viewing a presentation of a document that shows "fox jumped". The user adds "quick" to the beginning of the display so the result is "quick fox jumped". Should "quick" be inserted after the beginning of the document or before the event that added "fox"? Either makes sense for this display. If there was an unselected event inserting "The" at the beginning and this event is now displayed with the "quick" user input the display will be either "quick The fox" or "The quick fox". Obviously in this case you would prefer the latter. The decision will depend on the system. For this text based system, generally the "at the beginning" reference should only be used if there is no event available to reference a new event to or if the user indicates that is the proper place.

Additionally, the user may further add "brown" to "The quick fox" between "quick" and "fox". Should "brown" be added before "fox" or after "quick"? This is a bit more of a nuanced decision and may depend on context information in the events. Generally, inserting after "quick" could be the default decision. However, "brown" is an adjective and adjectives generally go before a noun ("fox") so it may be preferable to insert it before "fox". That would be the rule for English but other languages have other rules for adjectives so the decision may be language dependent. Further, if "fox" was input by another user it may be better to insert "brown" after "quick" because both were entered by the same user. The information as to the user that input an event is one example of context information that can be stored in the events for later use. Similarly, the presentation processor may choose to assemble the presentation differently when some events are not selected. For example, just the opposite could be provided, where the first edit made gets precedence over the last edit made in a multi-user system. Alternatively, a method of edit reference can be provided for the multi-user environment, that is not limited to a single previous event, but can be related to multiple events, or to multiple factors, to facilitate a supporting of a cloud environment to allow a user to choose how the later-made references are treated relative to the earlier references. There are many options that can be optimized for the particular type of document (text, movie, audio, image based) that is being stored and how the users expect to view the document.

In the fourth column from the left in FIG. 73A, at time ($t^7$), each user is provided with a display presentation for that user responsive to a respective set of selected events, either as selected by that user for (or otherwise as selected) as to which users' inputs of edits will be displayed. The selection of events for a user may not be at the user's complete discretion. The network event processor (10020) or their user subsystem (10010A, 81B, 81C) may impose limits on the events that can be selected for a user. For example, for security concerns or for work flow automation all users may not be able to view events. However, since all users are still working the same event storage their individual work is automatically integrated together and other users that can select all the events have an instant availability to everyone's work in context with each other without time consuming, non-productive integration or delays for user to wait for another user to complete their work. User 1, at time $t^7$, has selected to see a presentation ("1 2 3") corresponding to the initial display plus user 1 and user 2 inputs, provided in the ordering and time sequences as described for FIG. 73A. Whereas, user 2 has selected a presentation ("1 3 4") corresponding to the initial display of 1, plus user 2 and user 3 inputs. User 3 has selected a presentation ("4") to see only the edit event input of the number 4 as provided by user 3. It should also be noted that at time $t^7$ none of the user's are displaying a presentation of the document that has ever been seen before by any of the users, a unique feature of the event based document system.

Referring to FIG. 73B, an analogous system to that of FIG. 73A is shown, except that the events and display relate to a media file display relating to media data. As illustrated, a media stream is provided comprising a video or audio file that has content comprised of multiple segments that sequence and change over time which can be combined to comprise a whole, such as audio, (e.g., an audio song, speech), or video (e.g., a movie, etc.). In an analogous manner to FIG. 73A, at time $t^1$, user 1, user 2, and user 3 have a common local display of an initial presentation showing a first media clip ("Clip 1") within the media file display (10038). During time interval ($t^2$), user 1, user 2, and user 3 provide additional media files—clips to be added to or otherwise annotated relative to the initial media file (or media stream of data). As illustrated in FIG. 73B, time ($t^3$), time ($t^3$), time ($t^4$), and time ($t^5$), occur within time interval ($t^2$). At time ($t^3$), user 3 provides media clip 4 to be placed after media clip 1. At time ($t^4$), user 2 provides an input of media clip 3 to be placed after media clip 1. At time ($t^5$), user 1 provides an input of media clip 2 to appear after media clip 1.

At time $t^6$, the network event processor 10020 processes the additional clips that were provided at time during time interval ($t^2$), [as occurred at time ($t^3$), time ($t^4$), and time ($t^5$)] and provides an assembled presentation output that is coupled via communications interface (10029), to the user media subsystems (10030A, 10030B, 10030C) for the users (1, 2, 3, respectively). The assembled presentation output for each user is then displayed to each of the users as a presentation of media clip 1, followed by media clip 2, followed by media clip 3, followed by media clip 4. This ordering is chosen by the network event processor in this embodiment [alternate preferred embodiments can insert the media stream differently] is determined by the relative time when the media clips were inserted by each user and where the user chose to insert the clip. Each user in this example inserted their respective clip after clip 1. User 1 first inserted clip 4 after clip1 at time $t^3$. $t^4$ . . . . User 2 at time $t^4$ inserted clip 3 after clip 1 which places it after clip 1 and before clip 4. Finally, user 3 inserts clip 2 after clip 1 at time $t^5$. Clip 2 is inserted after clip 1 which places it after clip 1 and before clip 3 which is followed by clip 4. The users could have chosen to insert their clip "at the end" of the presentation data. If user 2 had chosen this placement, then the resulting clip order would be clip 1, clip 3, clip 4, clip 2.

Similarly, as described to FIG. 73A, and FIG. 73B, other rules of ordering and hierarchical processing can alternatively or additionally be followed. While this order is best for many situations for a single user, and for some situations of multiple users, it may or may not be best for a given situation for multiple users, and all such alternatives are consistent with the teachings of this present invention.

At time ($t^7$), each user is provided with a custom selection of which of the clips they will be present. In a preferred embodiment, each user is provided with a selection of which user annotations they would like to see. [Alternatively, other means of selection can be provided, such as by another user for other users, or by computer logic.] Analogous for FIG. 73A, FIG. 73B, and FIG. 73C, the network event processor (10020) responds to the user requests of specific clips to be seen, as controlled by the group selector responsive to a user input, and provides the presentation data output as needed for generation of the presentation on the display apparatus. As shown in FIG. 73B, user 1, at time (f), is illustrated as having requested and being provided with a display presentation of the initial clip 1, combined with the input annotations of user 1 and user 2, showing a resultant display presentation of a sequence of clip 1, clip 2, and clip 3 in that order of sequence. User 2, at time (f), is illustrated as having chosen and being provided with a display presentation of the initial clip display 1 followed by the input annotations of user 2 and user 3, providing a display presentation of clip 1 followed by clip 3, and followed by clip 4. In FIG. 73B, user 3, at time ($t^7$), has chosen to see only the addition of the event made by user 3, and only clip 4 is illustrated.

Referring to FIG. 73C, another alternative embodiment is shown of the system to FIG. 73A and FIG. 73B, with some equivalent components therein, and with the difference being that the display presentation that is provided is of a visual presentation, such as a still picture, a graphic file, a 2-D model, and a 3-D model, etc. Additionally, this system can provide for other types of visually based presentations, such as a POWERPOINT presentation, or even a video presentation. The system of FIG. 73B also provides for utilizing a video media file.

As illustrated in FIG. 73C, at time ($t^1$), an initial presentation of an image (of a portion of a house) is shown as the initial presentation shown on the display apparatus of each of the user devices. That initial display presentation can be provided by the system from stored content, or can be provided by a user. A group selector can provide for selection of a set of event content from the event storage and via the network event processor (10020), to provide the display presentation.

In FIG. 73C, at time ($t^2$), each of the users provide an input of user edits which generates a respective output of a new (edit) event, which is coupled via the system bus interface network communication bus (10029) to the network event processor (10020). At time ($t^3$), user 3 provides an annotation of an addition of an image of a tree as the added new event, and this addition is illustrated in the combined display presentation for user 3 in user subsystem (10040C) at time ($t^3$). At time ($t^4$), user 2 provides an input annotation of a display image of a person, which is displayed as combined with the initial display image of time ($t^1$), as displayed in the combined presentation on the presentation system of user system (10040B) at time ($t^4$). At time ($t^5$), user 1 provides an input annotation of an image of a rising sun located and positioned next to the house from ($t^1$), and this combined presentation is displayed in the display presentation of the user subsystem (10048) at time ($t^5$). At time ($t^6$), the network event processor (10020) processes the new events provided by the user 1, user 2, and user 3, at times ($t^3$), ($t^4$), and ($t^5$), to provide an output of presentation data and input to visual subsystems 10040A, 10040B, and 10040C (in a preferred embodiment) of the assembled event content, responsive to selected set of events assembled into an ordered format responsive thereto. As shown at time ($t^6$), user 1, user 2, and user 3, all see a common display (10042A, 10042B, 10042C) showing the house (from ($t^1$)) with a man next to it (from ($t^4$)), the sun above him (from ($t^5$)), and the tree next to him on the other side (from ($t^3$)). As illustrated in FIG. 73C, the presentation resulting from the user annotations is not affected by the order of entry. However, if the user annotations were instead made so as to affect the presentation of the initial display (from ($t^1$)), or the display for other user annotation input, then, order of entry could affect the combined presentation. For example, if objects would appear in front of each other, then the order of entry would be relevant in terms of what object appears atop or behind (or obscure or not) another in the display.

At time ($t^7$), the network event processor (10020), responsive to each users' selection of specific edit events, provides for presentation data be coupled to each respective user subsystem (10040A, 10040B, 10040C) for the selected set of events as selected by (or for) that respective user, to provide a respective presentation on the display apparatus of that respective subsystem. Thus, as illustrated in FIG. 73C, at time ($t^7$), user 1 has selected the initial display of the house from time ($t^1$), combined with the inputs of user 1 (the sun, at time ($t^5$)), and user 2 (the stickman, at time ($t^4$)), as shown on the display (10042A). User 2, at time ($t^7$), sees a display (10042B) of the selected combination of the initial display of the house from time ($t^1$), combined with the inputs of user 2 (of the stickman at time ($t^5$)), and user 3 (of the tree at time ($t^3$)). At time ($t^7$), user 3 sees the display (10042C) of the selected edit event of user 3 of the tree only (from time ($t^3$). The network event processor (10020) of FIG. 73A, FIG. 73B, and FIG. 73C, is shown in further detail, alternatively, as subsystem (10460) of FIG. 80A, subsystem (10560) of FIG. 80B, or subsystem (10660) of FIG. 80C. The event processor (10023) of FIG. 73A, FIG. 73B, and FIG. 73C, is shown is further detail, alternatively, as subsystem (10100) of FIG. 74A, subsystem (10200) of FIG. 74B, and subsystem (10300) of FIG. 74C. The network interface (10022) of FIG. 73A, FIG. 73B, and FIG. 73C, is shown in further detail, alternatively, as subsystem (10495) of FIG. 80A, subsystem (10595) of FIG. 80B, and subsystem (10695) of FIG. 80C. The data interface to the network bus (10029), and the network interface (10021) as coupled to the common bus/network/cloud (10029), is illustrated in further detail, alternatively, as (10496) in FIG. 80A, 10596 in FIG. 80B, and 10696 in FIG. 80C, respectively.

The edit processor subsystem (10040) of FIG. 73A, FIG. 73B, and FIG. 73C, is illustrated in further detail, alternatively, as (10450) of FIG. 79A, (10550) of FIG. 79B, and (10650) of FIG. 79C, respectively. The interface data connection to the system bus (10029) is local communication interface (10041A), (10041B), and (10041C) of FIG. 73A, of FIG. 73B, and of FIG. 73C, and is shown in further detail as 10452 of FIG. 79A, 10552, FIG. 79B, and 10616 of FIG. 79C, respectively.

The edit processor subsystems 81A, 81B and 81C of FIG. 73B are configured for textual based documents. The edit processor subsystems in FIG. 73B are configured for documents of media streams. The edit processor subsystems 81A, 81B and 81C of FIG. 73A are further described in 10450 (FIG. 79A), 10550 (FIG. 79B) or 10650 (FIG. 79C). The user subsystems are coupled via communications interface 10016 [10451 (FIG. 79A), 10551 (FIG. 79B) or 10651 (FIG. 79C)] to an output 82A, 82B, and 82C [for 81A, 81B, and 81C] to couple data from each subsystem to communications bus, network, network/cloud 10029. The communications interface 10016 couples to the group selector logic 10017 [10170 (FIG. 74A), 10270 (FIG. 74B) or 10370 (FIG. 74C)] and editor logic 10018 [10110 (FIG. 74A), 10210 (FIG. 74B) or 10310 (FIG. 74C)]. The editor logic displays the textual presentation on display 83A, 83B, and 83C for each user. Elements 10016, 10017 and 10018 are also contained in 81B and 81C although not shown for clarity since the resulting displays is the focus of this figure.

The edit processor subsystems 10030A, 10030B and 10030C of FIG. 73B are configured for documents of media streams and the display 10032A, 10032B and 10032C are capable of presentation of media streams such as audio, video, flash, animations to the user. The edit processor subsystems 10030A, 10030B and 10030C of FIG. 73B are identical to 81A, 81B, 81C of FIG. 73A except that 10030A, 10030B and 10030C are coupled to the communications bus, network, network/cloud 10029 via 10031A, 10031B and 10031C instead of 82A, 82B, and 82C.

The edit processor subsystems 10030A, 10030B and 10030C of FIG. 73B are configured for documents of media streams and the display 10032A, 10032B and 10032C are capable of presentation of media streams such as audio, video, FLASH, animations to the user. The edit processor subsystems 10030A, 10030B and 10030C of FIG. 73B are identical to 81A, 81B, 81C of FIG. 73A except that 10030A, 10030B and 10030C are coupled to the communications bus, network, network/cloud 10029 via 10031A, 10031B and 10031C instead of 82A, 82B, and 82C.

The event processor subsystem 10020 [(10496) of FIG. 80A, (10596) of FIG. 80B or (10696) of FIG. 80C] is coupled to the edit processor subsystems of FIGS. 73A, 73B and 73C via communications bus, network, network/cloud 10029 and bus 10021 to the communications interface 10022 [(10495 of FIG. 80A, (10595) of FIG. 80B or (10695) of FIG. 80C] of the network event processor 10020 [(10460) of FIG. 80A, (10560) of FIG. 80B or (10660 of FIG. 80C], which provides centralized event processing. The communications interface 10022 is coupled to the event processor 10023 [(10100) of FIG. 74A, (10200) of FIG. 74B or (10300) of FIG. 74C].

Figure 74A:
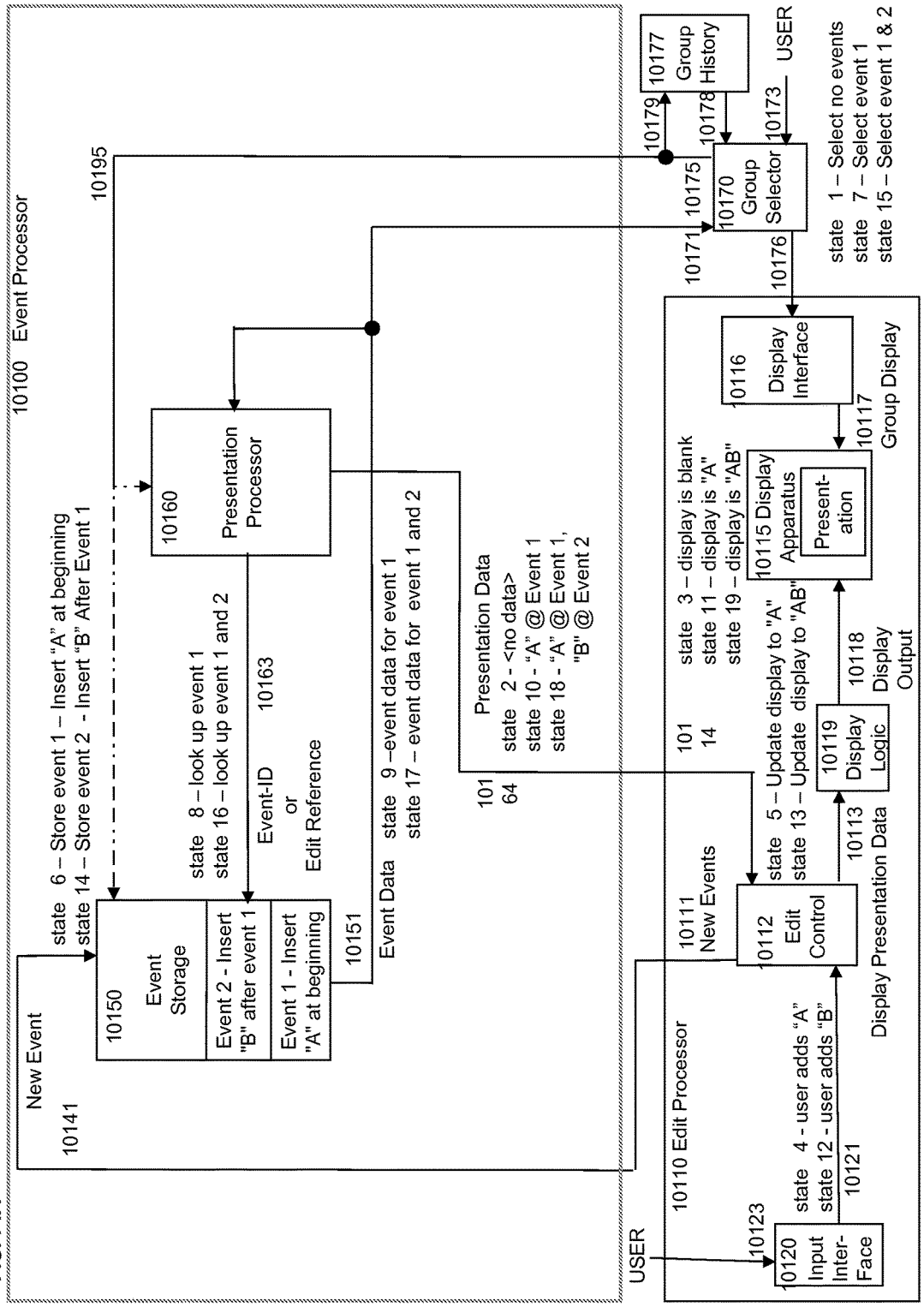
FIG. 74A illustrates the state flow of an event processing system providing for user input of new events based on presentation data generated from a presentation processor using events in event storage.
Figure 74B:
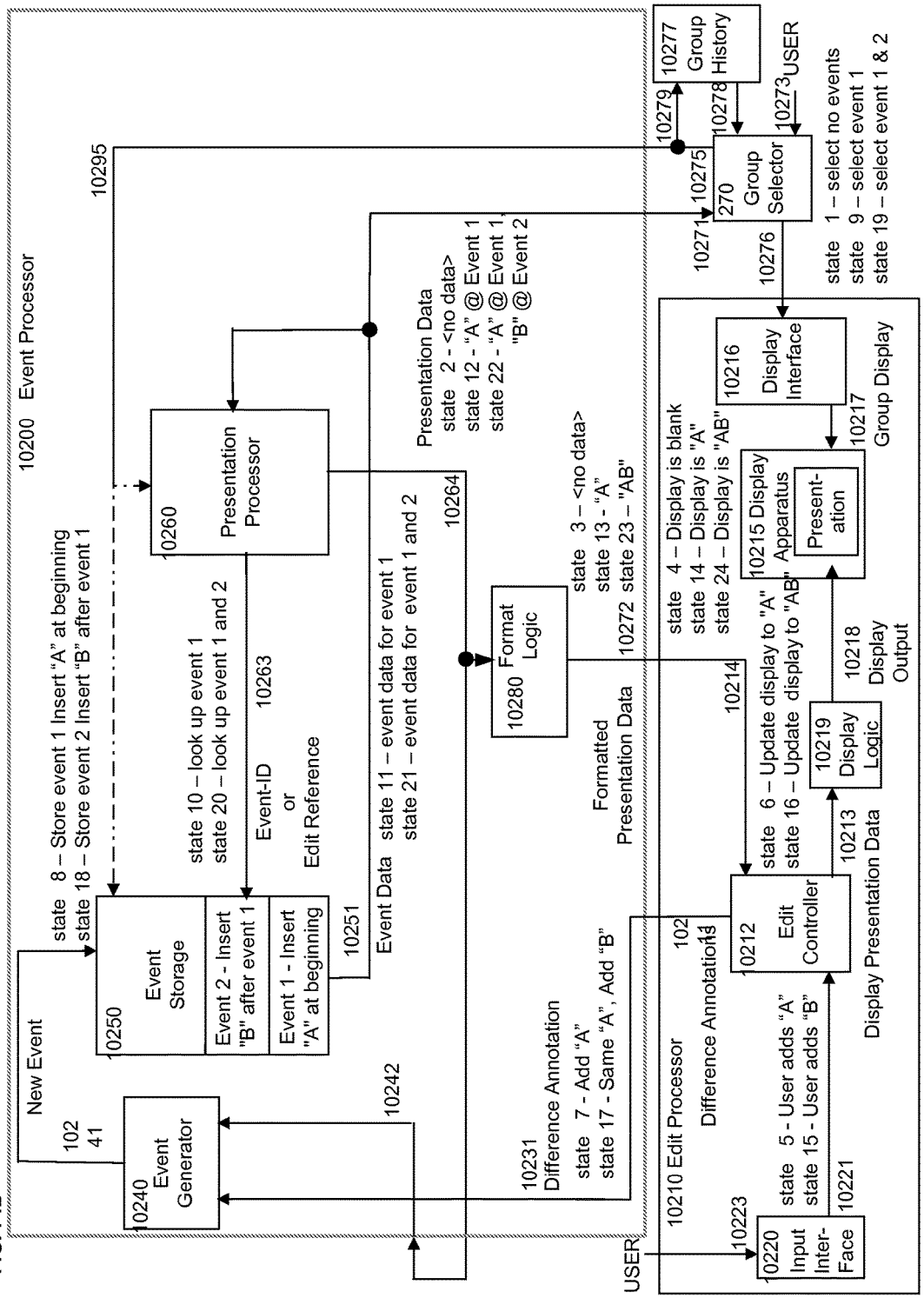
FIG. 74B illustrates the state flow of an event processing system providing for user input of new events using difference annotations based on formatted presentation data generated from a presentation processor using events in event storage.
Figure 74C:
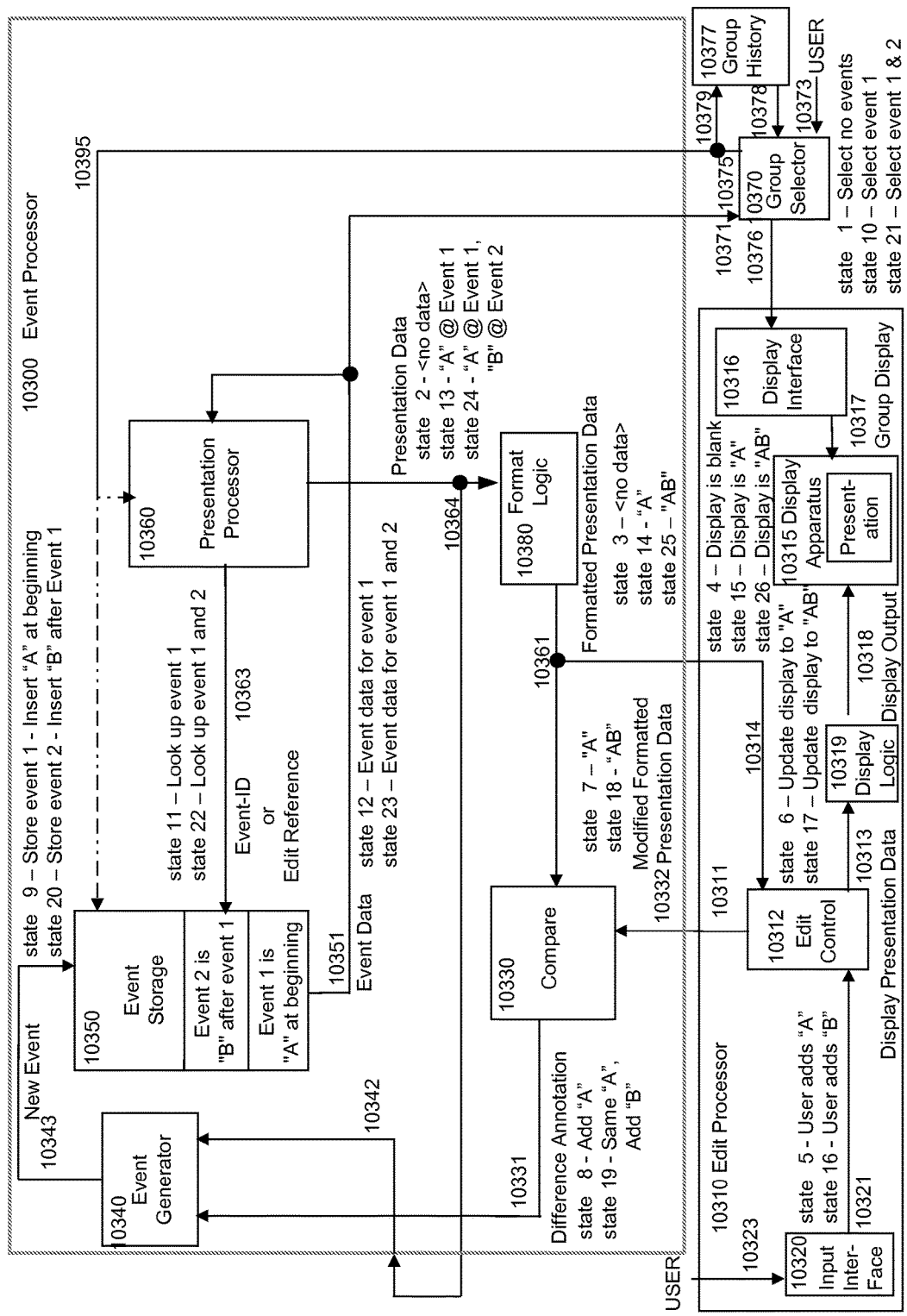
FIG. 74C illustrates the state flow of an event processing system providing for user input of new events using modified formatted presentation data based on formatted presentation data generated from a presentation processor using events in event storage.

The group selector logic (10047) of FIG. 73C [as well as (10017) of FIG. 73A, and (10037) of FIG. 73B] is shown in further detail as (10170) in FIG. 74A, (10270) in FIG. 74B, and (10370) in FIG. 74C.

The edit processing subsystem (10048) of FIG. 73C [as well as (10018) of FIG. 73A, and (10038) of FIG. 73B] is illustrated in further detail as (10110) of FIG. 74A, (10210) of FIG. 74B, and (10310) of FIG. 74C, respectively.

FIG. 74A, illustrates an electronic block diagram is provided, including a state flow diagram therein, of a system providing an event editing system for a single user, with the edit control logic (10112) outputting new events directly responsive to the user input (10121), which new events are directly stored in the event storage (10150) for utilization in generating selected display presentations. An input interface (10120) is responsive to an external user stimulus to provide an output of user data (10121) that is coupled to the control logic (10112). The control logic (10112) responds to the user input (10121) to provide an output of new events (10111), which output is coupled as an input (10141) of the new edit event that is coupled to the input (10141) of the event storage (10150), which stores the respective event content therein. A group selector (10170) is also responsive to a user input (10173) [which may be the same user or different user, or maybe the same user input provided to the input interface (10120)] and stored group history output (10178). The user stimulus (10173) is input to the group selector (10170), which generates an output (10175) of a selection of a set of selected group of events. The output (10175) is coupled as input (10195) to the presentation processor (10160) and to the event storage (10150). The output (10175) is also coupled as input (10179) to the group history (10177) which adds the output (10175) selected group of events to the stored group history. This allows the user input (10173) to select at least one of selected group of events in the stored group history and modify one of the selected group of events in the stored group history to provide a new selected set of events. Different implementations of the presentation processor and group selection are possible. The requests for event data may come from various sources to the event storage in one implementation. In this case, the group selection logic can request event data directly from the event storage. In an alternative implementation, requests for event data can only come from the presentation processor. In this alternative implementation logic within the presentation processor would request event data for group selection based on group selection input to the presentation processor.

Additionally, the group selector logic (10170) is responsive to the event data output (10151) from the event storage (10150) and is coupled to provide an input (10171) to the group selector (10170) which provides an output (10176) of display data coupled to the display interface logic (10116) which provides a group display output (10117) coupled to the display apparatus (10115) which provides a user interface for feedback to the user for user control of the group selector logic (10170). The control logic (10112) is responsive to an input of presentation data (10164), as output from the presentation processor (10160). The control logic (10112) is responsive to the presentation data, and (selectively) also to the user data (10121) input, (and responsive thereto) provides an output (10113) of an alternative display output (10113) that is coupled to display logic (10119) that generates a display output (10118) that is coupled to the display apparatus (10115) which provides a user display presentation thereon, responsive thereto. The presentation processor (10160) is responsive to the group selector output (10195), such that the presentation processor sends a request for a specific event-ID (or edit reference) as output (10163) that is coupled to the event storage (10150), which responsive thereto provides an output of the requested event data (10151), that is coupled as an input to the presentation processor (10160) and also provides an input (10171) to the group selector (10170). Responsive to the event data (10151), the presentation processor (10160) outputs presentation data (10164), which is coupled as an input to the control logic (10112). The control logic (10112), responsive to the presentation data (10164), and selectively is responsive to an additional user input of data (10121) when present to provide an alternate display data output (10113) coupled to the display logic (10119) to generate display output data (10118) coupled to the display apparatus (10115) to generate a respective presentation to a respective user thereof.

Referring to state flow diagram portion of FIG. 74A, at state 1, there are no selected events. The group selector (10170) provides an output that there are no selected events. At state 2, the presentation processor (10160) responding to a selection of no events, provides a presentation data output (10164) that contains no display presentation data, and couples that output (10164) to the control logic (10112). The control logic (10112) provides an output of no alternate display data (10113), which is coupled to display logic (10119) which generates a display output (10118) to the display apparatus (10115) which provides a blank display at state 3.

At state 4, the user provides a user stimulus (10123) to the user input interface (10120) of an event defining for that user: add the letter "A" at the beginning. The control logic (10112) responsive to this user input (10121) provides an alternate display output (10113) to the display logic (10119) which generates a display output (10118) responsive thereto, which is coupled to the display apparatus (10115) to generate a user presentation thereof of a blank display.

At state 6, a new event output (10111) is provided from the control logic (10112) which is coupled to provide input (10141) to event storage (10150) of a new (edit) event for storage in the event storage (10150). The event storage (10150) stores an edit reference (to add at the beginning), an event-ID (for event 1), and event data content for the change data (insert "A"). Thus, the event content as stored is [add event 1, insert "A" at beginning].

At state 7, the user [or alternatively, the computing system can generate the signal] provides for selection via the group selector (10170) to select event 1 as the selected set of events, which is provided as output (10175) from group selector (10170) and is coupled as input (10195) to the presentation processor (10160).

At state 8, the presentation processor (10160) provides, to the event storage (10150), a look-up request (10163) to look up event 1.

At state 9, the event storage (10150) responding to the look-up request (10163), provides an output (10151) of the requested event data, to get event 1, and provides the corresponding data content for event 1 to the group selector (10170) and to the presentation processor (10160). In this case, the event data is only utilized by the presentation processor (10160) which generates the corresponding presentation data output (10164) (in a preferred embodiment) at state 10 [of "A" at event 1], which data output is coupled to the control logic (10112). The control logic (10112) responds to the presentation data to generate display presentation data (10113) which is coupled to the display logic (10119). The display logic (10119) generates a display output (10118) (in a preferred embodiment) which is coupled to the display apparatus (10115) which responsive thereto provides a presentation to the user [of "A"] as state 11.

At state 12, the user provides an input to the interface (10120) to [add "B" after "A" after event 1]. The user data (10121) of the add "B" event, is coupled to the control logic (10112) which, at state 13, provides an output of display presentation data output (10113) that is coupled to display logic (10119) which provides a display output (10118) coupled to the display apparatus (10115) to generate a presentation of a user display of "AB", therein providing a graphical user interface to update the display to show the user thereof what has just been entered by that user.

State 13 updates the display to "AB" to allow the user to immediately see their edit to the document. State 19 updates the display to "AB" again after the user submits the new event in state 14 and the group selector chooses to include the new event (event-ID 2) in the updated display. If the group selector had not changed the selection of events in state 15 and kept the selection to the same as state 7 then the display would be updated in state 19 to "A" from "AB" in state 13.

Note that at state 19, there is also provided an update to provide separately for the display of an "AB", which occurs responsive to the processing of the new event which, as described in more detail below, results in output of presentation data to generate a respective display output coupled to the display apparatus which provides a display presentation thereof, responsive thereto, providing a graphical user interface to update the display to show the user thereof what has just been processed as a selected set of events which includes the new event now looks like after the processing of the new event and the then current selected group of events output. The presentation processor updates control logic (10112) to update the display, to cause the display to ultimately be updated to "AB", as described in more detail below.

At state 14, the control logic (10112) outputs a new event [event 2, insert "B" after event 1], which is stored in the event storage (10150).

At state 15, the user (or computing system, or other selection source) provides a selection output for selection of a selected set of events, illustrated as event 1 and event 2. The selection is in part responsive to user input (10173) to group selector (10170), which responsive thereto provides an output (10175) which is coupled as an input (10195) to the presentation processor (10160). The group selector also provides an output (10176) to display interface (10116) which responsive thereto provides a user interface display output (10117) which generates a graphical user interface or other means for the user to select via the user display on the display apparatus (10115), such as via the user input at (10173) to permit the user to select which events are in the selected set to be output by the group selector at (10175).

At state 16, the presentation processor (10160), responsive to the [select event 1 and event 2] output (10175) from group selector (10170), sends a look-up request (10163) to the event storage (10150) to [look up event 1 and event 2]. The event storage (10150) responds to this look-up request (10163), at state 17, to provide event data output (10151) providing event data for event 1 and event 2.

At state 17, the event data output (10151) for event 1 and event 2 is coupled as an input to the presentation processor (10160) which generates an output (10164) of corresponding presentation data (at state 18) of ["A" at event 1, "B" at event 2]. This presentation data output (10164) is coupled as an input (10114) to the control logic (10112), which responsive thereto generates presentation data output (10113) coupled to display logic (10119) to generate display output (10118) coupled to the display apparatus (10115), which (at state 19 provides a presentation display of "A B". The event data (10151) is coupled as input (10171) to the group selector (10170) which responsive thereto provides the output (10176) defining the events that can be selected as part of the user interface, which selection choices are displayed at the display apparatus (10115). Alternatively, the group selector (10170) automatically provides for selection of a set of events.

In the state flow presented here the group selector always included the new event when creating the set of selected events for the next assembly of the presentation data. This is not required and in many cases this will not be the case, especially in some multi-user systems where new events from one user may not be included in another user's presentation data. Alternatively, the group selector may include other events added by another user in the event storage between the time that the events were selected previously (state 7) and currently (state 15). This example, seems to redundantly update the display to the same value (e.g., state 13 and state 19). There are several reasons to do this. First, this ensures that the user is actually viewing the correct presentation of the document if the edit control does not accurately represent the presentation processor output after the user has made changes. Obviously, this would not be an expected situation but every system needs to provide redundancy in their operation. Second, the display apparatus may lose its state between state 13 and state 19. A common situation where this would occur is if the edit processor is turned off or logged off somewhere between state 13 and state 19. The update at state 19 brings the edit processor back to the desired state.

FIG. 74B, illustrates a detailed block diagram and state flow diagram combined therein. An edit subsystem for a single user, via control logic (10212) provides an output of difference annotations (as opposed to directly outputting new events as in FIG. 74A). This output of difference annotations (10231) is directly coupled to an event generator (10240) which generates the new events (10241) for storage in the event storage (10250). The components of FIG. 74B (2XX) are the same as the similarly numbered components of FIG. 74A (1XX), except for a few. First, control logic (10212) provides different functionality (than control logic (10112)) in that it provides an output of difference annotations (10231) instead of directly generating an output of new events as from control logic (10112) of FIG. 74A. Thus, the output of difference annotations (10211) from control logic (10212) is of difference annotations (10211), while the output (10111) from control logic (10112) is of new events (10111). A second difference of FIG. 74B from 74A is that the difference annotation output (10212) couples to an event generator (10240), which said event generator (10240) is not present in the FIG. 74A and its functionality is not provided in FIG. 74A.

Finally, a third difference of FIG. 74B from FIG. 74A, is that in FIG. 74B, there is an additional subsystem of format logic (10280) that is provided between the presentation data output (10264) of the presentation processor (10260) and the control logic (10212). The presentation data output (10264) is coupled to the format logic (10280) which outputs formatted presentation data (10272) coupled as an input (10214) to the control logic (10212). Additionally, the presentation data output (10264) also couples as an input (10242) into the event generator (10240) which responsive to the presentation data (10264) (for the then current display) and to the difference annotation output (10231) (representative of the new input made by the user since the display), generates a corresponding new event (10241) [corresponding to new edit event (10141) of FIG. 74A] which is stored in event storage (10250). Thereafter, the processing and other components in the system is the same for FIG. 74B as for FIG. 74A.

A state flow description of FIG. 74B begins at state 1, where no events have been selected by the group selector (10270), which provides a selected set output (10275) of no events. At state 2, the presentation processor (10260) is responsive to the no events set output (10275) from group selector (10270), which is coupled as an input is input (10295) to the presentation processor (10260) which responsive thereto generates an output (10264) of no data output as the presentation data output (10264) at state 2. The output (10275) is also coupled as input (10279) to the group history (10277) which adds the output (10275) selected group of events to the stored group history. This allows the user input (10273) to select at least one of selected group of events in the stored group history and modify one of the selected group of events in the stored group history to provide a new selected set of events. The presentation data output (10264) is coupled to the format logic (10280) which provides an output (10272) of formatted presentation data (10272) at state 3 [which is "no display data"] which is coupled to the control logic (10212) via input (10214). Control logic (10212) provides a display presentation data output (10213) coupled as an input to the display logic (10219) which responsive thereto generates display output (10218) that is coupled as an input to display apparatus (10215) which generates a display presentation (in this case, which is blank) at state 4.

At state 5, a user provides a user stimulus (10223) coupled to the input interface (10220) which provides an output of user data (10221) of user data showing that the user has added "A" after the beginning. The control logic (10212) is responsive to this input data (10221) to provide (at state 6) an update to the display of display presentation data (10213) that is coupled to display logic (10219) which responsive thereto provides a corresponding display output (10218) that is coupled to the display apparatus (10215) which responsive thereto provides a display presentation of an update to the display to which would now display "A".

At state 7, the control logic (10212) provides an output to (10211) of difference annotations, responsive to the user input (10221), to add "A". The difference annotation (10211) is coupled as an input (10231) to the event generator (10240). Also, coupled as an input (10242) to the event generator (10240) is the presentation data output (10264) (from state 2) of "no data". The event generator (10240) is responsive to these two inputs to generate an output of a new (edit event) (10241), which (at state 8) is stored in event storage (10250) as a stored event with event-ID 1, change data of "A" and operation of "insert at beginning" as the stored event content.

At state 9, the group selector logic (10270) provides an output (10275) request to "select event 1". Output (10275) is coupled as input (10295) to the presentation processor (10260), which responsive thereto, provides an output (10263) (at state 10) of a look-up request coupled as an input to look up event 1 coupled to the event storage (10250).

At state 11, event storage (10250) responds to the look-up request (10263) and provides an output (10251) of the "event data for event 1". The output (10251) is coupled as an input to the presentation processor (10260), which responsive thereto generates presentation data output (10264) (at state 12) of "A" at event 1. The presentation data output (10264) is also coupled as an input to the format logic (10280) which responsive thereto (at state 13) generates an output (10272) of formatted presentation data for "A". The formatted presentation data output (10272) is coupled as an input (10214) to control logic (10212), which responsive thereto (at state 14) generates an update to change the presentation at the display apparatus (10215) to make it display "A". This is done by control logic (10212) providing a display presentation data output (10213) coupled as an input to display logic (10219) which responsive thereto provides a display output (10218) coupled as an input to the display apparatus (10215) which responsive thereto generates a display presentation thereupon. Also, the group selector (10270) provides an output (10276) to the display interface (10216) which provides group display output (10217) that is coupled to the display apparatus (10215) to provide a presentation responsive thereto of a graphical user interface to the user as to what selection has been made and what events can be selected.

At state 15, the user provides an input [to "add "B" after event 1 (A)"] coupled via input interface (10220), user input interface (10220) provides an output of user data (10221) coupled as an input to the control logic (10212).

At state 16, control logic (10212) provides for update of the display presentation to show the added input and the current display providing an update of the display to show "A B". This is accomplished by the control logic (10212) providing a presentation data output (10213) coupled as an input to the display logic (10219). Display logic (10219) responds by providing a display output (10218) coupled as an input to the display apparatus (10215) which responsive thereto generates a display presentation thereupon.

At state 17, control logic (10212) provides an output (10211) of difference annotations, responsive to the user data (10221) from state 15. The difference annotations (10211) are coupled as an input (10231) to the event generator (10240). The difference annotations (10231) are comprised of (at state 17) of [same "A" add "B" thereafter]. The event generator (10240) is responsive to the difference annotation data (10231) from state 17, and to the presentation data (10242) from state 12, to generate an output (10241) of a new event which, at state 18, is stored as "event 2, "B", insert after event 1" which is the event content for the event 2, which is stored in event storage event (10250).

At state 19, the group selector (10270) provides an output (10271) of selection of "event 1 and event 2" as the selected set output (10271), and responsive thereto provides output (10276) to the display interface (10216), which provides an output (10217) coupled as an input to the display apparatus (10215) which responsive thereto shows the update in the selection as a display presentation. Also, the group selector (10270) provides an output of the selected set of events (10275), which is provided as input (10295) into the presentation processor (10260) [and an optionally also as an input to the event storage (10250). Responsive to the input (10295), the presentation processor (10260) provides (at state 20) a look-up request "to look up event 1 and event 2", which look-up request (10263) is coupled as an input to the event storage (10250), which responsive thereto provides an output (10251) of the requested event data (10251) coupled as an input back to the presentation processor (10260), which responsive thereto (at state 22) provides an output (10264) of corresponding presentation data of ["A" at event 1, "B" at event 2]. The presentation data output (10264) is coupled as an input to the format logic (10280), which (at state 23) generates a formatted presentation data output (10272) of "A B", which formatted presentation output (10272) is coupled as an input (10214) to the control logic (10212), which responsive thereto provides a presentation data output (10213) that is coupled to display logic (10219) which responsive thereto provides a corresponding display output (10218) coupled to the display apparatus (10215) which responsive thereto generates the corresponding presentation display (at state 24) of the display of "A B".

It will be noted that the look-up request can be of many forms, comprising one or more event-IDs, and/or one or more edit references, and/or an alternative look-up mechanism regarding mapping, etc.

Referring to FIG. 74C, an alternative block diagram of an event editing system is shown illustrating both a block diagram and state flow diagram combined in a single interrelated drawing. An edit processor (10300) for a single user is illustrated, which via the control logic (10312) provides an output of new modified formatted presentation data (10332) (also referred to as NCBI, a new core base image) which output is coupled as an input to stored at comparator subsystem (10330) where it is compared to formatted presentation output (10361) from the format logic (10360) which is representative of the original display presentation output (CBI, core base image), and which is provided as an input of the formatted presentation data (10361) from format logic (10380). Responsive to thereto, the compare logic (10330) provides an output of difference annotations (10331), which is coupled as an input to the event generator (10340).

FIG. 74C differs from FIG. 74B, in that the output of the control logic (10312) is of modified formatted presentation data [instead of "difference annotations (10211) in FIG. 74B], and that in FIG. 74C, the output from the control logic (10312) id of modified formatted presentation data (10332) that is coupled as one of two inputs to compare logic subsystem (10330). The other input to the compare logic (10330) is of the [There is no compare logic of this sort in FIG. 74B.] formatted presentation data output (10361) from the format logic (10380). Responsive to its two inputs, the compare logic generates the difference annotations (10331) corresponding to the difference annotations (10231) of FIG. 74B. Otherwise, the components of similar numbers, 2XX versus 3XX, are equivalent.

Referring to the state flow of FIG. 74C (at state 1), there are no selected events by the group selector (10370) which provides a corresponding no event selection output (10375 which is coupled as an input (10395) to the presentation processor (10360). The output (10375) is also coupled as input (10379) to the group history (10377) which adds the output (10375) selected group of events to the stored group history. This allows the user input (10373) or alternatively from Group History (10377) via 10378 to select at least one of selected group of events in the stored group history and modify one of the selected group of events in the stored group history to provide a new selected set of events. At state 2, the presentation processor (10360) provides an output of presentation data (10364) of "no data" which output (10364) is coupled as an input to the format logic (10380). At state 3, the format logic generates a formatted presentation data output (10361) for a presentation of no display, which output (10361) is coupled as an input (10314) to the control logic (10312), which generates an output of a display presentation data output (10313 which is coupled as an input to the display logic (10319) which responsive thereto generates a display output (10318), which is coupled to display apparatus (10315), which provides a blank display of the no selected events, or a display with no events and whatever base image that is otherwise present (at state 4).

At state 5, a user input (10323) is coupled to input interface (10320) which responsive thereto generates a user data output (10321) which as illustrated specifies the user adding "A" [inserting "A" after the beginning as event1]. The user data output (10321) is coupled as an input to control logic (10312), which responsive thereto (at state 6) generates an update of the presentation display to show "A". This is accomplished by coupling the presentation data output (10313) to display logic (10319) which responsive thereto generates display output (10318), which is coupled to the display apparatus (10315) which responsive thereto generates a corresponding display of "A".

At state 7, the control logic (10312) provides an output of modified presentation data (10332) for "A" coupled as one input to the compare logic (10330). The formatted presentation data output (10361) from format logic (10380) [for state 3 of no data] is coupled to the other input of the compare logic (10330), which responsive to the two inputs provides an output (at state 8) of a difference annotations output (10331) [of add "A"], which difference annotations (10331) is coupled as one input to the event generator (10340). The other inputs of the event generator (10340) is coupled from the output (10364) of presentation processor (10360) [output of presentation data (10364) for state 2 of no data] which output (10364) is coupled as input (10342) to the event generator (10340). The event generator (10340), responsive to the two inputs, generates an output (10343) of a new event (at state 9) which new event output (10343) specifies to add as event 1, insert "A" at beginning.

At state 10, the group selector (10370) provides an output (10375, 10376) of select event 1. The group selector (10370) provides an output (10375) coupled as input (10395) to the presentation processor (10360). Additionally, the group selector (10370) provides an output (10376) to the display interface (10316) which responsive thereto provides an output (10317) to the display apparatus (10315) which responsive thereto provides, for example, a graphical user interface to the user of the selection made and the events available to select, or any other user interface structure. The presentation processor (10360) responds to the selection of event 1 (at state 10), to provide a look-up request output (10363) to look up event 1, which output (10363) is coupled to the event storage (10350), which responsive thereto (at state 12) provides for an output of the event data (10351) for the event 1, which output of event data (10351) is coupled as an input to the presentation processor (10360). The presentation processor (10360) responds thereto, to generate an output of presentation data (at state 13) [of "A" at event 1], which is coupled as an input to the format logic (10380), which responsive thereto generates an output of formatted presentation data (10361) (at state 14) [of "A"], which output (10361) is coupled as input (10314) coupled to the control logic (10312), which responsive thereto generates display presentation data (10313) coupled to display logic (10319) that generates display output (10318), responsive thereto, which display output (10318) is coupled to the display apparatus (10315) which (at state 15) provides a display presentation [of "A"].

At state 16, the user provides for an input [to add "B"] via input interface (10320), which outputs user data (10321) [of user adds "B"] as an input to control logic (10312), which responsive thereto (at state 17) provides an update of the presentation display to show "A B", by providing display presentation data output (10313) coupled to display logic (10319) which responsive thereto generates display output (10318) which is coupled as an input to the display apparatus (10315) which responsive thereto generates the display presentation, of "A B".

At state 18, the control logic (10312) provides an output of modified presentation data (10332) responsive to the user input at state 16, (for "A B"), which is coupled as an input (10332) to the compare logic (10330). The compare logic (10330) provides a comparison of the modified formatted presentation data (10332) from state 18, to the formatted presentation data output (10361) [from state 14] from format logic (10380), and responsive to these two inputs, provides an output (10331) of difference annotations (10331) (at state 19) [of "same" "A" add "B"]. The output (10331) of difference annotations (10342) [from state 19] is coupled as one input to the event generator (10340), with the other input (10342) to the event generator (10340) is coupled to receive the presentation data output (10364) [for state 13] the event generator (10340) is responsive to the two inputs to provide a new event output (10343) (at state 20) which is coupled as an input to the event storage (10350) to store the event content (of event 2) in the event storage (10350) as insert "B" insert after event 1.

At state 21, the group selector (10370) provides an output (10375) [of select event 1 and event 2] as a selected group that is coupled as an input (10395) to the presentation processor (10360), and provides an output 19376) of the selection coupled to the display interface (10316) which responsive thereto provides an output (10317) of a user display output (10317) responsive thereto provides a display presentation on the display apparatus (10315) of graphical user interface update to show the group selection interface. The group selector (10370) provides an output (10375) specifying a selected set of selected events which is coupled as an input (10395) to the presentation processor (10360), which responsive thereto (at state 22) provides an output (10363) of a look-up request of the selected evens (in this case to look up event 1 and event 2).

At state 23, the event storage (10350) is responsive to the look-up request (10363) [from state 22] to provide an output (10351) of event data [for the selected events of event 1 and event 2] which is coupled as an input to the presentation processor (10360), which responsive thereto, at state 24, generates a presentation data output (10364) [of "A" add event 1, "B" add event 2]. The presentation data output (10364) [for state 24] is coupled as an input to the format logic (10380), which responsive thereto generates an output of formatted presentation data (10361) (at state 25) for the display of "A B". The formatted presentation data output (10361) is coupled as an input (10314) to the control logic (10312), which responsive thereto (at state 26) generates a display of "A B", by coupling presentation data output (10313) to display logic (10319), which responsive thereto generates a display output (10318) which is coupled to the display apparatus (10315) which responsive thereto generates a display presentation on the display apparatus (10315).

FIG. 75A to FIG. 75D provides a detailed example illustration of a specific example of implementation of corresponding to FIGS. 72E and 74C, specifically illustrating a detailed HTML based centralized server, text editor embodiment.

Figure 75A:
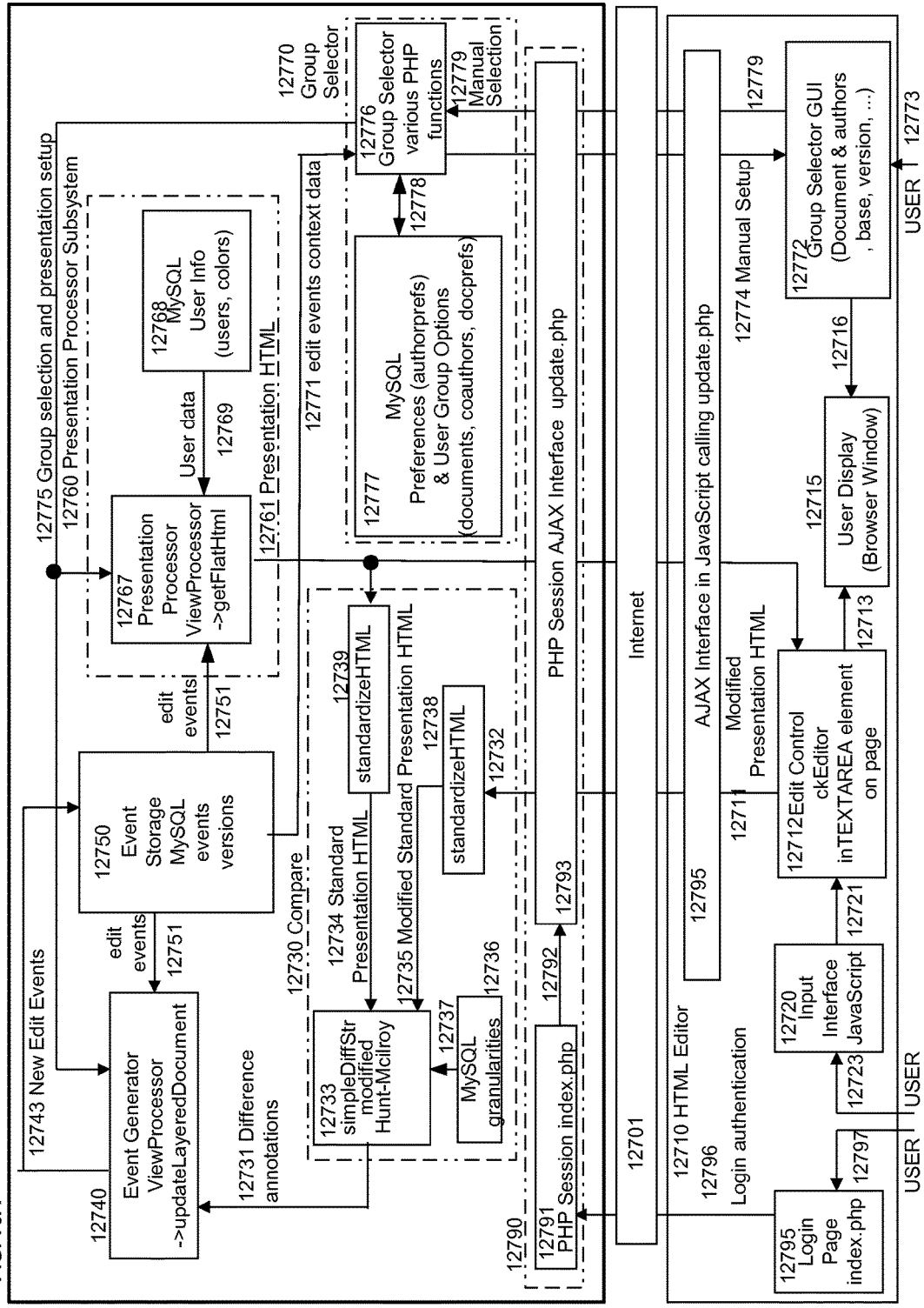
FIG. 75A illustrates an HTML event processing system for HTML documents using a central server on the Internet.
Figure 75B:
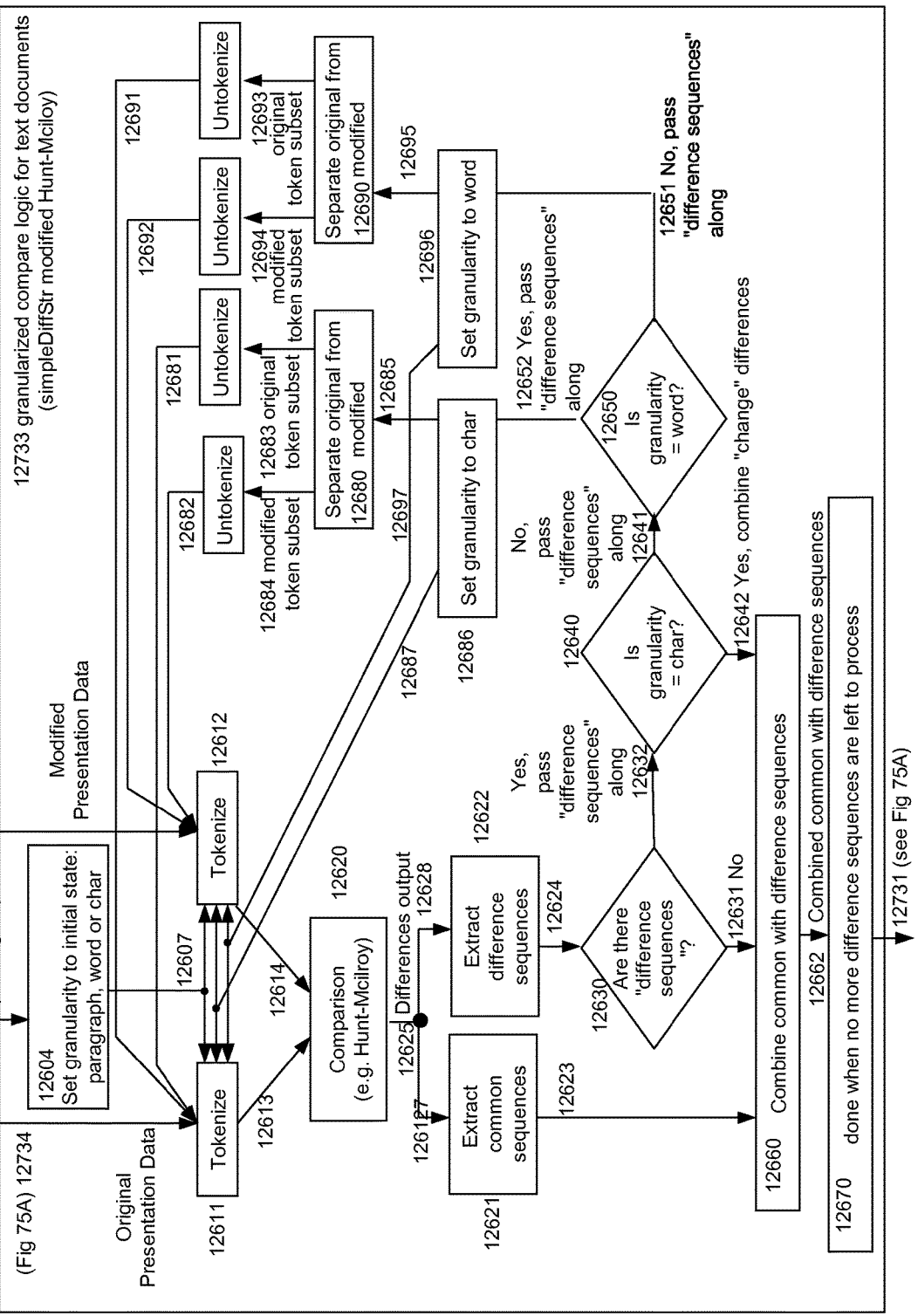
FIG. 75B illustrates the granularized comparison subsystem for the HTML event processing system in 75A.
Figure 75E:
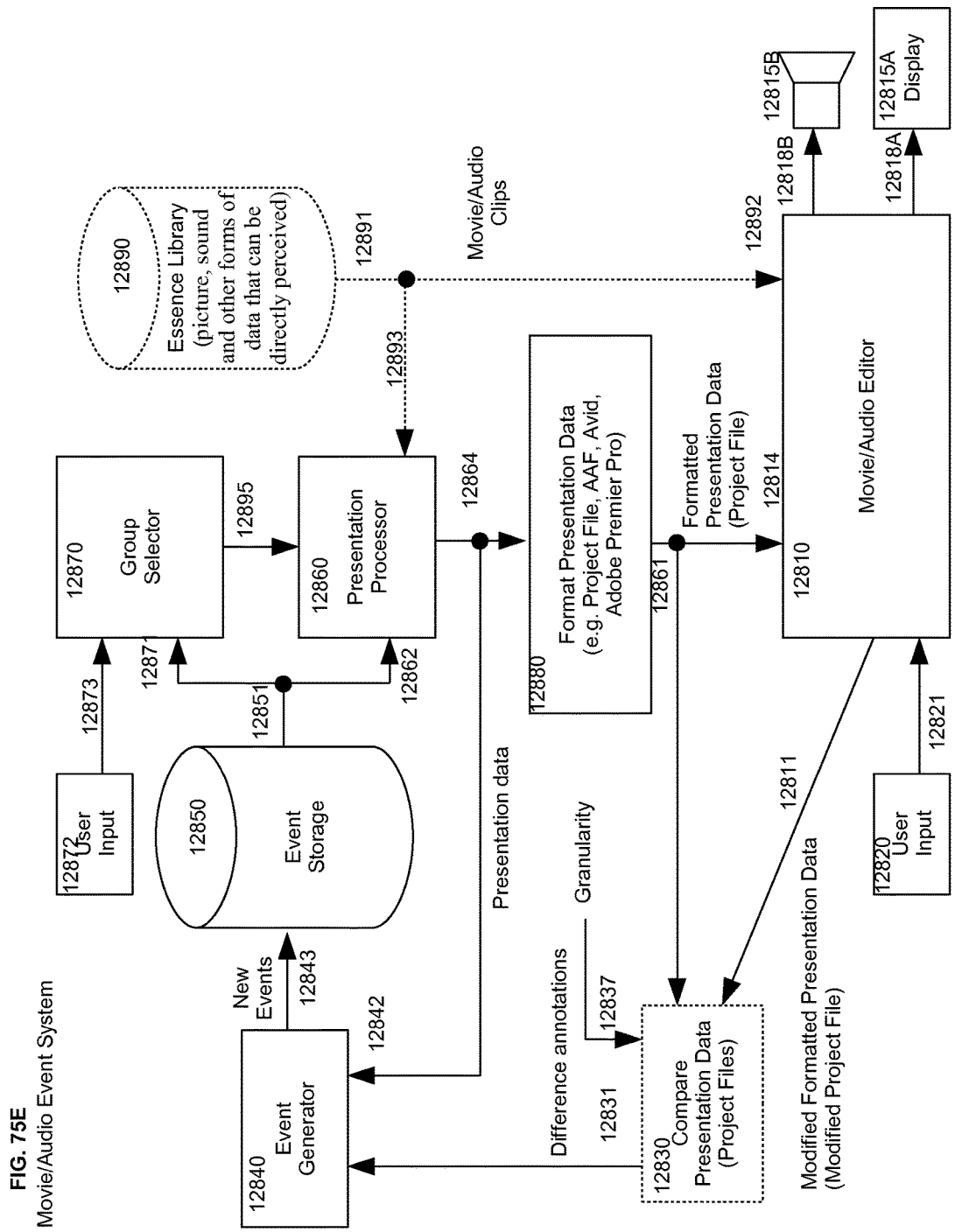
FIG. 75E illustrates an media event processing system for streaming documents such as video and audio.
Figure 75F:
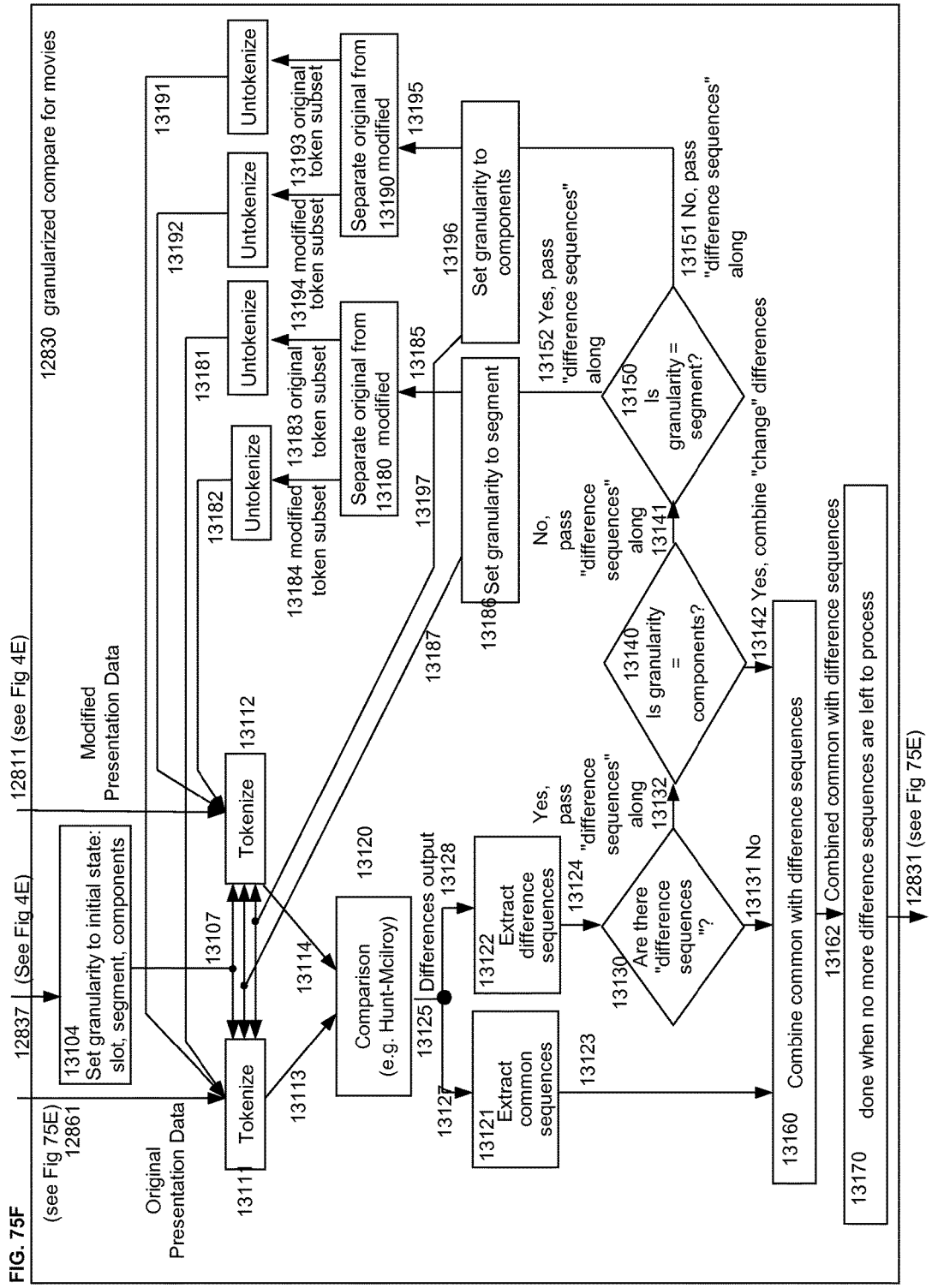
FIG. 75F illustrates the granularized comparison subsystem for the media event processing system in 75E.

FIG. 75E to FIG. 75G illustrates a detailed embodiment for video or audio editor embodiment corresponding to FIGS. 72E and 74C, respectively.

Referring to FIG. 75A, an alternate detailed block diagram of the system event processing as shown in FIG. 72, FIG. 73, and FIG. 74 is shown for a specific type of event generation and processing. The components in FIG. 75A and FIG. 75B are analogous to equivocally named and similarly numbered components of FIG. 72 and FIG. 74. Referring to FIG. 75A, a user input is coupled as input (12723) or input (12797) to the input interface (12720), or login page interface3 (12795), respectively, of the user event editor (12710). This correlates to the edit processor of FIG. 74C. The user input is coupled via the login interface (12795) to generate a login authentication (12796) coupled to the communications interface (12701), illustrated as an Internet connection (although other types of communications interface are also compatible with the teachings herein). This coupling of login authentication is coupled via the communications interface (12701) into the document event server (12700) (which correlates to the event processor (10300) of FIG. 74C). The event server (12700) processes the login authentication and if valid, enables and logs in and enables the logging in of the user to the event server. Thereafter, the user input via input interface (12720) provides for processing of user input to generate events and event content data therefore, for user input annotations to be made relative to an in-process working document. The input interface (12720) of FIG. 75A is analogous to the input interface (10032) of FIG. 74C. The output of the input interface (12720), output (12721) is coupled as an input to the edit control logic (12712), which as illustrated in FIG. 75A, provides for a check editor in text area element on page processing. As illustrated in FIG. 75A, the input interface is provided in JAVASCRIPT within the browser. Other options are also acceptable. The edit control logic (12712) of FIG. 75A is analogous to the edit control logic (10312) of FIG. 74C. The edit control logic (12712) provides a display presentation to the user such as through a browser window on the user display (12715) via 12713. Additionally, the control logic (12712) provides an output of modified presentation data (12711) (analogous to modified presentation data (10311) and (10332) of FIG. 74C). The modified presentation data (12711) is coupled via an interface (12795) into the communications network Internet (12701) and coupled therefrom into the event server (12700) via the Internet interface (12793) and therefrom to the input (12732) of a standardized HTML processor (12738) that couples modified standard presentation data output (12735) in HTML format into compare logic component (12733) which provides simplified difference string comparison using modified Hunt McIlroy processing (12733). The standardized modified standard presentation HMTL is compared by logic (12733) to a standard presentation HTML output (12734) received from the presentation processor subsystem (12767) as an input (12761) to a standardized HTML processor (12739), and responsive thereto generates an output from the comparator (12730) of difference annotations (12731) coupled as an input to the event generator (12740) which provides for view processor output and provides an update of the layered document. The event generator provides an output for new events (12743) to the event storage (12750) which is illustrated running a MySQL logic software functionality does queries of events and document versions responsive to the new edit event request (12743) to generate an output event content (12751) both to the event generator for further generation of new events (12743) and for coupling the event content (12751) to the presentation processor subsystem (12760) to the presentation processor (12767) therein, which generates a presentation HTML output responsive thereto (12761). The selection control logic (12768) provides for user data (12769) coupled as an input to the presentation processor (12767) provide additional levels of control for selection of specific event content based on criteria such as user information, colors of display, etc., illustrated as a MySQL-type software response base system. The standardized HTML processors (12738 and 12739) perform cleanup of generic HTML which can vary but have the same results. For example, the HTML specifications for tag identifiers are case independent and as well as the ordering of properties is not specified and white space are flexible. The standardized HTML processors reformat the HTML to output a uniform HTML regardless of the input. The event generator (12740) is analogous to the event generator (10340) of FIG. 74C. The event storage (12750) is analogous to the event storage (10350) of FIG. 74C. The presentation processor subsystem (12760) is analogous to the presentation processor (10360) of FIG. 74C. The group selector logic (12770) of FIG. 75A is analogous to the group selector (10370) of FIG. 74C. The group selector GUI interface (12772) of FIG. 75A is analogous to the display interface (10316) of FIG. 74C in providing for update of the user display (12715) responsive to group selection input provided by the user of selected events to be displayed. The user data output (12769) from the option selection logic (12768) provides for selection of options of how the presentation processor (12767) will assemble the event content and process it to generate the presentation output (12761).

The user via 12772 provides input to the Group Selector GUI (12772) for the selection of events to be selected for display. Signal 12716 provides appropriate updates to the User Display (12715) for feedback to the user. The Group Selector (12776) is responsive to the Group Selector GUI (12772) for manual selections (12779) of the events. The Group Selector (12776) may alternatively automatically select events responsive to preferences stored in MYSQL Preferences (12777) and edit events context data (12771). The MYSQL Preferences (12777) can also store the manual selections (12779). These preferences are communicated between 12777 and 12776 via 12778. The group selections are communicated back to the Group Selector GUI (12772) via Manual Setup signal 12774. The Group selection and presentation setup (12775) are also communicated from the Group Selector (12776) to the Presentation Processor (12767) and the Event Generator (12740) and sets in motion the series of actions described above to generate new information for display on the User Display (12715).

Security block 12790 provides security for the system by blocking signals 12732, 12761, 12774 and 12779 until the user has authenticated that they are a valid user of the system. PHP Session index.php (12791) receives login authentication (12796) via 12701 and evaluates it to determine that it is valid. If valid, then PHP Session AJAX Interface (12793) is activated via 12792 allowing the signals 12732, 12761, 12774 and 12779 to pass data. Otherwise, if invalid, the signals 12732, 12761, 12774 and 12779 do not pass any data.

FIG. 75B shows the embodiment of the compare logic subsystem (12733) FIG. 75A, specifically directed to the use of the comparison and granularity settings for purposes of modification and edits to a text document. FIG. 75B provides a detailed block diagram of the compare logic subsystem (12733) of FIG. 75A. As illustrated in FIG. 75B, the comparison logic (12733) is taking and providing an output of difference annotations relative to new input of annotations by a user compared relative to the previously presented display presentation to which that user is making the input annotations relative to. The analysis and comparison of the modified standard presentation output of the edit control logic (12712) provides the modified standard presentation output, ultimately (12735), which represents the added or changed input annotations. The existing display presentation to which these annotations are being made relative is provided via the output of the presentation processor subsystem (12767) (output (12761) coupled via standardization logic (12731) to generate the standard presentation output (12734). The comparison of these data signals is done by the compare logic (12733) in accordance with determine granularities, pursuant to the granularity logic (12736). The output of the granularity selection logic (12736) is an output (12737) of selected granularity which is provided as an input to the compare logic (12733) in FIG. 75A.

Referring to FIG. 75B, this granularity input (12737) is coupled as an input to the system at state (12604) which sets the granularity to an initial state, either a paragraph, a word, or a character. This step precedes at (12607) to provide for tokenizing of each of the original presentation data via input (12734) from FIG. 75A, via tokenize logic (12611) and tokenizes the modified presentation data as input (12735) from FIG. 75A via tokenize logic (12612) and generates outputs (12613) from tokenize logic (12611) and (12614) from tokenize logic (12612) which are provided as inputs to comparison logic (12620) (providing a comparison of the tokenized original presentation data versus the tokenized modified presentation data, and based on a comparison with the required granularity provides a differences output (12625) coupled as inputs (12627) to extraction logic (12621) and as input (12628) to extraction logic (12622). The granularity determines the size and type of tokens as detailed later in FIG. 75C. Extraction logic (12621) extracts common sequences from the comparison and provides an output (12623) of the common sequences. The extraction logic (12622) extracts the difference sequences from the comparison, and provides an output of difference sequences (12624) to logic (12630) which determines whether there are any difference sequences. If so, then these difference sequences are coupled at (12632) to character granularity logic (12640) which determines whether granularity is at the character level. If it is, then the output (12642) is coupled to step (12660) which combines the common sequences with the difference sequences. If there were difference sequences, then processing precedes also at (12631) to step (12650) and therefrom provides an output of the combined common with difference sequences (12622) to step (12670) which completes the processing that is done with no more difference sequences left to process and provides an output (12731) in FIG. 75A, providing an output of difference annotations (12731) as in FIG. 75A.

Continuing in FIG. 75B, if the granularity is not character, then processing precedes at (12641) to step (12650) which determines whether granularity was set at the word level. If not, then the difference sequences are coupled at (12651) the tokens for the difference sequences are coupled to (12690) via 12696 and 12695 which separates the original tokens from the modified tokens and provides respective outputs of modified token subset (12694) to untokenized logic and outputs original token subset (12693) to respective separate untokenized logic. Additionally, the output (12651) activates step (12696) which sets granularity output to word coupled at step (12697) as an input to the tokenized logic (12611) and (12612) to define the set of granularity to the current state word. Similarly, if the output from step (12651) is that granularity is set at word, then in a similar manner, an output that it is at word level is coupled to step (12686) which resets granularity to a character level and provides an output (12687) coupled to tokenized logic (12611) and (12612) which their granularity level set to character level. Additionally, the difference sequences output (12652) from step (12650) are coupled as input (12685) to step (12680) which provides for separation of the tokens for the original presentation data from the tokens from the modified presentation data to provide an output of an original token subset (12683) to untokenized logic and provides an output of modified token subset (12684) to its own untokenized logic. The untokenized logic coupled to the token subsets (12683), (12684), (12693), and (12694) are processed by the untokenized logic to regroup the tokens into a respective combined signal of a partial presentation data representing the modified presentation data and original presentation data and this partially processed data is coupled as an input to the tokenized logic (12611) and (12612), respectively, which according to the then current granularity settings thereof, provide tokenization and couple the granularized tokens to comparison logic (12620) which differences output (12625) and extracts common sequences and differences sequences as discussed herein above, which are processed as described to either provide an output (12731) with the common difference sequences combined when there are no more sequences left to process, the output is final for this processing. Alternatively, if there continued to be difference sequences, then processing until granularity is at the character level, at which point, the processing concludes. The difference annotations (12731) are then coupled to the event generator (12740) of FIG. 75A, which are utilized to generate new events (12743) for storage in the event storage (12750), as discussed herein above and elsewhere herein.

FIG. 75C illustrates in table format the three levels of granularity for the preferred embodiment of text document event processing. The compare logic (12733) finds differences between the modified formatted presentation data (12735) and formatted presentation data (12734) to create the difference annotations (12731). The difference annotations (12670) found are not necessarily the same set of changes as the user input but the resulting modified formatted presentation data is identical. It is impossible to replicate the user input exactly without more information. However, the difference annotations can be made to be more similar to the likely user input. In addition, the compare logic can be quite computationally intensive. Both issues can be addressed by the compare logic.

All documents are composed of "atoms" or "tokens" which are the smallest entity in a document. The granularity is the choice of the tokens used to break a document into its entities. The choice of token types or granularity may vary depending on the needs of the system and the choices will vary with the type of content. For instance, textual documents are made up of characters and formatting. Formatting would include setting the font choice, font size and other font characteristics. If would also include line spacing, margins and other items. A textual document may include charts, images and graphics. Characters can be characterized as white space (non-printing characters such as space, tab, line feed and carriage return), punctuation, letter and numeral. Characters can be combined to form words, numbers and paragraphs. Thus the tokens for a document could be defined as characters and formatting. Alternatively, it could be defined as white space, punctuation, words, numbers and formatting. The choice of granularity of the tokens will determine what is used in an event.

A video can be broken into tokens (atoms) as well. The choices for video content can be an overall segment of video, clips making up the video, frames within a clip and even pixels withing a frame, although the latter would generally be a much smaller token than usually required. Another choice for video is filters affecting the video content tokens. Examples would be: changing the length of a clip (setting the in/out points on the clip), changing the brightness, contrast, hue and other visual effects, adding transitions, adding overlays, adding timecode information and more.

Audio would be similar to video. The choices for audio content can be an overall segment of audio, clips making up the audio, samples within a clip. Another choice for audio is filters affecting the audio content tokens. Examples would be: changing the length of a clip (setting the in/out points on the clip), changing the loudness, compression, combining audio, equalization and other effects, adding transitions, adding timecode information and more.

A user input adding "Apple" could create either 5 events or 1 event to add the characters "A" "p" "p" "l" "e" where a token is a character. If there are 5 events then the most obvious would insert"A", the second would insert "p" after "A", and so on. There are other scenarios such as first insert "e", then insert "l" before "e", then insert "p" before "1" and so on. A 6th event could be added that inserts an "s" after "e" in which case (if all these events are selected) the display would be "Apples".

The change data in a single event could also contain an array of characters ["A","p","p","l","e"] and the change data could specify that the array of characters will be inserted relative to the edit reference. In this case a token is still a character as in the previous example but the change data can contain multiple tokens. Another event could modify the event by adding an "s" to the end of the array of characters. Note that this additional event doesn't actually modify the original event in event storage but can modify it in the presentation data. The advantage is that fewer events need to be added at the expense of more complicated change data structures.

When an token is a word then "Apple" is added in a single event. This is approximately equivalent to the second example above except that if you wanted to change the word to "Apples" you would first hide the event containing "Apple" and insert another event containing "Apples" since the token as a word can't add a character to a word but only replace the entire word.

The common way to implement the compare logic (FIG. 75A (12733) and in detail FIG. 75B (12733)) determines the longest common subsequence, LCS, between the modified formatted presentation data, MFPD, and the formatted presentation data, FPD. Many version control systems use this comparison (see FIG. 82A (12322), (12332) and (12342)) for a different purpose and was implemented in the popular UNIX program "diff" was published in the 1976 paper "An Algorithm for Differential File Comparison", by Douglas McIlroy and co-written with James W. Hunt and simply known as Hunt-McIlroy. A sequence is an ordered list of tokens. A subsequence is a partial list of tokens from a full list of tokens. The partial list of tokens is in the same order as the full list but may not contain all of the tokens in the full list. A common subsequence is a subsequence that is a subsequence of two or more sequences. The compare logic (FIG. 75B (12733)) first breaks up the MFPD (12735) into modified token sequence (MTS) (12614) and the FPD (12734) into original token sequence (OTS) (12614). Typically, in a textual document each token would be a character or a formatting tag. A formatting tag must be handled separately as a token because it affects the visual characteristics of the character tokens that follow it. Determining the LCS is both time consuming involving numerous comparisons between the MTS and OTS which grows exponentially with the length of the MTS and OTS as well as the number of common tokens in MTS and OTS. Since the letters "a" "e" and space " " (as well as many others) occur rather often in most textual documents the compare logic can not efficiently find the LCS. In addition, an "e" at the beginning of the MTS is unlikely to be in the desired difference annotations if the "e" is being compared to an "e" at the end of the OTS.

Therefore, we teach in this preferred embodiment of the invention in FIGS. 75A, 75B, 75C, 75D, 75E, 75F and 75G a compare logic that finds the difference annotations by finding the LCS at progressively finer levels of granularity. Granularity determines the token types that are in the MTS (12614) and OTS (12613) when the compare logic breaks up the MFPD ((12735) for "paragraph" granularity, (12692) for "word" granularity and (12682) for "char" granularity) and FPD ((12734) for "paragraph" granularity, (12691) for "word" granularity and (12681) for "char" granularity). A finer granularity produces a token that are a subset of a token produce with a coarser granularity. As illustrated in FIG. 75C, in a textual document the document can have a granularity of "paragraph" (see FIG. 75A, 75B, 75C, 75D). In this case, formatting tags and line breaks are tokens and all characters between those tokens are combined into a token. Note the latter is similar to the common definition of a paragraph but may not be exactly the same. An alternate embodiment would have all line breaks as a token and all formatting tags and characters between the line breaks is another token type. Regardless, of either embodiment there are far fewer common tokens between the MTS and OTS except line breaks and there are almost always far fewer tokens in each of the MTS and OTS. This minimizes the computational requirements for determining the LCS at this level of granularity. The compare logic then takes the tokens between the gaps in the LCS from both the MTS and OTS and untokenizes them to create a subsets of the MFPD and FPD. Each subset pair is again tokenized at a finer granularity. This process repeats recursively until the compare logic has used the finest granularity for all subsets.

Also illustrated in FIG. 75C, a finer granularity than "paragraph" is "word". This granularity creates a token for all formatting tags, line breaks, whitespace (non-printing characters such as spaces, tabs, . . . ) and punctuation. All other characters between the proceeding tokens are combined to form a token. This granularity works well on a subset of the MFPD and FPD that were found with a granularity of "paragraph".

As further illustrated in FIG. 75C, a finer granularity than "word" is "char". This granularity creates a token for all formatting tags, line breaks, whitespace (non-printing characters such as spaces, tabs, . . . ) and punctuation. All other characters between the proceeding tokens create a separate token. This granularity works well on a subset of the MFPD and FPD that were found with a granularity of "word".

After all the paragraphs that have changed are found, then the words in those paragraphs that have changed are found and then the characters in the word that have changed are found. One very small documents this may result in more computation and complexity than required by using a granularity of char initially but the computational requirements are small for those documents anyway. Large documents are much more efficient and changes are localized to where they have changed which is more similar to how a user would have typically input the changes. The difference annotation result will not necessarily be a LCS solution to the differences between the MFPD and FPD but is both more computationally efficient and relevant to the user.

A textual document could also incorporate tokens for images, graphics, video, audio and other media into the granularity. Depending on the system these may include finer granularity of each of these types or could only include them as a whole. This decision on the token types in each granularity would depend on goals and use of the system.

Referring to FIG. 75D, a software code example is provided of one embodiment of determining difference annotations (12731) utilizing a pseudo-code language that can be translated any programming language, including C++, Pascal, Basic, Fortran, etc. This software would be running on a computational machine with data connections inputting the presentation data and modified presentation data and outputting the difference annotations.

As illustrated in FIG. 75D, the difference annotations are obtained by comparing the presentation data and modified presentation data, first with a granularity set at paragraph, and consisting by starting comparing original tokens to modified tokens at each of the granularity levels, until either no more differences are found or there is no more characters to analyze and no more levels of granularity to reduce to. The result of the difference annotations is to return all differences to provide the output difference annotations (12731).

The pseudo-code is but one example of how this could be coded, but sets forth the logic and structure for creating a computer program to generate the difference annotations.

Referring to FIG. 75E, an alternative embodiment of the event processing system is shown for a movie/audio/multimedia event system. The components of FIG. 75A are analogous to similarly numbered components or labeled components of FIG. 72, FIG. 74, and FIG. 75 herein.

Referring to FIG. 75E, the user provides an input (12820) which provides an output of user data (12821) that is coupled to the edit processor subsystem (12810) for movie/audio editor. The user input (12820) is analogous to the input interface to the input interface (10320) of FIG. 74C, for example, as well as other input interfaces (XXX20) of other figures. The edit processor (12810) of FIG. 75E is analogous to the edit processors (XXX10) of other figures, such as (10310) of FIG. 74C. The output of modified formatted presentation data from the (12811) from the edit processor (12810) is coupled as an input to the compare logic (12830) which also has coupled to its input formatted presentation data output (12861) provided as an output from the format logic (12880). The granularity (12837) is supplied by the movie and audio event system to the compare logic. The compare logic is analogous to the (XXX30) compare logic of the other figures, such as compare logic (10330) of FIG. 74C. The format logic (12880) of FIG. 75E is analogous to the format logic (XXX80) of other figures were to have format logic, such as format logic (10380) of FIG. 74C. The compare logic (12830) provides an output of difference annotations (12831) generated resulting from the comparison of its inputs, which output of difference annotations is coupled as an input to the event generator (12840) stores the generated events in the Event Storage (12850) via 12843 and, which also has coupled to its input presentation data output (12842) coupled from the presentation processor (12860). The event generator (12840) is analogous to the event generators of other figures herein, such as event generator (10340) of FIG. 74C. The presentation processor (12860) of FIG. 75E is analogous to the presentation processor (XXX60) of other figures herein, such as presentation processor (10360) of FIG. 74C. The user input is also provided at input interface (12872) to provide user select input (12873) coupled to as an input to group selector logic (12870) which also has coupled as an input thereto event content output (12851) from event storage (12850) via 12851 and 12871. The group selector logic (12870) is analogous to the group selection logic (XXX70) from other figures herein, such as group selector (10370) of FIG. 74C. The event storage (12850) of FIG. 75E is analogous to the event storage of other figures herein, such as event storage (10350) of FIG. 74C. The group selector is responsive to the user selection input (12873) specifying which events are selected, and/or which users, or other ways designating which event should be selected, and is also responsive to the event content output from the event storage to provide for a selection of selected events (12895) coupled as an input to the presentation processor (12860). The presentation processor (12860) also has event content output (12851) coupled as input (12862) thereto. The presentation processor, additionally, optionally, has additional data that can be coupled via additional data input (12893) provided by the Essence Library (12890) via 12891. The data from the Essence Library (12890) may also be provided directly to the Movie/Audio Editor (12810) via 12892 if the Formatted Presentation Data (12814) does not include all the data from the Essence Library (12890). In one embodiment, this additional data can be in essence library. The essence library as illustrated in FIG. 75E provides database storage of pictures, sounds, and other forms of data that can be perceived by a person, which can be added to the content being processed by the presentation processor in generating of presentation data output. The presentation processor (12860), responsive to the event content and the group selector output (12895), and in an alternative embodiment also to the additional data input (12893), provides an output of presentation data (12864) which is coupled as an input to both the event generator as input (12842) as discussed above herein, and is also coupled as an input to the format logic (12880), also as discussed above. The format logic (12880), responsive to the presentation data output (12864) coupled as an input to the format logic (12880), provides for assembly of in generation of formatted presentation data. The format logic (12880) places the presentation data into a format that is compatible with the edit processor requirements, such as eliminating event references and IDs and placing it in a video, audio, or text document file format, such as a project file, an AAF, an AIFF, or MP3, or AVID format, ADOBE PREMIEREPRO format, FINALCUTPRO format, ADOBE LOGIC, GARAGEBAND, or other standard application software format. The format logic (12880) outputs the formatted presentation data (also sometimes referred to a project file), which is provided as an input (12814) to the edit processor subsystem (12810) which provides a movie/audio/multi-media editor subsystem, depending on the type of project file being worked with.

In an alternative embodiment, where the additional data library (12890) is utilized, the presentation processor (12860) generates presentation data output (12864) which contains references to the additional data, but not the additional data itself. Thus, the formatted presentation data output (12861) from the format logic (12880) also contains references to, but not the actual data, for the additional data. Thereafter, the edit processor (12810) is responsive to both the formatted presentation data output (12861) from format logic (12820) and to the input of additional data for the movie, audio, video, multi-media clip data for the actual presentation, which is utilized by display generation logic within the edit processor (12810) to generate a display presentation output (12818A) of the video visual portion of the display presented on display apparatus (12815A), and also provides an audio separated output (12818B) coupled to a separate audio speaker system (12815B). While illustrated in FIG. 75E as separate components, both the visual and audio of the presentation can be displayed on a single device, and where there is only audio that can be processed only on an audio sound system. Alternatively, other combinations can be utilized.

Referring to FIG. 75F, a state flow and operational flow chart for the generating of the difference annotations, for movies and audio, analogous to FIG. 75B for text documents, is shown in FIG. 75F. Referring to FIG. 75F, the granularity setting, altering, tokenizing, and recombining, in generation of a difference annotation output as in FIG. 75B, but instead for movies and audio versus text documents is illustrated. Referring to FIG. 75F, at the top of the drawing, the state flow and flow chart for (12830) for granulized compare for movies is illustrated, which also applies to audio and other sound/visual documents. The initial granularity setting (12837) is coupled as an input to step (13104) which sets granularity to its initial state, one of either slot, segment, or components. This setting is coupled as (13107) to set the tokenized logic (13111) and (13112), which each respectively, modify and tokenize either the original presentation data (12861) or modified presentation (12811) (both is corresponding to (12761) and (12711) of FIG. 75B), respectively, as inputs to tokenized logic (13111) and (13112). Tokenized logic (13111) tokenizes the original presentation data (12861) according to the initial set granularity from (13104) and generates an output of original presentation data tokens (13113) coupled to the comparison logic (13120). Similarly, tokenized logic (13112 responsive to the modified presentation data (12811) and to the initial setting of granularity. As set forth, it provides a tokens of output of the modified presentation data (13114) coupled as an input to the comparison logic (13120). The comparison logic utilizes processing, such as described above (with reference to Hunt-McGilroy), to generate a differences output from comparison of the tokens of the original presentation data to the modified presentation data generating a differences output (13125) which is coupled as inputs to extract logic (13121) via 13127 and (13122) via 13128. The extract logic (13121) responsive to the differences output (13125) provides an output (13123) of extracted common sequences between the two tokens. Similarly, the extract logic (13122) responsive to the differences output (13125) provides an output (13124) of extracted difference sequences in the tokens. The common sequences output (13123) is provided as one input to combining of the common sequences with the difference sequences at step (13160). If there are different sequences at step (13130), then these are passed along at step (13132) to step (13140) which determines whether granularity was set at components and if so, the differences are passed as an input (13142) to be combined with the common sequences at (13160) to provide an output (13162) of combined common with different sequences coupled as an input to step (13170) which completes processing when there are no more different sequences left to process as signaled from 13131 and granularities have all been processed providing an output (12831) of the differences annotations analogous to output (12731) of FIG. 75B. When granularity was not set at components, processing precedes to pass the difference sequences along to step (13150) via 13141 to determine if the granularity was set at segment. If it was set at segment, then the difference sequences are passed and coupled as output (13152) both set to granularity at logic (13186) step to set granularity to segment providing output (13187) which sets the granularity level at tokenized logic (13111) and (13112) to segment granularity. Additionally, the difference sequences output (13152) is coupled as an input (13185) to separation logic (13180) which separates the original presentation data from the modified presentation data to regenerate original token subset (13183) and modified token subset (13184) coupled to untokenized logic for each which generates respective output (13181) for the original token subset (13183) and which generates output (13182) of the recombined untokenized modified and original presentation data, with the original presentation data output (13181) and the modified presentation data (13182) being coupled to respective tokenized logic (13111) and (13112), which then re-precedes with processing with a new set granularity and follows through the flow charts and process steps until there are no more difference sequences left to process in all levels of granularity have been processed. Finally, if the granularity is not set to segment and was not set to components, then the difference sequences are passed to separate logic (13190) via 13196 and 13151, and are also coupled to set granularity logic (13196) via 13151, which responsive thereto, provides an output (13185) coupled as input (13197) to reset granularity for tokenized logic (13111) and (13112) to be granularity of components. Additionally, the difference sequences (13150) is coupled as input (13195) to the separate logic (13190), which responsive thereto, separated the original token subset (13193) as one output from the modified token subset (13194) as another output which are each coupled to respective untokenized logic which responsive to the inputs generate respective outputs (13191) of re-combined original presentation data which is coupled to tokenized logic (13111) and to provide re-combined modified presentation data output (13192) coupled as input to tokenized logic (13112). The tokenized logic (13111) and (13112) then precede to provide tokenizing according to the then current set granularity level and provide comparison extraction and further processing in accordance with the flow chart and state flow as per FIG. 75F.

A movie and audio stream can have different granularities as well (See FIGS. 75E, 75F, 75G). A preferred embodiment uses objects from a AAF object model supported by the AAF Association which is part of the Advanced Media Workflow Association, Inc. (10436 N. Westfield Road, Madison, Wis. 53717 USA). A white paper "Enabling Better Media Workflows: An Overview of the Advanced Authoring Format, EBU TECHNICAL REVIEW 291—July 2002 Brad Gilmer"" and also from the European Broadcasting Union. It should be noted that while this embodiment uses the AAF object model for tokenizing a multimedia steam there are similar other models that can be used in a similar manner for the token types in the granularity.

Referring to FIG. 75G, a table illustrating granularity and token types and analysis for the movie/audio event processing system is shown, analogous to the granularity table shown for a document file types on FIG. 75C. The compare logic in 12733 in FIG. 75B is similar to the compare logic 12830 in FIG. 75F except that the presentation data contains video/audio data and the granularity is appropriately different for the type of media. Referring to FIG. 75G, the first row shows that for a slot granularity, the token type that is created is a slot. The coarsest video/audio granularity is "slot". The AAF object model contains everything in a package that describes a complete video/audio stream which is equivalent to a document in other parts of the description of this invention. A package has one or more slots that contain parts of the video/audio stream description. Thus, the highest level of granularity creates a token for each slot. The compare logic only needs to determine whether a slot token in the MTS is identical to a slot in the OTS so the use of checksums or signatures on the slot can be used instead creating a token with all the data. This greatly reduces the comparison time when generating the LCS. Checksums or signatures can be used on other token types both in video/audio granularities and textual granularities.

The segment granularity is finer than slot granularity as shown in FIG. 75G. Each slot is composed of various segments. Segments such as SourceClip and Sequence provide the actual media be it video, audio, flash, animations and other types. The Sequence segment specifies that its set components are arranged in a sequential order while SourceClip references a section of a Slot in another Package. Other segments are like formatting tags in a textual document. Effect and Filter sements modify the SourceClip and Sequence Segments. Locator, TaggedValue, KLVData, Transition, Parameter, ControlPoint provide additional information for the video/audio format and control where and how the media is placed in the media stream.

The components granularity is finer than segment granularity as shown in FIG. 75G. This granularity creates a token for each component in a Sequence segment and breaks out as tokens the parameters in other segments so individual parameters can be compared in those segments.

FIG. 76A, 76B and 76C illustrates a more detailed preferred embodiment, illustrating the operation of the presentation processor showing the operation and use for event content processing and storage and display presentation output relating thereto, as displayed over time, also illustrating event storage based on group selection. Furthermore, it shows the textual-based document assembly of presentation data.

Referring to FIG. 76A, the storage (12910) of event storage provides storage of event content. As illustrated, the storage is shown as a table with an event-ID in the left column, an edit reference in the second column, and an operation as a third column. This is to be noted that this does not needed to be stored in a table format, and can be done as linked list data, memory arrays, arrays of pointers to memory locations and other known techniques of memory storage structures. The data at (12911) illustrates the assembly time of when the event-ID reference operation of event storage part (12910) is assembled. Thus, at time $t^1$, event 1 for insert "A" after the beginning is assembled and generated into a display presentation. At time $t^2$, the second row, the event-ID 2 references edit 1 to insert "B" after event-ID 1 as specified by event-ID 2's edit reference.

The table 12911 illustrates the time of assembly that the edit content is utilized and assembled into a combined presentation. Thus, at time t1, of table 12911, in the event storage, the operation of insert "A" after beginning occurs. Time t2, the insertion of "B" after event-ID 1 occurs. Time t3 (12922), the insertion of "D" after event-ID 2 occurs. Time t4, the insertion of "c" after event-ID 2 occurs. At time t5, the event-ID 6 operation occurs that deletes the "c" from event-ID 4 from the presentation data. At time t6, the insertion of "C" after event-ID 4 occurs. Note that while "c" was deleted by event-ID 6 it still holds a position in the presentation data for "C" to be inserted. At time t7, the insertion of "E" after event-ID 3 occurs.

The assembly of the presentation is illustrated below the event storage table representation of 12910 and 12911, as FIG. 76E. In FIG. 76E, the assembly of the presentation data for each of the times of assembly table 12911 are illustrated, and shows that time $t^1$ (12920) "A" for event-ID 1 is assembled as presentation data for display. At time t2 (12921), "A" event-ID 1 is the first character, which is shown to which is added thereafter "B" for event-ID 2. At time t3, "A", and "B" are assembled as presentation that is displayed. At time t4 (12923), the "A" is shown first followed by "B", followed by "D, followed by "c" which was just inserted". At time t5 (12924), the "A" is shown first followed by "B", followed by "D". At time t6 (12925), the "A" is shown first followed by "B", followed by "C" which was just inserted, followed by "D". At time t7 (12926), "A" is shown first followed by "B", followed by "C", followed by "D" followed by "E" that was just inserted.

The output of the formatted presentation data resulting therefrom is shown in FIG. 76F, creates the formatted presentation data that can be used for generating a display. The formatted presentation data that corresponds to the assembly of presentation data at time t1 is 12930 corresponding to presentation data 12920. Likewise the formatted presentation data that corresponds to the assembly of presentation data at time t2 (12921), t3 (12922), t4 (12923), t5 (12924), t6 (12925) and t7 (12926) is formatted presentation data (12931), (12932), (12933), (12934), (12935) and (12936). The final formatted presentation data is "ABCDE" (12936).

FIGS. 76D, 76E and 76F are specific embodiments illustrating the operation of the presentation processor showing the operation in use of the event content and the resulting internal storage and display presentation output, displayed over time, and also illustrating event storage based on event storage and group selection. Wherein in FIG. 76A illustrates it for a text document based assembly and FIG. 76B illustrates a media-based (audio/video/etc.) documents or file of presentation data.

Referring to FIG. 76D, the event storage (13000) provides storage of event content. As illustrated, the storage of event content is shown structured as a table (13000) within which each event is stored in an indexed relation shown as a row with multiple linked columns. As illustrated, an event-ID stored in a first left column, an edit reference stored in a second column, and an operation stored in a third column. It should be noted that other storage structures and formats can be utilized consistent with the teachings of the present invention, beyond the use of storage in a table format, such as using linked list data, memory arrays, arrays of pointers to memory locations and other known techniques of memory storage structures. The table (at (13001) illustrates the assembly time of when the event-ID reference operation of event storage part (13000) is assembled. Thus, at time ($t^1$), event 1 for insert clip "A" after the beginning is assembled into presentation data that is used to generate a display presentation. At time ($t^2$), in the second row of table (13001), the "event-ID" 2 has an "edit reference" references edit 1 with an "operation" to insert clip "B" after edit reference 1.

The table 13001 illustrates the time of assembly at which the edit content for each edit event is utilized and assembled into a combined presentation to generate a presentation data output. Thus, at time ($t^1$), of table (13001), the operation of insert clip "A" after beginning occurs at time ($t^2$), event-ID 2 operation for the insertion of clip "B" after event-ID 1 occurs. At time ($t^3$), the event-ID 4 operation is followed, [set in/out] which determines the start and stop points of clip B, which operation is performed relative to event 2. At time ($t^4$), event-ID 5 operation to insert clip "C" after event-ID 2 (clip B) is performed. At time t5, the event-ID 3 operation to insert clip "D" after event-ID 2 (clip B) is performed. At time t6, the event-ID 6 operation to delete event-ID 3 (clip D) is performed. Finally, at time t7, the event-ID 7 operation to insert clip "E" after event-ID 3 (clip D) is performed. Note that while clip D was deleted by event-ID 6 it still holds a position in the presentation data for clip E to be inserted.

The assembly of the presentation is illustrated in FIG. 76E. In FIG. 76E, the assembly of the presentation data for each of the times of assembly table (13001) are illustrated, and shows that time ($t^1$), (13020), clip "A" for event-ID 1 is assembled as presentation data for display. At time ($t^2$), (13021), clip "A" event-ID 1 is the first clip, to which is added thereafter clip "B" for event-ID 2. At time ($t^3$), (13022), clip "A", and edited reduced the length of clip "B" are assembled as a presentation that is displayed. At time ($t^4$), (13023), the clip "A" is shown first followed by clip "B" as edited and cut, followed by the insertion of clip "C" after 2, to provide the display presentation display resulting from presentation data at time. At time t5 (13024), the clip "A" is shown first followed by clip "B" as edited and cut, followed by clip C, and followed by clip D that was just inserted. At time t6 (13025), the clip "A" is shown first followed by clip "B" as edited and cut, followed by clip C (clip D is no longer in the stream since it was deleted). At time t7 (13026), the clip "A" is shown first followed by clip "B" as edited and cut, followed by clip E that was just inserted and followed by clip C.

In FIG. 76F, the output of the formatted presentation data resulting therefrom is shown is FIG. 76F, which creates the final formatted presentation data (13030) that can be used for generating a presentation display. This project file (13030) is comprised of clip "A", clip "B", clip "E", and clip "C", concatenated into a single file/clip.

FIG. 77A, 77B and 77C provide detailed flow charts and state flow for the operation of the FIGS. 72 and 3 as follows:

FIG. 77A corresponds to FIGS. 72B and 74A. FIG. 77B corresponds to FIGS. 72C and 74B. FIG. 77C corresponds to FIGS. 72E and 74C.

FIG. 77A, FIG. 77B, FIG. 77C, provide flow charts illustrating the methodology associated with the processed flow for selection of a grouping of events for a selected set of events, providing a display presentation responsive to the selected set, including the assembly of the presentation, display of the presentation to the user, providing for a new input of changes by a user and generating new events for storage in the event storage, for corresponding to FIG. 72B, FIG. 72C, and FIG. 72E, respectively.

Referring to FIG. 77A, starting at step 10610, there is a selection of a set of events. This can be done by the user of a particular computing system, or by another user of a system such as a teacher or leader who select which events to be in a selected set for display, or by the computer by predefined criteria, such as a last viewed document, or a core base image document associated with start-up. At step 10611, there is a retrieval of the selected set of events from event storage responsive to the selected set from step 10610. The retrieval is of event content for the selected set of events. At step 10612, there is an assembly of presentation data from the event content responsive thereto for the events in the selected set of events. At step 10613, a display presentation is generated for viewing by the user. At step 10614, the user provides input for changes to be made relative to the current display presentation made to the user for the selected set. At step 10615, there is a generating of new events representative of the user changes from step 10614. At step 10616, this new event for the user changes from step 10614 are stored as event content in the event storage in a structured format as described elsewhere herein. From step 10616, the flow returns to step 10610 where there is a selection of set of events for viewing as a selected view of a selected current document. It is to be understood that there many ways to initially provided for selection of the core base image or initial selected document. The initial selected document could contain "nothing" or a blank screen. Alternatively, the core base image or initial selected document can be imported from a common document format such as MICROSOFT WORD, EXCEL, POWERPOINT, WORDPERFECT, JPEG, TIFF, PHOTO SHOP, WAV, MPG, AVI, . . . .

Referring to FIG. 77B, an analogous operation of the system of FIG. 72C is provided. This methodology begins at step 10620 when there is a selecting of a set of events representing a selected group of events for which a view of the current selected document is to be provided. At step 10621, there is a retrieving of the event content for the selected set of events from event storage. At step 10622, there is an assembling of presentation data from the event content for the selected set of events, assembled responsive to and according to the event content for the selected set of events. At step 10623, there is creating of formatted presentation data from the presentation data, which at step 10624 is utilized for generating display formatted presentation data to provide a display presentation to the user for the selected set of events. At step 10625, the user provides an input for changes relative to the display presentation. At step 10626, there is generating of differences or difference annotations to the formatted presentation data-based presentation, that said differences based on the user changes. At step 10627, there is a generating of new events based upon a generation of analysis of differences between the difference annotations and the presentation data to generate new events and event content therefore. At step 10628, these new events are stored in event storage. After step 10628, the processing continues by going to step 10620 for a selection of a set of events for a now current display view of the presentation of the document.

Referring to FIG. 77C, another alternative flow chart of the methodology as described relative to FIG. 72E is provided. Referring to FIG. 77C, at step 10630, there is a selecting of a set of events to define a selected view. At step 10631, there is retrieving of even content for the selected set of events from event storage. At step 10632, the event content from the selected set of events is utilized to assemble presentation data. At step 10633, there is a creating of formatted presentation data from the assembled presentation data. At step 10634, a display presentation is provided to a user of the display formatted presentation data. At step 10635, the user provides for input of changes or annotation data relative to the then current display presentation. At step 10636, there is a generation of modified formatted presentation data that is provided based on the user changes of step 10635. At step 10637, there is a comparison in finding of differences between the formatted presentation data and the modified presentation data, which at step 10638 is utilized for generating of new events based on the differences in the presentation data. At step 10639, the new events are stored in event storage. Thereafter, from step 10639, processing resumes at step 10630 with selection of a set of events for a new selected view presentation.

Referring to FIG. 78A, a system block diagram is provided showing a centralized event processing system (10400). FIG. 78A corresponds to FIG. 74A, FIG. 74B, and FIG. 74C, all of which also show a centralized event processing system. The centralized processing system (10400) is comprised of one or more centralized event processor with network interface ((10402A), (10402B), etc.) [See FIG. 80A, FIG. 80B, or FIG. 80C, for further detailed block diagrams on alternatives], one or more edit processor subsystems ((10401A), (10401B) and (10401C)) for edit processors with group control and group control selection with network interface [See FIG. 79A, FIG. 79B, or FIG. 79C for further detailed block diagrams and alternate embodiments of the edit processor subsystem]. As illustrated in FIG. 78A, there is a centralized event processor with network interface (10402A) coupled via communications interface (10403D) to communications subsystem (10409) (which can be from a simple Internet connection or internal bus connection to a wireless or wired local area or wide area network-based interface. Optionally there may be one or more additional centralized event processor with network interface (10402B) coupled via communications interface (10403E) to communications subsystem (10409). There are also a plurality of the edit processor subsystems, one for each user. As illustrated in FIG. 78A, user 1 couples via input (10404A) to edit processor subsystem (10401A), which couples via communications interface (10403A) to the communications subsystem (10409). Similarly, user 2 couples via user input (10404B) to edit processor subsystem (10401B) which couples via communications interface (10403B) to the communications subsystem (10409). Finally, as illustrated in FIG. 78A, user 3 couples via user input interface (10404C) to edit processor subsystem (10401C) which couples via communications interface (10403C) to the communications subsystem (10409). The communications subsystem (10409) provides for interface of data between each of the editor processing subsystems ((10401A), (10401B), (10401C), etc.) and the event processor subsystems ((10402A), (10402B), etc.). This data communication can alternatively be between all components, between each of the edit processor subsystem components and each of the event processor subsystems, or a combination thereof. The event processor subsystem (10402A) will communicate with event processor subsystem (10402B) to synchronize the event data stored in each and for retrieving event data stored in the other event processor subsystem that is not stored in their own event processor subsystem. Multiple event processor subsystems (10402A, 10402B, etc.) may be used to share the load of processing events for the edit processor systems (10401A, 10401B, 10401C, etc.) and share the storage of event data in a distributed manner.

FIG. 78A also corresponds to FIG. 73A and FIG. 73B and FIG. 73C architectures.

Referring to FIG. 78B, a peer-to-peer event processing system (10700) is illustrated. This peer-to-peer event processing system (10700) is comprised of multiple event and edit subsystems (10701A, 10701B, and 10701C), as illustrated in FIG. 78B, each coupled to a respective user and coupled to each other. User 1 is coupled via user interface (10704A) into event and edit event subsystem (10701A) [See FIG. 81A, FIG. 81B, and FIG. 81C for further detailed drawings and alternatives for the event and edit subsystem (10701)]. The event and edit subsystem (10701A) is coupled via communications interface (10703A) to communications subsystem (10709). Similarly, user 2 couples via user interface (10704B) to event and edit event subsystem (10701B) which is coupled via communications interface (10703B) to network communications subsystem (10709). Finally, as illustrated in FIG. 78B, user 3 is coupled via a user interface (10704C) to event and edit event subsystem (10701C) which is coupled via communications interface (10703C) to communications subsystem (10709) which provides for coupling and communications of data between all of the event and edit event subsystem (10701 A, B, and C). Each event and edit subsystem (10701A, 10701B, 10701C, etc.) includes a synchronization capability to allow for event data to be synchronized between the respective event and edit subsystems (10701A, 10701B, 10701C, etc.). These subsystems may also share the load of processing events and share the storage of event data in a distributed manner.

FIG. 79A, FIG. 79B, and FIG. 79C provide illustrations of more detailed block diagrams of the edit subsystems (10401A), (10401B), and (10401C) of FIG. 78A. FIG. 79A also corresponds to showing the utilization of the group selection and control logic (10170) and edit processor logic (10110) from FIG. 74A. FIG. 79B further corresponds to utilization of the group control logic (10270) and edit control processor logic (10210) from FIG. 74B. FIG. 79C corresponds to and illustrates the use of the group control logic (10370) and edit control processor logic (10310) from FIG. 74C.

In a similar manner, FIG. 80A, FIG. 80B, and FIG. 80C correspond to more detailed electrical diagrams of the event subsystems of FIG. 78A. with FIG. 80A corresponding to FIG. 74A and to FIG. 79A, with FIG. 80B corresponding to showing FIG. 74B event processor (10200) and corresponding to FIG. 79B, and corresponding to FIG. 74B. Similarly, FIG. 80C corresponds to FIG. 78A and to FIG. 74C, and to FIG. 79C.

Referring to FIG. 79A, FIG. 79B, and FIG. 79C, a user input [(10453), (10553), and (10653), respectively] is coupled to the edit subsystem [(10450), (10550), (10650), respectively] which is coupled therein to both group control logic [(10170), (10270), (10370), respectively], and to edit control processor logic [(10110), (10210), (10310), respectively], from FIG. 74A, FIG. 74B, FIG. 74C, respectively. The group control logic [(10170), (10270), (10370), respectively] is coupled via the network interface [(10451), (10551), (10651), respectively] of the edit subsystem, and is coupled out to the communications interface [(10452), (10552), (10652), respectively]. The network interface [(10451), (10551), (10651), respectively] receives event information from the event processors (10402A and 10402B) to the group control input [(10171), (10271), (10371), respectively]. The network interface sends the selected group set output [(10175), (10275), (10375), respectively] from the edit subsystem to the event subsystem of the corresponding FIG. 80A, FIG. 80B, and FIG. 80C, respectively, to FIG. 79A, FIG. 79B, and FIG. 79C. The presentation data is received, responsive to the group control logic, from the event subsystem of FIG. 80 to the network interface of FIG. 79 is coupled to the presentation data input (10114) of the edit control processor (10110) generates a display presentation for viewing locally by the respective user of the edit subsystem of FIG. 79. The modified presentation data is received, responsive to the group control logic, from the event subsystem of FIG. 80 to the network interface of FIG. 79 is coupled to the presentation data input [(10214), (10314), respectively] of the edit control processor [(10210), (10310), respectively] generates a display presentation for viewing locally by the respective user of the edit subsystem of FIG. 79. The new events are sent from output (10111), responsive to the user input, to the event subsystem of FIG. 80 to the network interface of FIG. 79. The difference annotations are sent from output (10211), responsive to the user input, to the event subsystem of FIG. 80 to the network interface of FIG. 79. The modified presentation data is sent from output (10311), responsive to the user input, to the event subsystem of FIG. 80 to the network interface of FIG. 79.

Referring to FIG. 80A, FIG. 80B, and FIG. 80C, the communications interface (10403D) from the communications subsystem couples data to and from the event subsystem [(10460), (10560), (10660), respectively], of FIG. 80A, FIG. 80B, and FIG. 80C. The available events are provided by [(10151), (10251), and (10351), respectively] to the group control logic FIG. 79A, FIG. 79B, and FIG. 79C, and are coupled via the communications interface [(10496), (10596), and (10696), respectively] [See (10403D and 10403E) of FIG. 78A] to the network interface of the event subsystem of FIGS. 80 [(10495), (10595), and (10696), respectively]. The selected set output from the group control logic FIG. 79A, FIG. 79B, and FIG. 79C, are coupled via the communications interface [(10496), (10596), and (10696), respectively] [See (10403D and 10403E) of FIG. 78A] to the network interface of the event subsystem of FIGS. 80 [(10495), (10595), and (10696), respectively]. The selected set output is coupled to the respective event processor [(10100) of FIG. 74A for FIG. 80A, (10200) of FIG. 74B for FIG. 80B, and (10300) of FIG. 74C for FIG. 80C] coupled via [(10195), (10295), and (10395), respectively]. The event processor of FIG. 80A, FIG. 80B, and FIG. 80C, retrieves event content from event storage responsive to the selected set of events received via the network interface and provides and an output [presentation data (10164), formatted presentation data (10272), and formatted presentation data (10361), respectively] back via the network interface of FIG. 80A, FIG. 80B, and FIG. 80C via the respective communications interface [(10496), (10596), and (10696), respectively] for coupling back to the respective interface FIG. 79A, FIG. 79B, and FIG. 79C, respectively, [(10452), (10552), and (10652), respectively]. The event processor of FIG. 80A, FIG. 80B, and FIG. 80C, receives modifications to the document via [new events (10141), difference annotations (10231), and modified formatted presentation data (10332), respectively].

The event processor provides event storage. However, there may be a plurality of event subsystems each their respective event storage in the event processor. The network interface can provide a communication of event storage data available in one event subsystem and not available in one of the other of plurality of event subsystems. Additionally, each event subsystem may have a local copy of all or some of the events available in other event subsystems. The network interface provides synchronization functions to ensure each event subsystem is up-to-date with all the necessary events in their respective event storage. This task is simplified in this embodiment over other document systems because events don't change or rarely if ever are deleted; the events are typically only added. The events are simply used in different selected sets of events to provide different presentations of the document. In this way, the operations of FIG. 78A are implemented for a centralized event processing subsystem with various of the configurations as shown in FIG. 74A for FIG. 79A, FIG. 80A, for FIG. 74B as shown for FIG. 79B and FIG. 80B, and for FIG. 74C as shown for FIG. 79C and FIG. 80C. FIG. 73A, 73B and 73C also show a multi-user system in operation utilizing central server.

Figure 81A:
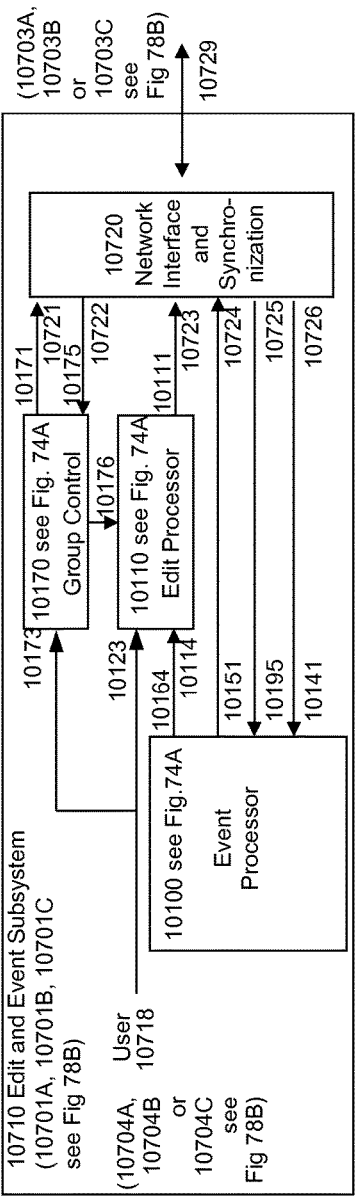
FIG. 81A illustrates an embodiment of the event and edit subsystem (10710) as shown in FIG. 78B (10701A, 10701B, 10701C) utilizing subsystems shown in FIG. 74A (10100, 10110 and 10170).
Figure 81B:
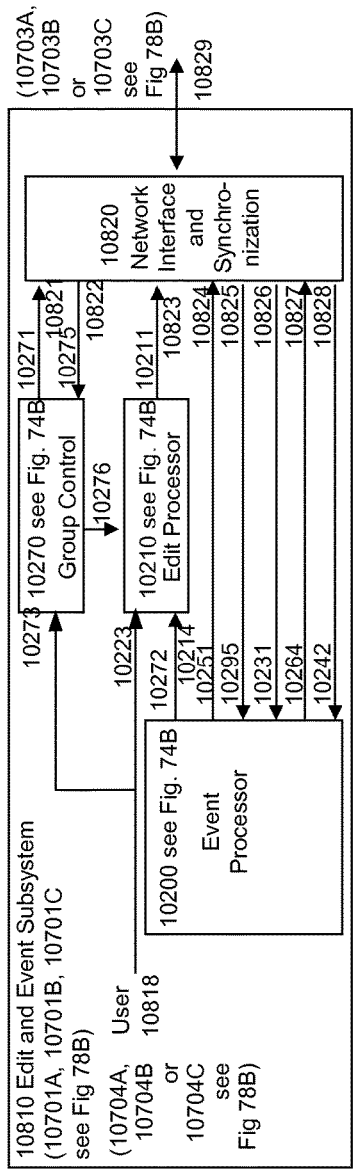
FIG. 81B illustrates an embodiment of the event and edit subsystem (10810) as shown in FIG. 78B (10701A, 10701B, 10701C) utilizing subsystems shown in FIG. 74B (10200, 10210 and 10270).
Figure 81C:
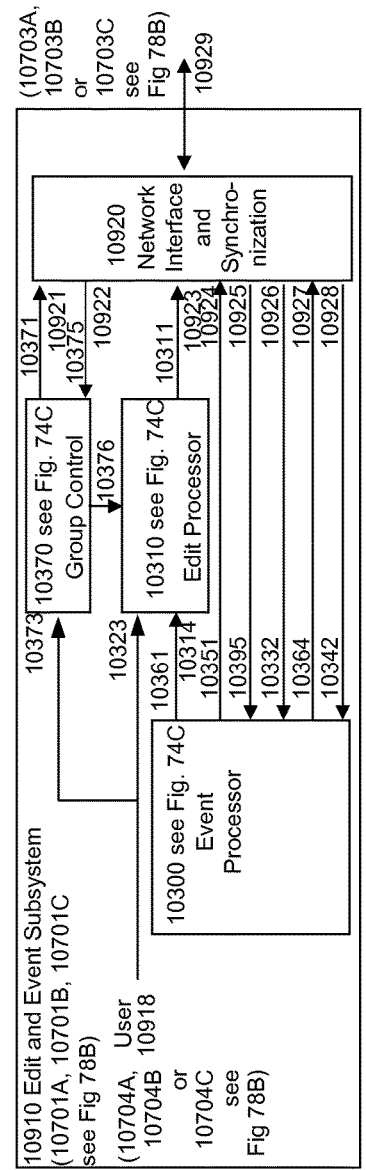
FIG. 81C illustrates an embodiment of the event and edit subsystem (10910) as shown in FIG. 78B (10701A, 10701B, 10701C) utilizing subsystems shown in FIG. 74C (10300, 10310 and 10370).

Referring to FIG. 81A, FIG. 81B, and FIG. 81C, a distributed peer-to-peer event processing system is illustrated for embodiments corresponding to the FIG. 74A, FIG. 74B, and FIG. 74C, respectively. The distributed event processing subsystem as illustrated in FIG. 81A, FIG. 81B and FIG. 81C is comprised of a separate user event processor and user edit/control processor being provided for each user at each user's site, in an operative stand-alone system, with the level of distribution of function from total to minimal to allow peer-to-peer operation, with additional features being provided for some over others, or all being equal peers. The individual separate edit and event subsystems are coupled each other via a communications subsystem/network interface so as to provide communications with each other.

Referring to FIG. 81A, FIG. 81B, and FIG. 81C, an edit and event subsystem [(10710), (10810), and (10910), respectively] is illustrated corresponding to the edit and event subsystem (10701A), (10701B), and (10701C) of FIG. 78B. FIG. 81A corresponds to utilization of the subsystem of FIG. 74A for the event processor [(10100), (10200), and (10300), respectively], the edit processor [(10110), (10210), and (10310), respectively] and the group control [(10170), (10270), and (10370), respectively]. Referring to FIG. 81A, FIG. 81B, and FIG. 81C, the communications interface (10703A), (10703B) or (10703C) from the communications subsystem couples data to and from the edit and event subsystem [(10710), (10810), (10910), respectively], of FIG. 81A, FIG. 81B, and FIG. 81C to the network interface and synchronization logic [(10720), (10820), and (10920), respectively]. User input [(10718), (10818), (10918), respectively] is provided to the group control [(10170), (10270), and (10370), respectively] on input [(10173), (10273), and (10373), respectively] and the edit processor [(10110), (10210), and (10310), respectively] input [(10123), (10223), and (10323), respectively]. Selected events are output [(10171), (10271), and (10371), respectively] from the group control to the network interface [(10721), (10821), and (10921), respectively]. Event information is provided in input [(10175), (10275), and (10375), respectively] to the group control from the network interface via [(10722), (10822), and (10922), respectively, and (10729), (10829) and (10929) respectively]. Modifications to the document are input [new events (10141), difference annotations (10231), and modified formatted presentation data (10332), respectively] to the event processor via the network interface via [(10726), (10826), and (10926), respectively, and (10729), (10829) and (10929) respectively] from any one of the edit and event subsystems. The selected set of events in input [(10195), (10295), and (10395), respectively] via the network interface via [(10725), (10825), and (10925), respectively] from any one of the edit and event subsystems. The presentation information in output [presentation data (10164), formatted presentation data (10272), and formatted presentation data (10361), respectively] to edit processor [(10110), (10210), and (10310), respectively] to input [(10114), (10214), and (10314), respectively]. Events are output [(10151), (10251), and (10351), respectively] to the via the network interface via [(10724), (10824), and (10924), respectively] from any one of the edit and event subsystems. Modifications to the document are output [new events (10111), difference annotations (10211), and modified formatted presentation data (10311), respectively] from the edit processor via the network interface via [(10723), (10823), and (10923), respectively] to any one of the edit and event subsystems. Presentation data is input [(10242), and (10342), respectively] to the event processor via the network interface via [(10828), and (10928), respectively, and (10829) and (10929) respectively] from any one of the edit and event subsystems for use in generating new events. Presentation data is output [(10264), and (10364), respectively] from the event processor via the network interface via [(10827), and (10927), respectively] from any one of the edit and event subsystems for use in generating new events on the receiving edit and event subsystem.

Thus, FIG. 81A, FIG. 81B, and FIG. 81C help to clearly illustrate that any of the system architectures and methodologies as described with reference to FIG. 74A, FIG. 74B, and/or FIG. 74C can be utilized for implementation of the peer-to-peer architecture of FIG. 78B, as well as supporting use in the centralized architecture.

The plurality of edit and event subsystems each provides event storage in their respective event processors (10100) of FIG. 81A, (10200) of FIG. 81B, and (10300) of FIG. 81C. The network interface (10720) of FIG. 81A, (10820) of FIG. 81B, and (10920) of FIG. 81C can provide a communication of event storage data available in one edit and event subsystem and not available in one of the other of plurality of edit and event subsystems. Additionally, each edit and event subsystem may have a local copy of all or some of the events available in other edit and event subsystems. The network interface provides synchronization functions to ensure each edit and event subsystem is up-to-date with all the necessary events in their respective event storage. This task is simplified in this embodiment over other document systems because events don't change or rarely if ever are deleted; the events are typically only added. The events are simply used in different selected sets of events to provide different presentations of the document.

FIG. 82A, FIG. 82B, and FIG. 82C provide illustrations of alternative storage structures, data tables, utilization of layer storage, and assembly and generation of display presentation responsive to event content and illustrates the view presentation occurring relative to other events and annotations.

As illustrated in FIG. 82A, there are three different users providing input each stored in a respective data layer. User 1 data is stored in layer zero. User 2 data is stored in layer 1, and user 3 data is stored in layer 2. As illustrated in FIG. 82A, the event content storage, and structured layered mapping for layer zero, provides for storage of event-ID, event order entry, text by order illustrated in terms of order of assignment of event-ID and order in the table, how far down it is the later it is, the later the event-ID occurred, and showing the change data (the text itself) and the change operation illustrated as an after version of change reference. As illustrated, event-ID 1 shows to insert the letter "A" after the beginning. Event-ID 2 inserts the letter "D" after event-ID 1. Event-ID 3, third row, shows insertion of the text "EFGH" after event-ID 2. Event-ID 4 shows inserting "IJ" after event-ID 3. Event-ID 5 shows it is inserting "OOP" after event-ID 4. Finally, the sixth row of the table (12130) shows event-ID 6 being to insert the text "QRST" after event-ID 5.

Similarly, for user 2, layer 1 stores user 2 change annotations, in logic table storage structure (12140) showing the order of events in the first row event-ID 8, and in the second row event-ID 10. As illustrated in FIG. 82A, at event-ID 8, insert the letter "C" after event-ID 7. Event-ID 10 is to insert the letters "KL" after event-ID 4.

Referring to FIG. 82A, table (12150) shows in the first row event-ID 7 as the first event occurring, for user 3, and event-ID 9 is the second event occurring for user 3. At event-ID 7, the text "B" is to be inserted after event-ID 1. Table (12150) also shows that even-ID 9 is to have text "MN" inserted after event-ID 4. Thus, FIG. 82A represents the totality of event content for a document defined by event-IDs 1-10. These events can be selected to define a selected grouping of events as a selected set wherein only those events for the selected set have event content provided for assembly in generating presentation data for a view to presentation of the selected set of event content which is assembled responsive to the corresponding set of operations and change data.

Referring to FIG. 82B, the storage of events from a layered storage structure is illustrated with storage in a single logic table in a memory of a mapping to the layers for all event-IDs in a defined document. This document forms a core base image that can then be used for further editing and/or selected viewing. As illustrated in FIG. 82B, the logic and mapping utilized to generate the table provides for a mapping of the layer where data is stored and the associated event content for all events for that layer. The storage of the mapped data table is ordered by event-ID. As illustrated in FIG. 82B, table (12100) shows that for layer event-ID 1 is in layer zero to provide text after the beginning. Event-ID 2 is in layer zero to insert text "D" after event-ID 1. Event-ID 3 is stored in layer zero, showing its event content, and then it shows event-ID 4 as the fourth entry in the table fourth row for layer zero and its change reference and data. This continues until event-ID 7 is stored in layer 2 and is inserted after event-ID 1. Then, for the eighth row of the table shows that the event-ID 8 is stored in layer 1 and its even content, change data, and change reference. The event-ID 9 is shown as stored in layer 2 and its change reference and change data. Finally, event-ID 10 is shown as the tenth row in the table with storage in layer 1 of the insert of "KL" after event-ID 4.

Referring to FIG. 82C, a front view of the display presentation resulting from selection of sets of events for this document utilizing the methods and teachings of the present invention are illustrated.

Referring to display presentation (12110), for selection of event-ID 10 as selection of all event-IDs in generation of the display. This shows for each event-ID, the event-ID as a numeral and the text circled, and the resulting layout and display presentation of the text for the assembled display presentation responsive to following the change operation and change references and event-IDs of the event content and the mapping of the table (12100) logic for layer retrieval of the event-IDs to generate the display presentation.

Referring to FIG. 82C display (12120), an alternative view for display presentation responsive to selection to events 1-6 only for display presentation is illustrated. As illustrated in display (12120), only the display is generated by events 1-6 is shown on the display screen. As illustrated, the assembly of the display presentation precedes first by event order and then further processed according to event content of change reference and change data, as well as possible filtering by one or more of other parameters such as event-ID, author/user, date, time, etc.

Figure 83:
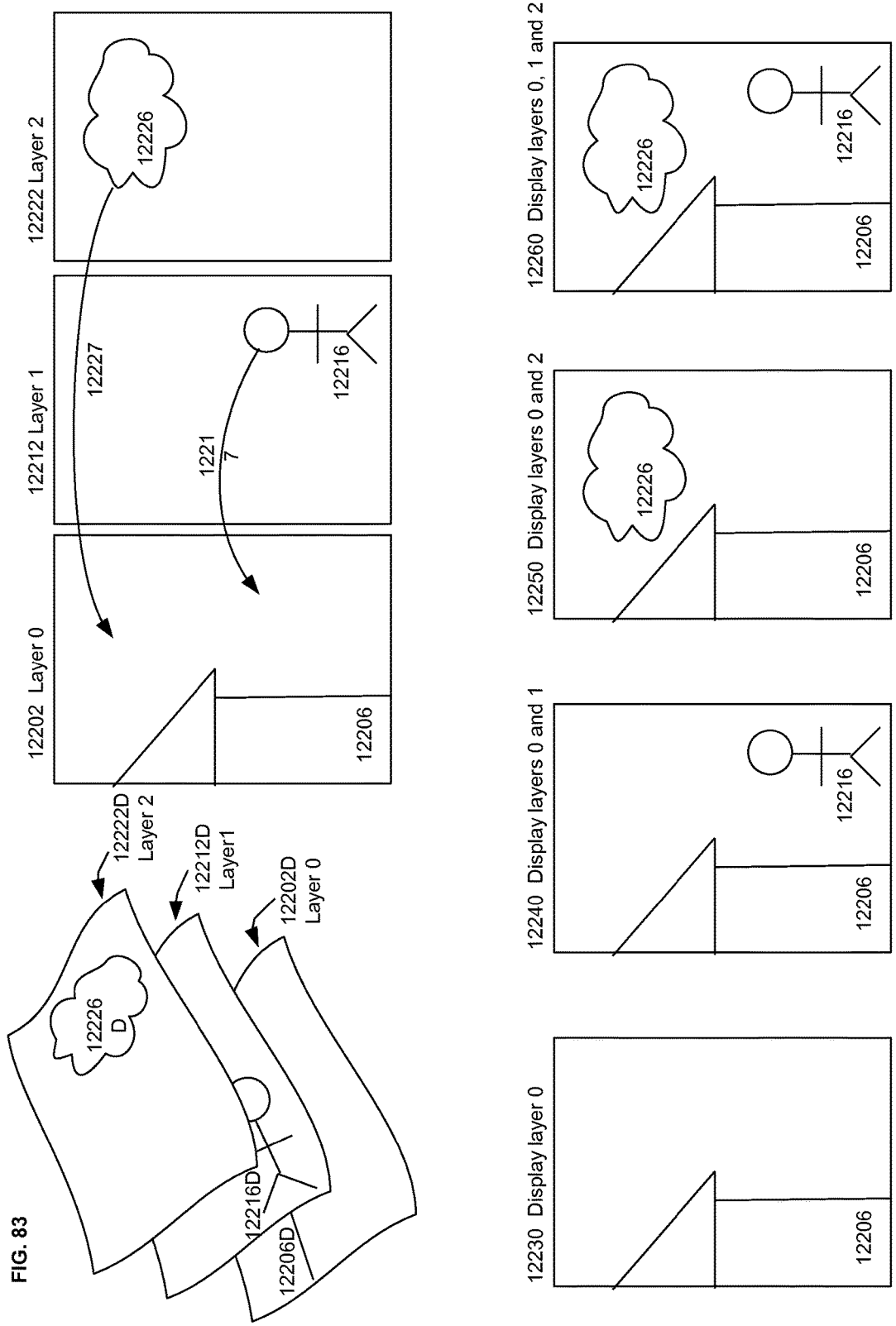
FIG. 83 illustrates visual events stored in layers and the display presentation for four different selections of events.

Referring to FIG. 83B, the third display presentation (12250) shows the display of selected grouping of all events in layer zero and layer 2. As illustrated herein, this display (12250) shows the house (12206) as generated from the display data for layer zero with the display of the cloud generated from the display for layer 2, and with the just position as defined by the event content parameter data (12227). Finally, referring to FIG. 83B, display presentation (12260), it shows the resulting display presentation with the selection of display layer zero, 1, and 2, and of all events in those layers. This display presentation (12260) shows the house as generated from display layer of user 1 layer zero, and the person (12216) as provided from user 2 layer 1 data, just position relative to the house (12206), and the cloud (12226) generated from the display data of layer 2 for user 3, also positioned relative to the house (12206) for user 1 of layer zero.

Although illustrated as referencing relative to an object in layer zero, the present invention is also compatible with other referencing methodologies and schemes, such that any point in any presentation or layer can be a reference point, and any type of referencing logic can be utilized. The reference could be relative to another event in the same layer or another layer.

Figure 84A:
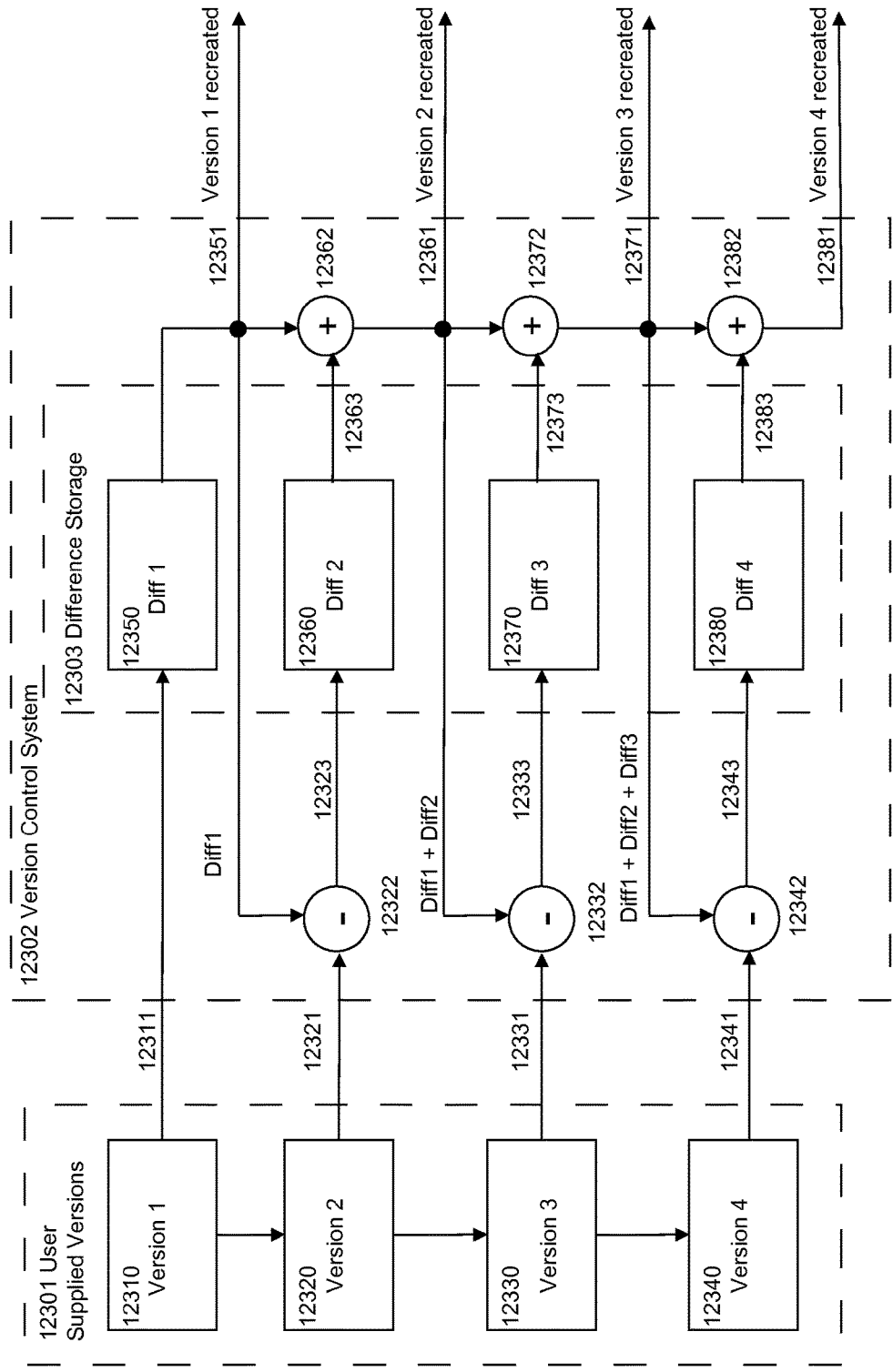
FIG. 84A illustrates prior art version control and document management systems.

Referring to FIG. 84A, one example of a prior art document management version control system is illustrated. User supplied versions of documents are provided at (12301) over time, so that at a first time, a version 1 (12310) is generated and stored, and at a second time, a second version, version 2 (12320) is stored, similarly, version 3 (12330) is stored at a third time with additional modifications to version 2 (12320) and also shown is at a later time version 4 (12340) is generated from version 3 with additional changes thereto. The output of the versions 1, 2, 3, and 4 are coupled via outputs (12311), (12321), (12331), and (12341), respectively, from the user supplied version subsystem (12301). The outputs are coupled to a version control system (12302). The original version 1 is coupled to a first comparator (12350) for generating a difference subset of changes relative to version 1. Since no changes have occurred, a version 1 output recreated (12351) is provided. At time (t2), version 2 output (12321) is coupled to a comparator 12351 which subtracts version 1 from version 2 to generate a difference output (12323) coupled to the different storage (12303) subsystem (12360) which generates a difference output (12363) of the changes from version 2 which are combined by logic (12362) to the version 1 recreated output (12351) to generate a version 2 recreated output (12361). This represents the differences of 1 and the differences of 2 outputs from (12350) and (12360), respectively. At time (t3), version 3 output (12331) is coupled to a comparator (12332) which subtracts version 2 recreated (12361) from version 3 (12331) to generate an output of differences (12333) which is coupled to difference storage (12370) which generates an output of the third differences (12373) which are combined by logic (12372) which adds the version 2 recreated to the differences 3 (12373) to generate an output of a version 3 recreated document (12371) comprising differences 1 plus differences 2 plus differences 3 (outputs (12351), (12361), and (12371)).

Referring to FIG. 84A, at time ($t^4$), version 4 (12340) provides the output (12341) of the version 4 document as saved to the compare logic (12342) which subtracts the version 3 recreated (12371) from the version 4 (12341) to generate differences (12343) which are stored in difference storage (12303) in memory (12380) thereof, which selectively provides an output of the difference 4 data (12383) coupled to combination logic (12382) which combines the difference 4 (12383) with the version recreated data (12371) to generate a version 4 recreated document (12381). As is illustrated herein, all new versions are absolutely dependent upon and require reference to and utilization of all prior versions in order to reconstruct and view the selected version of the document. Reconstruction of a version of a document is based upon the entire document's history for all previous versions and not on the changes themselves. Thus, there is an absolute restriction to buy versions. And, combinations cannot just be provided of any groupings of any annotations by one user or by any users in any order of entry that is desired to be displayed. This is contrast to the systems and methodologies as taught and claimed in the present invention.

Referring to FIG. 84B, a flow chart is illustrated showing the state flow and operation as shown in FIG. 84A. Referring to FIG. 84B, at step 11500, a user opens the editor software on the computing system. At step 11501, the user edits the document with the editing subsystem software. This can include WORD, any text editor, POWERPOINT, any image editor, movie editor, 74D model editor, image editor, PHOTOSHOP, . . . .

At step 11502, a first version of the document is saved by the user, including all edits made to that point, and is saved as a file version 1. At step 11503, version 1 of the file is opened and worked on the computing system. At step 11504, a further edit is made to the document. At step 11505, the user saves a second version of the document to a file as version 2. The processing continues for multiple versions analogous to FIG. 84A.

Referring to FIG. 84C, three alternative display presentations are shown illustrating various levels of display presentation of tracked changes, such as in a word processing software document. Display (12400) shows the document display presentation when all changes are to be tracked and made visible and shown in the display. As illustrated, there were four edits made, which can be from any version, any user, or all users, or any one user. Display (12400) shows the edits appearing with the otherwise core base image display presentation of an underlying document. Display (12410) shows an alternate view presentation of that same document but with the changes made and the edits being selected to be hidden rather than shown. In this case, none of the added edits are displayed in the display presentation (12420). Finally, display (12410) provides a view selection where the user selects two of the changes/edits 1 and edit 3, to be accepted and as part of the clean displayed flattened document, and chooses to reject and cancel edits 2 and 4, so they are no longer in this version of the document, and this version of the document with accepted and rejected is in the display presentation. If this version is saved, it creates a flattened document, where all of the tracking information is lost for the past events and past versions.

Figure 84D:
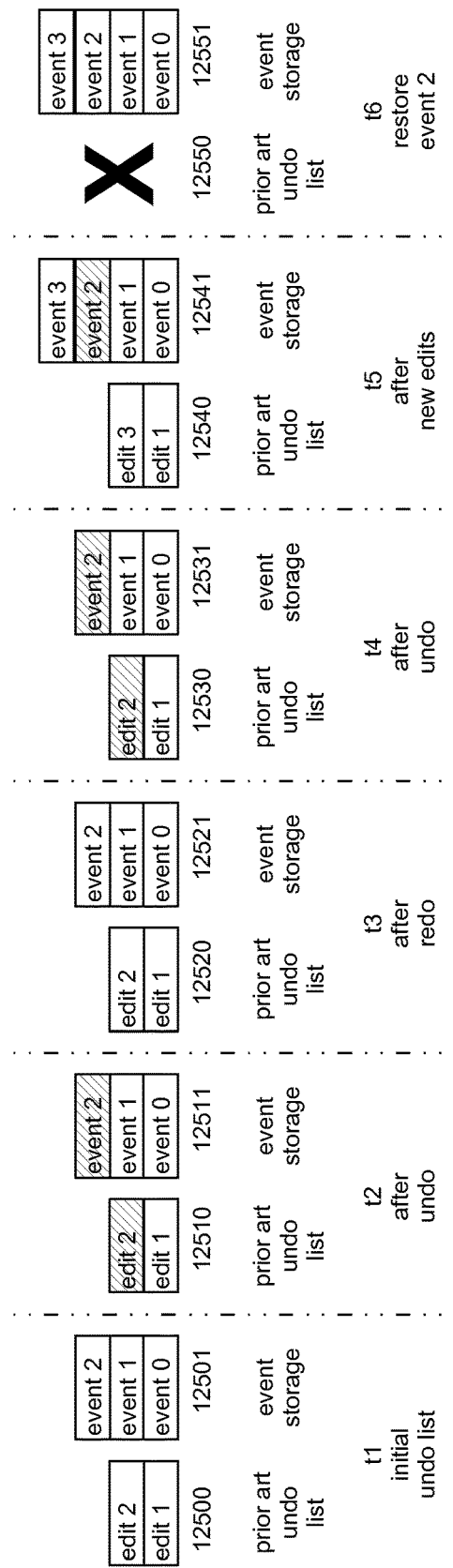

Referring to FIG. 84D, a comparison is provided of memory storage of edits and utilization and prior art undo/redo listing, versus the event content storage and logic and display processing and assembly pursuant as per the present invention, illustrated for each of a plurality of time windows of processing. As illustrated in FIG. 84D, at time (t1), there is an initial processing period. In the prior art, there are shown stored in edit memory edit 1 and edit 2 in storage (12500). This provides the initial undo list for the edit processor. Event storage (12501) provides event content storage for events zero, 1 and 2, which can be selected for selected grouping for generation of a view of a display presentation.

At time (t2), a first undo has been selected. As illustrated, edit table (12510) and event storage (12511) provides for a display presentation where edit 2 is not utilized and has been removed from the undo list. In the event storage, the event content for event zero, 1 and 2 are maintained in event storage, but the event 2 shown as darkened is not selected in the selected set of events for generating the display presentation, which eliminates the viewing and the presentation of event 2, but does not change the event storage. At time (t3), a first redo is selected. In the prior art edit storage (12520), edit 2 is re-entered into the undo list (12520). In the event storage (12521), the content remains unchanged. However, the selected grouping is of all events zero, 1 and 2, and so provides a display presentation of the three events in the selected grouping.

At time (t4), the user has selected another undo of which removes the last entered edit of edit 2 from the undo list, shown as blackened out in the table (12530). However, the event storage (12531) is unchanged again, but the selection of event 2 is not selected as part of the selected set (illustrated as darkened in the event storage (12531), so that the assembly of event content is only for events zero and 1 to generate the view in the presentation.

At time ($t^5$), new edits are added by the user. In the prior art storage of the undo list, there is only edit 1 at time ($t^4$), in table (12530). Edit 2 has been removed as shown darkened at time ($t^4$).

At time ($t^5$), the edit 3 is stored in the second entry storage location of the memory (12540). Thus, the ability to further undo or redo edit 2 is lost in the prior art. In the event storage (12541), after the new event is added, event zero, 1, 2, and 3 all have event content stored in the event storage (12541). However, as shown as blackened in the event storage (12541), event 2 is not selected to be within the selected grouping, which is the set of events zero, 1 and 3, as illustrated for time ($t^5$), and this selected grouping of event content is utilized to generate a presentation view for display to the user.

A key distinction and benefit of the present invention relative to the prior art is illustrated at (t6) depicted by undo list (12550) and event storage (12551), in FIG. 84D. At time (t6), the user of the system wishes to restore the second edit event 2. However, with the prior art, the undo list no longer contains edit 2, and since it was undone, and additional edits done in its place, then there is no way to retrieve or utilize it. However, since in the event storage of the present event processing with the present invention, all event content is retained at all times in this process, so that the selected set of events is what determines which event content will be displayed and processed assembled for display and viewed. In this case, it is a simple matter of selecting event 2 as part of the selected grouping of set of events to be assembled to provide the display. Thus, at time (t6), with the present invention, event 2 can be restored, while in the prior art, it cannot.

The use of an undo list is present in numerous programs of all genres, from word processing and document processing of text documents to image processing and audio processing. Non-linear editing systems as well as linear systems utilize undo lists. These problems of loss of ability to restore events is a liability and problem with many systems.

Additionally, although in some application software, there is an ability in some programs such as ADOBE LIGHTROOM, ADOBE PHOTOSHOP, and others, to view the entire undo list as a history of undos. They provide an opportunity to jump to a particular spot in the undo list. While this exposes the undo list to the user, and most programs only allow to take one off the top, or add one, or move back up the list in steps of one, these allow to jump up and down, however, it is equivalent in functionality to do multiple undos or multiple redos, so their functionality is described this figure.

What is claimed is:

1. A system for collaboration, comprising:
    a computing appliance for use by a respective user;
    storage comprising non-transitory storage media;

wherein said storage stores respective user data that is representative of a respective display of annotations responsive to a respective user input by the respective user;

wherein the storage provides associatively mapped storage of respective user data stored as associated with the user providing the respective user input;

wherein the user data is comprised of event content data for respective events generated in a defined order of entry relative to other of the events;

view control logic selecting a plurality of the events as a selected set;

presentation assembly logic responsive to the mapping logic, and generating presentation data responsive to processing the event content data for said events in the selected set, in a defined order responsive to other of the events in the selected set; and display apparatus providing a presentation responsive to the presentation data.

2. The system as in claim 1, wherein there are a plurality of the computing appliances, each said computing appliance for use by a respective one user of a plurality of users;

wherein the storage of the user data is mapped as associated with the user providing the input of said user data.

3. The system as in claim 2, wherein there are a plurality of the computing appliances, wherein each said computing appliance is associated with a respective one user of a plurality of users;

wherein each said user is associated with a separate said display apparatus of a respective said computing appliance, which provides a local display presentation thereupon of a respective combined presentation comprising a display of at least some annotations as input by at least two of the plurality of users.

4. The system as in claim 2, wherein the view control logic is responsive to selection of respective said event content by a respective said user for use in generation of associated display presentations at the computing appliance associated with each of at least two of the users.

5. The system as in claim 2, wherein the storage is comprised of layer storage comprised of a plurality of data layers;

wherein the user data associated with the user input for each said user is stored in an associated said data layer;

the system further comprising:

display enable control logic defining a display enable mode defining one of an enabled display state and a disabled display state, for each of a plurality of respective data layers for each of the respective plurality of users, on a user-by-user individual basis as to each individual said user of the plurality of users; and wherein the display generation is responsive to the display enable mode of the data layer for controlling providing the presentation.

6. The system as in claim 2, wherein there are a plurality of computing appliances each associated with a respective one of a plurality of users;

wherein the storage is comprised of layer storage comprised of a plurality of data layers;

wherein the user data associated with the user input for each said user is stored in an associated said data layer;

wherein the storage is comprised of a set of a plurality of the data layers stored in a centralized layer storage and duplicated and stored in a set of local data layers of storage located in each of at least two of the plurality of computing appliances;

wherein each of a plurality of computing appliances is associated with a same duplicated said local data layer in said respective local data layers of storage, in each of said at least two of said respective plurality of computing appliances;

wherein storage of the event content data in the centralized layer storage and the in each of the respective plurality of local data layers, is synchronized and updated such that changes to the user data in any of the sets of local data layers, are communicated for storage to all other ones of the sets of local data layers and to the centralized layer storage.

7. The system as in claim 1, wherein the defined order of entry is determined responsive to utilizing of the event content data for the events in the selected set.

8. The system as in claim 1, wherein there are a plurality of the computing appliances, wherein each said computing appliance is associated with a respective one user of a plurality of users;

wherein the presentation assembly logic is further comprised of:

selection logic, responsive to the mapping logic, providing a respective output of said user data for each of at least two of the users, for each of the events in the selected set; and display generation logic providing generation of the presentation data for the presentation utilizing the event content for selected events from respective storage, responsive to the selection logic, responsive to the respective output.

9. The system as in claim 1, wherein there are a plurality of the computing appliances, wherein each said computing appliance is associated with a respective one user of a plurality of users;

wherein each said computing appliance is further comprised of local view control logic providing selection of respective selected ones of the events as a local selected set of events; and wherein the display generation at each said computing appliance is responsive to the event content associated with the local selected set of events.

10. The system as in claim 1, further comprising:

edit control logic, responsive to the user input, for generating events comprised of the event content data comprising an event-ID, and change reference data; and wherein the defined order is determined by the presentation assembly logic responsive to respective said change reference data and respective said event-ID.

11. The system as in claim 1, wherein there are a plurality of the computing appliances, wherein each said computing appliance is associated with a respective one user of a plurality of users;

wherein each of at least two of the plurality of computing appliances is further comprised of local storage;

wherein changes to the respective user data for at least each said user of at least two said users is stored in respective associated said local storage of the respective said users;

wherein the storage is comprised of layer storage comprised of a plurality of data layers;

wherein the user data associated with the user input for each said user is stored in an associated said data layer;

wherein the layer storage is further comprised of a base layer of storage storing base image data representative of a respective base image display; and wherein the display control logic provides selection of the base layer and at least one of the plurality of data layers as a selected data layer that provides respective said event content for the selected events to be utilized in the display generation, responsive to the mapping logic.

12. The system as in claim 1,
wherein there are a plurality of the computing appliances, wherein each said computing appliance is associated with a respective one user of a plurality of users;
wherein each of at least two of the plurality of computing appliances is further comprised of local storage;
wherein changes to the respective user data for each of at least two said users is stored in respective associated said local storage of the respective said users; and
wherein said changes to the respective user data are communicated between the at least two of the plurality of computing appliances, to provide updating, so that the respective said local storage of each one of the at least two of the plurality of computing appliances is updated to each store the same content comprising at least a part of said respective user data comprised at least in part of the changes.

13. The system as in claim 12,
wherein the updating provides for copying the user data for a change stored in the local storage at a first said computing appliance, to be copied from said first said computing appliance for storage in the local storage of said at least one other one of the plurality of computing appliances.

14. The system as in claim 1,
wherein there are a plurality of the computing appliances, wherein each said computing appliance is associated with a respective one user of a plurality of users;
wherein each of at least two of the plurality of computing appliances is further comprised of local storage;
wherein the storage is comprised of layer storage comprised of a plurality of data layers;
wherein the user data associated with the user input for each said user is stored in an associated said data layer that is associated with said user;
wherein the storage is comprised of duplicate sets of data layers, each duplicate set comprised of a same plurality of data layers that are each stored in local storage and stored in corresponding ones of said data layers in said duplicate set in each of at least two of the plurality of computing appliances;
wherein each of the plurality of computing appliances is associated with a respective data layer in the set;
wherein changes to the user data in one of the duplicate sets are communicated to and stored in at least one other ones of the duplicate sets to provide a synchronization of storage of the event content data in each of the duplicate sets.

15. The system as in claim 1, further comprising:
wherein there are a plurality of the computing appliances, wherein each said computing appliance is associated with a respective one user of a plurality of users;
communication apparatus providing voice communication between each of at least two of the plurality of users.

16. The system as in claim 1, further comprising:
providing for collaboration on a common project having an associated base image display;
wherein the presentation is provided responsive to the presentation data and the base image display to provide a combined display presentation comprising a display of the presentation responsive to the presentation data shown with at least a part of a display of the base image display.

17. The system as in claim 16,
wherein the base image display is comprised of a display generated responsive to a streaming video presentation.

18. The system as in claim 16,
wherein the base image display is comprised of a display generated responsive to a interactive game video presentation.

19. The system as in claim 16,
wherein the base image display is comprised of a display generated responsive to a data file for a document comprised of one of a word processing document, a spreadsheet document, a graphic image, a photographic image, a moving picture, a group edited document, an engineering project, an agreement, a social media interaction, a display from Instant Messaging, a display from email, a display from a computer program, and a live on-line meeting.

20. A method of collaborating, the method comprising:
utilizing a computing appliance for use by a respective user, in working on a project providing a display of an associated base image display;
providing associatively mapped storage of user data having an associated display of annotations associated with input, by a user, in a defined order relative to other of the events; and
wherein the user data is comprised of event content data for events generated responsive to the input by said user;
the method further comprising:
providing selection of a plurality of the events as a selected set;
processing the event content for the events in the selected set, responsive to the event content data for the events in the selected set, processed in a defined order responsive to the event content data for other of the events in the selected set, to generate presentation data;
providing a combined display presentation responsive to the presentation data.

21. The method as in claim 20,
wherein there are a plurality of the computing appliances each for use by an associated said user of a plurality of users;
wherein the combined display presentation shows the collaborating via the input of at least two of the users.

22. The method as in claim 21,
wherein said storage is comprised of a plurality of data layers,
the method further comprising:
wherein each said data layer of storage storing said user data as associated with the input by each of at least two said users;
providing for user selection of selective inclusion as to which of the data layers are utilized in generation of a local display; and
providing display generation of a local display presentation responsive to the user selection.

23. The method as in claim 22,
providing for a plurality of the users to each provide user selection of selective inclusion to select which of the data layers are to be utilized in an associated said local display presentation for said user;
providing the associated said local display presentation to each of said users responsive to the user selection.

24. The method as in claim 21, further comprising: selecting from the plurality of users to select selected ones of the said users;
selecting associated selected ones of the events responsive to the selected ones of the users; and providing the display generation responsive to the event content for the associated selected ones of the events.

25. The method as in claim 21,
wherein said storage is comprised of a plurality of data layers,
wherein each said data layer of storage stores respective user data that is representative of a respective display of annotations as input by a respective said user;
wherein the storage is comprised duplicate of sets of data layers each said duplicate set stored in one of a plurality of local storage in a respective said computing appliance at least two of the plurality of computing appliances; and
wherein each of the computing appliances is associated with a respective said data layer in said respective local storage in said at least two of said respective plurality of computing appliances;
the method further comprising:
communicating each of said changes between at least two of the computing appliances,
wherein changes to the user data stored in one of the duplicate sets local storage of one said computing appliance are communicated to at least one other one of the computing appliances respective sets of local data layers;
storing the changes to the communicated said user data in the data layer in the local storage that is associated with said user that is associated with said communicated user data, for each of at least two of the plurality of computing appliances; and
wherein the respective said local layer of storage of each one of the at least two of the plurality of computing appliances is updated to both contain a same content as to the changes.

26. The method as in claim 21, further comprising:
providing voice communication between at least each of said at least two of the plurality of users, during the respective said combined display presentation.

27. A method of collaboration, comprising:
a computing appliance for use by a respective user;
non-transitory storage media, storing in user data that is representative of a display of annotations provided responsive to input by a respective user at an associated computing appliance wherein the user data is comprised of event content data for respective events generated in a defined order of entry relative to other of the events;
providing associatively mapped storage of respective user data stored as associated with the user providing the input of said respective user data;
selecting a plurality of the events as a selected set;
generating presentation data responsive to processing the event content data for said events in the selected set, in a defined order responsive to other of the events in the selected set responsive to the mapping logic; and
providing a presentation responsive to the presentation data.

28. The method as in claim 27,
wherein the events are entered in an entry order of input; and
wherein the order of processing of the events is different than the entry order of input.

29. The method as in claim 27,
wherein the user data is comprised of event content data for respective events generated responsive to the input by the respective said user;
wherein the change reference data of one said event identifies a position, within the defined order of entry, relative to another said event.

30. The method as in claim 27,
wherein there are a plurality of the computing appliances, each said computing appliance for use by an associated said user of a plurality of users;
wherein for each one of at least two of the plurality of the users, respective said user data is associated with a display presentation of annotations that are originated by said user;
the method further comprising:
storing the user data that is originated by each said user in local non-transitory memory in the computing appliance associated with said user; communicating the user data for each of at least two of the users between the computing appliances for said at least two of the users, for storage of the user data in respective said local non-transitory storage;
storing the user data in the local storage of the computing appliance to which said user data was communicated; and
providing a local display presentation to each of at least two of the users, responsive to at least a part of the storage of the user data from the communication.

31. The method as in claim 27,
wherein there are a plurality of the computing appliances having input apparatus, each said computing appliance for use by an associated one of a plurality of users;
wherein for each respective one of at least two of the users, the associated said user data is representative of a display presentation of annotations originated at a respective one of the computing appliances;
the method further comprising: providing event content data for respective said events, responsive to the user input for a respective said user for each of at least two of the users, of annotations made by the respective user relative to viewing the display presentation; and storing the event content data for the respective said events, responsive to the mapping, and said event content data generated responsive to the respective said presentation data for the selected set of events.

32. The method as in claim 27,
wherein there are a plurality of the computing appliances, each said computing appliance for use by a respective one user of a plurality of users;
wherein the storage of the user data is mapped as associated with the user providing the input of said user data;
wherein the user data is comprised of event content data for respective events generated responsive to the input by the respective said user;

the method further comprising:

providing storage in a respective one of a plurality of data layers of non-transitory memory, of respective said user data, provided responsive to an input by a respective said user;

mapping of the event content to a respective said data layer that is associatively mapped to the user associated with said event, wherein the event content is stored in a respective one of the data layers that is associatively mapped to the user providing the said input of the event content;

wherein each of the computing appliances has a role designation;

the method further comprising:

selecting a grouping of the data layers as selected data layers for said grouping, responsive to the role designation;

processing the event content data for the events in the selected set in a defined order responsive to the change reference data, and from the selected data layers, to generate presentation data; and generating a respective said display presentation at each of the plurality of computing appliances having the same role designation, responsive to the presentation data for the role designation of each of said plurality of computing appliances in a same said grouping.

33. The method as in claim 27, wherein the event content data is comprised of change reference data, and change content data; the method further comprising:

providing selection of at least two of the events as a selected set;

defining a mapping of the event content as associatively mapped to the respective user associated with said event;

processing the event content data for the events in the selected set, in a defined order responsive to the change reference data for the events in the selected set, and the mapping, to generate new presentation data; and generating a new presentation responsive to the new presentation data.

34. The method as in claim 27, wherein the presentation is provided responsive to the presentation data and as base image display for collaboration on a common project to provide a combined local display presentation comprising a display of the presentation responsive to the presentation data shown with at least a part of a display of the base image display.

35. The system as in claim 34, wherein the base image display is comprised of a display generated responsive to a streaming video presentation.

36. The system as in claim 34, wherein the base image display is comprised of a display generated responsive to a interactive game video presentation.

\* \* \* \* \*